US012297986B2

(12) United States Patent
Vinh et al.

(10) Patent No.: US 12,297,986 B2
(45) Date of Patent: May 13, 2025

(54) BAR HANGER ASSEMBLY WITH CROSSMEMBERS AND HOUSING ASSEMBLIES USING SAME

(71) Applicant: DMF, Inc., Carson, CA (US)

(72) Inventors: Bao Khoa Vinh, Garden Grove, CA (US); Frederick William Kopitzke, Long Beach, CA (US); Amir Lotfi, Redondo Beach, CA (US)

(73) Assignee: DMF, Inc., Carson, CA (US)

( * ) Notice: Subject to any disclaimer, the term of this patent is extended or adjusted under 35 U.S.C. 154(b) by 228 days.

(21) Appl. No.: 17/379,489

(22) Filed: Jul. 19, 2021

(65) Prior Publication Data

US 2022/0018523 A1 Jan. 20, 2022

Related U.S. Application Data

(60) Provisional application No. 63/071,440, filed on Aug. 28, 2020, provisional application No. 63/053,253, filed on Jul. 17, 2020.

(30) Foreign Application Priority Data

Jul. 16, 2021 (CA) ..................................... 3124987

(51) Int. Cl.
*F21V 21/04* (2006.01)
*F21S 8/02* (2006.01)
(Continued)

(52) U.S. Cl.
CPC ................ *F21V 21/03* (2013.01); *F21S 8/02* (2013.01); *F21V 21/04* (2013.01); *F21V 21/22* (2013.01)

(58) Field of Classification Search
CPC . F21V 21/04; F21V 21/047; F21S 8/02; F21S 8/026
See application file for complete search history.

(56) References Cited

U.S. PATENT DOCUMENTS 1,133,535 A 3/1915 Cain et al.
1,454,722 A 5/1923 Boutin
(Continued)

FOREIGN PATENT DOCUMENTS

CA 2243934 C 6/2002
CA 2502637 A1 9/2005
(Continued)

OTHER PUBLICATIONS

Canadian Notice of Allowance dated Nov. 23, 2022 from Canadian App. No. 3,102,022 1 page.
(Continued)

*Primary Examiner* — Sean P Gramling
(74) *Attorney, Agent, or Firm* — Smith Baluch LLP

(57) ABSTRACT

A housing assembly includes a housing to support one or more components of a lighting system or an electrical system, a caddy-type bar hanger assembly to facilitate installation onto support structures in the environment, and one or more bar hanger holders or a pan frame to couple the bar hanger assembly to the housing. In particular, the bar hanger assembly includes a crossmember with mounting features to facilitate installation onto a wood/metal joist or stud, a T-bar, a hat channel, and a metal frame. The crossmember is formed as a unitary component separate from the bar hangers, thus simplifying manufacture by enabling fabrication using conventional sheet metal processes and enabling different housing assemblies to be assembled using one or more of the same components to accommodate housings with different shapes and sizes. The housing assembly may also include support for a junction box and an emergency ballast.

21 Claims, 112 Drawing Sheets

(51) Int. Cl.
*F21V 21/03* (2006.01)
*F21V 21/22* (2006.01)

(56) References Cited

U.S. PATENT DOCUMENTS 1,471,340 A 10/1923 Knight
1,856,356 A 5/1932 Owen
2,038,784 A 4/1936 Ghadiali
2,179,161 A 11/1939 Rambusch
2,197,737 A 4/1940 Appleton
2,352,913 A 7/1944 Morrill
2,528,989 A 11/1950 Ammells
2,642,246 A 6/1953 Larry
2,670,919 A 3/1954 Vincent
2,697,535 A 12/1954 Olson
2,758,810 A 8/1956 Good
D180,844 S 8/1957 Poliakoff
2,802,933 A 8/1957 Broadwin
2,809,002 A 10/1957 Rudolph
2,998,512 A 8/1961 Duchene et al.
3,023,920 A 3/1962 Cook et al.
3,057,993 A 10/1962 Gellert
3,104,087 A 9/1963 Joseph et al.
3,214,126 A 10/1965 Roos
3,422,261 A 1/1969 McGinty
3,460,299 A 8/1969 Wilson
3,650,046 A 3/1972 Skinner
3,675,807 A 7/1972 Lund et al.
3,700,885 A 10/1972 Bobrick
3,711,053 A 1/1973 Drake
D227,989 S 7/1973 Geisel
3,773,968 A 11/1973 Copp
3,836,766 A 9/1974 Auerbach
3,874,035 A 4/1975 Schuplin
3,913,773 A 10/1975 Copp et al.
D245,905 S 9/1977 Taylor
4,050,603 A 9/1977 Harris et al.
4,062,512 A 12/1977 Arnold
4,088,827 A 5/1978 Kohaut
4,154,218 A 5/1979 Hulet
4,154,219 A 5/1979 Gupta et al.
4,176,758 A 12/1979 Glick
4,280,169 A 7/1981 Allen
D267,694 S 1/1983 Moriarty et al.
D267,695 S 1/1983 Paquette et al.
D267,775 S 2/1983 Holcombe
4,399,497 A 8/1983 Druffel
4,450,512 A 5/1984 Kristofek
4,460,948 A 7/1984 Malola
4,520,435 A 5/1985 Baldwin
4,539,629 A 9/1985 Poppenheimer
4,601,145 A 7/1986 Wilcox
4,667,840 A 5/1987 Lindsey
4,723,747 A 2/1988 Karp et al.
4,729,080 A 3/1988 Fremont et al.
4,733,339 A 3/1988 Kelsall
4,754,377 A 6/1988 Wenman
4,770,311 A 9/1988 Wang
4,880,128 A 11/1989 Jorgensen
4,910,651 A 3/1990 Montanez
4,919,292 A 4/1990 Hsu
4,929,187 A 5/1990 Hudson et al.
4,930,054 A 5/1990 Krebs
5,044,582 A 9/1991 Walters
5,216,203 A 6/1993 Gower
5,222,800 A 6/1993 Chan et al.
5,239,132 A 8/1993 Bartow
5,250,269 A 10/1993 Langer et al.
D340,856 S 11/1993 McHugh
D341,819 S 11/1993 Carlstrom
5,266,050 A 11/1993 O'Neil et al.
5,303,894 A 4/1994 Deschamps et al.
5,382,752 A 1/1995 Reyhan et al.
5,420,376 A 5/1995 Rajecki et al.
5,444,606 A 8/1995 Barnes et al.
5,465,199 A 11/1995 Bray et al.
D365,165 S 12/1995 Stultz
5,505,419 A 4/1996 Gabrius
5,544,870 A 8/1996 Kelly et al.
5,560,101 A 10/1996 Sandell
5,562,343 A 10/1996 Chan et al.
5,571,993 A 11/1996 Jones et al.
5,580,158 A 12/1996 Aubrey et al.
5,588,737 A 12/1996 Kusmer
5,603,424 A 2/1997 Bordwell et al.
5,613,338 A 3/1997 Esposito
D381,111 S 7/1997 Lecluze
5,662,413 A 9/1997 Akiyama et al.
D386,277 S 11/1997 Lecluze
5,690,423 A 11/1997 Hentz et al.
D387,466 S 12/1997 Lecluze
5,738,436 A 4/1998 Cummings et al.
5,778,625 A 7/1998 Druffel et al.
5,836,678 A 11/1998 Wright et al.
5,942,726 A 8/1999 Reiker
5,944,412 A 8/1999 Janos et al.
5,957,573 A 9/1999 Wedekind et al.
5,975,323 A 11/1999 Turan
6,030,102 A 2/2000 Gromotka
6,033,098 A 3/2000 Hentz et al.
6,076,788 A 6/2000 Akiyama
6,082,878 A 7/2000 Doubek et al.
6,095,669 A 8/2000 Cho
6,098,945 A 8/2000 Korcz
6,105,334 A 8/2000 Monson et al.
6,161,910 A 12/2000 Reisenauer et al.
6,170,685 B1 1/2001 Currier
6,170,965 B1 1/2001 Kotovsky
6,174,076 B1 1/2001 Petrakis et al.
6,176,599 B1 1/2001 Farzen
6,267,491 B1 7/2001 Parrigin
6,332,597 B1 12/2001 Korcz et al.
6,350,043 B1 2/2002 Gloisten
6,350,046 B1 2/2002 Lau
6,364,511 B1 4/2002 Cohen
6,375,338 B1 4/2002 Cummings et al.
6,423,899 B1 7/2002 Reiker
D461,455 S 8/2002 Forbes
6,461,016 B1 10/2002 Jamison et al.
6,474,846 B1 11/2002 Kelmelis et al.
6,491,270 B1 12/2002 Pfaller
6,491,413 B1 12/2002 Benesohn
D468,697 S 1/2003 Straub, Jr.
6,515,313 B1 2/2003 Ibbetson et al.
6,521,833 B1 2/2003 DeFreitas
6,583,573 B2 6/2003 Bierman
6,585,389 B2 7/2003 Bonazzi
6,600,175 B1 7/2003 Baretz et al.
D478,872 S 8/2003 Heggem
6,632,006 B1 10/2003 Rippel et al.
6,657,236 B1 12/2003 Thibeault et al.
6,666,419 B1 12/2003 Vrame
D487,600 S 3/2004 Fickas
D488,583 S 4/2004 Benghozi
6,719,438 B2 4/2004 Sevack et al.
6,758,578 B1 7/2004 Chou
6,777,615 B1 8/2004 Gretz
6,827,229 B2 12/2004 Dinh et al.
6,827,471 B1 12/2004 Benghozi
6,838,618 B2 1/2005 Newbold et al.
6,889,943 B2 5/2005 Dinh et al.
6,906,352 B2 6/2005 Edmond et al.
D509,314 S 9/2005 Rashidi
6,948,829 B2 9/2005 Verdes et al.
6,958,497 B2 10/2005 Emerson et al.
6,964,501 B2 11/2005 Ryan
6,967,284 B1 11/2005 Gretz
D516,235 S 2/2006 Rashidi
7,025,476 B2 4/2006 Leadford
7,025,477 B2 4/2006 Blessing
7,064,269 B2 6/2006 Smith
D528,673 S 9/2006 Maxik et al.
7,102,172 B2 9/2006 Lynch
D531,740 S 11/2006 Maxik

(56) References Cited

U.S. PATENT DOCUMENTS

| | | | |
|---|---|---|---|
| D532,532 | S | 11/2006 | Maxik |
| 7,148,420 | B1 | 12/2006 | Johnson et al. |
| 7,152,985 | B2 | 12/2006 | Benitez et al. |
| 7,154,040 | B1 | 12/2006 | Tompkins |
| 7,170,015 | B1 | 1/2007 | Roesch et al. |
| D536,349 | S | 2/2007 | Humber et al. |
| D537,039 | S | 2/2007 | Pincek |
| 7,181,378 | B2 | 2/2007 | Benitez et al. |
| D539,229 | S | 3/2007 | Murphey |
| 7,186,008 | B2 | 3/2007 | Patti |
| 7,190,126 | B1 | 3/2007 | Paton |
| 7,211,833 | B2 | 5/2007 | Slater, Jr. et al. |
| 7,213,940 | B1 | 5/2007 | Van De Ven et al. |
| 7,234,674 | B2 | 6/2007 | Rippel et al. |
| D547,889 | S | 7/2007 | Huang |
| D552,969 | S | 10/2007 | Bobrowski et al. |
| D553,267 | S | 10/2007 | Yuen |
| D555,106 | S | 11/2007 | Pape et al. |
| D556,144 | S | 11/2007 | Dinh |
| 7,297,870 | B1 | 11/2007 | Sartini |
| 7,312,474 | B2 | 12/2007 | Emerson et al. |
| 7,320,536 | B2 | 1/2008 | Petrakis et al. |
| D561,372 | S | 2/2008 | Yan |
| D561,373 | S | 2/2008 | Yan |
| 7,335,920 | B2 | 2/2008 | Denbaars et al. |
| D563,896 | S | 3/2008 | Greenslate |
| 7,347,580 | B2 | 3/2008 | Blackman et al. |
| D570,012 | S | 5/2008 | Huang |
| 7,374,308 | B2 | 5/2008 | Sevack et al. |
| D570,504 | S | 6/2008 | Maxik et al. |
| D570,505 | S | 6/2008 | Maxik et al. |
| 7,399,104 | B2 | 7/2008 | Rappaport |
| 7,413,156 | B1 | 8/2008 | Cho |
| 7,429,025 | B1 | 9/2008 | Gretz |
| D578,677 | S | 10/2008 | Huang |
| 7,431,482 | B1 | 10/2008 | Morgan et al. |
| 7,432,440 | B2 | 10/2008 | Hull et al. |
| 7,442,883 | B2 | 10/2008 | Jolly et al. |
| 7,446,345 | B2 | 11/2008 | Emerson et al. |
| 7,470,048 | B2 | 12/2008 | Wu |
| 7,473,005 | B2 | 1/2009 | O'Brien |
| 7,488,097 | B2 | 2/2009 | Reisenauer et al. |
| 7,494,258 | B2 | 2/2009 | McNaught |
| 7,503,145 | B2 | 3/2009 | Newbold et al. |
| 7,510,159 | B2 | 3/2009 | Rippel |
| 7,524,089 | B2 | 4/2009 | Park |
| D591,894 | S | 5/2009 | Flank |
| D592,945 | S | 5/2009 | Mahan |
| 7,534,989 | B2 | 5/2009 | Suehara et al. |
| D596,154 | S | 7/2009 | Rivkin |
| 7,566,154 | B2 | 7/2009 | Gloisten et al. |
| D599,040 | S | 8/2009 | Alexander et al. |
| D600,836 | S | 9/2009 | Hanley et al. |
| 7,588,359 | B2 | 9/2009 | Coushaine et al. |
| 7,592,583 | B2 | 9/2009 | Page et al. |
| D606,696 | S | 12/2009 | Chen et al. |
| 7,628,513 | B2 | 12/2009 | Chiu |
| 7,651,238 | B2 | 1/2010 | O'Brien |
| D611,650 | S | 3/2010 | Broekhoff |
| 7,670,021 | B2 | 3/2010 | Chou |
| 7,673,841 | B2 | 3/2010 | Wronski |
| 7,677,766 | B2 | 3/2010 | Boyer |
| D613,444 | S | 4/2010 | Rashidi |
| 7,692,182 | B2 | 4/2010 | Bergmann et al. |
| 7,699,283 | B2 | 4/2010 | Vrame |
| 7,704,763 | B2 | 4/2010 | Fujii et al. |
| D616,118 | S | 5/2010 | Thomas et al. |
| 7,712,922 | B2 | 5/2010 | Hacker et al. |
| 7,722,208 | B1 | 5/2010 | Dupre et al. |
| 7,722,227 | B2 | 5/2010 | Zhang et al. |
| 7,735,795 | B2 | 6/2010 | Wronski |
| 7,735,798 | B2 | 6/2010 | Kojima |
| 7,748,887 | B2 | 7/2010 | Zampini, II et al. |
| 7,766,518 | B2 | 8/2010 | Piepgras et al. |
| 7,769,192 | B2 | 8/2010 | Takagi et al. |
| 7,771,082 | B2 | 8/2010 | Peng |
| 7,771,094 | B2 | 8/2010 | Goode |
| 7,784,754 | B2 | 8/2010 | Nevers et al. |
| D624,692 | S | 9/2010 | Mackin et al. |
| D625,847 | S | 10/2010 | Maglica |
| D625,876 | S | 10/2010 | Chen et al. |
| 7,810,775 | B2 | 10/2010 | Ponte et al. |
| D627,727 | S | 11/2010 | Alexander et al. |
| 7,828,465 | B2 | 11/2010 | Roberge et al. |
| D629,366 | S | 12/2010 | Ericson et al. |
| 7,857,275 | B2 | 12/2010 | de la Borbolla |
| 7,871,184 | B2 | 1/2011 | Peng |
| 7,874,539 | B2 | 1/2011 | Wright et al. |
| 7,874,703 | B2 | 1/2011 | Shastry et al. |
| D633,224 | S | 2/2011 | Lee |
| D636,903 | S | 4/2011 | Torenbeek |
| D637,339 | S | 5/2011 | Hasan et al. |
| D637,340 | S | 5/2011 | Hasan et al. |
| 7,950,832 | B2 | 5/2011 | Tanaka et al. |
| D639,499 | S | 6/2011 | Choi et al. |
| D640,819 | S | 6/2011 | Pan |
| 7,956,546 | B2 | 6/2011 | Hasnain |
| 7,959,332 | B2 | 6/2011 | Tickner et al. |
| 7,967,480 | B2 | 6/2011 | Pickard et al. |
| D642,317 | S | 7/2011 | Rashidi |
| 7,972,035 | B2 | 7/2011 | Boyer |
| 7,972,043 | B2 | 7/2011 | Schutte |
| D642,536 | S | 8/2011 | Robinson |
| D643,970 | S | 8/2011 | Kim et al. |
| 7,993,037 | B1 | 8/2011 | Buse |
| 8,002,425 | B2 | 8/2011 | Russo et al. |
| D646,011 | S | 9/2011 | Rashidi |
| 8,013,243 | B2 | 9/2011 | Korcz et al. |
| 8,038,113 | B2 | 10/2011 | Fryzek et al. |
| D648,476 | S | 11/2011 | Choi et al. |
| D648,477 | S | 11/2011 | Kim et al. |
| D650,115 | S | 12/2011 | Kim et al. |
| 8,070,328 | B1 | 12/2011 | Knoble et al. |
| 8,096,670 | B2 | 1/2012 | Trott |
| D654,205 | S | 2/2012 | Rashidi |
| D655,436 | S | 3/2012 | Johnson |
| D656,262 | S | 3/2012 | Yoshinobu et al. |
| D656,263 | S | 3/2012 | Ogawa et al. |
| 8,142,057 | B2 | 3/2012 | Roos et al. |
| 8,152,334 | B2 | 4/2012 | Krogman |
| D658,788 | S | 5/2012 | Dudik et al. |
| D658,802 | S | 5/2012 | Chen |
| D659,862 | S | 5/2012 | Tsai |
| D659,879 | S | 5/2012 | Rashidi |
| D660,814 | S | 5/2012 | Wilson |
| 8,177,176 | B2 | 5/2012 | Nguyen et al. |
| 8,182,116 | B2 | 5/2012 | Zhang et al. |
| 8,201,968 | B2 | 6/2012 | Maxik et al. |
| D663,058 | S | 7/2012 | Pan |
| D663,466 | S | 7/2012 | Rashidi |
| D664,274 | S | 7/2012 | de Visser et al. |
| D664,705 | S | 7/2012 | Kong et al. |
| 8,215,805 | B2 | 7/2012 | Cogliano et al. |
| 8,220,970 | B1 | 7/2012 | Khazi et al. |
| 8,226,270 | B2 | 7/2012 | Yamamoto et al. |
| 8,235,549 | B2 | 8/2012 | Gingrich, III et al. |
| 8,238,050 | B2 | 8/2012 | Minano et al. |
| 8,240,630 | B2 | 8/2012 | Wronski |
| D667,155 | S | 9/2012 | Rashidi |
| 8,262,255 | B1 | 9/2012 | Rashidi |
| D668,372 | S | 10/2012 | Renshaw et al. |
| D668,809 | S | 10/2012 | Rashidi |
| D669,198 | S | 10/2012 | Qui |
| D669,199 | S | 10/2012 | Chuang |
| D669,620 | S | 10/2012 | Rashidi |
| 8,277,090 | B2 | 10/2012 | Fryzek et al. |
| 8,308,322 | B2 | 11/2012 | Santiago et al. |
| D673,869 | S | 1/2013 | Yu |
| D676,263 | S | 2/2013 | Birke |
| D676,814 | S | 2/2013 | Paul |
| 8,376,593 | B2 | 2/2013 | Bazydola et al. |
| D677,417 | S | 3/2013 | Rashidi |
| D677,634 | S | 3/2013 | Korcz et al. |
| D679,047 | S | 3/2013 | Tickner et al. |

(56) References Cited

U.S. PATENT DOCUMENTS 8,403,289 B1 3/2013 Rinderer
8,403,533 B1 3/2013 Paulsel
8,403,541 B1 3/2013 Rashidi
D681,259 S 4/2013 Kong
8,408,759 B1 4/2013 Rashidi
D682,459 S 5/2013 Gordin et al.
D683,063 S 5/2013 Lopez et al.
D683,890 S 6/2013 Lopez et al.
D684,269 S 6/2013 Wang et al.
D684,719 S 6/2013 Rashidi
D685,118 S 6/2013 Rashidi
D685,120 S 6/2013 Rashidi
8,454,204 B1 6/2013 Chang et al.
D685,507 S 7/2013 Sun
D687,586 S 8/2013 Rashidi
D687,587 S 8/2013 Rashidi
D687,588 S 8/2013 Rashidi
D687,980 S 8/2013 Gravely et al.
D688,405 S 8/2013 Kim et al.
8,506,127 B2 8/2013 Russello et al.
8,506,134 B2 8/2013 Wilson et al.
D690,049 S 9/2013 Rashidi
D690,864 S 10/2013 Rashidi
D690,865 S 10/2013 Rashidi
D690,866 S 10/2013 Rashidi
D691,314 S 10/2013 Rashidi
D691,315 S 10/2013 Samson
D691,763 S 10/2013 Hand et al.
8,550,669 B2 10/2013 Macwan et al.
D693,043 S 11/2013 Schmalfuss et al.
D693,517 S 11/2013 Davis
D694,456 S 11/2013 Rowlette, Jr. et al.
8,573,816 B2 11/2013 Negley et al.
D695,441 S 12/2013 Lui et al.
D696,446 S 12/2013 Huh
D696,447 S 12/2013 Huh
D696,448 S 12/2013 Huh
D698,067 S 1/2014 Rashidi
D698,068 S 1/2014 Rashidi
8,622,361 B2 1/2014 Wronski
8,632,040 B2 1/2014 Mass et al.
D698,985 S 2/2014 Lopez et al.
D699,384 S 2/2014 Rashidi
D699,687 S 2/2014 Baldwin et al.
D700,387 S 2/2014 Snell
8,641,243 B1 2/2014 Rashidi
8,651,705 B2 2/2014 Wilcox
8,659,034 B2 2/2014 Baretz et al.
D700,991 S 3/2014 Johnson et al.
D701,175 S 3/2014 Baldwin et al.
D701,466 S 3/2014 Clifford et al.
8,672,518 B2 3/2014 Boomgaarden et al.
D702,867 S 4/2014 Kim et al.
D703,843 S 4/2014 Cheng
8,684,569 B2 4/2014 Pickard et al.
8,696,158 B2 4/2014 Santiago et al.
D705,472 S 5/2014 Huh
8,727,582 B2 5/2014 Brown et al.
D708,381 S 7/2014 Rashidi
8,777,449 B2 7/2014 Ven et al.
D710,529 S 8/2014 Lopez et al.
8,801,217 B2 8/2014 Oehle et al.
8,833,013 B2 9/2014 Harman
8,845,144 B1 9/2014 Davies et al.
D714,989 S 10/2014 Rowlette, Jr. et al.
8,870,426 B2 10/2014 Biebl et al.
8,888,332 B2 11/2014 Martis et al.
8,890,414 B2 11/2014 Rowlette, Jr. et al.
D721,845 S 1/2015 Lui et al.
8,926,133 B2 1/2015 Booth
8,939,418 B2 1/2015 Green et al.
D722,296 S 2/2015 Taylor
D722,977 S 2/2015 Hagarty
D722,978 S 2/2015 Hagarty
8,950,898 B2 2/2015 Catalano
8,967,575 B1 3/2015 Gretz
D726,363 S 4/2015 Danesh
D726,949 S 4/2015 Redfern
9,004,435 B2 4/2015 Wronski
9,039,254 B2 5/2015 Danesh
D731,689 S 6/2015 Bernard et al.
9,062,866 B1 6/2015 Christ et al.
9,065,264 B2 6/2015 Cooper et al.
9,068,719 B2 6/2015 Van De Ven et al.
9,068,722 B2 6/2015 Wronski et al.
D734,525 S 7/2015 Gordin et al.
D735,012 S 7/2015 Cowie
D735,142 S 7/2015 Hagarty
9,078,299 B2 7/2015 Ashdown
9,109,760 B2 8/2015 Shum et al.
9,109,783 B1 8/2015 Davis et al.
D739,355 S 9/2015 D'Aubeterre
D739,590 S 9/2015 Redfern
9,140,441 B2 9/2015 Goelz et al.
D742,325 S 10/2015 Leung
9,151,457 B2 10/2015 Pickard et al.
9,151,477 B2 10/2015 Pickard et al.
9,217,560 B2 12/2015 Harbers et al.
9,222,661 B2 12/2015 Kim et al.
9,239,131 B1 1/2016 Wronski et al.
D750,317 S 2/2016 Lui et al.
9,285,103 B2 3/2016 Van De Ven et al.
9,291,319 B2 3/2016 Kathawate et al.
9,301,362 B2 3/2016 Dohn et al.
D754,078 S 4/2016 Baldwin et al.
D754,079 S 4/2016 Baldwin et al.
D754,605 S 4/2016 McMillan
9,303,812 B2 4/2016 Green et al.
9,310,038 B2 4/2016 Athalye
9,310,052 B1 4/2016 Shum
9,322,543 B2 4/2016 Hussell et al.
D756,025 S 5/2016 Wronski et al.
9,347,655 B2 5/2016 Boomgaarden et al.
9,366,418 B2 6/2016 Gifford
9,371,966 B2 6/2016 Rowlette, Jr. et al.
D762,181 S 7/2016 Lin
9,395,051 B2 7/2016 Hussell et al.
D762,906 S 8/2016 Jeswani et al.
D764,079 S 8/2016 Wu
9,404,639 B2 8/2016 Bailey et al.
9,417,506 B1 8/2016 Tirosh
9,423,110 B1 8/2016 Newton et al.
D766,185 S 9/2016 Hagarty
D767,199 S 9/2016 Wronski et al.
9,447,917 B1 9/2016 Wronski et al.
D768,325 S 10/2016 Xu
D768,326 S 10/2016 Guzzini
D769,501 S 10/2016 Jeswani et al.
D770,065 S 10/2016 Tittle
9,476,552 B2 10/2016 Myers et al.
9,488,324 B2 11/2016 Shum et al.
D776,324 S 1/2017 Gierl et al.
D777,967 S 1/2017 Redfern
9,534,751 B2 1/2017 Maglica et al.
D778,241 S 2/2017 Holbrook et al.
D778,484 S 2/2017 Guzzini
D779,100 S 2/2017 Redfern
9,581,302 B2 2/2017 Danesh
9,583,926 B2 2/2017 Ye
9,599,315 B1 3/2017 Harpenau et al.
9,605,842 B1 3/2017 Davis
9,605,910 B2 3/2017 Swedberg et al.
D785,228 S 4/2017 Guzzini
D786,472 S 5/2017 Redfern
D786,474 S 5/2017 Fujisawa
D788,330 S 5/2017 Johnson et al.
D790,102 S 6/2017 Guzzini
9,673,597 B2 6/2017 Lee
9,689,541 B2 6/2017 Wronski
D791,709 S 7/2017 Holton
D791,711 S 7/2017 Holton
D791,712 S 7/2017 Holton
9,696,021 B2 7/2017 Wronski
9,702,516 B1 7/2017 Vasquez et al.

(56) References Cited

U.S. PATENT DOCUMENTS

| | | | |
|---|---|---|---|
| D795,820 | S | 8/2017 | Wengreen |
| 9,732,904 | B1 | 8/2017 | Wronski |
| 9,732,947 | B1 | 8/2017 | Christ et al. |
| 9,739,464 | B2 | 8/2017 | Wronski |
| 9,791,111 | B1 | 10/2017 | Huang et al. |
| 9,797,562 | B2 | 10/2017 | Dabiet et al. |
| 9,803,839 | B2 | 10/2017 | Visser et al. |
| D805,660 | S | 12/2017 | Creasman et al. |
| D805,881 | S | 12/2017 | Nehls |
| 9,854,642 | B2 | 12/2017 | Kashani |
| D809,176 | S | 1/2018 | Partington |
| 9,863,619 | B2 | 1/2018 | Mak |
| D809,465 | S | 2/2018 | Keirstead |
| 9,903,569 | B2 | 2/2018 | O'Brien et al. |
| 9,945,548 | B2 | 4/2018 | Williams et al. |
| 9,964,266 | B2 | 5/2018 | Danesh |
| D819,879 | S | 6/2018 | Oudina et al. |
| D820,494 | S | 6/2018 | Cohen |
| 9,995,439 | B1 | 6/2018 | Shum et al. |
| 9,995,441 | B2 | 6/2018 | Power et al. |
| 10,006,613 | B2 | 6/2018 | Oudina et al. |
| D824,494 | S | 7/2018 | Martins et al. |
| 10,054,274 | B2 | 8/2018 | Athalye et al. |
| 10,072,805 | B2 | 9/2018 | Bailey |
| D832,218 | S | 10/2018 | Wronski et al. |
| D833,977 | S | 11/2018 | Danesh et al. |
| 10,125,959 | B2 | 11/2018 | Cohen |
| 10,139,059 | B2 | 11/2018 | Danesh |
| D834,928 | S | 12/2018 | Lu et al. |
| D836,976 | S | 1/2019 | Reese et al. |
| 10,244,607 | B1 | 3/2019 | Kashani |
| D847,414 | S | 4/2019 | Danesh et al. |
| D847,415 | S | 4/2019 | Danesh et al. |
| 10,247,390 | B1 | 4/2019 | Kopitzke et al. |
| D848,375 | S | 5/2019 | Danesh et al. |
| 10,281,131 | B2 | 5/2019 | Cohen |
| 10,295,163 | B1 | 5/2019 | Cohen |
| D851,046 | S | 6/2019 | Peng et al. |
| 10,408,395 | B2 | 9/2019 | Danesh |
| 10,408,396 | B2 | 9/2019 | Wronski et al. |
| 10,408,436 | B2 | 9/2019 | Wronski et al. |
| D864,877 | S | 10/2019 | Danesh |
| 10,488,000 | B2 | 11/2019 | Danesh et al. |
| 10,541,522 | B2 | 1/2020 | Lalancette |
| 10,551,044 | B2 | 2/2020 | Peng et al. |
| 10,563,850 | B2 | 2/2020 | Danesh |
| D877,957 | S | 3/2020 | Kopitzke, IV |
| 10,591,120 | B2 | 3/2020 | Bailey et al. |
| 10,609,785 | B1 | 3/2020 | Fardadi et al. |
| 10,663,127 | B2 | 5/2020 | Danesh et al. |
| 10,663,153 | B2 | 5/2020 | Nikooyan et al. |
| 10,683,994 | B2 | 6/2020 | Wronski et al. |
| 10,684,003 | B2 | 6/2020 | Wronski et al. |
| 10,704,745 | B2 | 7/2020 | Sherry et al. |
| D892,069 | S | 8/2020 | Cohen |
| 10,753,558 | B2 | 8/2020 | Danesh |
| 10,808,917 | B2 | 10/2020 | Harris et al. |
| 10,816,148 | B2 | 10/2020 | Danesh |
| D901,398 | S | 11/2020 | Danesh et al. |
| D902,160 | S | 11/2020 | Cohen |
| D902,871 | S | 11/2020 | Danesh et al. |
| D903,605 | S | 12/2020 | Danesh et al. |
| D905,327 | S | 12/2020 | Williams et al. |
| D907,284 | S | 1/2021 | Danesh et al. |
| D917,401 | S | 4/2021 | Mohamed |
| 10,975,570 | B2 | 4/2021 | Shen |
| 10,982,829 | B2 | 4/2021 | Danesh |
| 11,015,785 | B1 | 5/2021 | Schubert |
| D922,331 | S | 6/2021 | Cohen |
| 11,022,259 | B2 | 6/2021 | Bailey et al. |
| 11,028,982 | B2 | 6/2021 | Danesh |
| 11,047,538 | B2 | 6/2021 | Danesh et al. |
| D924,467 | S | 7/2021 | Danesh et al. |
| D925,109 | S | 7/2021 | Danesh et al. |
| 11,060,705 | B1 | 7/2021 | Danesh et al. |
| 11,067,231 | B2 | 7/2021 | Lotfi et al. |
| D927,430 | S | 8/2021 | Cohen et al. |
| 11,085,597 | B2 | 8/2021 | Danesh |
| 11,118,768 | B2 | 9/2021 | Danesh |
| D934,665 | S | 11/2021 | Cronkhite et al. |
| D939,134 | S | 12/2021 | Danesh et al. |
| D940,545 | S | 1/2022 | Tanner et al. |
| 11,231,154 | B2 | 1/2022 | Kopitzke et al. |
| D944,212 | S | 2/2022 | Peng et al. |
| 11,242,983 | B2 | 2/2022 | Danesh |
| 11,255,497 | B2 | 2/2022 | Danesh |
| 11,274,821 | B2 | 3/2022 | Danesh |
| 11,306,903 | B2 | 4/2022 | Young |
| 11,391,442 | B2 | 7/2022 | Danesh |
| 11,435,064 | B1 | 9/2022 | Danesh |
| 11,435,066 | B2 | 9/2022 | Danesh |
| 11,448,384 | B2 | 9/2022 | Nikooyan et al. |
| D966,877 | S | 10/2022 | Kopitzke et al. |
| D970,081 | S | 11/2022 | Kopitzke et al. |
| 11,585,517 | B2 | 2/2023 | Kopitzke et al. |
| D990,030 | S | 6/2023 | Young et al. |
| 11,668,455 | B2 | 6/2023 | Danesh et al. |
| 11,800,617 | B2 | 10/2023 | Kumar et al. |
| 11,808,430 | B2 | 11/2023 | Danesh |
| D1,012,864 | S | 1/2024 | Danesh et al. |
| 12,000,562 | B2 | 6/2024 | Danesh |
| 2002/0172047 | A1 | 11/2002 | Ashley |
| 2003/0006353 | A1 | 1/2003 | Dinh et al. |
| 2003/0016532 | A1 | 1/2003 | Reed |
| 2003/0021104 | A1 | 1/2003 | Tsao |
| 2003/0092323 | A1 | 5/2003 | Chou |
| 2004/0001337 | A1 | 1/2004 | Defouw et al. |
| 2004/0120141 | A1 | 6/2004 | Beadle |
| 2004/0156199 | A1 | 8/2004 | Rivas et al. |
| 2005/0121215 | A1 | 6/2005 | Halbert |
| 2005/0225966 | A1 | 10/2005 | Hartmann et al. |
| 2005/0227536 | A1 | 10/2005 | Gamache et al. |
| 2005/0231962 | A1 | 10/2005 | Koba et al. |
| 2005/0237746 | A1 | 10/2005 | Yiu |
| 2006/0005988 | A1 | 1/2006 | Jorgensen |
| 2006/0108137 | A1 | 5/2006 | Smith |
| 2006/0158873 | A1 | 7/2006 | Newbold et al. |
| 2006/0215408 | A1 | 9/2006 | Lee |
| 2006/0237601 | A1 | 10/2006 | Rinderer |
| 2006/0243877 | A1 | 11/2006 | Rippel |
| 2006/0262536 | A1 | 11/2006 | Nevers |
| 2006/0262545 | A1 | 11/2006 | Piepgras et al. |
| 2007/0012847 | A1 | 1/2007 | Tai |
| 2007/0035951 | A1 | 2/2007 | Tseng |
| 2007/0121328 | A1 | 5/2007 | Mondloch et al. |
| 2007/0131827 | A1 | 6/2007 | Nevers et al. |
| 2007/0185675 | A1 | 8/2007 | Papamichael et al. |
| 2007/0200039 | A1 | 8/2007 | Petak |
| 2007/0206374 | A1 | 9/2007 | Petrakis et al. |
| 2008/0002414 | A1 | 1/2008 | Miletich et al. |
| 2008/0019138 | A1 | 1/2008 | Otte et al. |
| 2008/0068847 | A1 | 3/2008 | Bedard |
| 2008/0112168 | A1 | 5/2008 | Pickard et al. |
| 2008/0112170 | A1 | 5/2008 | Trott |
| 2008/0112171 | A1 | 5/2008 | Patti et al. |
| 2008/0137347 | A1 | 6/2008 | Trott et al. |
| 2008/0165545 | A1 | 7/2008 | O'Brien |
| 2008/0170404 | A1 | 7/2008 | Steer et al. |
| 2008/0186718 | A1 | 8/2008 | Magisano et al. |
| 2008/0224008 | A1 | 9/2008 | Dal Ponte et al. |
| 2008/0232116 | A1 | 9/2008 | Kim |
| 2009/0003009 | A1 | 1/2009 | Tessnow et al. |
| 2009/0034261 | A1 | 2/2009 | Grove |
| 2009/0080189 | A1 | 3/2009 | Wegner |
| 2009/0097262 | A1 | 4/2009 | Zhang et al. |
| 2009/0135613 | A1 | 5/2009 | Peng |
| 2009/0141500 | A1 | 6/2009 | Peng |
| 2009/0141506 | A1 | 6/2009 | Lan et al. |
| 2009/0141508 | A1 | 6/2009 | Peng |
| 2009/0147517 | A1 | 6/2009 | Li |
| 2009/0161356 | A1 | 6/2009 | Negley et al. |
| 2009/0237924 | A1 | 9/2009 | Ladewig |
| 2009/0280695 | A1 | 11/2009 | Sekela et al. |
| 2009/0283292 | A1 | 11/2009 | Lehr |

(56) References Cited

U.S. PATENT DOCUMENTS

2009/0290343 A1 11/2009 Brown et al.
2009/0310371 A1 12/2009 Goode
2010/0002320 A1 1/2010 Minano et al.
2010/0014282 A1 1/2010 Danesh
2010/0033095 A1 2/2010 Sadwick
2010/0061108 A1 3/2010 Zhang et al.
2010/0110690 A1 5/2010 Hsu et al.
2010/0110698 A1 5/2010 Harwood et al.
2010/0110699 A1 5/2010 Chou
2010/0148673 A1 6/2010 Stewart et al.
2010/0149822 A1 6/2010 Cogliano et al.
2010/0155497 A1 6/2010 Hagaman
2010/0165643 A1 7/2010 Russo et al.
2010/0244709 A1 9/2010 Steiner et al.
2010/0246172 A1 9/2010 Liu
2010/0259919 A1 10/2010 Khazi et al.
2010/0270903 A1 10/2010 Jao et al.
2010/0277905 A1 11/2010 Janik et al.
2010/0302778 A1 12/2010 Dabiet et al.
2010/0328956 A1 12/2010 Zhang
2011/0043040 A1 2/2011 Porter et al.
2011/0063831 A1 3/2011 Cook
2011/0068687 A1 3/2011 Takahasi et al.
2011/0069499 A1 3/2011 Trott et al.
2011/0080750 A1 4/2011 Jones et al.
2011/0116276 A1 5/2011 Okamura et al.
2011/0121756 A1 5/2011 Thomas et al.
2011/0134634 A1 6/2011 Gingrich et al.
2011/0134651 A1 6/2011 Berman
2011/0170294 A1 7/2011 Mier-Langner et al.
2011/0194299 A1 8/2011 Crooks et al.
2011/0216534 A1 9/2011 Tickner et al.
2011/0226919 A1 9/2011 Fryzek et al.
2011/0255292 A1 10/2011 Shen
2011/0267828 A1 11/2011 Bazydola et al.
2012/0020104 A1 1/2012 Biebl et al.
2012/0074852 A1 3/2012 Delnoij
2012/0106176 A1 5/2012 Lopez et al.
2012/0113642 A1 5/2012 Catalano
2012/0140442 A1 6/2012 Woo et al.
2012/0140465 A1 6/2012 Rowlette, Jr. et al.
2012/0162994 A1 6/2012 Wasniewski et al.
2012/0182744 A1 7/2012 Santiago et al.
2012/0188762 A1 7/2012 Joung et al.
2012/0243237 A1 9/2012 Toda et al.
2012/0250321 A1 10/2012 Blincoe et al.
2012/0266449 A1 10/2012 Krupa
2012/0287625 A1 11/2012 Macwan et al.
2012/0305868 A1 12/2012 Callahan et al.
2012/0314429 A1 12/2012 Plunk
2013/0009552 A1 1/2013 Page
2013/0010476 A1 1/2013 Pickard et al.
2013/0033872 A1 2/2013 Randolph et al.
2013/0051012 A1 2/2013 Oehle et al.
2013/0077307 A1 3/2013 Yamamoto
2013/0083529 A1 4/2013 Gifford
2013/0141913 A1 6/2013 Sachsenweger
2013/0155681 A1 6/2013 Nall et al.
2013/0227908 A1 9/2013 Gulbrandsen et al.
2013/0258677 A1 10/2013 Fryzek et al.
2013/0265750 A1 10/2013 Pickard et al.
2013/0271989 A1 10/2013 Hussell et al.
2013/0292149 A1 11/2013 Cooper
2013/0294084 A1 11/2013 Kathawate et al.
2013/0301252 A1 11/2013 Hussell et al.
2013/0322062 A1 12/2013 Danesh
2013/0335980 A1 12/2013 Nakasuji et al.
2014/0029262 A1 1/2014 Maxik et al.
2014/0036497 A1 2/2014 Hussell et al.
2014/0049957 A1 2/2014 Goelz et al.
2014/0063776 A1 3/2014 Clark et al.
2014/0071679 A1 3/2014 Booth
2014/0071687 A1 3/2014 Tickner et al.
2014/0140490 A1 5/2014 Roberts et al.
2014/0063818 A1 6/2014 Randolph et al.
2014/0254177 A1 9/2014 Danesh
2014/0268869 A1 9/2014 Blessitt et al.
2014/0299730 A1 10/2014 Green et al.
2014/0301092 A1 10/2014 Wronski
2014/0313775 A1 10/2014 Myers et al.
2014/0347848 A1 11/2014 Pisavadia et al.
2015/0009676 A1 1/2015 Danesh
2015/0078008 A1 3/2015 He
2015/0085500 A1 3/2015 Cooper et al.
2015/0138779 A1 5/2015 Livesay et al.
2015/0153635 A1 6/2015 Chen et al.
2015/0184837 A1 7/2015 Zhang et al.
2015/0198324 A1 7/2015 O'Brien et al.
2015/0233556 A1 8/2015 Danesh
2015/0263497 A1 9/2015 Korcz et al.
2015/0276185 A1 10/2015 Bailey et al.
2015/0362159 A1 12/2015 Ludyjan
2016/0084488 A1 3/2016 Wu et al.
2016/0209007 A1 7/2016 Belmonte et al.
2016/0230969 A1 8/2016 Pelletier et al.
2016/0238225 A1 8/2016 Doust
2016/0308342 A1 10/2016 Witherbee et al.
2016/0312987 A1 10/2016 Danesh
2016/0366738 A1 12/2016 Boulanger et al.
2017/0003007 A1 1/2017 Wronski
2017/0005460 A1 1/2017 Lee
2017/0045213 A1 2/2017 Williams et al.
2017/0059135 A1 3/2017 Jones
2017/0138576 A1 5/2017 Peng et al.
2017/0138581 A1 5/2017 Doust
2017/0167672 A1 6/2017 Stauner et al.
2017/0167699 A1 6/2017 Schubert et al.
2017/0198896 A1 7/2017 May
2017/0284616 A1 10/2017 Coakley et al.
2017/0307188 A1 10/2017 Oudina et al.
2017/0307198 A1 10/2017 Shah et al.
2018/0119907 A1 5/2018 O'Brien et al.
2018/0123351 A1 5/2018 Andrews et al.
2018/0142871 A1 5/2018 Morales
2018/0216809 A1 8/2018 Cohen
2018/0224095 A1 8/2018 Cohen
2018/0231197 A1 8/2018 Danesh
2018/0283677 A1 10/2018 Cohen
2019/0041050 A1 2/2019 Cairns et al.
2019/0049080 A1 2/2019 Danesh
2019/0063701 A1 2/2019 Lotfi et al.
2019/0086043 A1 3/2019 Wronski
2019/0093836 A1 3/2019 Danesh
2019/0195475 A1* 6/2019 Jones ...................... F21S 8/026
2019/0249852 A1 8/2019 Kim
2019/0301710 A1 10/2019 Harris
2020/0182420 A1 6/2020 Cohen et al.
2020/0291652 A1 9/2020 Shen
2020/0323073 A1 10/2020 Cartrette et al.
2020/0355334 A1 11/2020 Shen et al.
2020/0393118 A1 12/2020 Danesh et al.
2021/0010647 A1 1/2021 Danesh et al.
2021/0010663 A1 1/2021 Nikooyan et al.
2021/0033268 A1 2/2021 Danesh
2021/0045221 A1 2/2021 Dejonge et al.
2021/0080081 A1 3/2021 Cohen
2021/0080084 A1 3/2021 Danesh et al.
2021/0222845 A1 7/2021 Kopitzke et al.
2021/0254812 A1 8/2021 Danesh et al.
2021/0364139 A1 11/2021 Danesh
2022/0018522 A1 1/2022 Kopitzke et al.
2022/0018525 A1 1/2022 Danesh
2022/0034488 A1 2/2022 Cohen
2022/0042664 A1 2/2022 Lotfi et al.
2022/0049841 A1 2/2022 Young et al.
2022/0082233 A1 3/2022 Kopitzke et al.
2022/0085610 A1 3/2022 Dejonge et al.
2022/0243883 A1 8/2022 Cohen
2023/0040032 A1 2/2023 Danesh et al.

(56) References Cited

U.S. PATENT DOCUMENTS

| | | | |
|---|---|---|---|
| 2023/0125086 | A1 | 4/2023 | Ungaro |
| 2024/0035643 | A1 | 2/2024 | Kopitzke et al. |

FOREIGN PATENT DOCUMENTS

| | | | |
|---|---|---|---|
| CA | 2691480 | C | 4/2012 |
| CA | 2734369 | A1 | 10/2013 |
| CA | 2561459 | A1 | 11/2013 |
| CA | 2815067 | | 11/2013 |
| CA | 2848289 | A1 | 10/2014 |
| CA | 2998173 | | 7/2018 |
| CN | 2182475 | Y | 11/1994 |
| CN | 2406574 | Y | 11/2000 |
| CN | 1309618 | A | 8/2001 |
| CN | 201059503 | Y | 5/2008 |
| CN | 201259125 | Y | 6/2009 |
| CN | 101608781 | A | 12/2009 |
| CN | 101859057 | A | 10/2010 |
| CN | 201636626 | U | 11/2010 |
| CN | 102062373 | A | 5/2011 |
| CN | 202014067 | U | 10/2011 |
| CN | 202392473 | U | 8/2012 |
| CN | 202733693 | U | 2/2013 |
| CN | 302544307 | S | 8/2013 |
| CN | 103307518 | A | 9/2013 |
| CN | 103322476 | A | 9/2013 |
| CN | 203202661 | U | 9/2013 |
| CN | 203215483 | U | 9/2013 |
| CN | 302580902 | S | 9/2013 |
| CN | 101498411 | B | 11/2013 |
| CN | 203273663 | U | 11/2013 |
| CN | 203297980 | U | 11/2013 |
| CN | 203628464 | U | 12/2013 |
| CN | 203641919 | U | 6/2014 |
| CN | 204120631 | U | 1/2015 |
| CN | 303103186 | S | 2/2015 |
| CN | 104654142 | A | 5/2015 |
| CN | 204513161 | U | 7/2015 |
| CN | 204611541 | U | 9/2015 |
| CN | 204786225 | U | 11/2015 |
| CN | 204829578 | U | 12/2015 |
| CN | 103712135 | B | 4/2016 |
| CN | 205606362 | U | 9/2016 |
| CN | 206130742 | U | 4/2017 |
| CN | 103154606 | B | 5/2017 |
| CN | 304220113 | | 7/2017 |
| CN | 110671657 | A | 1/2020 |
| CN | 210536989 | U | 5/2020 |
| DE | 9109828 | U1 | 2/1992 |
| EP | 1 589 289 | | 10/2005 |
| EP | 1 672 155 | A1 | 6/2006 |
| EP | 1688663 | | 8/2006 |
| EP | 2 095 938 | A1 | 2/2008 |
| EP | 2 306 072 | A1 | 4/2011 |
| EP | 2 453 169 | A2 | 5/2012 |
| EP | 2 193 309 | B1 | 7/2012 |
| EP | 3 104 024 | A1 | 12/2016 |
| GB | 2325728 | | 12/1998 |
| GB | 2427020 | A | 12/2006 |
| GB | 2466875 | | 7/2010 |
| GB | 2471929 | | 1/2014 |
| GB | 2509772 | A | 7/2014 |
| JP | H02113002 | U | 9/1990 |
| JP | 2007091052 | A | 4/2007 |
| JP | 2007265961 | A | 10/2007 |
| JP | 2011060450 | A2 | 3/2011 |
| JP | 2012064551 | A2 | 3/2012 |
| JP | 2015002027 | A2 | 1/2015 |
| JP | 2015002028 | A2 | 1/2015 |
| JP | 2016219335 | A | 12/2016 |
| JP | 2017107699 | A2 | 6/2017 |
| JP | D1658938 | | 4/2020 |
| KR | 1020110008796 | A | 1/2011 |
| KR | 1020120061625 | A | 6/2012 |
| MX | 2011002947 | A | 9/2011 |
| PH | 3-2018-658-0001 | | 7/2018 |
| TW | 474382 | U | 1/2002 |
| WO | WO D038920-001 | | 1/1997 |
| WO | WO 2013/128896 | A1 | 9/2013 |
| WO | WO 2014/015656 | | 1/2014 |
| WO | WO 2015/000212 | A1 | 1/2015 |
| WO | WO 2016152166 | A2 | 9/2016 |
| WO | WO 2022/056180 | | 3/2022 |

OTHER PUBLICATIONS

Canadian Office Action dated Dec. 19, 2022 from Canadian Application No. 3,135,470, 5 pages.
Canadian Office Action dated Dec. 16, 2022 from Canadian Application No. 3,130,524, 6 pages.
Chinese Office Action and English Translation in Chinese Application No. CN 202210354716.6, dated Jul. 29, 2023, 13 pages.
Canadian Office Action in Canadian Application No. CA 3,135,470, dated Jul. 27, 2023, 4 pages.
Whaling Museum Chooses Imtra LED Lighting for Popular Exhibit, LEDs Magazine Sep. 17, 2010; https://www.ledsmagazine.com/company-newsfeed/article/16690837/whaling-museum-chooses-imtra-led-lighting-for-popular-exhibit, 3 pages.
Imtra supplied its LED lighting to USA. Whaling Museum; LEDinside, Sep. 20, 2010, https://www.ledinside.com/news/2010/9/news_Imtra_LED_20100920, 1 page.
International Search Report and Written Opinion in PCT/US 23/65292 dated Nov. 6, 2023, 31 pages.
Notice of Allowance Mailed Jun. 7, 2022 from U.S. Appl. No. 29/683,638, 7 pages.
Non-Final Office Action mailed Jun. 20, 2022 from U.S. Appl. No. 17/381,147, 4 Pages.
Non-Final Office Action mailed Jun. 22, 2022 from U.S. Appl. No. 29/759,492, 6 Pages.
Notice of Allowance mailed Jul. 11, 2022 from U.S. Appl. No. 29/696,830, 5 Pages.
Final Office Action from U.S. Appl. No. 29/711,198 , 7 Pages.
Non-Final Office Action dated Oct. 25, 2022 from U.S. Appl. No. 17/099,650, 10 Pages.
Final Office Action dated Dec. 15, 2022 from U.S. Appl. No. 29/743,066, 16 pages.
Supplemental Notice of Allowance mailed Jan. 17, 2023 from U.S. Appl. No. 17/384,564 2 pages.
Office Action dated Jan. 24, 2023 from U.S. Appl. No. 17/677,300, 5 pages.
Notice of Allowance mailed Mar. 1, 2023 from U.S. Appl. No. 29/711,198, 7 pages.
Non-Final Office Action mailed Mar. 17, 2023 from U.S. Appl. No. 17/723,370, 5 pages.
Non-Final Office Action mailed Mar. 23, 2023 from U.S. Appl. No. 17/694,489, 9 pages.
Notice of Allowance mailed Mar. 29, 2023 from U.S. Appl. No. 17/666,441, 9 pages.
Notice of Allowance mailed Apr. 10, 2023 from U.S. Appl. No. 29/743,066, 7 pages.
Final Office Action mailed Apr. 12, 2023 from U.S. Appl. No. 29/759,492, 8 Pages.
Non-Final Office Action dated May 8, 2023 from U.S. Appl. No. 17/677,300 , 7 Pages.
Non-Final Office Action dated Jul. 7, 2023 from U.S. Appl. No. 17/826,847, 8 Pages.
Non-Final Office Action dated Oct. 5, 2023 from U.S. Appl. No. 17/328,214, 12 Pages.
Final Office Action dated Oct. 12, 2023 from U.S. Appl. No. 17/723,370, 25 Pages.
Non-Final Office Action dated Oct. 16, 2023 from U.S. Appl. No. 17/694,489, 17 Pages.
Non-Final Office Action dated Oct. 23, 2023 from U.S. Appl. No. 17/381,147, 4 Pages.
Opinion from the Fed. Ct. of App. in *Amp Plus, Inc.* v. *Dmf, Inc.* in case Nos. 2021-1595, 2021-1636 (Appeals from the PTAB in IPR2019-01094) decided on Nov. 10, 2022, 15 pages.

(56) References Cited

OTHER PUBLICATIONS

Notice of Allowance dated Feb. 5, 2024 from U.S. Appl. No. 17/826,848, 8 Pages.
U.S. Appl. No. 14/183,424, filed Feb. 18, 2014, Danesh.
U.S. Appl. No. 14/726,064, filed May 29, 2015, Bailey et al.
U.S. Appl. No. 15/132,875, filed Apr. 19, 2016, Danesh.
U.S. Appl. No. 15/167,682, filed May 27, 2016, Bailey et al.
U.S. Appl. No. 14/942,937, filed Nov. 16, 2015, Peng et al.
U.S. Appl. No. 15/637,742, filed Jun. 29, 2017, Kopitzke, IV.
U.S. Appl. No. 15/688,266, filed Aug. 28, 2017, Lofti et al.
U.S. Appl. No. 15/853,400, filed Dec. 22, 2017, Kashani.
U.S. Appl. No. 15/901,738, filed Feb. 21, 2018, Danesh.
U.S. Appl. No. 15/947,065, filed Apr. 6, 2018, Danesh.
U.S. Appl. No. 16/016,040, filed Jun. 22, 2018, Danesh.
U.S. Appl. No. 16/200,393, filed Nov. 26, 2018, Danesh.
U.S. Appl. No. 29/638,259, filed Feb. 26, 2018, Danesh.
U.S. Appl. No. 29/541,565, filed Oct. 5, 2015, Peng.
U.S. Appl. No. 29/645,941, filed Apr. 30, 2018, Danesh et al.
U.S. Appl. No. 29/653,142, filed Jun. 11, 2018, Danesh et al.
U.S. Appl. No. 29/664,471, filed Sep. 25, 2018, Danesh et al.
U.S. Appl. No. 29/678,478, filed Jan. 29, 2019, Danesh et al.
U.S. Appl. No. 29/678,482, filed Jan. 29, 2019, Danesh et al.
U.S. Appl. No. 29/683,730, filed Mar. 15, 2019, Danesh et al.
U.S. Appl. No. 29/694,475, filed Jun. 11, 2019, Peng et al.
U.S. Appl. No. 16/653,497, filed Oct. 15, 2019, Danesh et al.
U.S. Appl. No. 29/711,198, filed Nov. 29, 2019, Danesh et al.
U.S. Appl. No. 16/690,970, filed Nov. 21, 2019, Nikooyan et al.
U.S. Appl. No. 16/719,361, filed Dec. 18, 2019, Danesh et al.
U.S. Appl. No. 16/522,275 filed Jul. 25, 201, Danesh.
U.S. Appl. No. 16/725,606, filed Dec. 23, 2019, Bailey et al.
U.S. Appl. No. 29/648,046, filed May 17, 2018, Williams.
U.S. Appl. No. 16/779,824, filed Feb. 3, 2020, Danesh.
U.S. Appl. No. 16/779,865, filed Feb. 3, 2020, Danesh et al.
U.S. Appl. No. 29/688,172, filed Apr. 18, 2019, Danesh et al.
U.S. Appl. No. 29/688,143, filed Apr. 18, 2019, Danesh et al.
U.S. Appl. No. 16/883,144, filed May 26, 2020, Nikooyan et al.
U.S. Appl. No. 29/696,830, filed Jul. 1, 2019, Kopitzke.
U.S. Appl. No. 16/182,481, filed Nov. 6, 2018, Kopitzke.
U.S. Appl. No. 29/762,016, filed Dec. 14, 2020, Williams et al.
U.S. Appl. No. 17/118,742, filed Dec. 11, 2020, Danesh et al.
U.S. Appl. No. 29/752,046, filed Sep. 24, 2020, Peng et al.
U.S. Appl. No. 17/229,668, filed Apr. 13, 2021, Shen.
U.S. Appl. No. 17/318,193, filed May 12, 2021, Danesh et al.
U.S. Appl. No. 17/080,080, filed Oct. 26, 2020, Danesh.
U.S. Appl. No. 17/220,779, filed Apr. 1, 2021, Kopitzke et al.
U.S. Appl. No. 17/395,522, filed Aug. 6, 2021, Danesh.
U.S. Appl. No. 17/385,766, filed Jul. 26, 2021, Kopitzke.
U.S. Appl. No. 17/384,564, filed Jul. 23, 2021, Kopitzke et al.
U.S. Appl. No. 17/381,147, filed Jul. 20, 2021, Lofti et al.
U.S. Appl. No. 17/379,748, filed Jul. 19, 2021, Young et al.
U.S. Appl. No. 17/379,489, filed Jul. 19, 2021, Vinh et al.
U.S. Appl. No. 17/378,214, filed Jul. 16, 2021, Kopitzke et al.
U.S. Appl. No. 17/374,674, filed Jul. 13, 2021, Danesh.
U.S. Appl. No. 17/234,421, filed Apr. 19, 2021, Danesh.
U.S. Appl. No. 29/764,875, filed Jan. 4, 2021, Danesh et al.
U.S. Appl. No. 29/759,492, filed Nov. 23, 2020, Danesh et al.
U.S. Appl. No. 17/099,650, filed Nov. 16, 2020, Danesh et al.
U.S. Appl. No. 29/757,754, filed Nov. 9, 2020, Danesh et al.
U.S. Appl. No. 17/473,934, filed Sep. 13, 2021, Danesh et al.
U.S. Appl. No. 29/467,026, filed Sep. 13, 2013, Danesh et al.
U.S. Appl. No. 14/823,410, filed Aug. 11, 2015, Williams et al.
U.S. Appl. No. 14/791,249, filed Jul. 2, 2015, Lee.
U.S. Appl. No. 15/158,538, filed May 18, 2016, Kashani.
U.S. Appl. No. 15/897,955, filed Feb. 15, 2018, Fardadi et al.
U.S. Appl. No. 29/648,937, filed May 24, 2018, Kopitzke.
U.S. Appl. No. 17/666,441, filed Feb. 7, 2022, Danesh et al.
U.S. Appl. No. 29/663,037, filed Sep. 11, 2018, Danesh et al.
U.S. Appl. No. 29/663,040, filed Sep. 11, 2018, Danesh et al.
U.S. Appl. No. 29/746,262, filed Aug. 12, 2020, Danesh et al.
U.S. Appl. No. 29/820,189, filed Dec. 20, 2021, Danesh et al.
U.S. Appl. No. 17/902,469, filed Sep. 2, 2022, Danesh.
U.S. Appl. No. 16/881,686, filed May 22, 2020, Danesh et al.
U.S. Appl. No. 17/085,636, filed Oct. 30, 2020, Danesh et al.
U.S. Appl. No. 17/867,522, filed Jul. 18, 2022, Danesh et al.
U.S. Appl. No. 17/000,702, filed Aug. 24, 2020, Danesh.
U.S. Appl. No. 17/677,300, filed Feb. 22, 2022, Danesh.
U.S. Appl. No. 17/933,257, filed Sep. 19, 2022, Danesh et al.
U.S. Appl. No. 16/886,365, filed May 28, 2020, Shen.
U.S. Appl. No. 17/694,489, filed Mar. 14, 2022, Danesh et al.
U.S. Appl. No. 13/484,901, filed May 31, 2012, Danesh.
U.S. Appl. No. 17/902,474, filed Sep. 2, 2022, Danesh.
U.S. Appl. No. 29/743,066, filed Jul. 17, 2020, Young et al.
U.S. Appl. No. 17/723,370, filed Apr. 18, 2022, Young et al.
U.S. Appl. No. 16/033,122, filed Jul. 11, 2018, Fardadi et al.
U.S. Appl. No. 29/867,928, filed Nov. 14, 2022, Kopitzke.
U.S. Appl. No. 29/683,638, filed Mar. 14, 2019, Kopitzke et al.
U.S. Appl. No. 29/867,213, filed Oct. 14, 2022, Kopitzke et al.
U.S. Appl. No. 17/582,921, filed Jan. 24, 2022, Kopitzke et al.
U.S. Appl. No. 17/826,847, filed May 27, 2022, Danesh.
U.S. Appl. No. 18/068,639, filed Dec. 20, 2022, Danesh et al.
U.S. Appl. No. 18/171,379, filed Feb. 20, 2023, Kopitzke et al.
U.S. Appl. No. 18/055,070, filed Nov. 14, 2022, Kumar.
U.S. Appl. No. 18/488,145, filed Oct. 17, 2023, Kumar, et al.
U.S. Appl. No. 18/501,219, filed Nov. 3, 2023, Danesh.
Canadian Office Action in Canadian App. No. 3,125,954 dated Mar. 27, 2024, 13 pages.
Canadian Office Action in Canadian App. No. 3,130,524 dated Apr. 10, 2024, 7 pages.
Notice of Allowance dated Jun. 12, 2024 in U.S. Appl. No. 17/694,489, 11 Pages.
Non-Final Office Action dated Jul. 25, 2024 in U.S. Appl. No. 18/501,219, 5 Pages.
Notice of Allowance dated Jul. 25, 2024 in U.S. Appl. No. 17/378,214, 16 Pages.
Non-Final Office Action dated Aug. 8, 2024 in U.S. Appl. No. 29/752,046, 9 pages.
Notice of Allowance dated Aug. 12, 2024 in U.S. Appl. No. 17/381,147, 8 pages.
Notice of Allowance dated Sep. 17, 2024 in U.S. Appl. No. 17/723,370, 9 pages.
Ex Parte Quayle Office Action mailed Dec. 5, 2024 for U.S. Appl. No. 17/694,489, 8 pages.
2006 International Building Code, Section 712 Penetrations, Jan. 2006, 4 pages.
Acrich COB Zhaga Module, Product Description, Seoul Semiconductor, Nov. 11, 2016, 39 pages.
<https://www.zhagastandard.org/books/book18/>, Mar. 2017, 5 pages. Accessed on May 14, 2018.
Bortz, J. C et al., "Optimal design of a nonimaging TIR doublet lens for an illumination system using an LED source", Proc. SPIE 5529, Nonimaging Optics and Efficient Illumination Systems, (Sep. 29, 2004); doi: 10.1117/12.562598; https://doi.org/10.1117/12.562598, 10 pages.
BXUV.Guideinfo, Fire Resistance Ratings—ANSI/UL 263, UL Online Certifications Directory, last updated Nov. 3, 2016, 27 pages.
CEYY.GuideInfo, Outlet Boxes and Fittings Certified for Fire Resistance, UL Online Certifications Directory, last updated May 16, 2013, 2 pages.
Canadian Office Action dated Dec. 23, 2013 from Canadian Application No. 2,778,581, 3 pages.
Canadian Office Action dated Mar. 22, 2016 from Canadian Application No. 2,879,629, 4 pages.
Canadian Office Action dated Dec. 6, 2016 from Canadian Application No. 2,879,629, 3 pages.
Canadian Office Action dated Mar. 9, 2017 from Canadian Application No. 2,931,588, 5 pages.
Canadian Office Action dated Feb. 1, 2016 from Canadian Application No. 2,879,486, 5 pages.
Canadian Office Action dated Jun. 12, 2017 from Canadian Application No. 2,927,601, 4 pages.
Canadian Office Action dated Aug. 11, 2017 from Canadian Application No. 2,941,051, 4 pages.

(56) References Cited

OTHER PUBLICATIONS

Carlon® Zip Box® Blue™ Switch and Outlet Boxes, Product Brochure, http://www.carlonsales.com/brochures.php, Jun. 20, 2006, 22 pages.
Cree LED Lamp Family Sales Sheet—Better light is beautiful light , Apr. 24, 2017, 2 pages.
DME Series Installation Instructions, Oct. 18, 2011, 2 pages.
DMF, Inc., "dmfLIGHTING: LED Recessed Lighting Solutions," Info sheets, Mar. 15, 2012, 4 pages.
DMF, Inc., "dmfLIGHTING: LED Recessed Downlighting," DRD2 Product Brochure, Oct. 23, 2014, 50 pages.
DMF, Inc., "dmfLIGHTING: LED Recessed Downlighting," Product Catalog, Aug. 2012, 68 pages.
Dross, O. et al., "Review of SMS design methods and real-world applications", Proc. SPIE 5529, Nonimaging Optics and Efficient Illumination Systems, (Sep. 29, 2004); doi: 10.1117/12.561336; https://doi.org/10.1117/12.561336, 14 pages.
Final Office Action mailed Apr. 27, 2016 from U.S. Appl. No. 14/184,601, 19 pages.
Final Office Action mailed Jul. 26, 2017 from U.S. Appl. No. 14/184,601, 18 pages.
Final Office Action mailed Jan. 29, 2016 from U.S. Appl. No. 14/183,424, 21 pages.
Final Office Action mailed Jun. 23, 2016 from U.S. Appl. No. 13/484,901, 18 pages.
Final Office Action mailed Apr. 2, 2015 from U.S. Appl. No. 13/484,901, 13 pages.
Halo, Halo LED H4 H7 Collection, SustainabLEDesign, Cooper Lighting, (emphasis on p. 18 "H7 Collection LED Modules—Halo Led H7 Module Features,") Mar. 28, 2012, 52 pages.
Halo, H7 LED Downlight Trims 49x Series, 6-inch LED Trims for Use with MI7x LED Modules, Cooper Lighting, ADV110422, rev. Aug. 12, 2011, 15 pages.
Halo, LED Module ML706x, Cooper Lighting, General Installation for All Modules/p. 1; Tether Installation/pp. 2-3; Installation into Halo H750x Series LED—only (Non-Screw Based), Recessed Fixture, p. 4, Oct. 20, 2009, 4 pages.
Medvedev, V. et al., "Uniform LED illuminator for miniature displays," Proc. SPIE 3428, Illumination and Source Engineering, (Oct. 20, 1998); doi: 10.1117/12.327957;https://doi.org/10.1117/12.327957, 13 pages.
"Membrane Penetrations in Fire-Resistance Rated Walls," https://www.ul.com/wp-content/uploads/2014/04/ul_MembranePenetrations.pdf, Issue 1, 2009, published Feb. 26, 2010, 2 pages.
"Metallic Outlet Boxes," UL 514A, Underwriters Laboratories, Inc., Feb. 16, 2004 (Title Page Reprinted Aug. 10, 2007), 106 pages.
"Metallic and Non-metallic Outlet Boxes Used in Fire-rated Assembly," https://iaeimagazine.org/magazine/2000/09/16/metallic-and-non-metallic-outlet-boxes-used-in-fire-rated-assembly/, Sep. 16, 2000, 5 pages.
Notice of Allowance mailed Mar. 26, 2018 for U.S. Appl. No. 14/184,601, 10 pages.
Non-Final Office Action mailed Mar. 15, 2010 from U.S. Appl. No. 12/100,148, 8 pages.
Non-Final Office Action mailed Apr. 30, 2010 from U.S. Appl. No. 12/173,232, 13 pages.
Non-Final Office Action mailed Sep. 5, 2014 from U.S. Appl. No. 13/791,087, 8 pages.
Non-Final Office Action mailed Jul. 20, 2015 from U.S. Appl. No. 14/184,601, 16 pages.
Non-Final Office Action mailed Dec. 15, 2016 from U.S. Appl. No. 14/184,601, 18 pages.
Non-Final Office Action mailed Feb. 6, 2018 from U.S. Appl. No. 15/167,682, 9 pages.
Non-Final Office Action mailed Sep. 15, 2015 from U.S. Appl. No. 13/484,901, 16 pages.
Non-Final Office Action mailed Oct. 16, 2014 from U.S. Appl. No. 13/484,901, 11 pages.
Non-Final Office Action mailed Sep. 6, 2017 from U.S. Appl. No. 14/726,064, 8 pages.
Non-Final Office Action mailed May 17, 2017 from U.S. Appl. No. 14/183,424, 20 pages.
Non-Final Office Action mailed Jun. 2, 2015 from U.S. Appl. No. 14/183,424, 20 pages.
Non-Final Office Action mailed Apr. 12, 2018 for U.S. Appl. No. 29/638,259, 5 pages.
Non-Final Office Action mailed May 16, 2018 for U.S. Appl. No. 15/132,875, 18 pages.
Notice of Allowance mailed Jan. 30, 2015 from U.S. Appl. No. 13/791,087, 9 pages.
Notice of Allowance mailed Jan. 16, 2015 from U.S. Appl. No. 29/467,026, 9 pages.
Notice of Allowance mailed Oct. 21, 2016 from U.S. Appl. No. 13/484,901, 7 pages.
Notice of Allowance mailed Mar. 24, 2016 from U.S. Appl. No. 14/247,149, 8 pages.
Notice of Allowance mailed May 22, 2018 from U.S. Appl. No. 14/183,424, 9 pages.
Notice of Allowance mailed May 10, 2018 from U.S. Appl. No. 14/726,064, 7 pages.
Notice of Allowance mailed Aug. 23, 2017 from Canadian Application No. 2,879,629, 1 page.
"Outlet Boxes for Use in Fire Rated Assemblies," https://www.ul.com/wp-content/uploads/2014/04/Ul_outletboxes.pdf, Apr. 2007, 2 pages.
Parkyn, W. A. et al., "New TIR lens applications for light-emitting diodes", Proc. SPIE 3139, Nonimaging Optics: Maximum Efficiency Light Transfer IV, (Oct. 3, 1997); doi: 10.1117/12.290217, 7 pages.
Schreiber, P. et al., "Microoptics for homogeneous LED-illumination", Proc. SPIE 6196, Photonics in Multimedia, 61960P (Apr. 21, 2006); doi: 10.1117/12.663084; https://doi.org/10.1117/12.663084, 11 pages.
Van Giel, B. V. et al., "Design of axisymmetrical tailored concentrators for LED light source applications", Proc. SPIE 6196, Photonics in Multimedia, 619603 (Apr. 21, 2006); doi: 10.1117/12.660115; https://doi.org/10.1117/12.660115, 11 pages.
Zhen, Y. et al., "The optimal design of TIR lens for improving LED illumination uniformity and efficiency", Proc. SPIE 6834, Optical Design and Testing III, 68342K (Nov. 28, 2007); doi: 10.1117/12.756101, 9 pages.
Zou, H. et al., "58.1: Single-Panel LCOS Color Projector with LED Light Sources", SID Symposium, vol. 36, Issue 1, 4 pages (May 2005).
Notice of Allowance mailed Sep. 21, 2018 from U.S. Appl. No. 29/645,941, 5 pages.
"Advanced LED Solutions," Imtra Marine Lighting. Jun. 17, 2011. 39 pages.
"Portland Bi-Color, Warm White/Red," item:ILIM30941.Imtra Marine Products. 2012. 3 pages. Accessed athttp://www.imtra.com:80/0ade25fb-3218-4cae-a926-6abe64ffd93a/lighting-light-fixtures-downlights-3-to-4-inches-detail.htm on Jan. 25, 2013.
"Cree LMH2 LED Modules," Mouser Electronics. Accesssed at www.mouser.com/new/cree/creelmh2 on Sep. 9, 2012. 2 pages.
"Cree LMH2 LED Module with TrueWhite Technology," Cree Product Family Data Sheet. Dec. 21, 2011. 3 pages.
"Cree LMH2 LED Modules Design Guide," Cree Product Design Guide. 2011. 20 pages.
"Undercabinet Pucks, Xyris Mini LED Puck Light," ELCO Lighting. Sep. 2018. 1 page.
"LED Undercabinet Pocket Guide," ELCO Lighting. Nov. 2, 2016. 12 pages.
"Versi LED Mini Flush," Lithonia Lghting. Sep. 2013. 6 pages.
Notice of Allowance mailed Oct. 4, 2018 from U.S. Appl. No. 15/947,065 , 9 pages.
Notice of Allowance mailed Sep. 19, 2018 from U.S. Appl. No. 15/167,682 , 7 pages.
Non-Final Office Action mailed Jun. 25, 2018 for U.S. Appl. No. 29/541,565, 10 pages.
Non-Final Office Action mailed Oct. 24, 2018 for U.S. Appl. No. 15/688,266, 14 pages.

(56) References Cited

OTHER PUBLICATIONS

OneFrame Recessed LED Downlight. Dmflighting.com. Published Jun. 6, 2018. Retrieved at https://www.dmflighting.com/product/oneframe on Jun. 6, 2018. 11 pages.
Notice of Allowance mailed Oct. 9, 2018 from U.S. Appl. No. 29/653,142, 7 pages.
International Search Report and Written Opinion in PCT/US2018/048357 mailed Nov. 14, 2018, 13 pages.
Notice of Allowance mailed Nov. 27, 2018 from U.S. Appl. No. 15/167,682, 11 pages.
Non-Final Office Action mailed Dec. 5, 2018 from U.S. Appl. No. 14/942,937, 13 pages.
Notice of Allowance mailed Jan. 2, 2019 from U.S. Appl. No. 29/541,565, 6 pages.
RACO 4 i+A882:C958n. Octagon Welded Concrete Ring, 3½ in. Deep with ½ and ¾ in. Knockouts and ilcludes 890 cover (20-Pack). Model # 280. Accessed at https://www.homedepot.com/p/RACO-4-in-Octagon-Welded-Concrete-Ring-3-1-2-in-Deep-with-1-2-and-3-4-in-Knockouts-and-ilcludes-890-cover-20-Pack-280/203638679 on Jan. 18, 2019. 3 pages.
RACO 4 in. Octagon Welded Concrete Ring, 6 in. Deep with ½ and ¾ in. Knockouts (10-Pack). Model # 276. Accessed at https://www.homedepot.com/p/RACO-4-in-Octagon-Welded-Concrete-Ring-6-in-Deep-with-1-2-and-3-4-in-Knockouts-10-Pack-276/203638675 on Jan. 16, 2019. 4 pages.
Notice of Allowance mailed Feb. 8, 2019 from U.S. Appl. No. 29/541,565, 5 pages.
Non-Final Office Action mailed Febraury 7, 2019 from U.S. Appl. No. 16/200,393, 32 pages.
Notice of Allowance mailed Jan. 28, 2019 from U.S. Appl. No. 29/664,471, 8 pages.
Non-Final Office Action mailed Jul. 24, 2018 from U.S. Appl. No. 29/638,259, 5 pages.
Final Office Action mailed Mar. 15, 2019 from U.S. Appl. No. 15/132,875,15 pages.
International Search Report and Written Opinion in International Patent Application No. PCT/US18/62868 mailed Mar. 14, 2019, 13 pages.
CS&E PCT Collaborative Search and Examination Pilot Upload Peer Contribution in International Patent Application No. PCT/US18/62868 mailed Mar. 14, 2019, 61 pages.
Notice of Allowance mailed Apr. 1, 2019 from U.S. Appl. No. 15/167,682, 7 pages.
Non-Final Office Action mailed Apr. 4, 2019 from U.S. Appl. No. 29/678,482, 8 pages.
Notice of Allowance mailed Apr. 8, 2019 from U.S. Appl. No. 29/653,142, 8 pages.
Notice of Allowance mailed Apr. 17, 2019 from U.S. Appl. No. 29/678,478, 7 pages.
International Search Report and Written Opinion in International Patent Application No. PCT/US18/67614 mailed Apr. 25, 2019, 20 pages.
CS&E PCT Collaborative Search and Examination Pilot Upload Peer Contribution in International Patent Application No. PCT/US18/67614 mailed Apr. 24, 2019, 53 pages.
Specification & Features 4" Octagonal Concrete Box Covers. Orbit Industries, Inc. Accessed at https://www.orbitelectric.com on May 6, 2019. 1 page.
4" Octagon Concrete Boxes and Back Plates. Appleton. Accessed at www.appletonelec.com on May 6, 2019. 1 page.
RACO Commercial, Industrial and Residential Electrical Products. Hubbell. Accessed at www.Hubbell-RTB.com on May 6, 2019. 356 pages.
Imtra Marine Lighting 2008 Catalog. 40 pages.
Imtra Marine Lighting 2009 Catalog. 32 pages.
Imtra Marine Lighting Spring 2007 Catalog. 36 pages.
Final Office Action mailed Jun. 6, 2019 from U.S. Appl. No. 15/688,266, 7 pages.
Non-Final Office Action mailed Jun. 11, 2019 from U.S. Appl. No. 15/901,738, 6 pages.
Cooper Lighting Halo ML56 LED System Product Sheet. Mar. 2, 2015. Accessed at http://www.cooperindustries.com/content/dam/public/lighting/products/documents/halo/spec_sheets/halo-ml56600-80cri-141689-sss.pdf. 8 pages.
Kwikbrace® New Construction Braces for Lighting Fixtures or Ceiling Fans 1½ in. Depth. Hubbel. Accessed at https://hubbellcdn.com/specsheet/926.pdf on Jun. 27, 2019. 1 page.
IC1JB Housing 4" IC-Rated New Construction Junction Box Housing. AcuityBrands. Accessed at https://www.acuitybrands.com/en/products/detail/845886/juno/ic1jb-housing/4-ic-rated-new-construction-junction-box-housing on Jun. 27, 2019.
Ex-Parte Quayle Action mailed Jun. 27, 2019 from U.S. Appl. No. 29/683,730, 5 pages.
Notice of Allowance mailed Jul. 31, 2019 from U.S. Appl. No. 15/167,682 , 7 pages.
Supplemental Notice of Allowance mailed Aug. 5, 2019 from U.S. Appl. No. 15/947,065, 2 pages.
International Search Report and Written Opinion in International Patent Application No. PCT/US19/32281 mailed Aug. 2, 2019, 18 pages.
Notice of Allowance mailed Sep. 11, 2019 from U.S. Appl. No. 29/653,142, 6 pages.
Corrected Notice of Allowance mailed Sep. 27, 2019 from U.S. Appl. No. 15/167,682 , 2 pages.
Final Office Action mailed Sep. 27, 2019 from U.S. Appl. No. 16/200,393, 34 pages.
Notice of Allowance mailed Feb. 15, 2019 from U.S. Appl. No. 15/947,065 , 9 pages.
Notice of Allowance mailed Oct. 1, 2019 from U.S. Appl. No. 14/942,937, 7 pages.
Final Office Action mailed Oct. 3, 2019 from U.S. Appl. No. 29/678,482, 6 pages.
Delhi Rehab & Nursing Facility ELM16-70884. Vertex Innovative Solutions Feb. 25, 2016. 89 pages.
SlimSurface surface mount downlighting. Philips Lightolier 2018. 8 pages.
Be seen in the best light. Lightolier by signify. Comprehensive 2019 Lighting Catalog. 114 pages.
Cree® LMR2 LED Module. Product Family Data Sheet Cree 2011. 3 pages.
Notice of Allowance mailed Oct. 16, 2019 from U.S. Appl. No. 15/132,875, 12 pages.
International Search Report and Written Opinion in International Patent Application No. PCT/US2019/036477 mailed Oct. 17, 2019, 15 pages.
ML56 LED Lighting System 600 / 900 / 1200 Series Halo. Cooper Lighting Brochure 2015. Accessed at https://images.homedepot-static.com/catalog/pdfImages/06/06d28f93-4bf6-45be-a35a-a0239606f227.pdf. 41 pages.
Switch and Outlet Boxes and Covers Brochure. Appelton 2010. 77 pages.
Notice of Allowance mailed Feb. 5, 2020 from U.S. Appl. No. 15/901,738 , 8 pages.
Notice of Allowance mailed Feb. 5, 2020 from U.S. Appl. No. 29/678,482 , 13 pages.
Maxim Lighting Wafer Trifold Brochure LMXBRO1711 2017. Accessed at https://www.maximlighting.com/Upload/download/brochure/pdf/LMXBRO1711.pdf on Feb. 13, 2020. 2 pages.
Maxim Convert Fixture. LMXCAT 1805 Maxim Main Catalog 2018 p. 639.
Maxim Wafer. LMXCAT 1805 Maxim Main Catalog 2018 pp. 636-638.
Maxim Lighting Trim Trifold LMXBRO1905 2019. Accessed at https://www.maximlighting.com/Upload/download/brochure/pdf/LMXBRO1905.pdf on Feb. 13, 2020. 2 pages.
International Search Report and Written Opinion in International Patent Application No. PCT/US2019/054220 mailed Feb. 24, 2020, 23 pages.
Final Office Action mailed Mar. 17, 2020 for U.S. Appl. No. 29/653,142, 13 pages.
LED Book Pr ice Guide 2012. DMF Light. Issued Jun. 26, 2013. 3 pages.

(56) References Cited

OTHER PUBLICATIONS

DLER411 4" Recessed LED Retrofit Module. DMF Light. Issued Jun. 15, 2011. 1 page.
DLEI411 4" Recessed LED New Construction, IC. DMF Light. Issued Nov. 30, 2011. 1 page.
DLEIR411 4" Recessed LED Remodel, IC. DMF Light. Issued Jun. 15, 2011. 1 page.
3 & 4" DLE Ser ies LED Sample Case Now Available. DMF Light. Issued Jan. 6, 2012. 1 page.
DLEI3 3" Recessed LED New Construction, IC. DMF Light. Issued Nov. 30, 2011. 2 pages.
Ridgway-Barnes, SlimSurface LED Downlight: One of the thinnest LED surface mount downlights in the market. Philips Lighting Blog. Oct. 28, 2014. Accessed at http://applications.nam.lighting.philips.com/blog/index.php/2014/10/28/slimsurface-led-downlight-one-of-the-thinnest-led-surface-mount-downlights-in-the-market/. 3 pages.
SlimSurface LED S5R, S7R & S10R Round 5", 7" and 10" Apertures. Lightolier by Signify. Nov. 2018. 9 pages.
Non-Final Office Action mailed Apr. 2, 2020 for U.S. Appl. No. 16/522,275, 21 pages.
Innofit Commercial Downlight. Greencreative. Accessed at https://greencreative.com/products/luminaires/commercial-downlighting/innofit-cdl-8-inch-12-19-27w/ on Apr. 28, 2020. 6 pages.
20 cu. in. Blue Polycarbonate Round New Work Ceiling Electrical Box. Carlon. Accessed at https://www.homedepot.com/p/Carlon-20-cu-in-Blue-Polycarbonate-Round-New-Work-Ceiling-Electrical-Box- B520P-UPC/202592617?MERCH=REC-_-pipsem-_-100404124-_-202592617-_-N on May 15, 2020. 14 pages.
Notice of Allowance mailed May 18, 2020 from U.S. Appl. No. 15/901,738 , 7 pages.
Non-Final Office Action mailed May 20, 2020 for U.S. Appl. No. 15/688,266, 6 pages.
Non-Final Office Action mailed May 26, 2020 for U.S. Appl. No. 16/719,361, 10 pages.
Taiwan Office Action and translation thereof dated Jun. 12, 2020 from Taiwan Application No. 108116564, 8 pages.
Access Lighting Installation Instructions. No. 20870LEDD/20871LEDD/20872LEDD. Dec. 16, 2019. 2 pages.
Model No. 20870LEDD-WH/ACR Infinite Specification Sheet. Access Lighting. Apr. 9, 2020. 1 page.
Notice of Allowance mailed Jul. 10, 2020 from U.S. Appl. No. 29/694,475, 6 pages.
Octagon Concrete Box Cover with (3) ½ in. & (2) ¾ in. Conduit Knockouts. Garvin. Accessed at https://www.garvinindustries.com/covers-and-device-rings/concrete-slab-box-covers-adaptor-rings/flat-covers-all-styles/cbp?gclid=Cj0KCQjw9b_4BRCMARIsADMUIypJc0K80UHdDTI9C5m4BDzR3U87PRYV1NdQIBFxEWQ21_3otTCTqEkaAi_DEALw_wcB on Jul. 20, 2020. 1 page.
Notice of Allowance mailed Jul. 28, 2020 from U.S. Appl. No. 16/719,361, 8 pages.
Notice of Allowance mailed Jul. 29, 2020 from U.S. Appl. No. 16/522,275, 8 pages.
Non-Final Office Action mailed Aug. 19, 2020 for U.S. Appl. No. 16/886,365, 16 pages.
Notice of Allowance mailed Sep. 8, 2020 from U.S. Appl. No. 29/678,482, 5 pages.
Corrected Notice of Allowance mailed Sep. 11, 2020 from U.S. Appl. No. 16/719,361, 2 pages.
Canadian Office Action in Application No. 2931588 dated Aug. 13, 2020, 5 pages.
Corrected Notice of Allowance mailed Sep. 14, 2020 from U.S. Appl. No. 16/522,275, 2 pages.
Notice of Allowance mailed Sep. 22, 2020 from U.S. Appl. No. 29/683,730, 6 pages.
Notice of Allowance mailed Sep. 22, 2020 from U.S. Appl. No. 29/653,142, 6 pages.
Notice of Allowance mailed Oct. 27, 2020 from U.S. Appl. No. 29/694,475, 5 pages.
Non-Final Office Action mailed Nov. 30, 2020 from U.S. Appl. No. 17/000,702, 7 pages.
International Search Report and Written Opinion in PCT/US2020/050767 mailed Dec. 9, 2020, 25 pages.
Non-Final Office Action mailed Dec. 16, 2020 from U.S. Appl. No. 17/080,080, 28 pages.
Canadian Office Action in Application No. 2941051 dated Dec. 8, 2020, 5 pages.
Final Office Action mailed Jan. 11, 2021 from U.S. Appl. No. 15/688,266, 7 pages.
Non-Final Office Action mailed Jan. 11, 2021 from U.S. Appl. No. 16/725,606, 7 pages.
Notice of Allowance mailed Jan. 15, 2021 from U.S. Appl. No. 17/000,702, 7 pages.
Notice of Allowance mailed Jan. 22, 2021 from U.S. Appl. No. 17/080,080, 14 pages.
Notice of Allowance mailed Jan. 22, 2021 from U.S. Appl. No. 16/886,365, 7 pages.
Final Office Action mailed Feb. 5, 2021 from U.S. Appl. No. 16/200,393, 7 pages.
"Electrical Boxes" accessed at http://electrical-inspector.blogspot.com/2013/06/electrical-boxes.html Jun. 22, 2013 retrieved from Wayback Machine Archive.org on Jan. 25, 2021. 12 pages.
"Electrical Boxes Volume and Fill Calculations" accessed at http://electrical-inspector.blogspot.com/2013/06/electrical-boxes-Volume-and-Fill-Calculations.html Jun. 22, 2013 retrieved from Wayback Machine Archive.org on Jan. 25, 2021. 8 pages.
U.S. Appl. No. 61/881,162, filed Sep. 23, 2013. Priority application to US Publication No. 2015/0085500 to Cooper et al. 31 pages.
Non-Final Office Action mailed Jan. 19, 2021 from U.S. Appl. No. 17/099,650, 15 pages.
Supplemental Notice of Allowance mailed Mar. 10, 2021 from U.S. Appl. No. 16/886,365, 2 pages.
Notice of Allowance mailed Apr. 6, 2021 from U.S. Appl. No. 16/200,393, 11 pages.
Non-Final Office Action mailed Apr. 12, 2021 from U.S. Appl. No. 29/694,475, 11 pages.
Notice of Allowance mailed Apr. 13, 2021 from U.S. Appl. No. 16/725,606, 7 pages.
Notice of Allowance mailed Apr. 26, 2021 from U.S. Appl. No. 17/080,080, 11 pages.
Corrected Notice of Allowance mailed Apr. 28, 2021 from U.S. Appl. No. 16/725,606, 2 pages.
Notice of Allowance mailed May 17, 2021 from U.S. Appl. No. 15/688,266, 9 pages.
Notice of Allowance mailed May 27, 2021 from U.S. Appl. No. 16/779,865, 9 pages.
Notice of Allowance mailed May 28, 2021 from U.S. Appl. No. 16/779,824, 11 pages.
Notice of Allowance mailed Jun. 1, 2021 from U.S. Appl. No. 16/719,361,7 pages.
Corrected Notice of Allowance mailed Jun. 21, 2021 from U.S. Appl. No. 16/779,865, 3 pages.
Non-Final Office Action mailed Jul. 14, 2021 from U.S. Appl. No. 17/118,742, 11 pages.
Chinese Office Action and English Translation Thereof in Chinese Patent Application No. 201880088009.9 dated Jun. 30, 2021, 18 pages.
Notice of Allowance mailed Jul. 21, 2021 from U.S. Appl. No. 17/318,13 pages.
Supplemental Notice of Allowance mailed Aug. 13, 2021 1 from U.S. Appl. No. 16/779,824, 3 pages.
Supplemental Notice of Allowance mailed Aug. 19, 2021 1 from U.S. Appl. No. 17/318,193, 4 pages.
Notice of Allowance mailed Sep. 16, 2021 from U.S. Appl. No. 16/779,865, 9 pages.
The ALO™ Box, The All-in-One Recessed Box. ELCO Lighting ELCAT1064 Jul. 2, 2021. 16 pages.
ELCO—Installing 4" LED Retrofit Kits into 4" Deep Metallic Outlet Box For ELJ444/R/C/F. Elco Lighting Nov. 2020. 1 page.
Square New Construction Box. ELCO Lighting 2021, Rev. Aug. 25, 2021. 3 pages.

(56) References Cited

OTHER PUBLICATIONS

ALO™ Box on New Construction Frame. ELCO Lighting 2021, Rev. Aug. 20, 2021. 7 pages.
Notice of Allowance mailed Nov. 3, 2021 from U.S. Appl. No. 17/220,779, 7 pages.
Notice of Allowance mailed Nov. 5, 2021 1 from U.S. Appl. No. 17/318,193, 11 pages.
Non-Final Office Action mailed Nov. 5, 2021 from U.S. Appl. No. 17/379,748, 8 pages.
Non-Final Office Action mailed Nov. 15, 2021 from U.S. Appl. No. 17/374,674, 7 pages.
Final Office Action mailed Nov. 16, 2021 from U.S. Appl. No. 17/099,650, 14 pages.
Notice of Allowance mailed Nov. 22, 2021 from U.S. Appl. No. 29/694,475, 7 pages.
Notice of Allowance mailed Nov. 24, 2021 from U.S. Appl. No. 17/234,421, 9 pages.
Non-Final Office Action mailed Nov. 30, 2021 from U.S. Appl. No. 17/395,522, 28 pages.
Corrected Notice of Allowance mailed Dec. 10, 2021 from U.S. Appl. No. 17/234,421, 2 pages.
Non-Final Office Action mailed Dec. 13, 2021 from U.S. Appl. No. 29/711,198, 8 pages.
Corrected Notice of Allowance mailed Jan. 11, 2022 from U.S. Appl. No. 29/694,475, 2 pages.
Corrected Notice of Allowance mailed Jan. 12, 2022 from U.S. Appl. No. 16/779,865, 9 pages.
Non-Final Office Action mailed Jan. 21, 2022 from U.S. Appl. No. 17/229,668, 5 pages.
Notice of Allowance from U.S. Appl. No. 17/379,748 mailed Feb. 16, 2022, 5 pages.
"12 Pack" reference by Hykolity on Amazon.com, date first available Nov. 7, 2019 [online], available from internet URL: https://www.amazon.com/dp/B081655CDL/ref=cm_sw_em_r_mt_dp_8NAZD4R3MTTP59290SG3?_encoding=UTF8&th=1 (Year: 2019) (6 pages).
"Halo" reference by Amazon.com, date first available Aug. 4, 2017 [online], site visited Jan. 31, 2022, available from internet URL: https://www.amazon.com/dp/B074K234DL/ref=cm_sw_em_r_mt_dp_P7H78BZ413RNSQ55NVTR (Year: 2013) (6 pages).
"Juno Lighting" reference by Express Electric on Amazon.com, date first available Feb. 14, 2008 [online], site visited Jan. 31, 2022, available from internet URL: https://www.amazon.com/Juno-Lighting-TC44R-Retrofit-Downlight/dp/BOOOOD I2HT/ref=psdc_6355949011_12_B078X1D488?th=1 (Year: 2008) (6 pages).
"Sunco Lighting" reference by Sunco Lighting on Amazon.com, date first available Sep. 21, 2018 [online], site visited Jan. 31, 2022, available from internet URL: https://www.amazon.com/Sunco-Lighting-Construction-Downlight-Electrician/dp/B07D92B5DL?th=1 ( Year: 2018) (6 pages).
Non-Final Office Action mailed Feb. 16, 2022 from U.S. Appl. No. 29/743,066, 6 pages.
Notice of Allowance mailed Feb. 14, 2022 from U.S. Appl. No. 17/473,934, 9 pages.
Non-Final Office Action mailed Feb. 25, 2022 from U.S. Appl. No. 17/384,564 28 pages.
Notice of Allowance mailed Mar. 11, 2022 from U.S. Appl. No. 17/118,742 13 pages.
Canadian Office Action in Canadian Application No. 3,102,022 dated Apr. 14, 2022, 2 pages.
Notice of Allowance Mailed Apr. 27, 2022 from U.S. Appl. No. 17/374,674, 7 pages.
Notice of Allowance Mailed Apr. 27, 2022 from U.S. Appl. No. 17/473,934, 9 pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, IPR2019-01094 filed May 17, 2019. 108 pages.
IPR2019-01094 Exhibit 1001. U.S. Pat. No. 9,964,266 ("the '266 Patent"). 14 pages, Date: 2019.
IPR2019-01094 Exhibit 1002. Declaration of Eric Bretschneider, Ph.D. ("Bretschneider"). 107 pages, Date: 2019.
IPR2019-01094 Exhibit 1003. Curriculum Vitae of Dr. Bretschneider. 11 pages, Date: 2019.
IPR2019-01094 Exhibit 1004. Excerpts from the File History of U.S. Pat. No. 9,964,266. 105 pages, Date: 2019.
IPR2019-01094 Exhibit 1005. Imtra 2011 Marine Lighting Catalog—Advanced LED Solutions ("Imtra 2011"). 40 pages.
IPR2019-01094 Exhibit 1006. Imtra 2007 Marine Lighting Catalog ("Imtra 2007"). 36 pages.
IPR2019-01094 Exhibit 1007. U.S. Pat. No. 9,366,418 ("Gifford"). 9 pages, Date: 2019.
IPR2019-01094 Exhibit 1008. Declaration of Colby Chevalier ("Chevalier"). 89 pages, Date: 2019.
IPR2019-01094 Exhibit 1009. U.S. Pat. No. 7,102,172 ("Lynch"). 41 pages, Date: 2019.
IPR2019-01094 Exhibit 1010. Illuminating Engineering Society, ANSI RP-16-10, Nomenclature and Definitions for Illuminating Engineering (approved as an American National Standard Jul. 15, 2005, approved by the IES Board of Directors Oct. 15, 2005). 4 pages.
IPR2019-01094 Exhibit 1011. Underwriters Laboratories Inc. Standard for Safety, Standard UL-8750, entitled Light Emitting Diode (LED) Equipment for Use in Lighting (1st ed. 2009). 5 pages.
IPR2019-01094 Exhibit 1012. Celanese CoolPoly® D5502 Thermally Conductive Liquid Crystalline Polymer Specification ("CoolPoly"). 1 page, Date: 2019.
IPR2019-01094 Exhibit 1013. Illuminating Engineering Society of North America, IES Lighting Handbook (John E. Kaufman and Howard Haynes eds., Application vol. 1981) ("Lighting Handbook"). 5 pages.
IPR2019-01094 Exhibit 1014. California Energy Commission, PIER Lighting Research Program: Project 2.3 Low-profile LED Luminaires Final Report (Prepared by Lighting Research Center, Jan. 2005) ("Pier LRP"). 70 pages.
IPR2019-01094 Exhibit 1015. Jim Sinopoli, Using DC Power to Save Energy and End the War on Currents, GreenBiz (Nov. 15, 2012), https://www.greenbiz.com/news/2012/11/15/using-dc-power-save-energy-end-war-currents ("Sinopoli"). 6 pages.
IPR2019-01094 Exhibit 1016. Robert W. Johnson, "Thought Leadership White Paper: AC Versus DC Power Distribution" (Nov. 2012) ("Johnson"). 10 pages.
IPR2019-01094 Exhibit 1017. Lumileds, LUXEON Rebel General Purpose Product Datasheet, Specification DS64 (2016) ("Luxeon Rebel"). 26 pages.
IPR2019-01094 Exhibit 1018. U.S. Pat. No. 8,454,204 ("Chang"). 11 pages, Date: 2019.
IPR2019-01094 Exhibit 1019. U.S. Department of Energy, CALiPER Benchmark Report: Performance of Incandescent A-Type and Decorative Lamps and LED Replacements (prepared by Pacific National Laboratory, Nov. 2008) ("CALiPER 2008"). 25 pages.
IPR2019-01094 Exhibit 1020. U.S. Pat. No. 3,836,766 ("Auerbach"). 13 pages, Date: 2019.
IPR2019-01094 Exhibit 1021. U.S. Department of Energy, CALiPER Application Summary Report 16: LED BR30 and R30 Lamps (prepared by Pacific Northwest National Laboratory, Jul. 2012) ("CALiPER 2012"). 26 pages.
IPR2019-01094 Exhibit 1022. Sandia National Laboratories, Sandia Report: "The Case for a National Research Program on Semiconductor Lighting" (Jul. 2000) ("Haitz"). 24 pages.
IPR2019-01094 Exhibit 1023. Sylvania, Post Top Street Light LED Retrofit Kit Specification, LED40POST (2009) ("Sylvania"). 4 pages.
IPR2019-01094 Exhibit 1024. Webster's New Collegiate Dictionary (1973) ("Webster's"). 2 pages.
IPR2019-01094 Exhibit 1025. 3M Wire Connectors and Tools Catalog 2013 ("3M Catalog"). 22 pages.
IPR2019-01094 Exhibit 1026. Wakefield Semiconductor Heat Sinks and Thermal Products 1974 Catalog ("Wakefield"). 3 pages.
IPR2019-01094 Exhibit 1027. U.S. Department of Energy, Solid-State Lighting Research and Development Portfolio: Multi-Year Program Plan FY'07-FY'12 (prepared by Navigant Consulting, Inc., Mar. 2006) ("DOE 2006"). 129 pages.

(56) References Cited

OTHER PUBLICATIONS

IPR2019-01094 Exhibit 1028. U.S. Department of Energy, Solid-State Lighting ResearA1023:C1043elopment: Multi-Year Program Plan (Apr. 2013) ("DOE 2013"). 89 pages.
Declaration of Colby Chevalier from Central District of California Civil Docket for Case #: 2:18-cv-07090-CAS-GJS filed Jun. 3, 2019, signed Jun. 3, 2019. 2 pages.
Docket Listing in Inter Partes Review of U.S. Pat. No. 9,964,266. Docket Navigator *AMP Plus, Inc. d/b/a Elco Lighting et alv. DMF, Inc*. PTAB-IPR2019-01094. Downloaded Mar. 25, 2020. 4 pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, PTAB-IPR2019-01500 filed Aug. 14, 2019. 99 pages.
Docket Listing in Inter Partes Review of U.S. Pat. No. 9,964,266 . *AMP Plus, Inc. d/b/a ELCO Lighting et al* v. *DMF, Inc*. PTAB-IPR2019-01500. Downloaded Mar. 25, 2020. 3 pages.
Civil Action No. 2:18-cv-07090. Complaint For Infringement And Unfair Competition. *DMF, Inc*. v. *AMP Plus, Inc. d/b/a ELCO Lighting*. 52 pages. Dated Aug. 15, 2018.
Docket Listing in Civil Action No. 2:18-cv-07090. *DMF, Inc*. v. *AMP Plus, Inc. d/b/a ELCO Lighting et al* CDCA-2-18-cv-07090. Downloaded on Mar. 25, 2020. 39 pages.
Civil Action No. 2:19-cv-4519.Complaint For Patent Infringement. *DMF, Inc*. v. *AMP Plus, Inc. d/b/a ELCO Lighting*. 23 pages dated May 22, 2019.
Docket Listing in Civil Action No. 2:19-cv-4519. *DMF Inc* v. *AMP Plus, Inc. d/b/a ELCO Lighting et al* CDCA-2-19-cv-04519. Downloaded on Mar. 25, 2020. 3 pages.
Decision Denying Institution of Inter Partes Review of U.S. Pat. No. 9,964,266 in IPR2019-01500 dated Mar. 17, 2020. 21 pages.
Defendants' Notice of Prior Art Pursuant To 35 U.S.C. § 282 in Civil Action No. 2:18-cv-07090-CAS-GJS dated Feb. 28, 2020. 7 pages.
Defendant AMP Plus, Inc.'s Opposition to DMF's Motion for Summary Judgement in Civil Action No. 2:18-cv-07090-CAS-GJS filed Feb. 10, 2020. 32 pages.
Declaration of Eric Bretschneider, Ph.D In Support of Amp Plus, Inc.'s Opposition to Dmf, Inc.'s Motion for Partial Summary Judgment in Civil Action No. 2:18-cv-07090-CAS-GJS filed Feb. 10, 2020. 210 pages.
Plaintiff DMF's Reply in Support Of Motion For Partial Summary Judgment in Civil Action No. 2:18-cv-07090-CAS-GJS filed Feb. 18, 2020. 33 pages.
Declaration of James R. Benya In Support of Plaintiff DMF's Motion for Summary Judgment in Civil Action No. 2:18-cv-07090-CAS-GJS filed Feb. 3, 2020. 193 pages.
Underwriters Laboratories Inc. Standard for Safely. UL 1598. Luminaires Jan. 11, 2020. 12 pages.
Exceptional LED Lighting Technology Product Portfolio. LightingScience 2012. 11 pages.
"Cree LMH2 LED Modules," Mouser Electronics. Sep. 9, 2012. 4 pages.
Slim Line Disc. EYE LEDs Specification Sheet 2012. 2 pages.
HiBay LED Heat Sink. Wakefield-vette. Dec. 11, 2017. 1 pages.
Thermal Management of Cree® XLamp® LEDs. Cree Application Note. 2004. 19 pages.
Imtra Marine Lighting Fall 2007 Catalog. 32 pages.
Cree LMH2 LED Modules Product Family Data Sheet. Cree 2011-2014, 18 pages.
Cree LMH2 LED Modules Design Guide. Cree 2011-2015, 23 pages.
Brochure of Elco EL49A, EL49ICA, EL49RA modules. ELCO Lighting Nov. 25, 2009. 1 page.
Image of Elco E347/247 module identified by Elco in response to DMF's Request for Production in Civil Action No. 2:18-cv-07090-CAS-GJS on Aug. 28, 2019. 1 page.
Screenshots from the Deposition of Brandon Cohen in Civil Action No. 2:18-cv-07090-CAS-GJS. Conducted Sep. 2, 2020. 8 pages.
Defendant AMP Plus, Inc.'s Initial Disclosure and Designation of Expert Witnesses in Civil Action No. 2:19-CV-4519-CAS. 37 pages, Date: 2019.
Defendant AMP Plus, Inc. D/B/A Elco Lighting's Supplemental Responses to Plaintiff DMF, Inc.'s First Set of Interrogatories (Nos. 1-16) in Civil Action No. 2:19-CV-4519-CAS, Redacted. 13 pages, Date: 2019.
Final Written Decision in IPR2019-01094 dated Nov. 19, 2020, 58 pages.

* cited by examiner

BAR HANGER ASSEMBLY WITH CROSSMEMBERS AND HOUSING ASSEMBLIES USING SAME

CROSS-REFERENCE TO RELATED APPLICATION(S)

The present application claims priority to U.S. Provisional Application No. 63/071,440, filed Aug. 28, 2020, entitled "BAR HANGER ASSEMBLY WITH CROSS MEMBERS AND HOUSING ASSEMBLIES USING SAME," and U.S. Provisional Application No. 63/053,253, filed Jul. 17, 2020, entitled "BAR HANGER ASSEMBLY WITH CROSS MEMBERS AND HOUSING ASSEMBLIES USING SAME." The present application also claims priority to Canadian Application No. 3124987, filed Jul. 16, 2021, entitled "BAR HANGER ASSEMBLY WITH CROSS-MEMBERS AND HOUSING ASSEMBLIES USING SAME." Each of the aforementioned applications is incorporated by reference herein in its entirety.

BACKGROUND

A housing (also referred to as an "enclosure"), such as an electrical junction box or a can housing for a lighting system, is typically installed in various environments, such as multi-family housing, single-family housing, and commercial spaces, to house and protect various electrical connections, electronics, and/or light sources. The layout and structure of different environments, however, may vary appreciably due to differences in architectural design, building codes/standards, and the building foundation. As a result, the housing typically forms part of a housing assembly that includes other components, which provide a mechanical interface for installation and a mechanism to accommodate variations in the layout and structure of the environment.

One common approach is for a housing assembly to include a bar hanger assembly to mount the housing to support structures in the environment. The bar hanger assembly typically includes at least one pair of bar hangers. Each bar hanger may include a bar hanger head to mechanically couple the housing assembly to a support structure, such as a wood/metal joist or a stud, a T-bar, or a metal frame. The pair of bar hangers may be telescopically engaged so that the overall length of the pair of bar hangers is readily adjustable to accommodate different sized gaps between support structures in the environment.

In some cases, the housing assembly may include two pairs of bar hangers to increase the mechanical stability and/or the load carrying capacity. The two pairs of bar hangers are typically mounted to a pan frame supporting the housing, disposed on opposing sides of the housing, and aligned in parallel. Thus, the overall length of each respective pair of bar hangers is adjustable along the same direction. In some bar hanger assemblies, each bar hanger may include a separate bar hanger head (resulting in a total of four bar hanger heads) to mount the housing assembly to the support structure(s). These bar hanger assemblies, however, make the housing more cumbersome to install since a user has to manually connect each bar hanger head to a respective support structure while maintaining a desired position and orientation of the housing by preventing unwanted movement of each bar hanger in the bar hanger assembly.

One way to reduce the complexity of installing a bar hanger assembly with multiple pairs of bar hangers is to mechanically couple the bar hangers from different pairs together via a crossmember (also referred to as a "crossbrace") in order to reduce the number of independently moving parts. This type of bar hanger assembly is referred to as a caddy-type bar hanger assembly.

SUMMARY

The Inventors have recognized and appreciated caddy-type bar hanger assemblies improve the ease of installation of a bar hanger assembly with multiple pairs of bar hangers while providing greater mechanical stability and load carrying capacity than bar hanger assemblies that only include a single pair of bar hangers. However, the Inventors have recognized the installation of conventional caddy-type bar hanger assemblies is typically limited to certain types of support structures, thus limiting their deployment in different environments.

The Inventors have also recognized conventional caddy-type bar hanger assemblies typically integrate several features, previously provided by different components in other bar hanger assemblies, into a single component. For example, the crossmember may be integrated together with one or more bar hangers. Although incorporating multiple features into a single part is generally beneficial in terms of reducing the number of parts for manufacture and assembly, one drawback in combining the bar hangers and the crossmember together in a bar hanger assembly is that the types and/or sizes of housings compatible with the bar hanger assembly may be more limited.

For example, the caddy-type bar hanger assembly may be tailored for a particular sized housing. If a user wishes to install a larger-sized housing, a correspondingly larger crossmember should be used, resulting in the manufacture of two different crossmembers to accommodate the different sizes of the two housings. If the bar hangers are integrated with the crossmember, the bar hangers cannot be reused for the large-sized bar hanger assembly even if the shape and/or dimensions of the bar hangers remain unchanged. Instead, new bar hangers should be fabricated with the larger-sized crossmember, resulting in greater material consumption and raw material cost.

Furthermore, the integration of multiple components (e.g., the crossmember, the bar hangers) into a single part may make the part more difficult to manufacture, resulting in higher manufacturing costs and a longer fabrication time. In order to improve the manufacturability of the integrated part, the shapes and/or dimensions of the various structural features on the part may be limited to simpler geometries at the expense of less functionality. For example, the part may have fewer mounting features, which may limit installation of the bar hanger assembly to a particular support structure in the environment (e.g., wood joist). In another example, the part may include bar hangers with a less desirable shape, which may result in unwanted play or compliance in the bar hanger assembly.

In view of the foregoing limitations of conventional caddy-type bar hanger assemblies, the present disclosure is directed to various inventive implementations of a housing assembly that incorporates a caddy-type bar hanger assembly with a separate crossmember component to couple and constrain two bar hangers from different pairs of bar hangers. In some implementations, the bar hanger assembly may include two crossmember assemblies that each include a crossmember coupled to respective bar hangers of two different pairs of bar hangers such that the bar hanger assembly has only two movable components. The housing assembly may further include a housing of various shapes and/or dimensions. In some implementations, the bar hanger assembly may be coupled directly to a sidewall of the housing via respective bar hanger holders. In some implementations, the bar hanger assembly may be indirectly coupled to the housing via a pan frame with integrated rails.

The bar hanger assembly and the housing may be slidably adjustable with respect to each other via the bar hanger holders or the pan frame. For example, the respective crossmember assemblies may be adjusted to traverse a gap between two support structures in the environment in order to facilitate attachment to the support structures. The housing, via the bar hanger holder(s) or the pan frame, may then be positioned along the respective bar hangers. Once the housing is at the desired position, fasteners may be used to lock the housing in place.

Unlike previous caddy-type bar hanger assemblies, the crossmember may include multiple features that allow installation onto various types of support structures including, but not limited to a wood/metal joist or stud, a T-bar, a hat channel, and a metal frame. The separation of the crossmember from the bar hangers may also improve ease of manufacture of the crossmember. For example, the crossmember may be readily formed from a single piece of sheet metal. The crossmember may be attached to the different support structures using one or more fasteners inserted through appropriate openings in the crossmember. In some implementations, the bar hanger assembly may be installed using two different support structures. For example, the housing assembly may be coupled to a wood joist at one end and a T-bar at the other end.

In some implementations, the crossmember may also include captive fasteners for greater ease of installation. The crossmember may also include features to facilitate attachment of a safety cable (also referred to as an aircraft cable or an earthquake cable), which provides a secondary attachment mechanism to ensure the housing assembly remains suspended from a support structure in the event the fasteners coupling the crossmember to one or more support structures detach or fail (e.g., during an earthquake). In some implementations, the bar hanger assembly may also satisfy various standards and/or regulations set forth by the Underwriter's Laboratory (UL). For example, the bar hanger assembly may comply with the requirements defined in UL 514A, which is the UL standard for metallic outlet boxes. For instance, the housing assembly may support a load of at least 200 pounds applied to the housing when the housing assembly is installed onto one or more support structures (e.g., a joist, a T-bar, a hat channel) in a ceiling.

Additionally, the crossmember and the bar hangers are formed as separate components. This provides greater flexibility and modularity in the design and assembly of the housing assembly. First, more complex, desirable features may be more readily incorporated into the crossmember and the bar hanger during manufacture, such as the inclusion of multiple tabs and/or channels in the crossmember to accommodate different types of support structures or shaping the bar hanger to reduce unwanted lateral play. Second, manufacturing the crossmember as a separate component from the bar hanger allows different implementations of the crossmember to be combined with different implementations of bar hangers. In other words, different bar hanger assemblies tailored for different environments and/or providing different features (e.g., less lateral play, lower cost, the range of adjustment, the type of mounting features) may be assembled using appropriate crossmember(s) and bar hanger(s) accordingly.

For example, a bar hanger assembly may be assembled from small (or large) sized crossmembers to support a correspondingly small (or large) sized housing. Both the small and large sized bar hanger assemblies may use the same type of bar hangers, thus reducing the number of types of bar hangers for manufacture. In another example, the crossmember may be coupled to different types and/or sizes of bar hangers in order to provide different bar hanger assemblies with different features, such as bar hangers that provide less lateral play, longer or shorter bar hangers with different ranges of longitudinal adjustment, and bar hangers tailored for a particular bar hanger holder and/or pan frame. In some implementations, the bar hangers may also include one or more notches that allow the bar hanger to be separated into smaller segments depending on the spacing between the support structures.

The bar hanger assembly may accommodate different types and/or sizes of housings and/or different mounting configurations (e.g., the housing is coupled to the bar hanger assembly via a bar hanger holder or a pan frame). In general, the housing may contain, at least in part, a component of a lighting system (e.g., a light source, a driver, a heat sink, a trim) and/or an electrical system (e.g., one or more electrical wires/cables, a cover plate). In some implementations, the housing may be dimensioned to have a sufficiently large cavity to reduce glare from a lighting module disposed within the cavity and/or to splice one or more cables or wires together. In some implementations, the housing may be dimensioned to be sufficiently compact to accommodate more confined spaces, such as the ceiling or wall space in multi-family housing units. The housing may have various cross-sectional shapes including, but not limited to, a circle and a polygon (e.g., a square, an octagon).

The housing assembly may also support different bar hanger holders and/or pan frames differentiated, in part, by their shape, dimensions, and compatibility with different housings. For example, the bar hanger holder may be formed from a single piece of sheet metal that is bent to form a passageway to support and guide bar hangers with a specific cross-sectional shape. In some implementations, the bar hanger holder and the housing may include features that enable the housing to be adjusted along an axis different from the longitudinal axis of the bar hangers. For example, the bar hanger holder may provide vertical adjustment of the housing while the bar hangers provide horizontal adjustment. The bar hanger holder may further include various locking mechanisms to lock the relative positions of the housing, the bar hanger holder, and the bar hangers in place. In some implementations, the bar hanger holder may constrain the movement of the housing such that only longitudinal adjustment via the bar hangers is allowed.

In some implementations, the pan frame may provide additional degrees of freedom to adjust and/or orient the housing. For example, the pan frame may include a rotatable mounting frame that allows the housing to be rotated, for example, with respect to a plane of a ceiling or a wall. In this manner, the housings from multiple housing assemblies may be aligned regardless of the layout and/or orientation of support structures in the environment. In some implementations, the pan frame may include a side plate to support an electrical junction box. For example, wires/cables from an external electrical power supply from a building or another lighting system may be fed into the junction box and spliced with another wire and/or cable that is fed into the housing. In some implementations, the pan frame may further support a bracket to mount other devices in the housing assembly including, but not limited to an emergency battery pack.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 11 shows a top, front, left perspective view of another exemplary housing assembly with a deep housing.

DETAILED DESCRIPTION

Figure 1A:
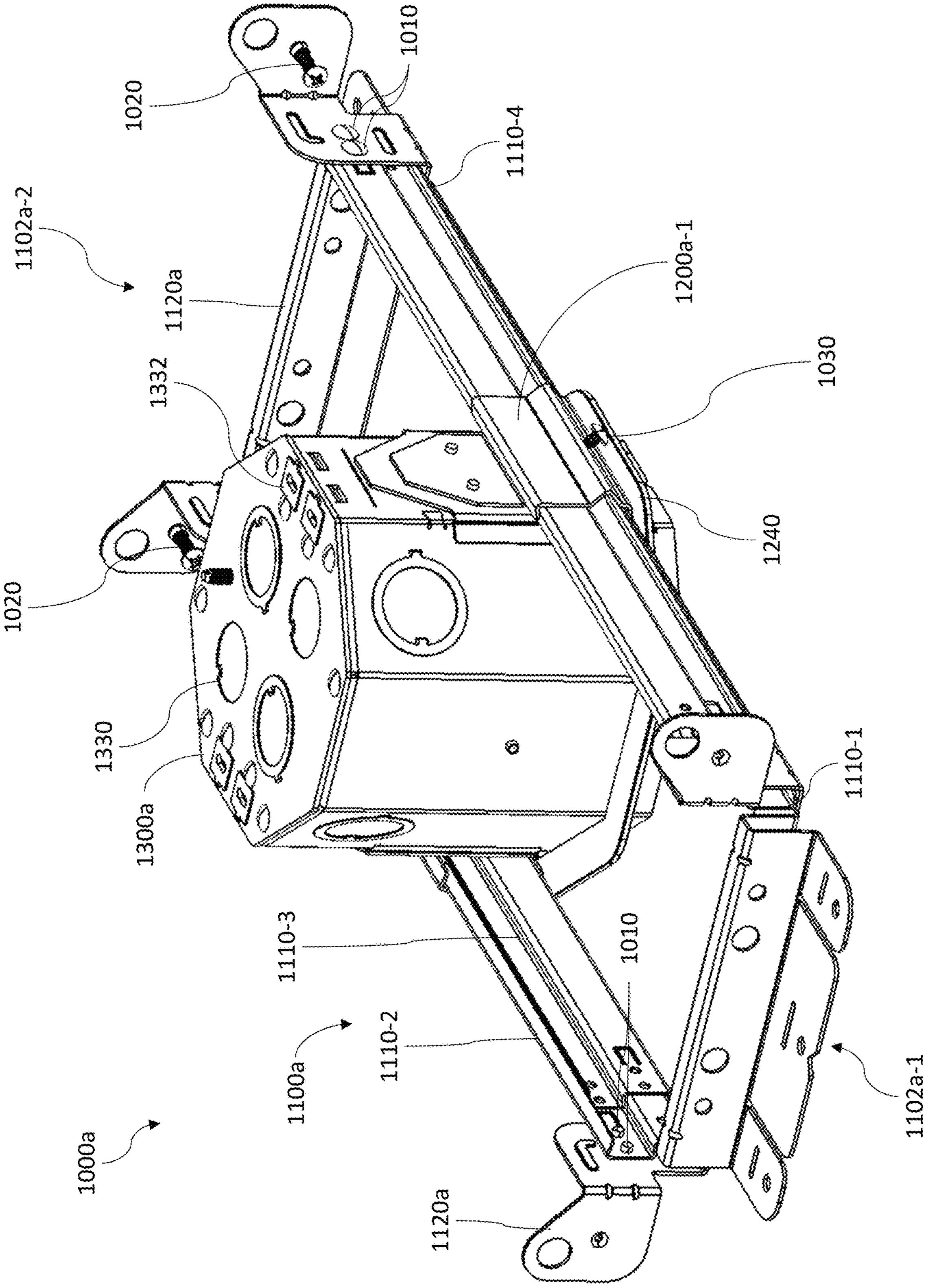
FIG. 1A shows a top, rear, right perspective view of an exemplary housing assembly with a deep housing.
Figure 1B:
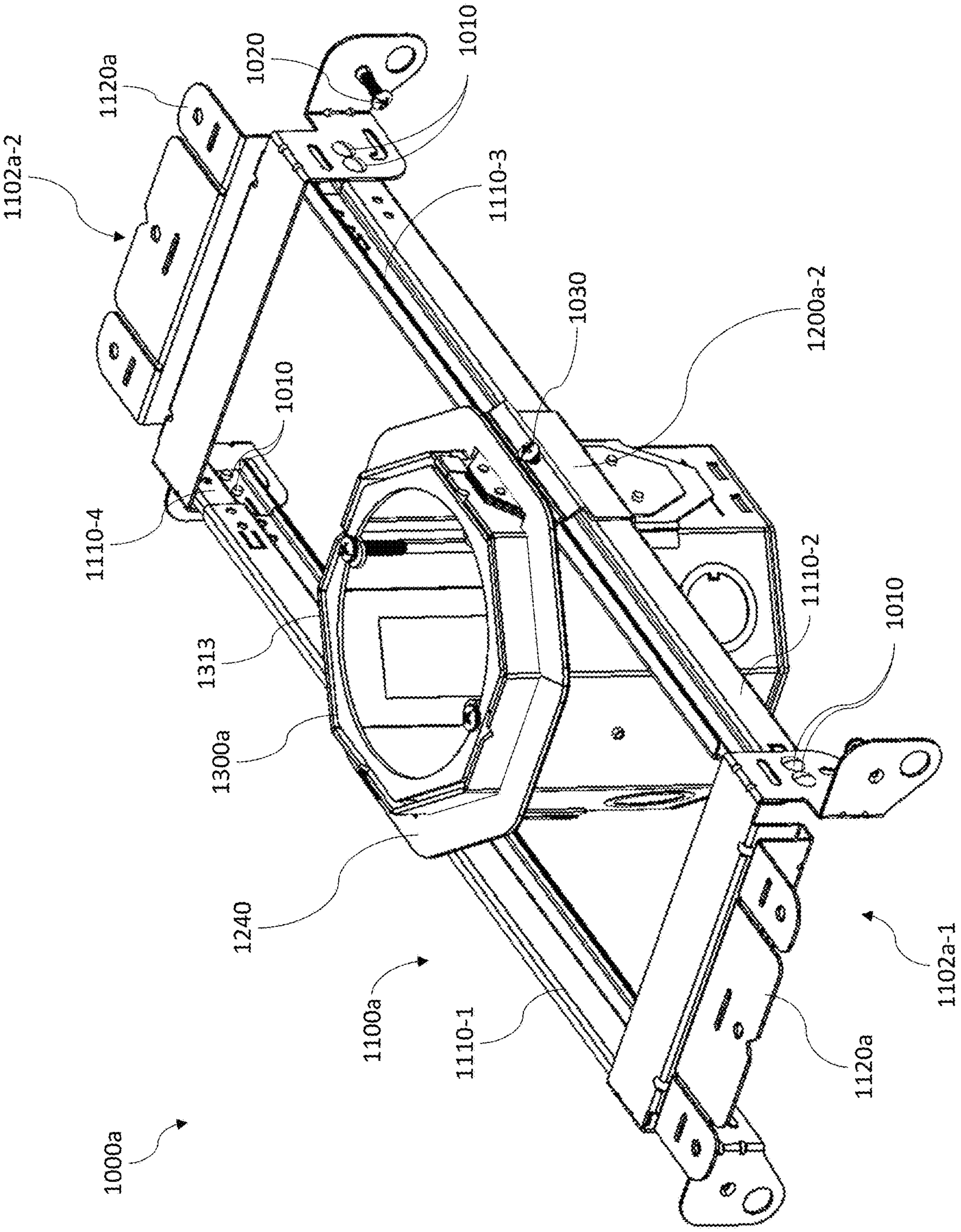
FIG. 1B shows a bottom, front, right perspective view of the housing assembly of FIG. 1A.
Figure 1C:
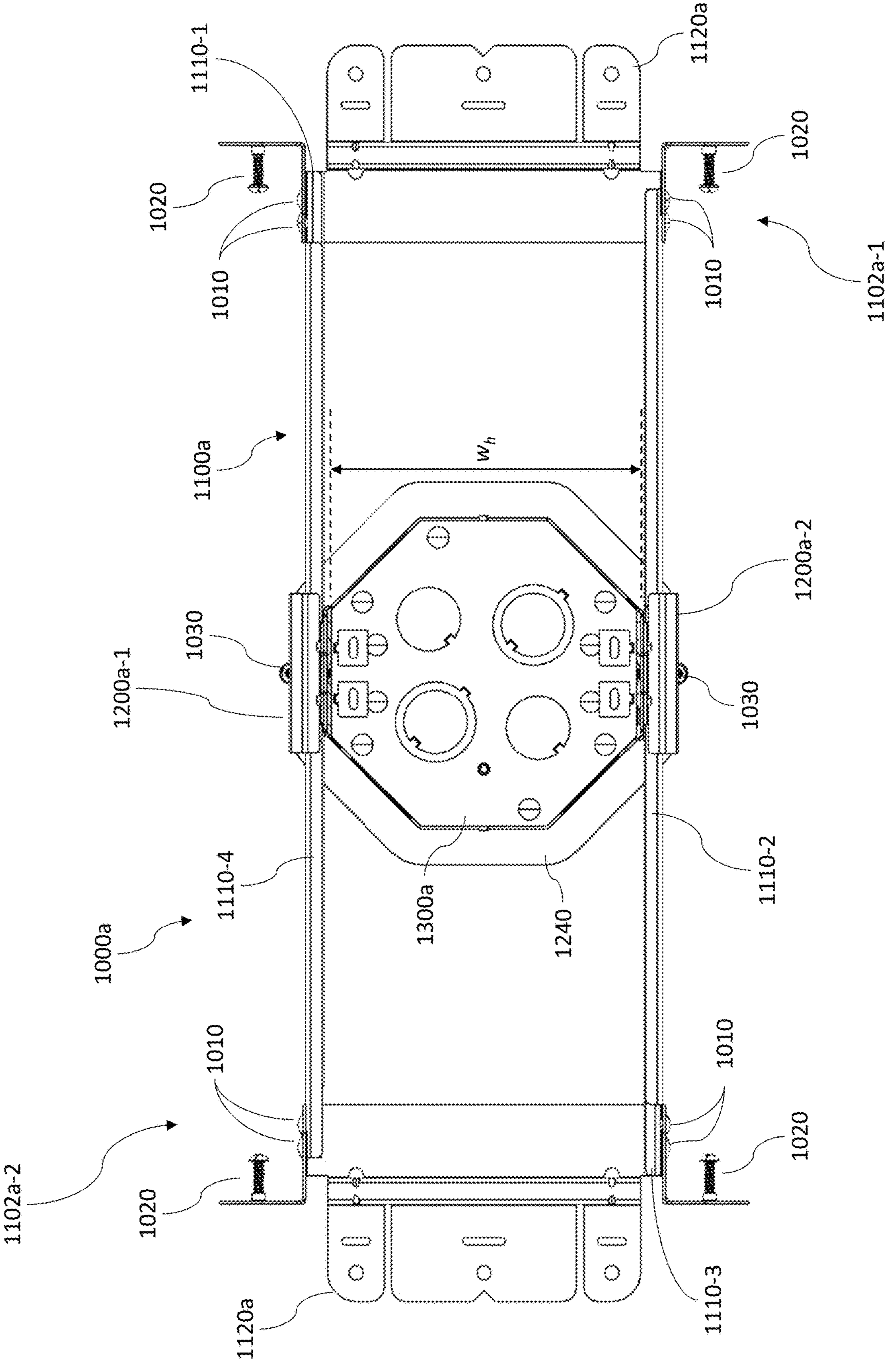
FIG. 1C shows a top view of the housing assembly of FIG. 1A.
Figure 1D:
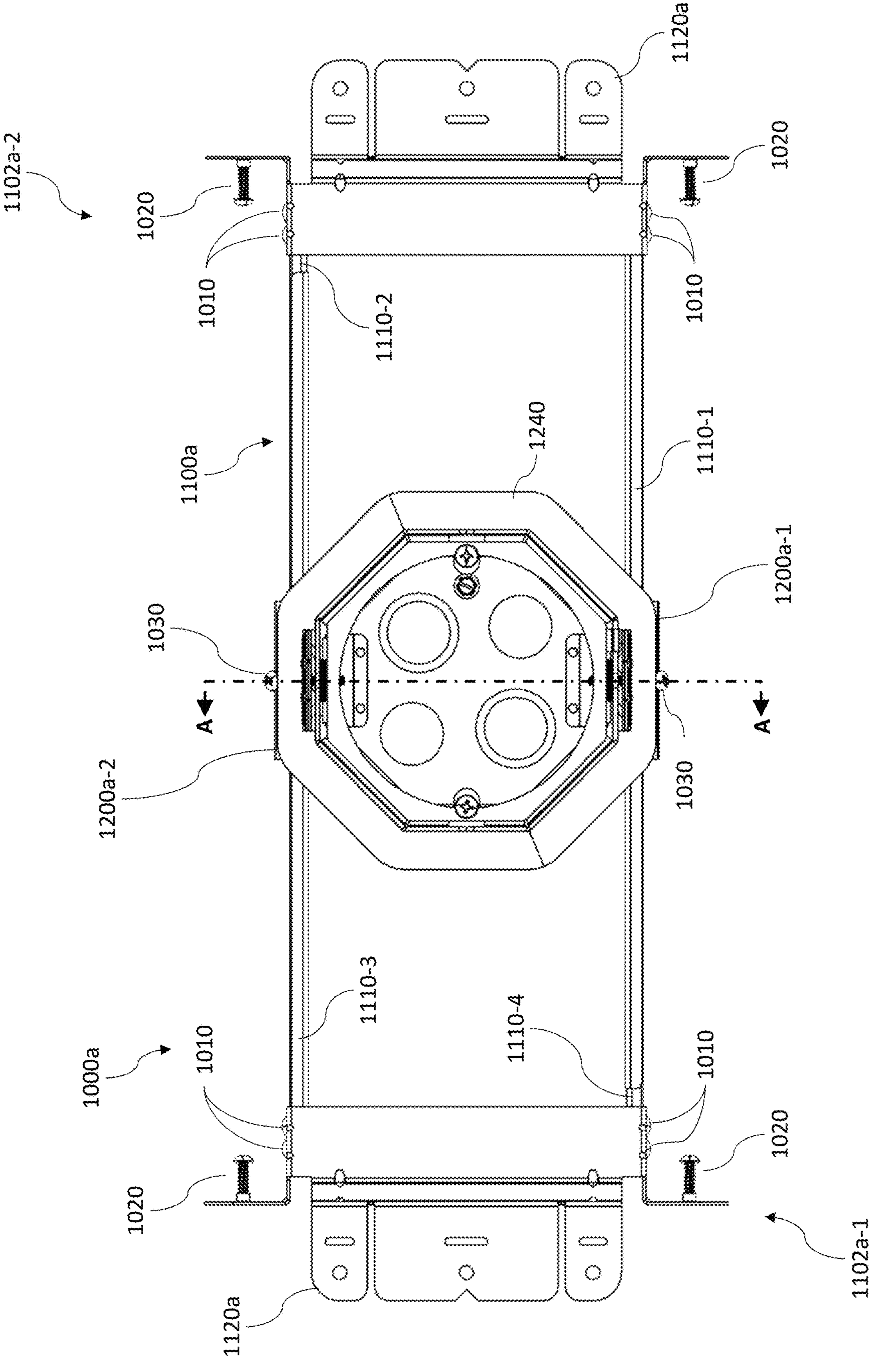
FIG. 1D shows a bottom view of the housing assembly of FIG. 1A.

Following below are more detailed descriptions of various concepts related to, and implementations of, a housing assembly that includes a bar hanger assembly formed from one or more bar hangers and one or more crossmembers, a housing, bar hanger holder, and/or a pan frame. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive housing assemblies are provided, wherein a given example or set of examples showcases one or more particular features of a housing assembly with a crossmember, a bar hanger, a bar hanger holder, and a pan frame. It should be appreciated that one or more features discussed in connection with a given example of a housing assembly may be employed in other examples of housing assemblies according to the present disclosure, such that the various features disclosed herein may be readily combined in a given housing assembly according to the present disclosure (provided that respective features are not mutually inconsistent).

Certain dimensions and features of the housing assembly are described herein using the terms "approximately," "about," "substantially," and/or "similar." As used herein, the terms "approximately," "about," "substantially," and/or "similar" indicates that each of the described dimensions or features is not a strict boundary or parameter and does not exclude functionally similar variations therefrom. Unless context or the description indicates otherwise, the use of the terms "approximately," "about," "substantially," and/or "similar" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

A Housing Assembly With a Deep Housing

FIGS. 1A-1J show several views of an exemplary housing assembly **1000*a*. As shown, the housing assembly 1000*a* may include a bar hanger assembly 1100*a* to mount the housing assembly 1000*a* to one or more support structure(s), a housing 1300*a* to contain at least a portion of one or more components (not shown) of a lighting system (e.g., a light source, a driver, a lighting module, a trim) and/or an electrical system (e.g., one or more electrical wires/cables, a cover plate), and one or more bar hanger holders 1200*a* (e.g., bar hanger holders 1200*a*-1 and 1200*a*-2 disposed on opposing sides of the housing 1300*a*) to couple the housing 1300*a* to the bar hanger assembly 1100*a*. In some implementations, the bar hanger holders 1200*a* may be substituted for a pan frame. In some implementations, a gasket assembly 1240 may be included to form an air-tight seal with the ceiling, wall, or floor. However, it should be appreciated the inclusion of the gasket assembly 1240** is optional.

The bar hanger assembly **1100*a* is a caddy-type bar hanger assembly that includes a pair of crossmember assemblies 1102*a*-1 and 1102*a*-2. The crossmember assembly 1102*a*-1 includes a crossmember 1120*a* rigidly coupled to bar hangers 1110-1 and 1110-2 via rivets 1010. Similarly, the crossmember assembly 1102*a*-2 includes another crossmember 1120*a* rigidly coupled to bar hangers 1110-3 and 1110-4 via rivets 1010. The respective crossmembers 1120*a* in the housing assembly 1000*a* constrain the pair of bar hangers 1110-1 and 1110-2 to move together and the bar hangers 1110-3 and 1110-4 to move together. Hereinafter, the bar hangers 1110-1, 1110-2, 1110-3, and 1110-4 are referred to as the bar hanger 1110** unless otherwise specified.

The bar hanger 1110-1 may be telescopically coupled to the bar hanger 1110-4 and the bar hanger 1110-2 may be telescopically coupled to the bar hanger 1110-3. In this manner, the crossmember assemblies **1102*a*-1 and 1102*a*-2 are slidably adjustable with respect to each another, which provides a mechanism for adjusting the length of the bar hanger assembly 1100*a*. For example, the length of the bar hanger assembly 1100*a* may be adjusted to traverse different sized gaps between support structures in the environment such that the respective crossmembers 1120*a* of the crossmember assemblies 1102*a*-1 and 1102*a*-2** physically contact the support structures in the environment prior to attachment.

The bar hanger holder **1200*a* may mechanically support one or more bar hangers 1110 (e.g., the bar hanger holder 1200*a*-1 supports one or both of the bar hangers 1110-1 and 1110-4) of the bar hanger assembly 1100*a*. Specifically, the bar hanger 1110 and the bar hanger holder 1200*a* may be slidably adjustable with respect to each other along a longitudinal axis 1111 of the bar hanger 1110. The bar hanger holder 1200*a* may further constrain the bar hanger 1110 laterally in order to reduce unwanted lateral play (i.e., unwanted lateral movement between the bar hanger 1110 and the bar hanger holder 1200*a*), thus making the housing assembly 1000*a* more mechanically rigid and stable. As shown in FIGS. 1B, 1D, 1E, 1G, and 1H, the housing assembly 1000*a* may also include a fastener 1030 to lock the bar hanger holder 1200*a* and the bar hangers 1110 together. The fastener 1030 may press the bar hangers 1110 against the bar hanger holder 1200*a* when tightened, thus producing a sufficiently large frictional force to prevent further movement between the bar hanger holder 1200***a* and the bar hangers 1110.

The bar hanger holder 1200*a* may also mechanically support the housing 1300*a*. In some implementations, the housing 1300*a* may be rigidly coupled to the bar hanger holder 1200*a*. In some implementations, the housing 1300*a* may be slidably adjustable with respect to the bar hanger holder 1200*a* along an axis that is different (e.g., substantially orthogonal or orthogonal) from the longitudinal axis of the bar hanger 1110. For example, the housing assembly 1000*a* may be oriented such that the longitudinal axis 1111 of the bar hangers 1110 is substantially horizontal or horizontal and the housing 1300*a* is adjustable along a vertical axis. In this manner, the position of the housing 1300*a* may be adjusted to accommodate different interior spaces of an environment where the ceiling, wall, or floor may be positioned at a different distance from the support structures supporting the housing assembly 1000*a*. In some implementations, the vertical position of the housing 1300*a* may be adjusted such that the opening 1314 is flush with an exposed opening in a ceiling or a floor.

Figure 1E:
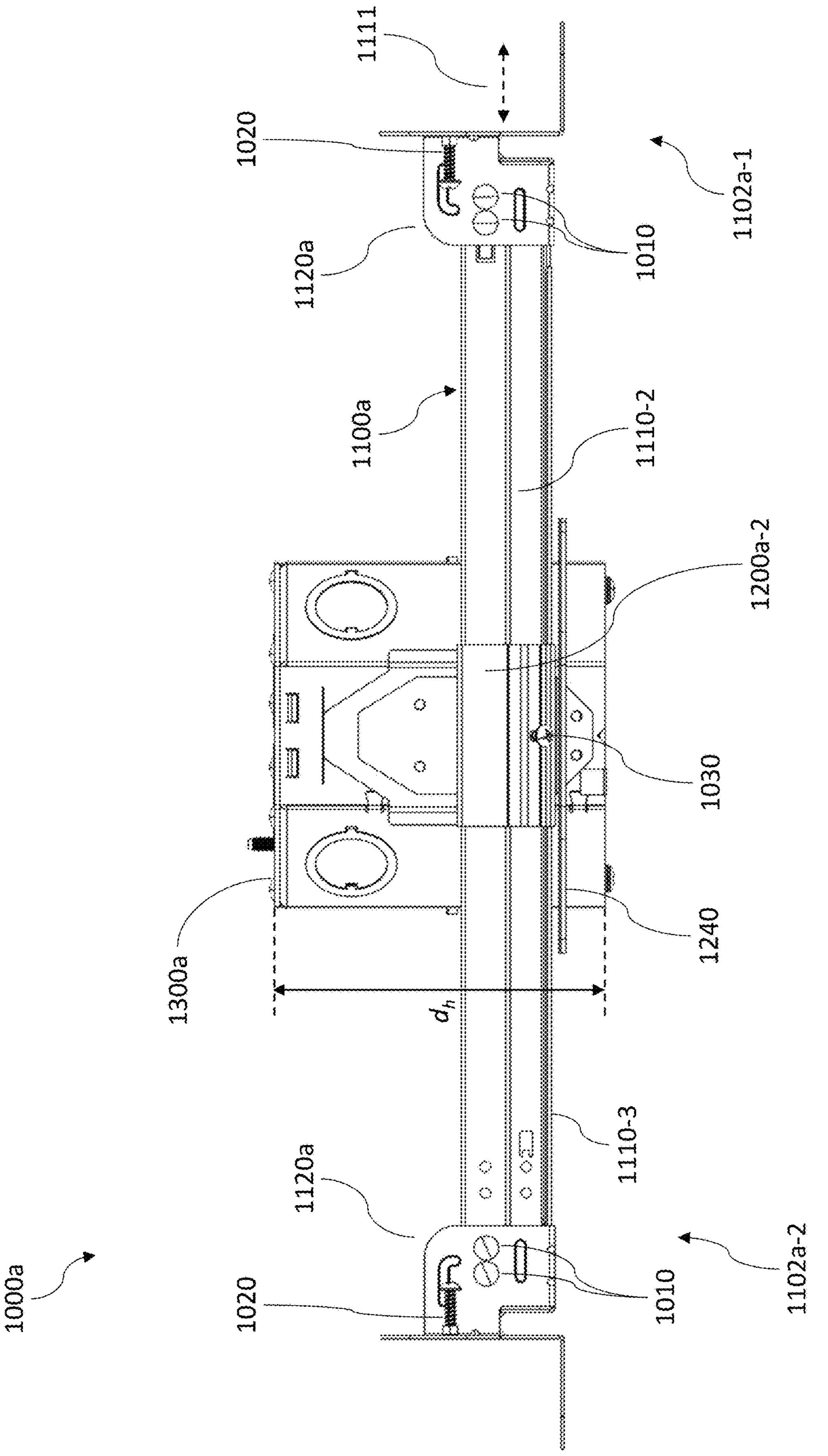
FIG. 1E shows a front view of the housing assembly of FIG. 1A.
Figure 1F:
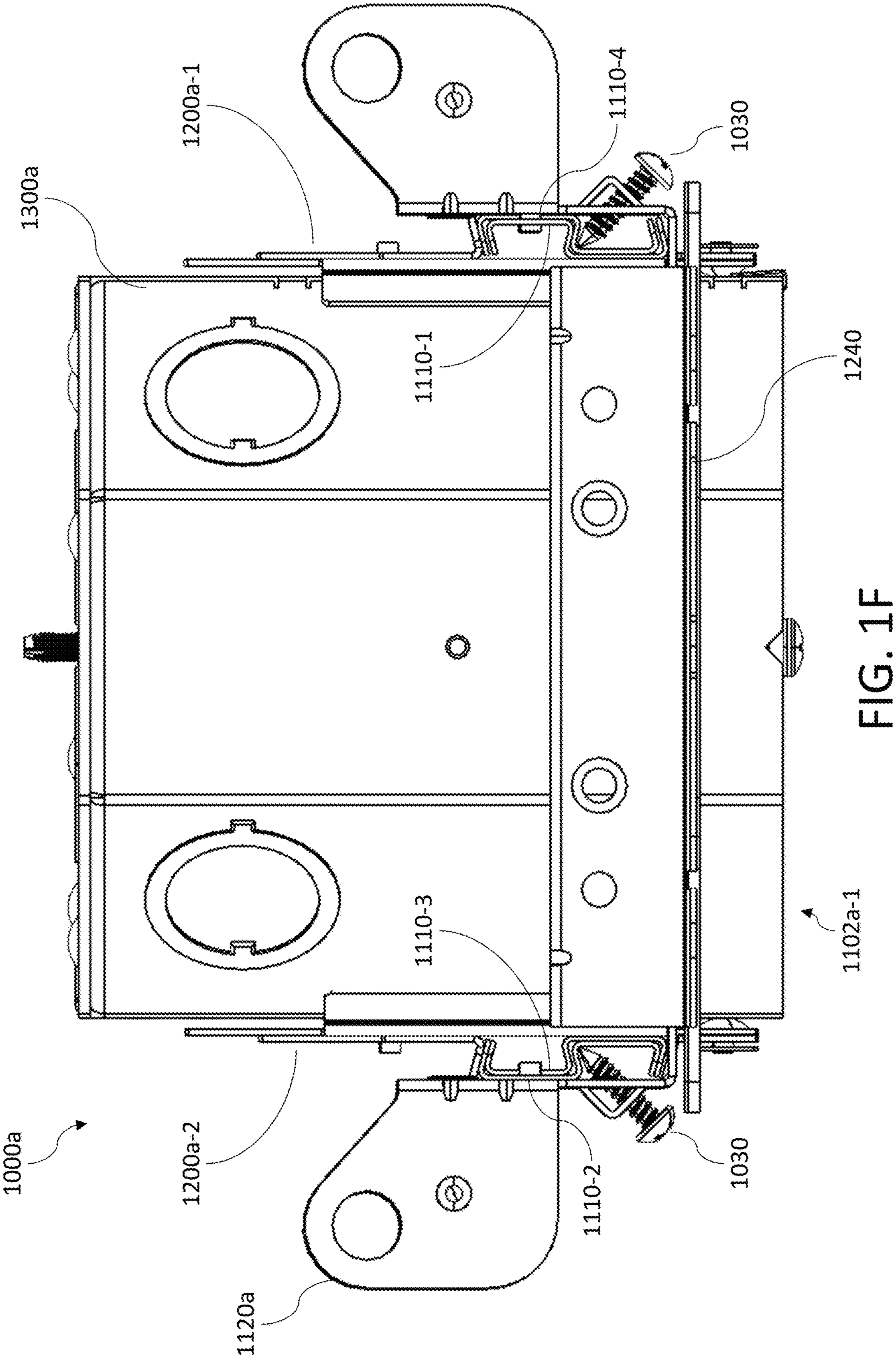
FIG. 1F shows a right-side view of the housing assembly of FIG. 1A.
Figure 1G:
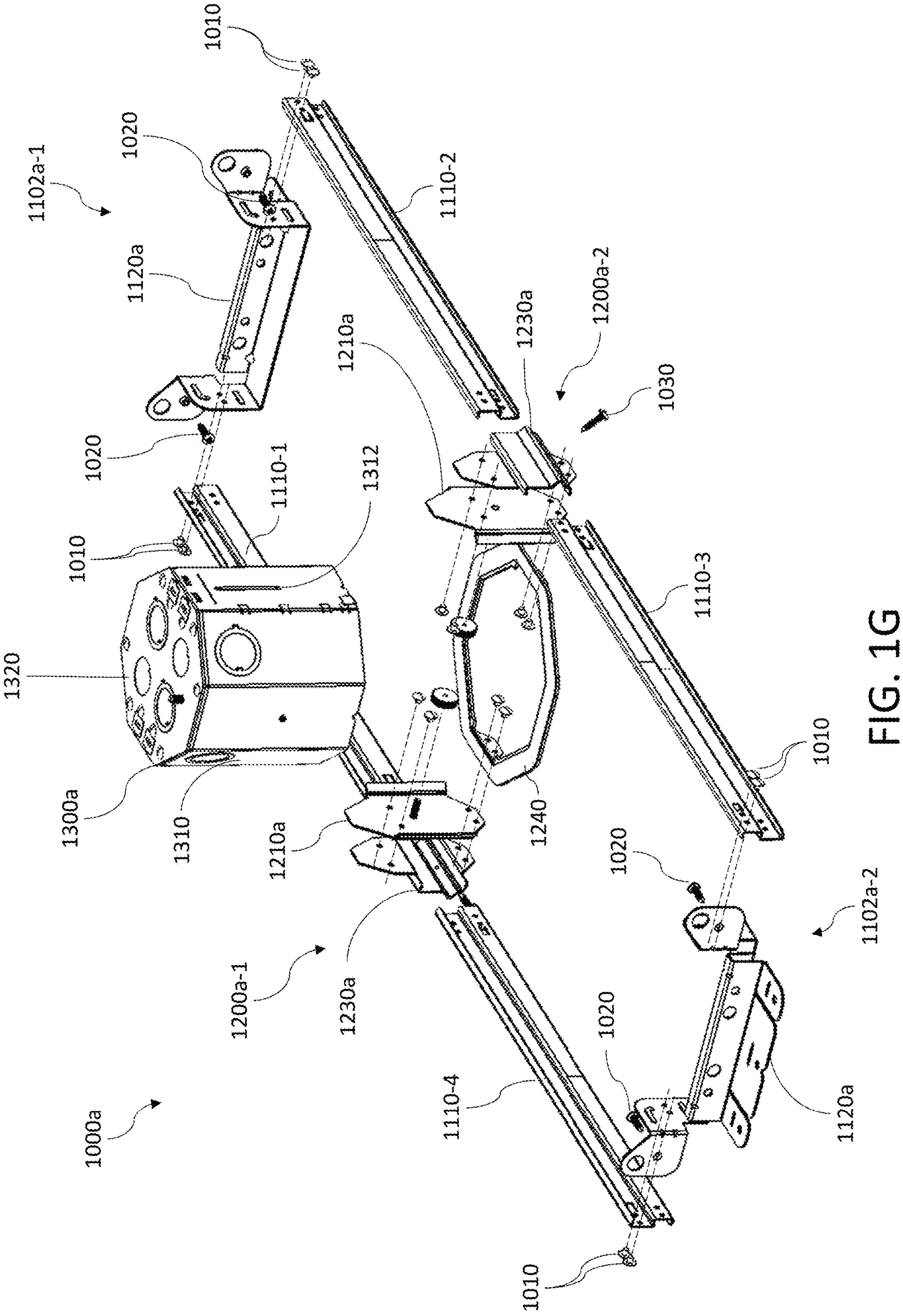
FIG. 1G shows an exploded top, rear, right perspective view of the housing assembly of FIG. 1A.
Figure 1H:
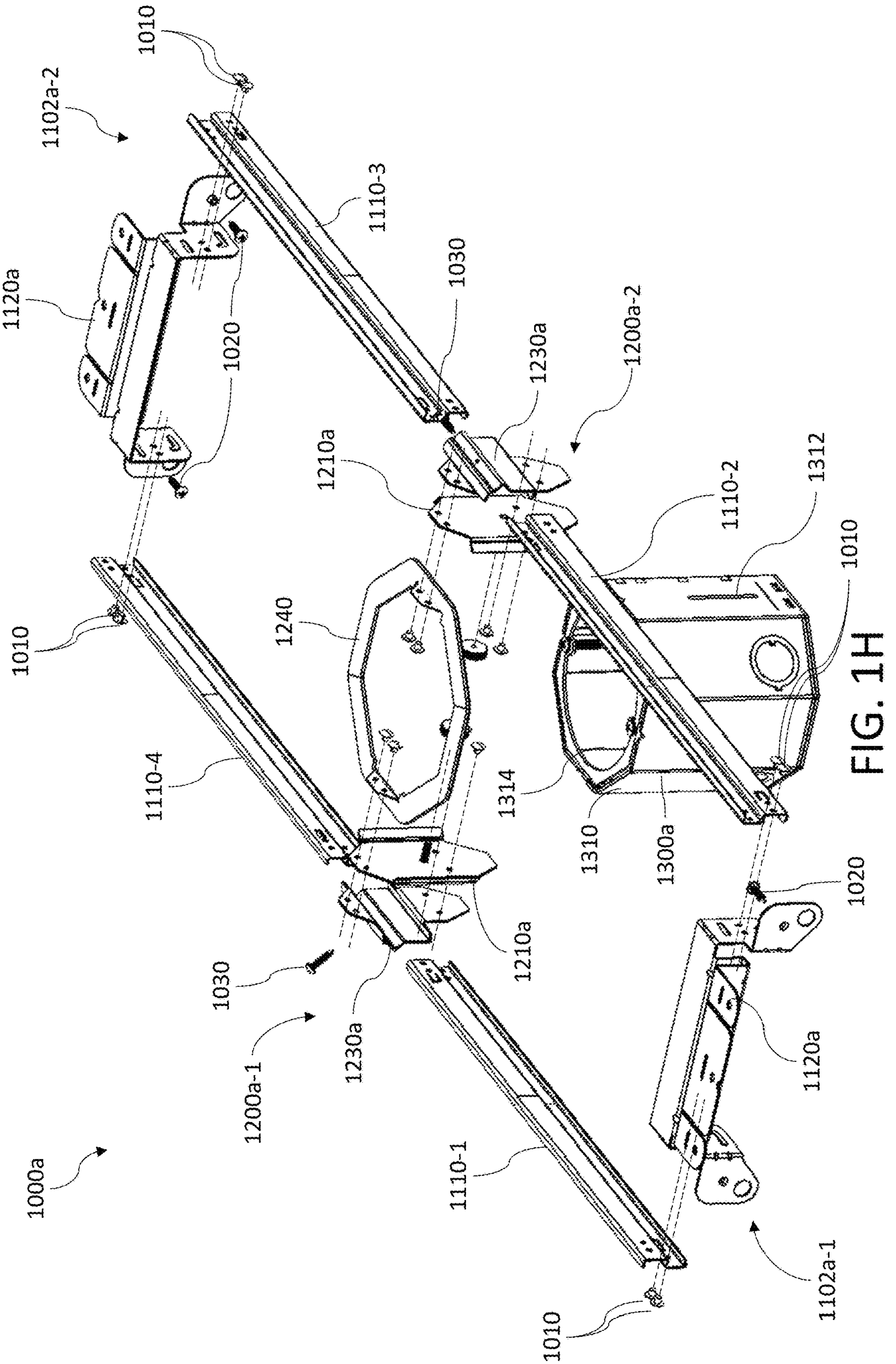
FIG. 1H shows an exploded bottom, front, right perspective view of the housing assembly of FIG. 1A.
Figure 1I:
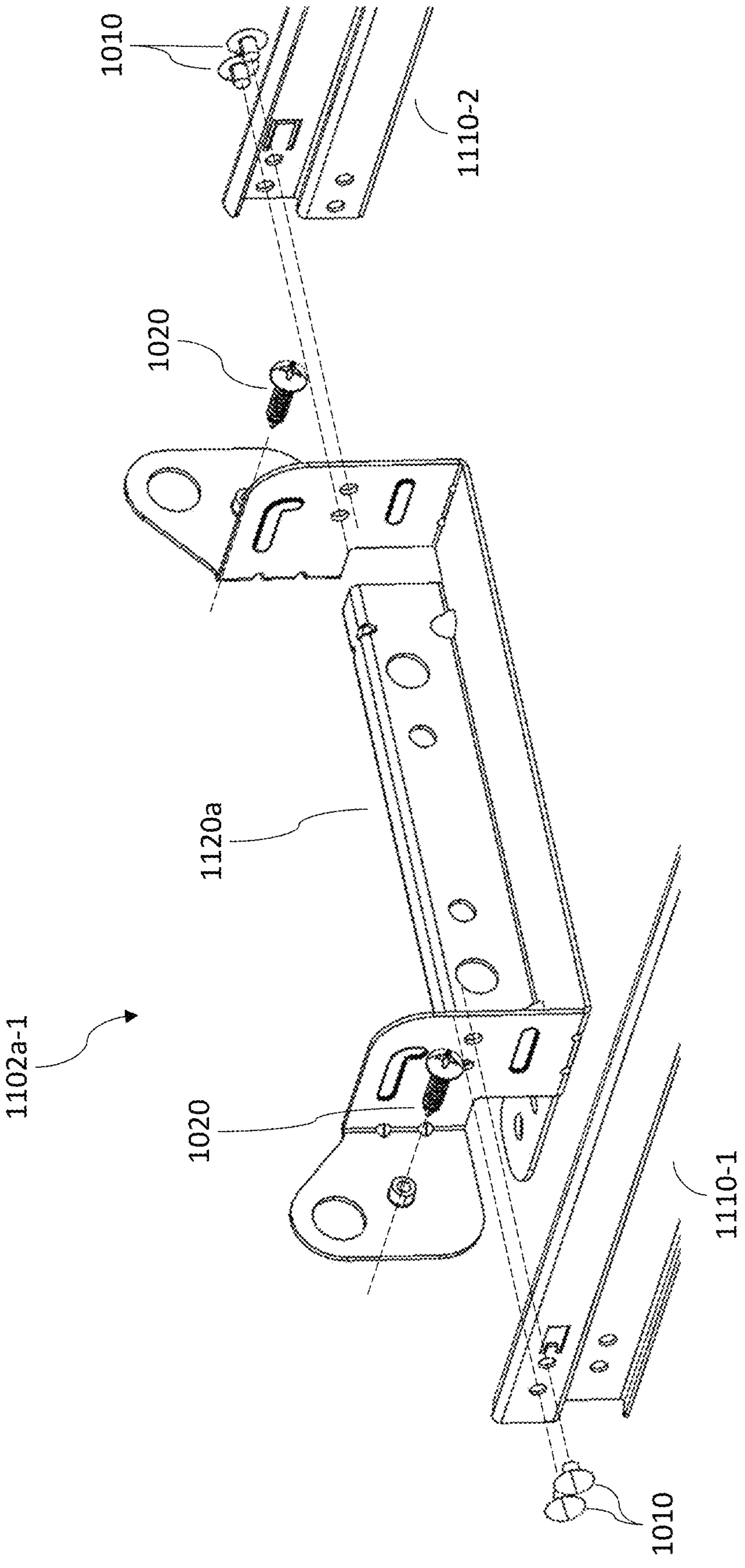
FIG. 1J shows a cross-sectional view of the housing assembly corresponding to the plane A-A of FIG. 1D.
Figure 1J:
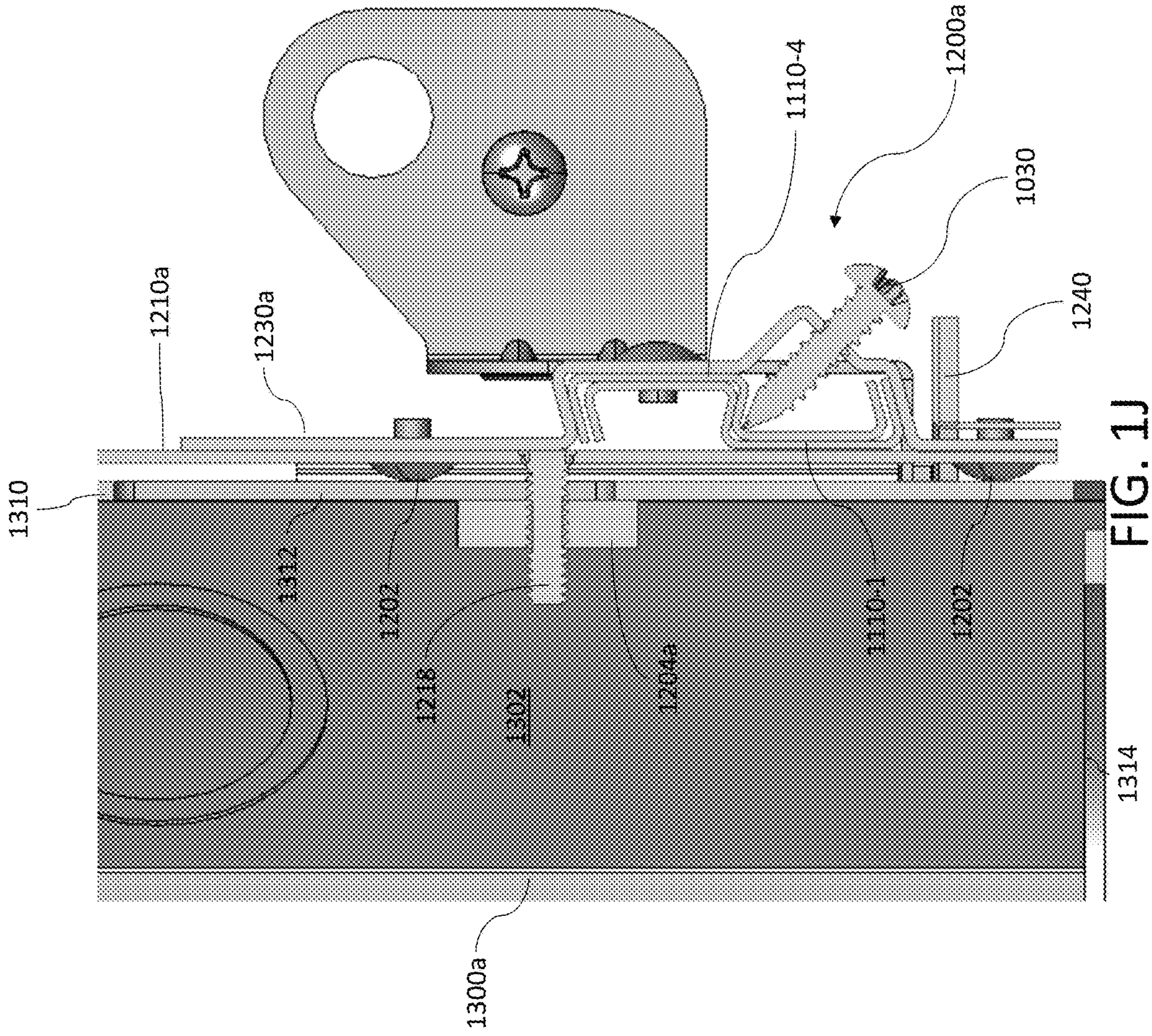

FIGS. 1G, 1H, and 1J show the housing 1300*a* may include a sidewall 1310 with a slot 1312 and the bar hanger holder 1200*a* may include a housing bracket 1210*a* with a rod 1218 that is inserted through the slot 1312 and into a cavity 1302. In this manner, the housing 1300*a* may be slidably adjustable with respect to the bar hanger holder 1200*a* along an axis defined by the slot 1312. FIG. 1J further shows a locking nut 1204*a* may be included to lock the bar hanger holder 1200*a* and the housing 1300*a* together. For example, the rod 1218 may include threads and the locking nut 1204*a* may screw onto the rod 1218. The locking nut 1204*a* may press the bar hanger holder 1200*a* against the housing 1300*a* when tightened, thus producing a sufficiently large frictional force to prevent movement between the bar hanger holder 1200*a* and the housing 1300*a*.

The housing assembly 1000*a* described herein provides several advantages over conventional housing assemblies with bar hanger systems. First, the bar hanger assembly 1100*a* includes fewer movable components (i.e., the crossmember assemblies 1102*a*-1 and 1102*a*-2) than conventional bar hanger systems with two pairs of bar hangers, where each bar hanger has a bar hanger head for attachment to a support structure. A reduction to the number of moving components may improve the ease of installation by reducing the number of components that the user should align and attach to support structure(s) during installation.

Second, the housing assembly 1000*a* includes four bar hangers 1110 (i.e., bar hangers 1110-1-1110-4), which provides greater mechanical stability and/or load carrying capacity compared to conventional bar hanger systems that include only a single pair of bar hangers. In some implementations, the housing assembly 1000*a* may satisfy various standards and/or regulations set forth, for example, by the Underwriter's Laboratory (UL). For example, the housing assembly 1000*a* may satisfy the requirements of UL 514A. For instance, the housing assembly 1000*a* may support a mechanical load of at least 200 pounds applied vertically to the housing 1300*a* when the housing assembly 1000*a* is installed onto support structures in a representative ceiling space.

Third, the housing assembly 1000*a* may be more modular compared to previous housing assemblies with caddy-type bar hanger systems. For example, the crossmember 1120*a* may be substituted for other implementations of the crossmember while using the bar hanger 1110 (e.g., a smaller (or larger) crossmember 1120*a* to accommodate a smaller (or larger) housing). In another example, the bar hanger 1110 may be substituted for other implementations of the bar hanger while using the crossmember 1120*a* (e.g., a shorter or longer bar hanger to provide a different range of adjustment for the overall length of the housing assembly). In this manner, the bar hanger assembly may be reconfigured to support different types and/or sizes of housings, bar hanger holders, and/or pan frames while reusing one or more of the same components in the housing assembly 1000*a*.

FIGS. 2A-2H show several views of the crossmember 1120*a*, which provides the interface for mounting the housing assembly 1000*a* to a support structure. As shown, the crossmember 1120*a* may include a base 1122 to support various mounting features. First, the crossmember 1120*a* may include flanges 1128-1 and 1128-2, disposed at opposing sides of the base 1122, where each flange includes an opening 1146 to receive and guide a fastener 1020 (e.g., a nail, a screw fastener, a scrail) for attachment to a wood/metal joist or stud. The flanges 1128-1 and 1128-2 may also provide attachment points with the bar hangers 1110. Second, the crossmember 1120*a* may include a guide 1124 extending from the base 1122 and disposed between the flanges 1128-1 and 1128-2. The guide 1124 may define a channel 1134 to engage a T-bar. Third, the crossmember 1120*a* may include flanges 1126-1, 1126-2, and 1126-3 that each extend from a side of the guide 1124 opposite to the base 1122. The flanges 1126-1, 1126-2, and 1126-3 may include corresponding openings 1138 to receive and guide a fastener (not shown) for attachment to a hat channel and/or a wood/metal joist or stud.

Figure 2A:
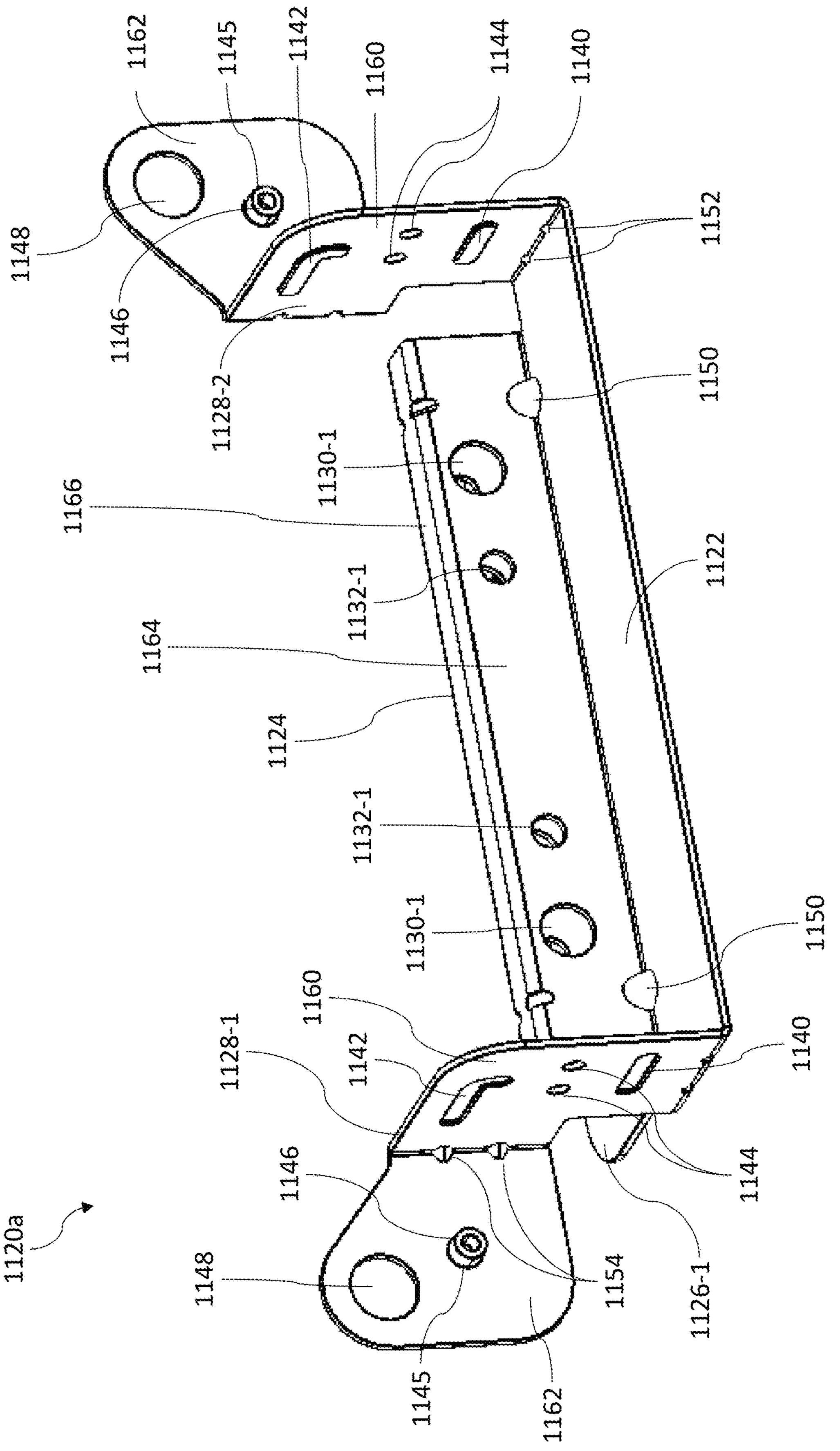
FIG. 2A shows a top, front, right perspective view of the crossmember in the housing assembly of FIG. 1A.
Figure 2B:
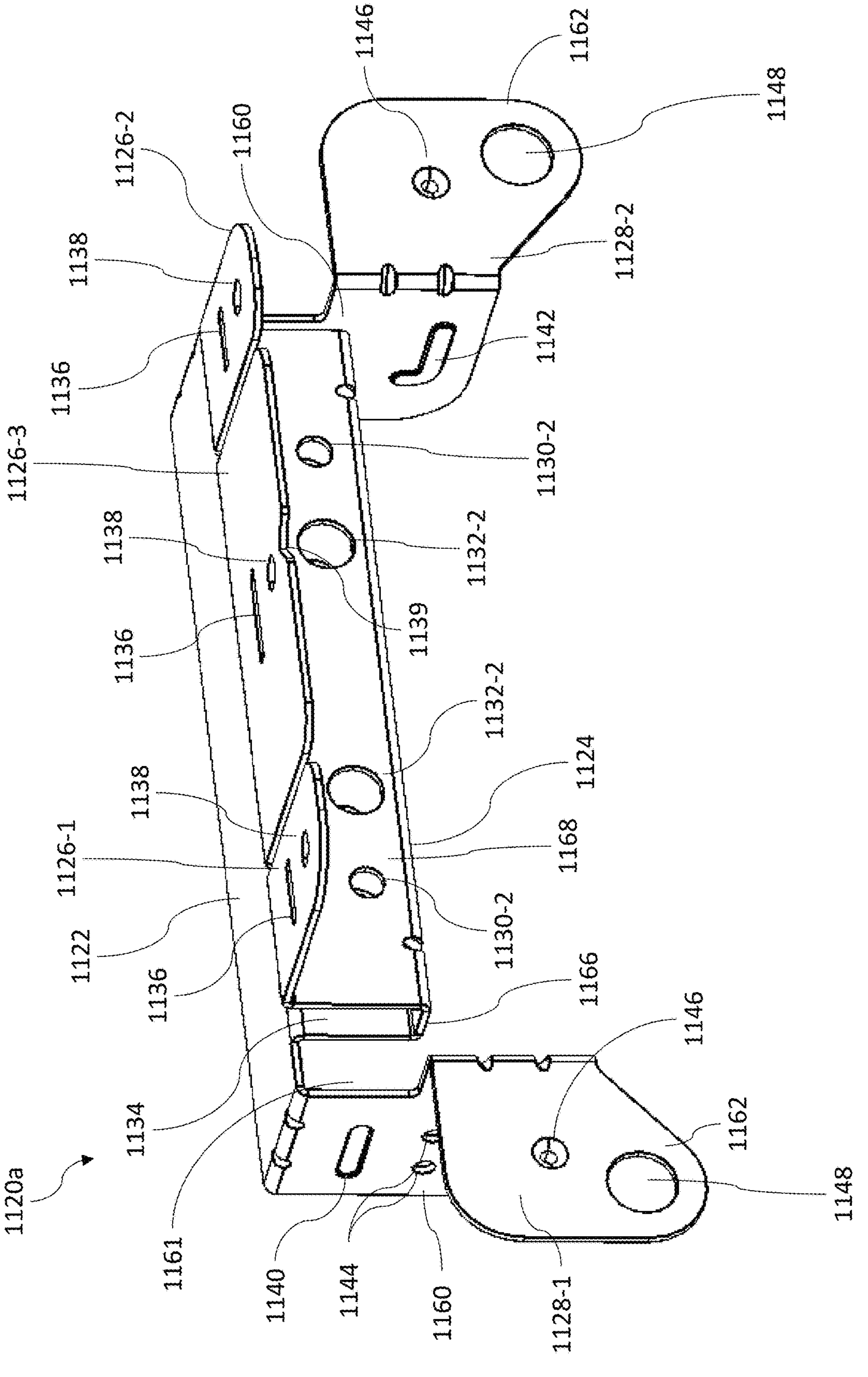
FIG. 2B shows a bottom, front, left perspective view of the crossmember of FIG. 2A.
Figure 2C:
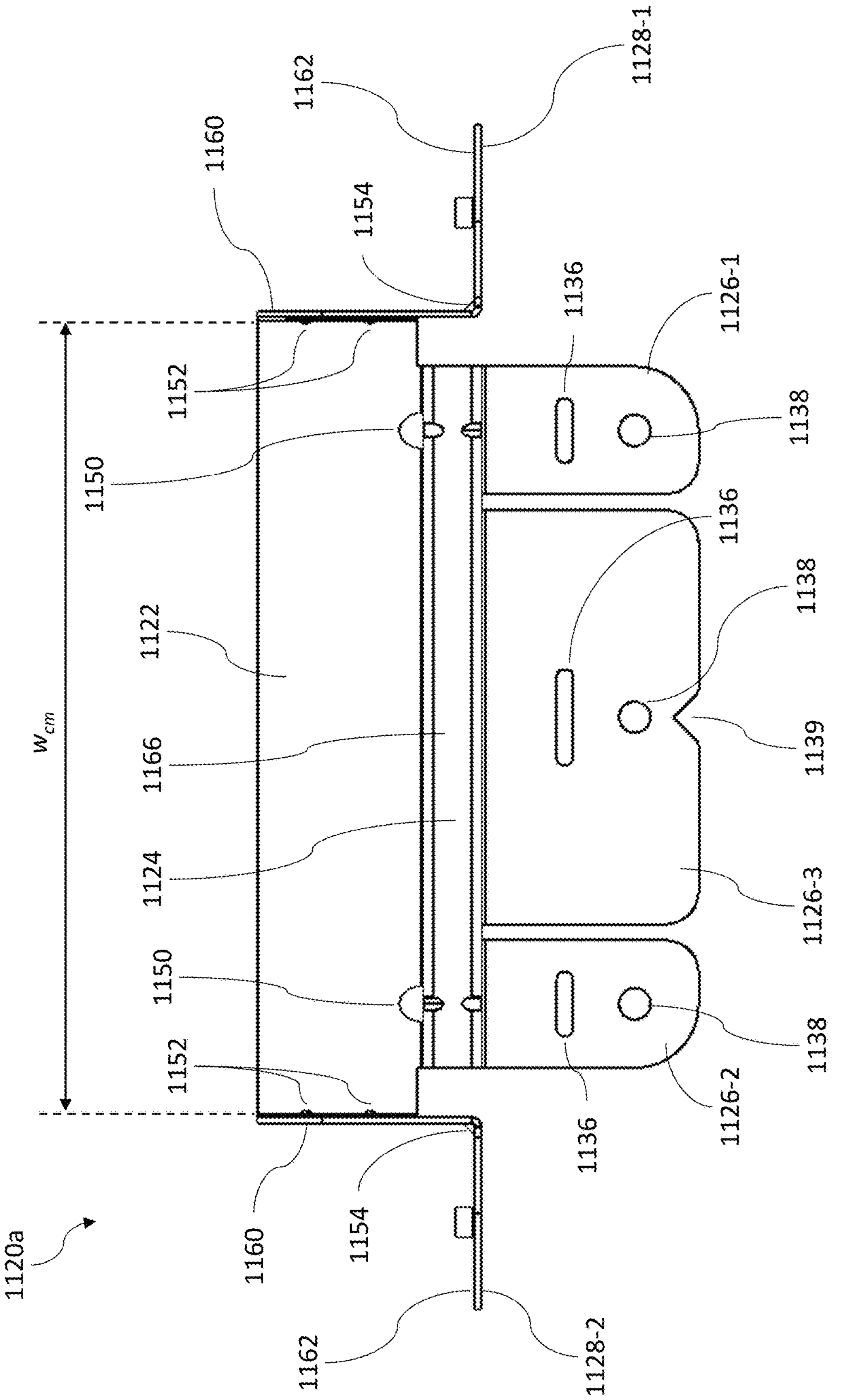
FIG. 2C shows a top view of the crossmember of FIG. 2A.

As shown in FIGS. 2A and 2B, the flanges 1128-1 and 1128-2 may each include a wall section 1160 that extends from the base 1122 and a wall section 1162 that extends from the wall section 1160. In some implementations, the wall sections 1160 and 1162 and the base 1122 may be substantially flat or flat in shape. Additionally, the wall sections 1160 and 1162 may be oriented vertically and the base 1122 may be oriented horizontally when the housing assembly 1000*a* is installed, for example, in a ceiling space. In some implementations, the wall sections 1160 and 1162 and the base 1122 may be oriented to be orthogonal with respect to one another.

For example, the wall section 1160 may be oriented to provide a surface to abut and support the bar hangers 1110. FIGS. 1G and 1H show the wall section 1160 may be oriented at a substantially right angle with respect to the base 1122. As shown, the wall section 1160 may include openings 1144 that align with corresponding openings 1112 on the bar hanger 1110 for attachment via the rivets 1010. In some implementations, the bar hanger 1010 may be positioned along an interior side of the wall section 1160 such that the bar hanger 1010 is disposed directly above or on the base 1122.

The wall section 1162 may be oriented to provide a surface that abuts one side of a wood/metal joist or stud, which, in turn, allows the fastener 1020 to be inserted through the opening 1146 and into the joist or stud. For example, FIGS. 1G and 1H show the wall section 1162 may be oriented at a substantially right angle with respect to the surface of the wall section 1160. In some implementations, the opening 1146 may be formed by a sidewall 1145 that protrudes from the wall section 1162 to better guide the fastener 1020 as the fastener 1020 is inserted into the wood joist by providing a larger contact area between the fastener 1020 and the sidewall 1145. If the fastener 1020 is a screw fastener, the sidewall 1145 may provide an interior surface with threads that engage corresponding threads of the fastener 1020. In some implementations, the fastener 1020 may be a captive fastener that is coupled to the sidewall 1145 and disposed, at least in part, in the opening 1146.

In some implementations, the wall section 1162 may also include a safety cable opening 1148. A safety cable (not shown) may be routed through the safety cable opening 1148 to suspend the housing assembly 1000*a* from a support structure. The safety cable may provide a secondary attachment mechanism to ensure the housing assembly 1000*a* remains attached to a support structure in the event the fasteners coupling the crossmember 1120*a* to a support structure detach or fail. The safety cable may be coupled to the same support structure as the crossmember 1120*a* or a different support structure. For example, the housing assembly 1000*a* may be installed in an environment that is susceptible to earthquakes. If an earthquake of sufficient magnitude occurs, the safety cable may prevent the housing assembly 1000*a* from falling from a ceiling space, thus protecting any occupants within the environment. In some implementations, the housing assembly 1000*a* may only include a safety cable when the housing assembly 1000*a* is installed onto T-bars in a suspended ceiling.

Figure 2D:
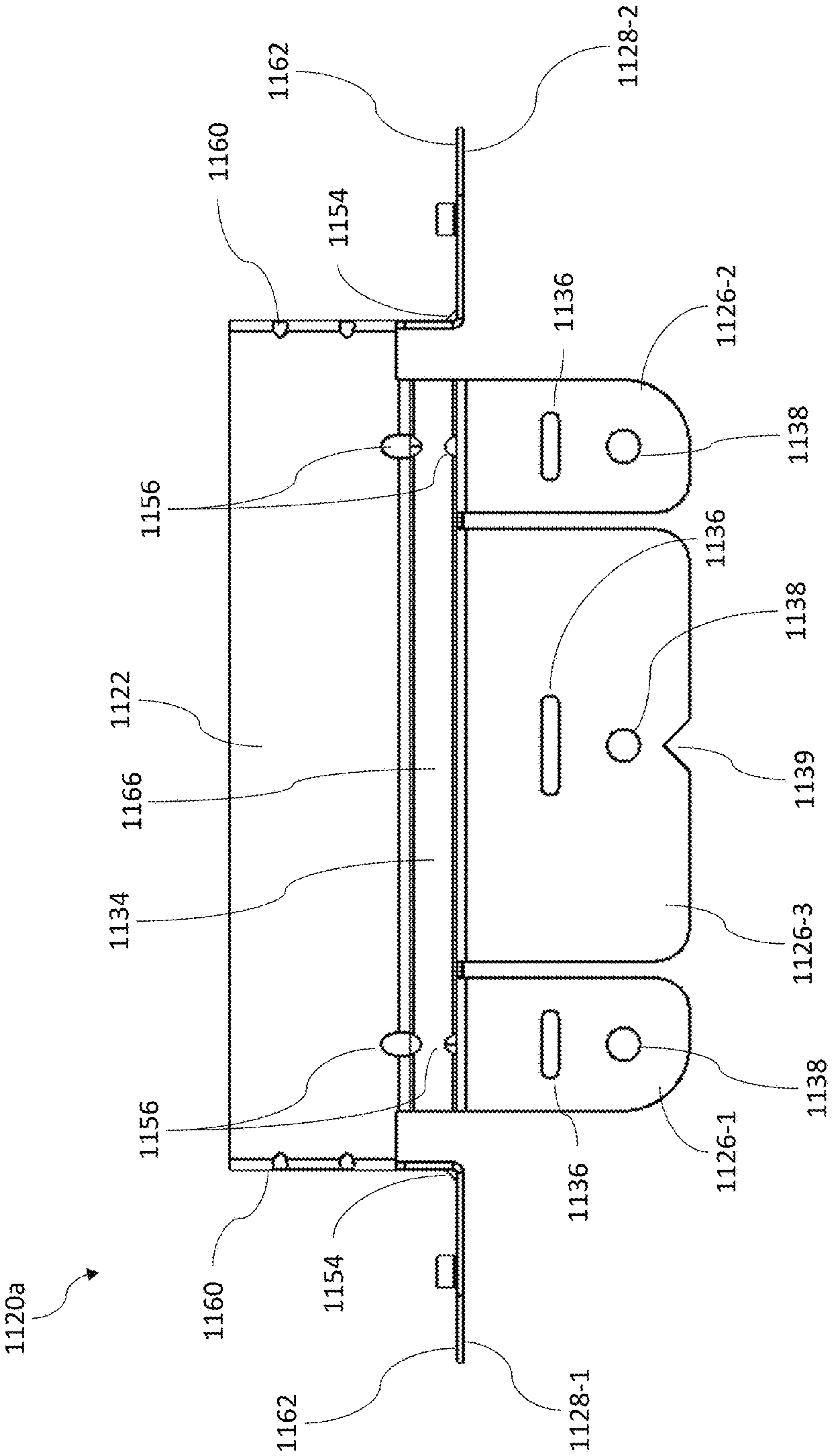
FIG. 2D shows a bottom view of the crossmember of FIG. 2A.
Figure 2E:
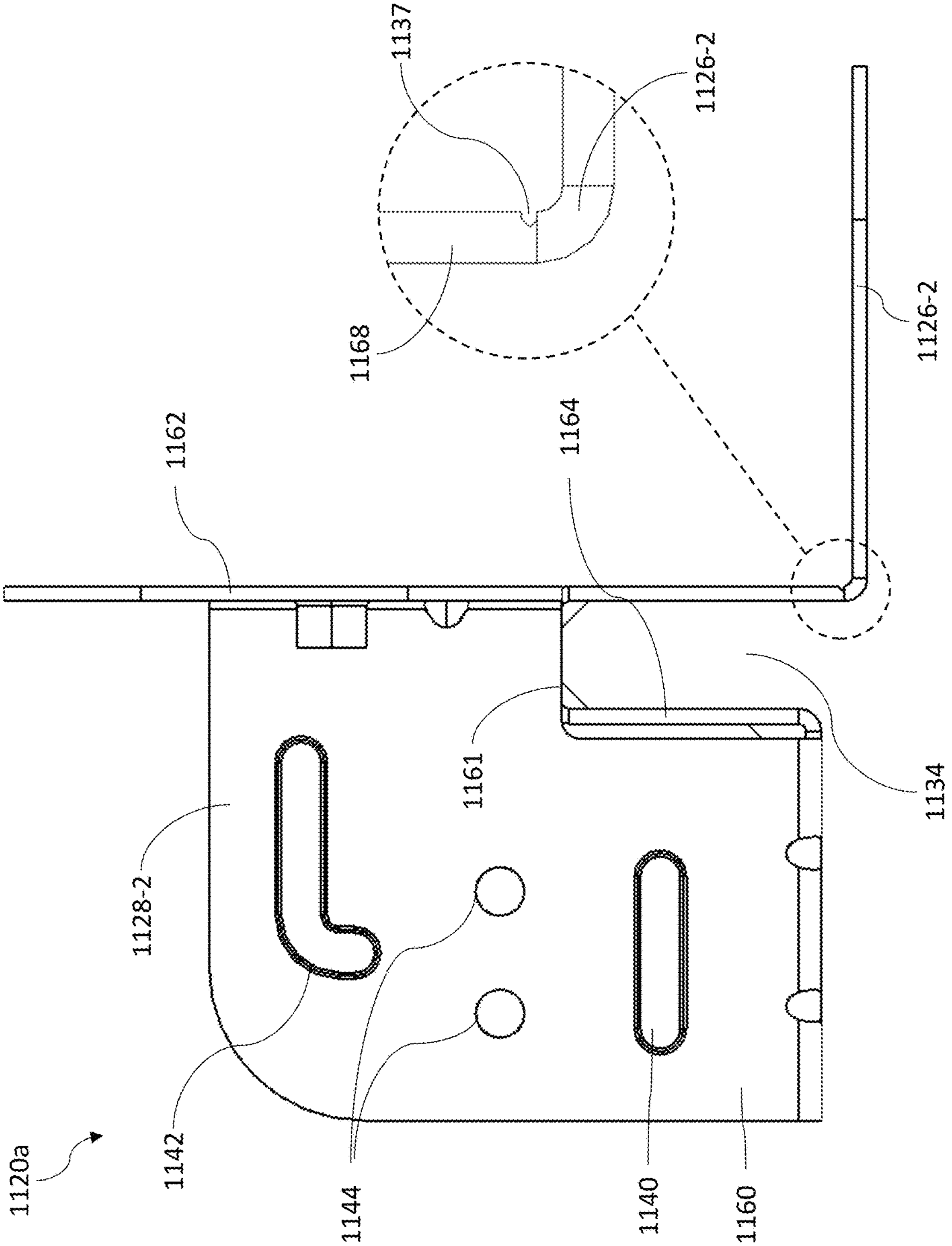
FIG. 2E shows a rear view of the crossmember of FIG. 2A.
Figure 2F:
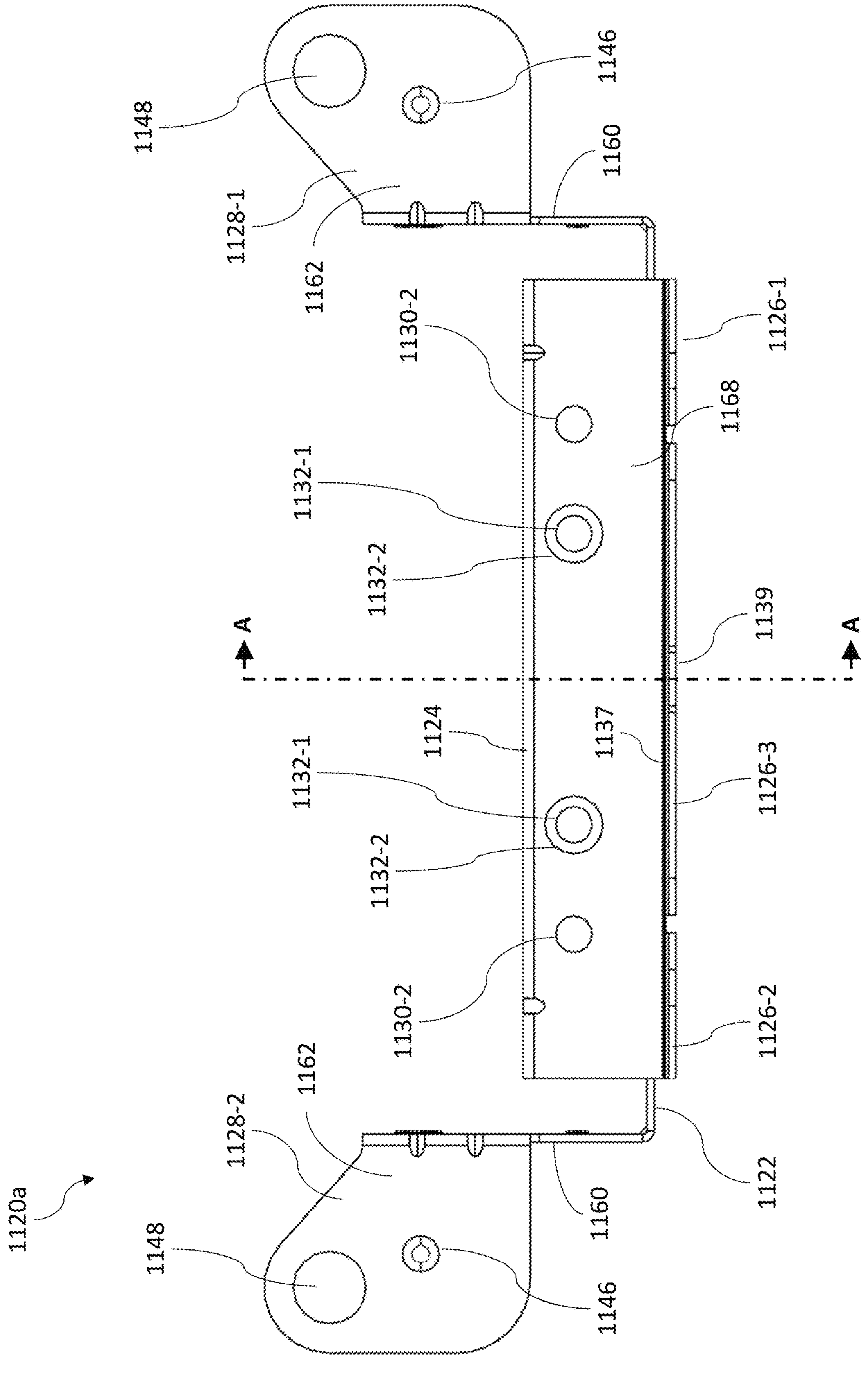
FIG. 2F shows a left-side view of the crossmember of FIG. 2A.
Figure 2G:
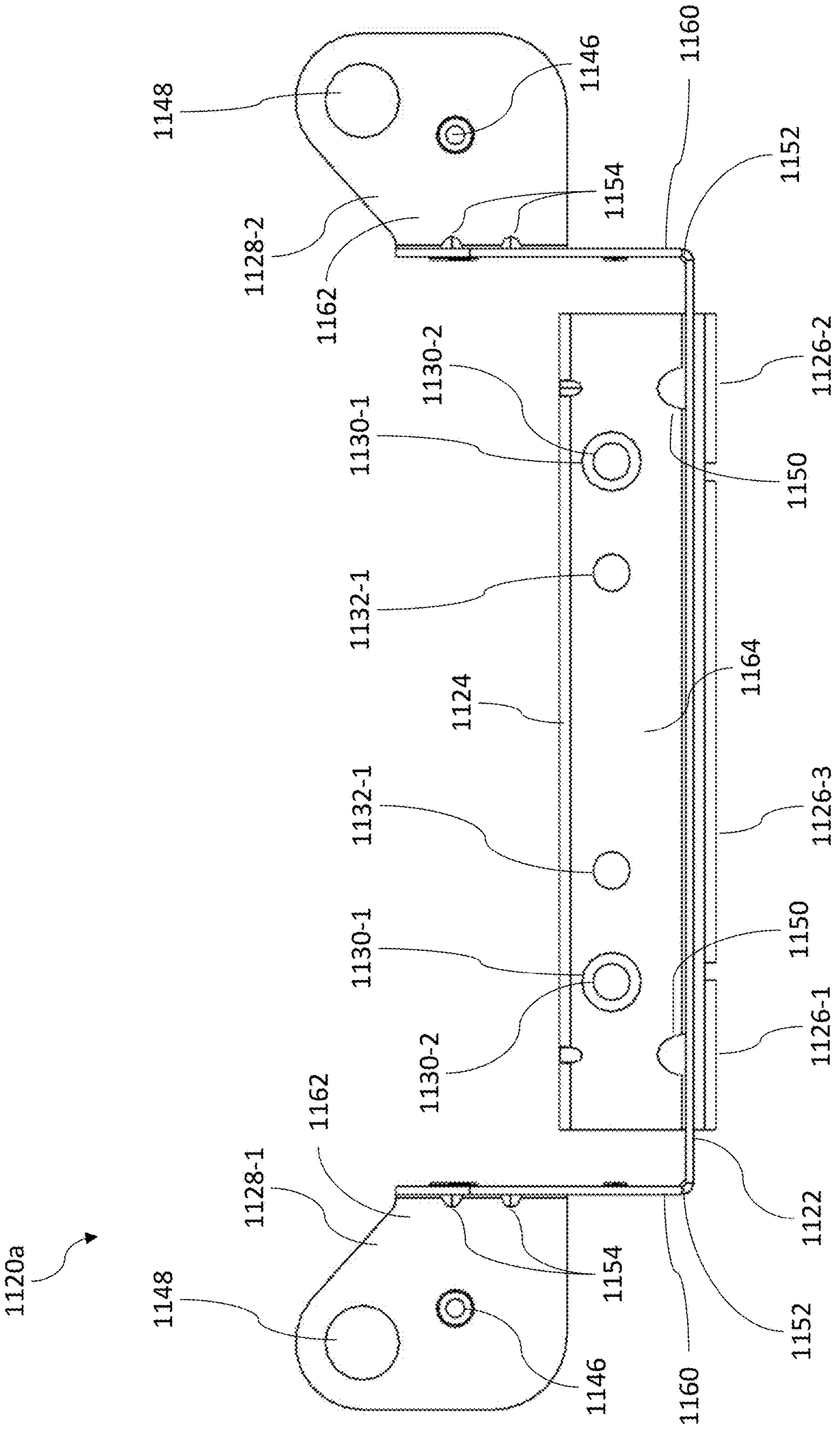
FIG. 2G shows a right-side view of the crossmember of FIG. 2A.
Figure 2H:
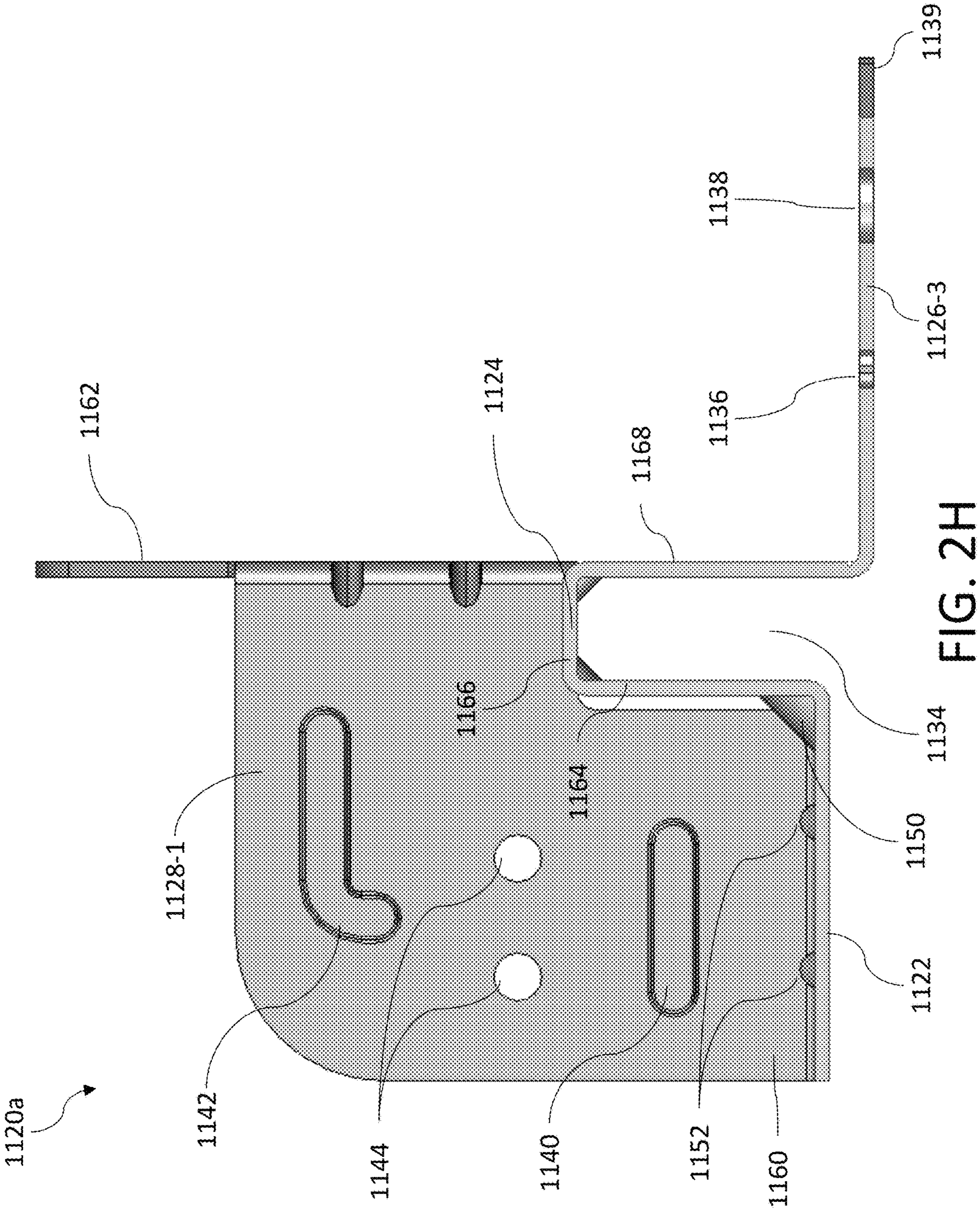
FIG. 2H shows a cross-sectional view of the crossmember corresponding to the plane A-A of FIG. 2F.

As shown in FIGS. 2B and 2H, the guide 1124 may include wall sections 1164, 1166, and 1168 forming a U-shaped structure that defines the channel 1134. The wall sections 1164, 1166, and 1168 may each be substantially flat and oriented at substantially right angles or right angles with respect to adjoining wall sections. In some implementations, the wall section 1168 may be substantially coplanar or coplanar with the wall section 1162 of the flanges 1128-1 and 1128-2 and, hence, may abut the surface of a support structure (e.g., a wood joist) together with the wall section 1162. The shape and/or dimensions of the wall sections 1164, 1166, and 1168 may be tailored such that the channel 1134 is able to engage a portion of a T-bar. For example, the wall section 1166 may rest on top of a portion of the T-bar while the wall sections 1164 and 1168 abut the sides of the T-bar. In some implementations, the wall sections 1160 of the flanges 1128-1 and 1128-2 may also each have a notch 1161 positioned to overlap at least a portion of the wall sections 1164, 1166, and 1168 along the front or rear sides of the crossmember 1120*a*. The notches 1161 may be shaped and/or dimensioned to provide sufficient clearance for a T-bar to be inserted into the channel 1134 (see, for example, FIG. 9B).

The guide 1124 may further include openings 1130-1 and 1132-1 on the wall section 1164 aligned with openings 1130-2 and 1132-2, respectively, on the wall section 1168. The openings 1130-1, 1130, 1132-1, and 1132-2 may be used to receive and guide fasteners (not shown) to couple the crossmember 1120*a* to the T-bar. The fasteners may be inserted through the openings 1130-1, 1130, 1132-1, and 1132-2 from either side of the guide 1124 (i.e., inserted from the wall section 1164 or 1168).

Figure 8A:
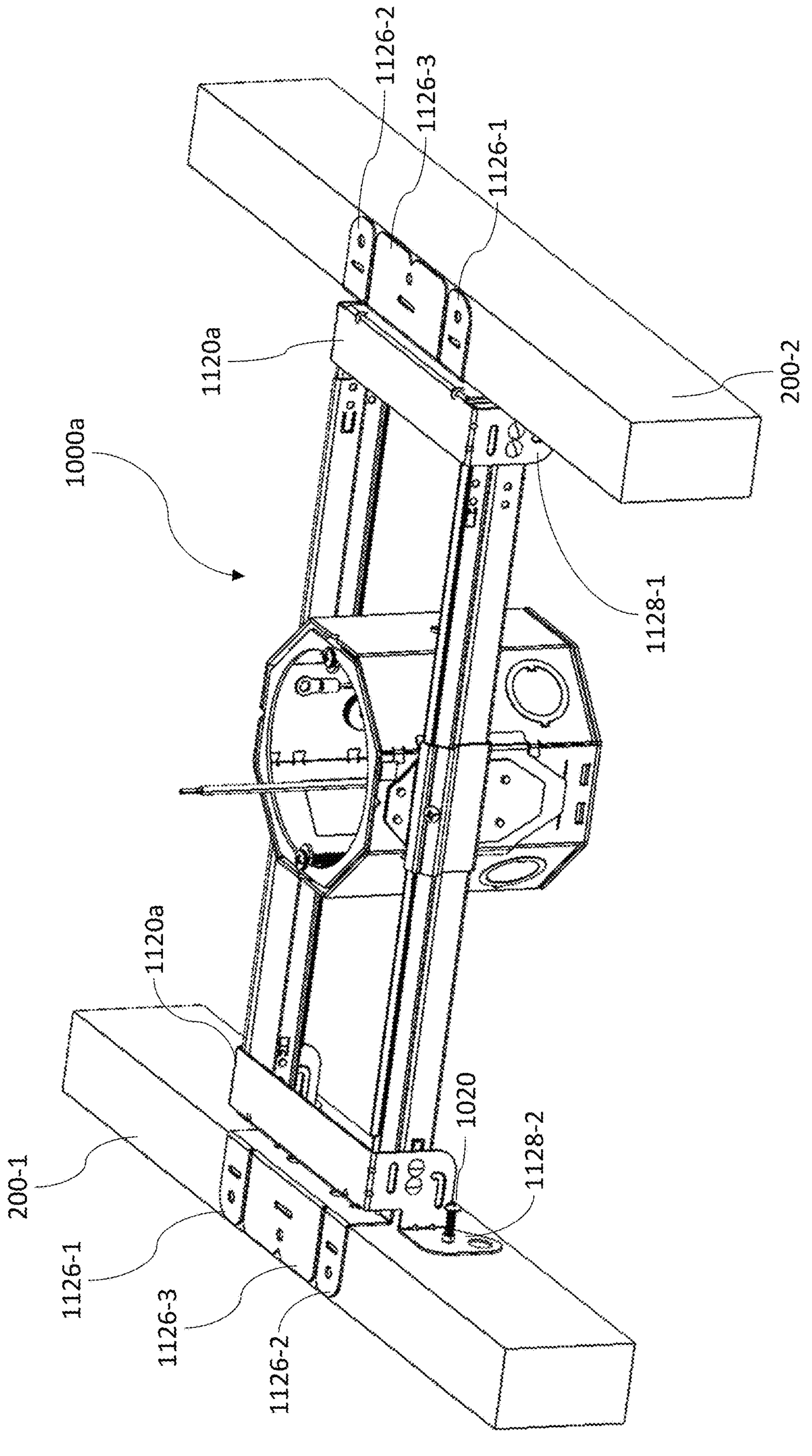
FIG. 8A shows a bottom, front, left perspective view of the housing assembly of FIG. 1A coupled to a pair of wood joists.
Figure 8B:
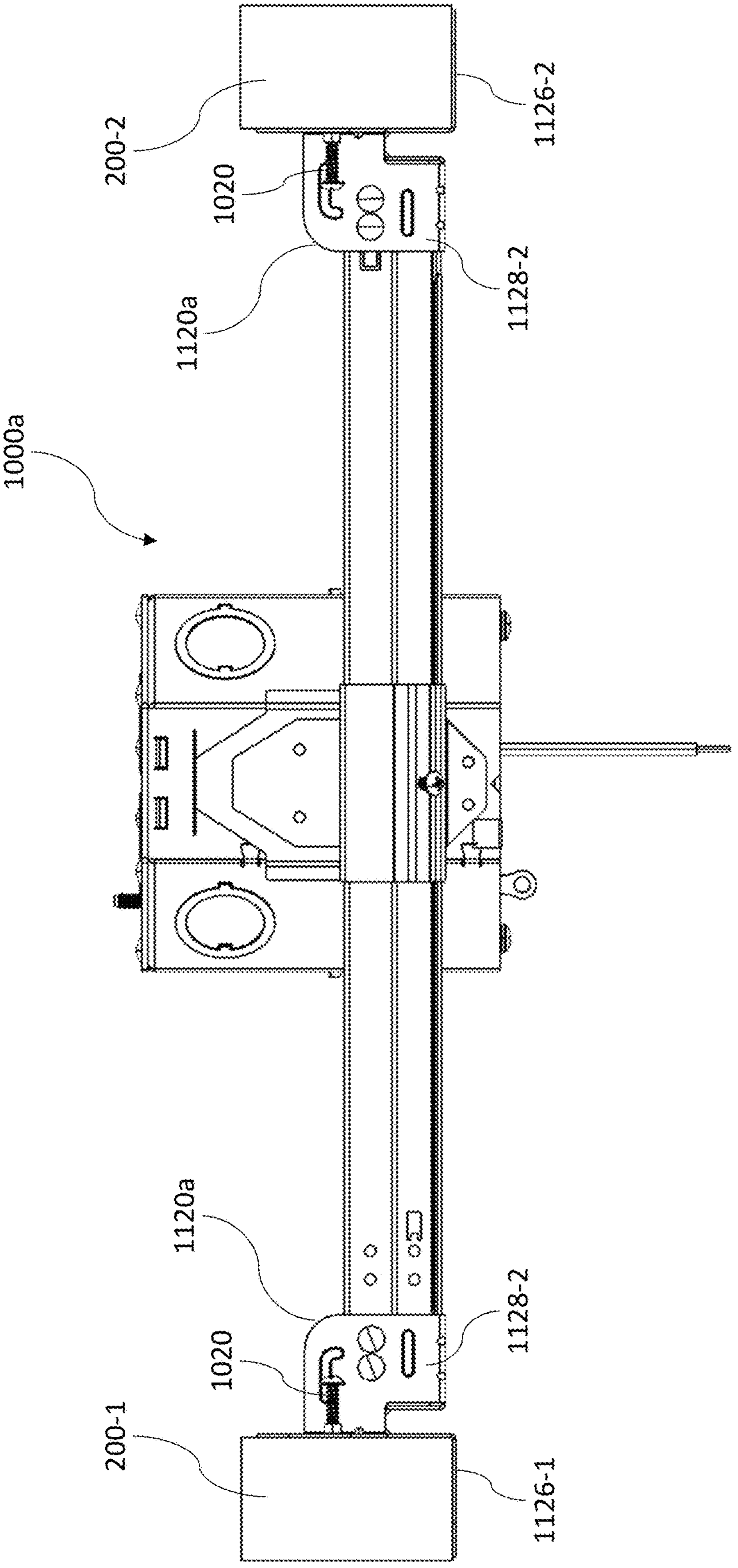
FIG. 8B shows a front view of the housing assembly of FIG. 8A.

FIG. 2B shows the flanges 1126-1, 1126-2, and 1126-3 may be substantially flat tabs that extend from the section 1168 of the guide 1124. As shown, the flanges 1126-1, 1126-2, and 1126-3 may be aligned substantially parallel with respect to each other and oriented at a substantially right angle with respect to the section 1168 of the guide 1124. In some implementations, the flanges 1126-1, 1126-2, and 1126-3 may provide a surface that is substantially orthogonal with respect to the surface of the wall section 1162 of the flanges 1128-1 and 1128-2 in order to provide additional support and alignment when mounting the housing assembly 1000*a* to a support structure, such as a wood/metal joist or stud. For example, the flanges 1126-1, 1126-2, and 1126-3 may be mounted to a bottom side of a wood/metal joist or stud while the wall sections 1162 may be mounted to a right or left side of the wood/metal joist or stud as shown in FIG. 8B.

The flanges 1126-1, 1126-2, and 1126-3 may each include a slot 1136 and an opening 1138. The slot 1136 may be shaped to receive a tool (e.g., a flat head screwdriver) to facilitate removal of the respective flanges 1126-1, 1126-2, and 1126-3 (e.g., by bending back and forth) from the crossmember 1120*a*. For example, the housing assembly 1000*a* may be installed into a confined space where one or more of the flanges 1126-1, 1126-2, and 1126-3 may collide with an obstruction in the environment (e.g., a wall), thus preventing the crossmember 1120*a* from being attached to a support structure. The removal of the flanges 1126-1, 1126-2, and/or 1126-3 may thus provide sufficient clearance between the crossmember 1120*a* and the obstruction.

In some implementations, the portion of the wall section 1168 joined to the flanges 1126-1, 1126-2, and 1126-3 may further include a notch 1137 that extends along at least the width of the respective flanges 1126-1, 1126-2, and 1126-3 and, in some instances, across the entirety of the wall section 1168 as shown in FIGS. 2E and 2F. The notch 1137 may reduce the thickness of the wall section 1168 so that removal of the flanges 1126-1, 1126-2, and/or 1126-3 occurs along the notch 1137. In some implementations, the corner between the wall section 1168 and the flanges 1126-1, 1126-2, and 1126-3 may alternatively be perforated with one or more openings/slots to make removal easier.

The opening 1138 may receive and guide a fastener (not shown) for attachment to a wood/metal joist or stud or a hat channel. In some implementations, the flange 1126-3 may also include a notch 1139 located along a centerline of the crossmember 1120*a*. The notch 1139 may provide an alignment reference when positioning the housing assembly 1000*a* on a support structure during installation.

In some implementations, the crossmember 1120*a* may include several structural features to increase structural rigidity. For example, one or more gussets may be added to the edges or corners formed between two bent sections of the crossmember 1120*a*. FIG. 2A shows the crossmember 1120*a* may include gussets 1150 formed between the base 1122 and the wall section 1164 of the guide 1124, gussets 1152 formed between the base 1122 and the wall section 1160 of the flanges 1128-1 and 1128-2, and gussets 1154 formed between the wall section 1160 and the wall section 1162 of the flanges 1128-1 and 1128-2. FIG. 2D further shows the guide 1124 may include gussets 1156 formed along the corners formed between the wall section 1166 and the wall sections 1164 and 1168. In some implementations, gussets may be excluded from the corner between the wall section 1168 and the flanges 1126-1, 1126-2, and 1126-3 in order for the flanges 1126-1, 1126-2, and 1126-3 to be more easily removed. In another example, the crossmember 1120*a* may include ribs 1140 and 1142 disposed along the wall section 1160 of the flanges 1128-1 and 1128-2. The ribs 1140 and 1142 may be shaped and/or dimensioned to increase the structural rigidity of the wall section 1160 and/or to improve the aesthetic appearance of the crossmember 1120*a*.

In some implementations, the dimensions of the crossmember 1120*a* may constrain the size of the housing supported in the housing assembly 1000*a*. For example, the crossmember 1120*a* may have a width ($w_{cm}$) corresponding to the width of the base 1122. The housing may have a width ($w_h$) that is less than or equal to $w_{cm}$. To accommodate a housing with a larger width, $w_h$, a larger crossmember 1120*a* having a larger width, $w_{cm}$, may be used instead (and together with the bar hangers 1110). In general, the width, $w_{cm}$, of the crossmember may range between about 3 inches and about 10 inches. For the crossmember 1120*a*, the width, $w_{cm}$, may be about 5 inches.

The crossmember 1120*a* may be formed as a single part. For example, the crossmember 1120*a* may be formed from a single piece of sheet metal that is processed to produce the geometry shown in FIGS. 2A-2H. More generally, the crossmember 1120*a* may be fabricated using various manufacturing methods including, but not limited to various sheet metal processes (e.g., bending, cutting, stamping), extrusion, molding, and casting. In some implementations, the crossmember 1120*a* may be formed from various metals including, but not limited to aluminum, aluminum alloys, and various steel alloys (e.g., galvanized steel, stainless steel).

Figure 3:
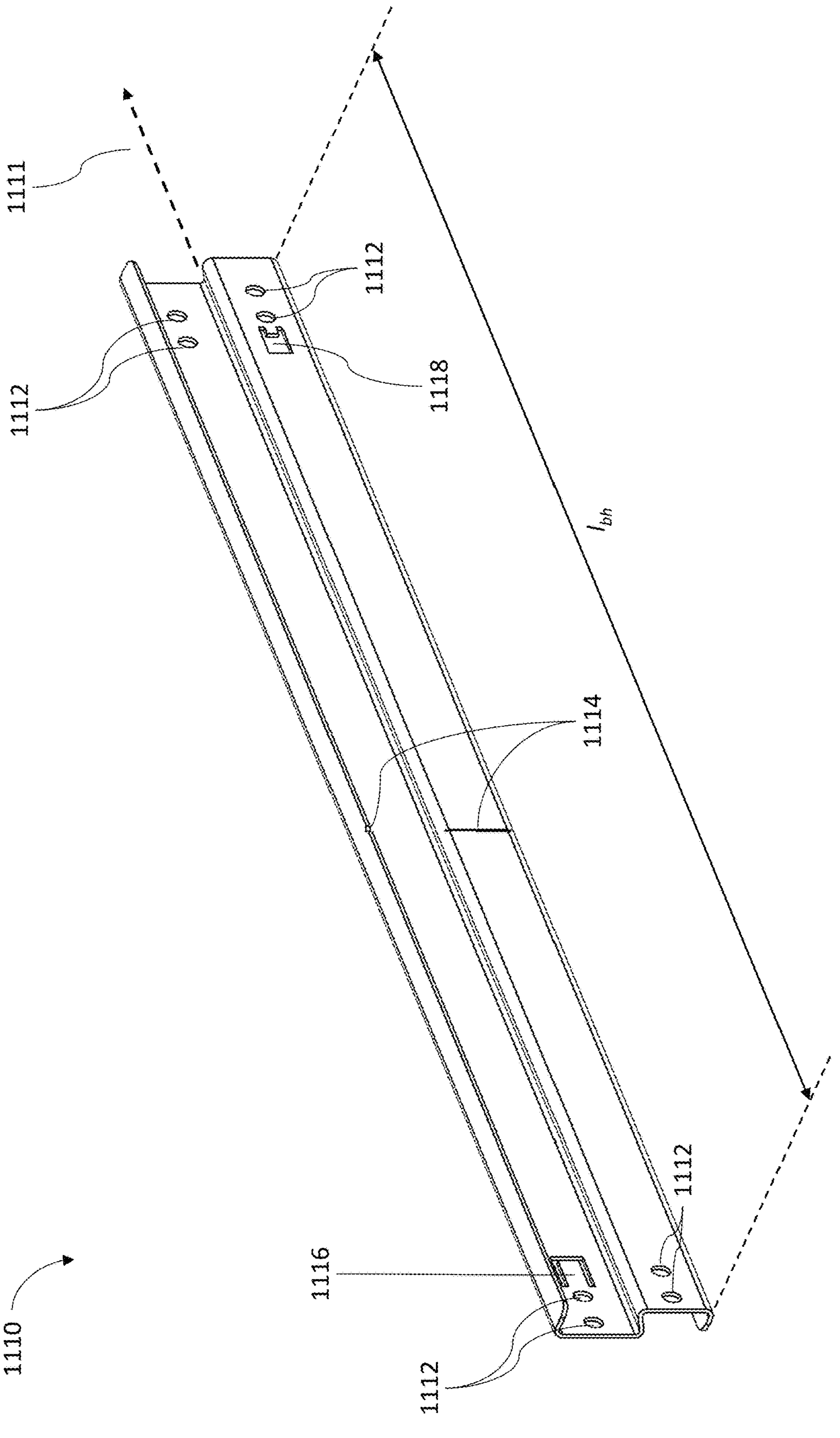
FIG. 3 shows a perspective view of the bar hanger in the housing assembly of FIG. 1A.
Figure 4A:
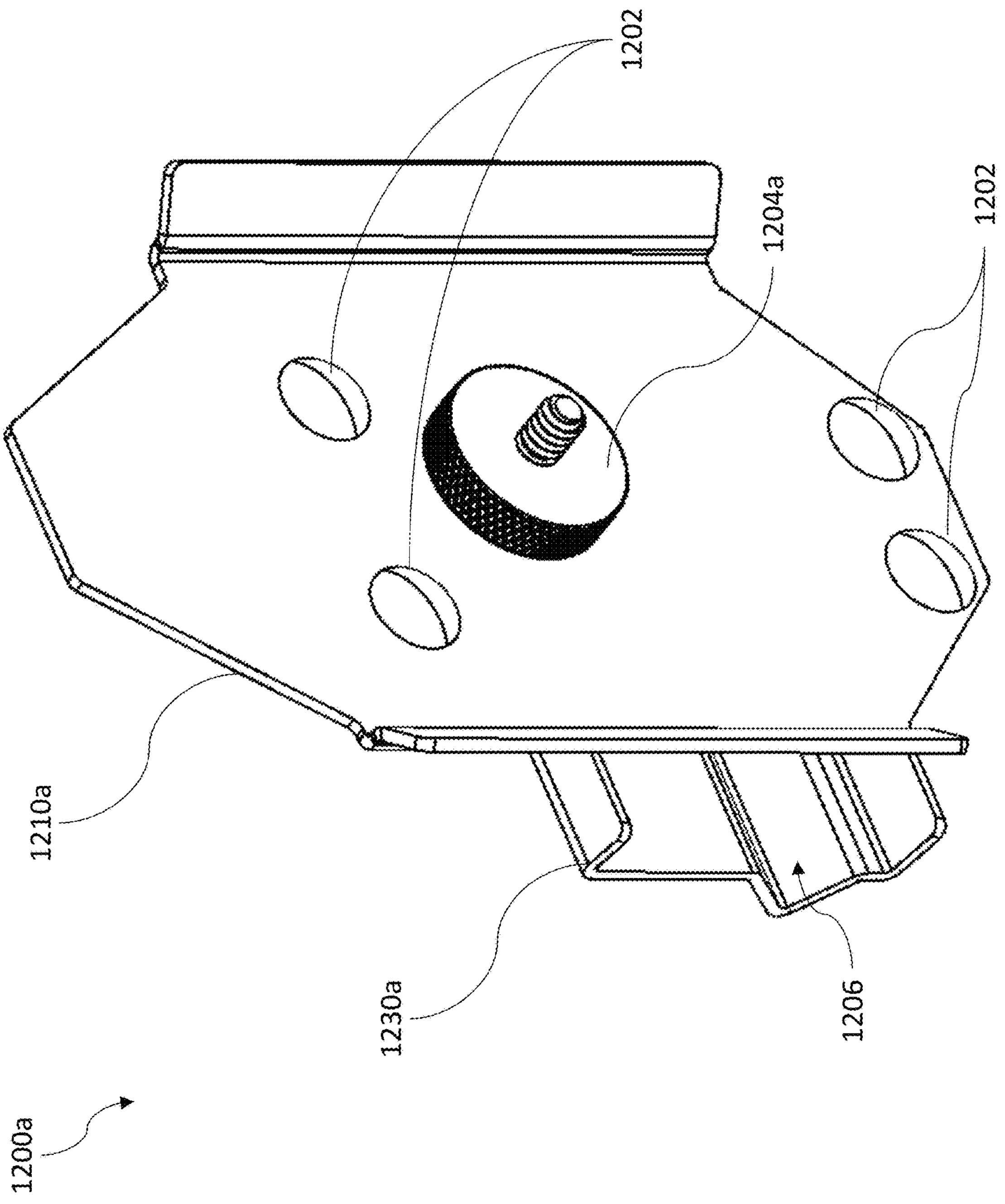
FIG. 4A shows a top, rear, right perspective view of the bar hanger holder in the housing assembly of FIG. 1A.
Figure 4B:
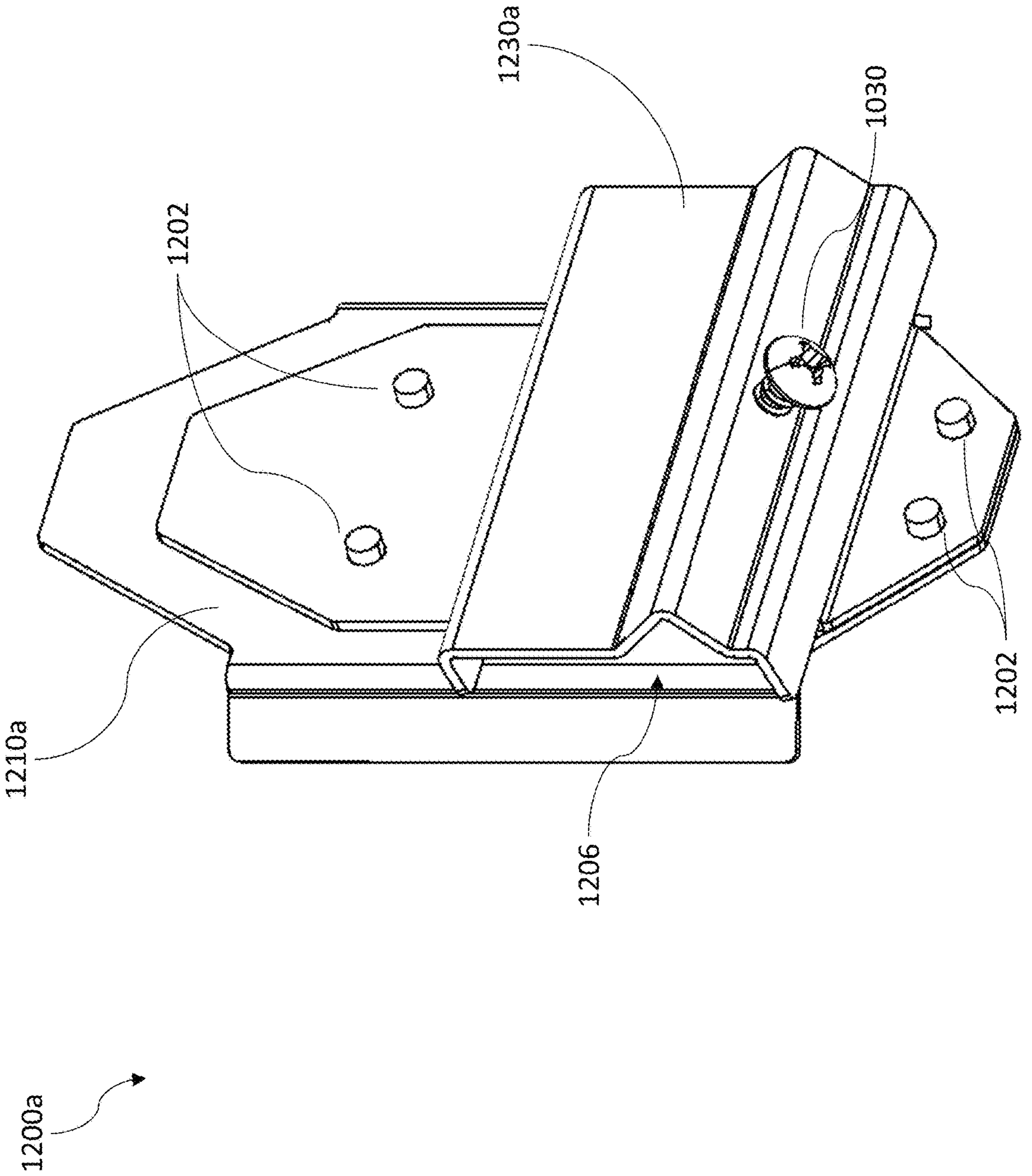
FIG. 4B shows a bottom, front, left perspective view of the bar hanger holder of FIG. 4A.
Figure 4C:
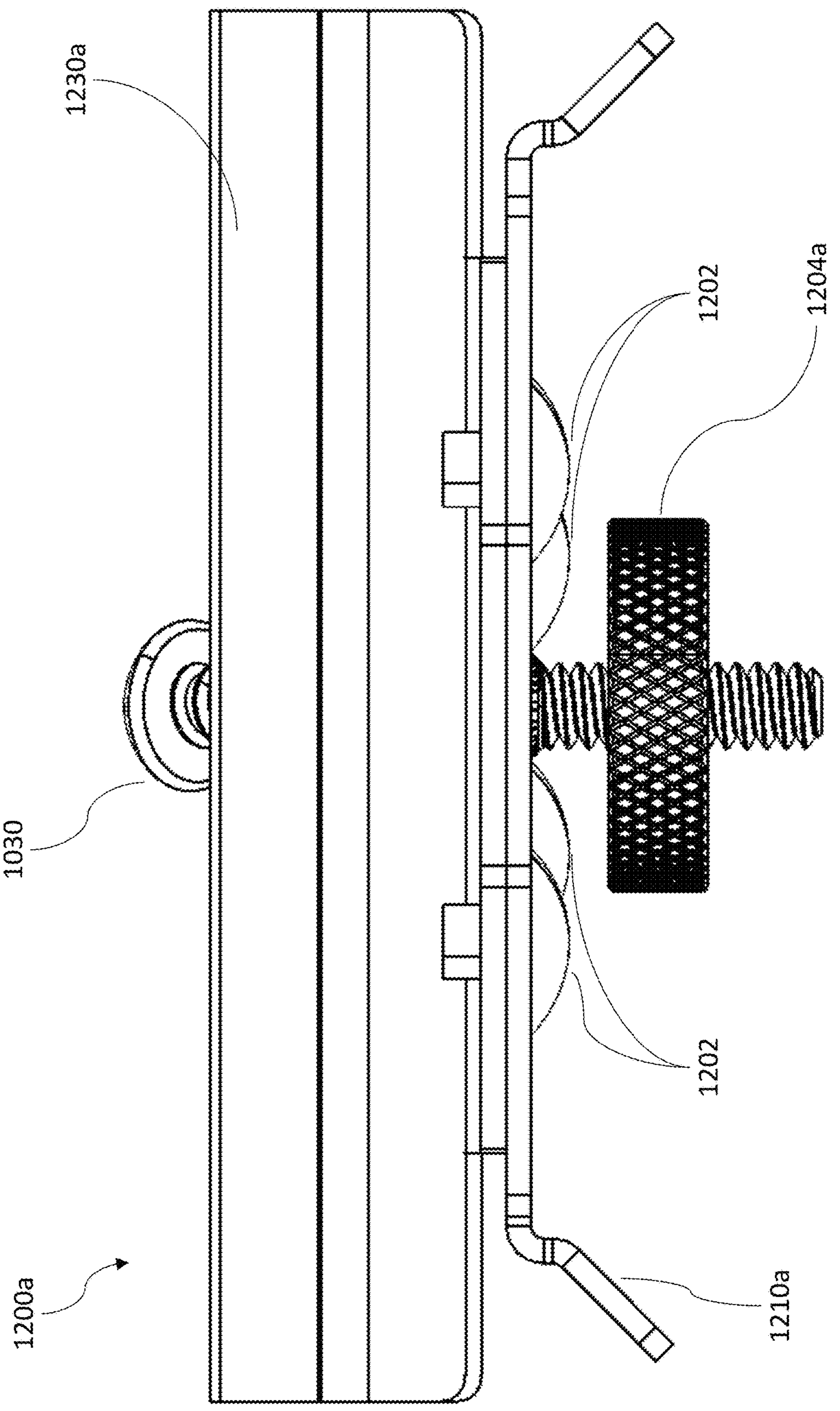
FIG. 4C shows a top view of the bar hanger holder of FIG. 4A.
Figure 4D:
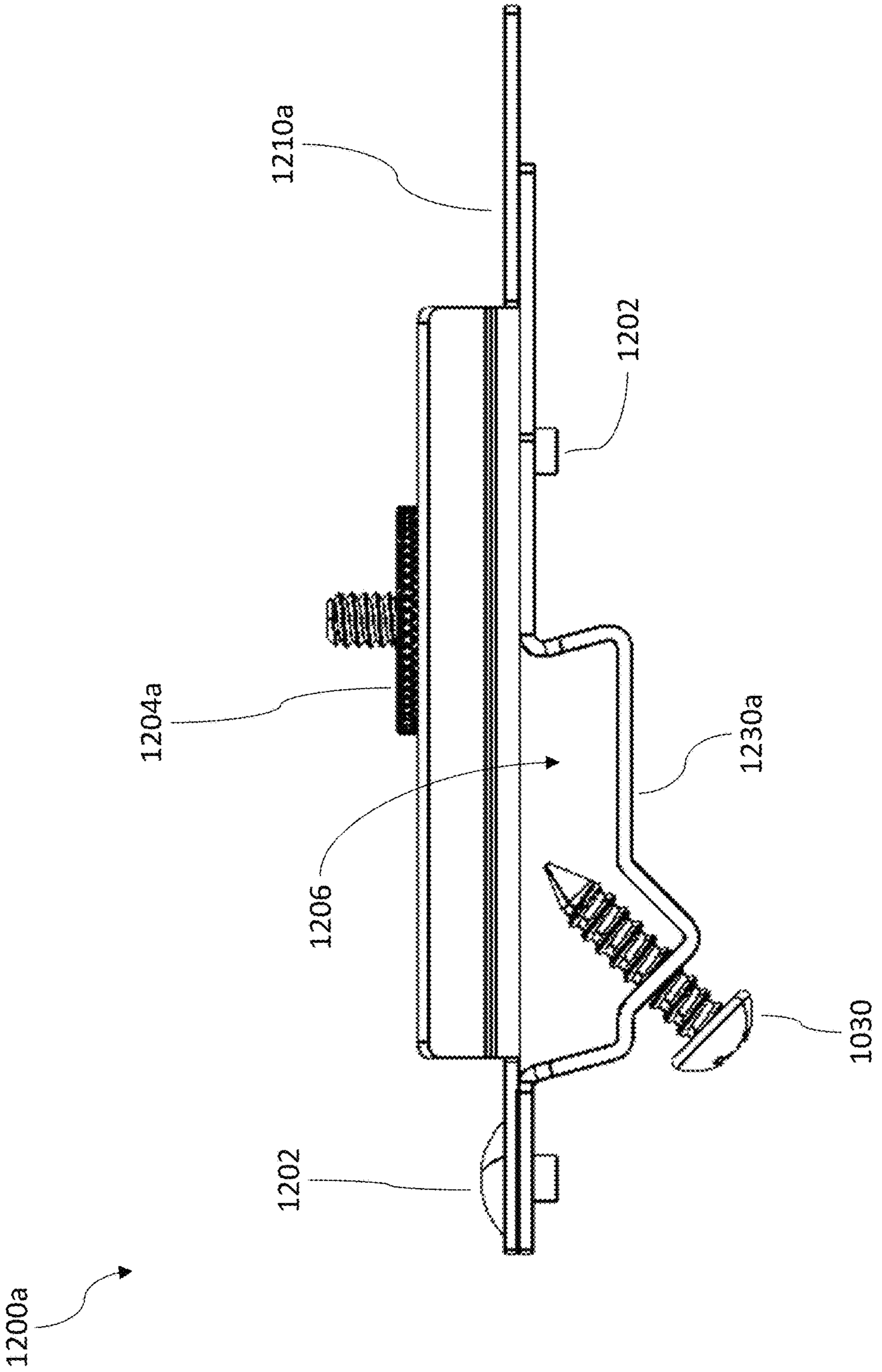
FIG. 4D shows a left-side view of the bar hanger holder of FIG. 4A.
Figure 4E:
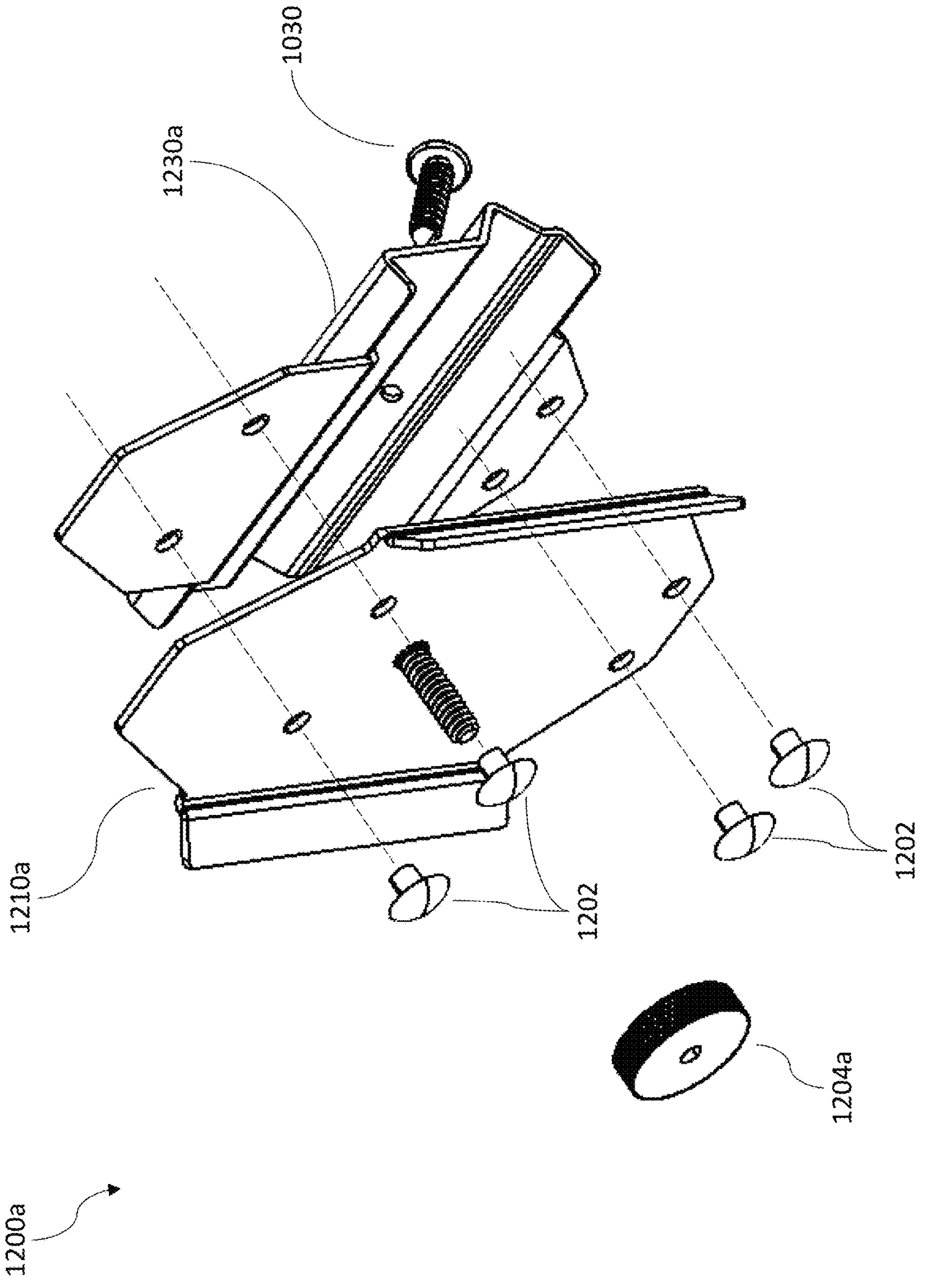
FIG. 4E shows an exploded top, rear, left perspective view of the bar hanger holder of FIG. 4A.
Figure 4F:
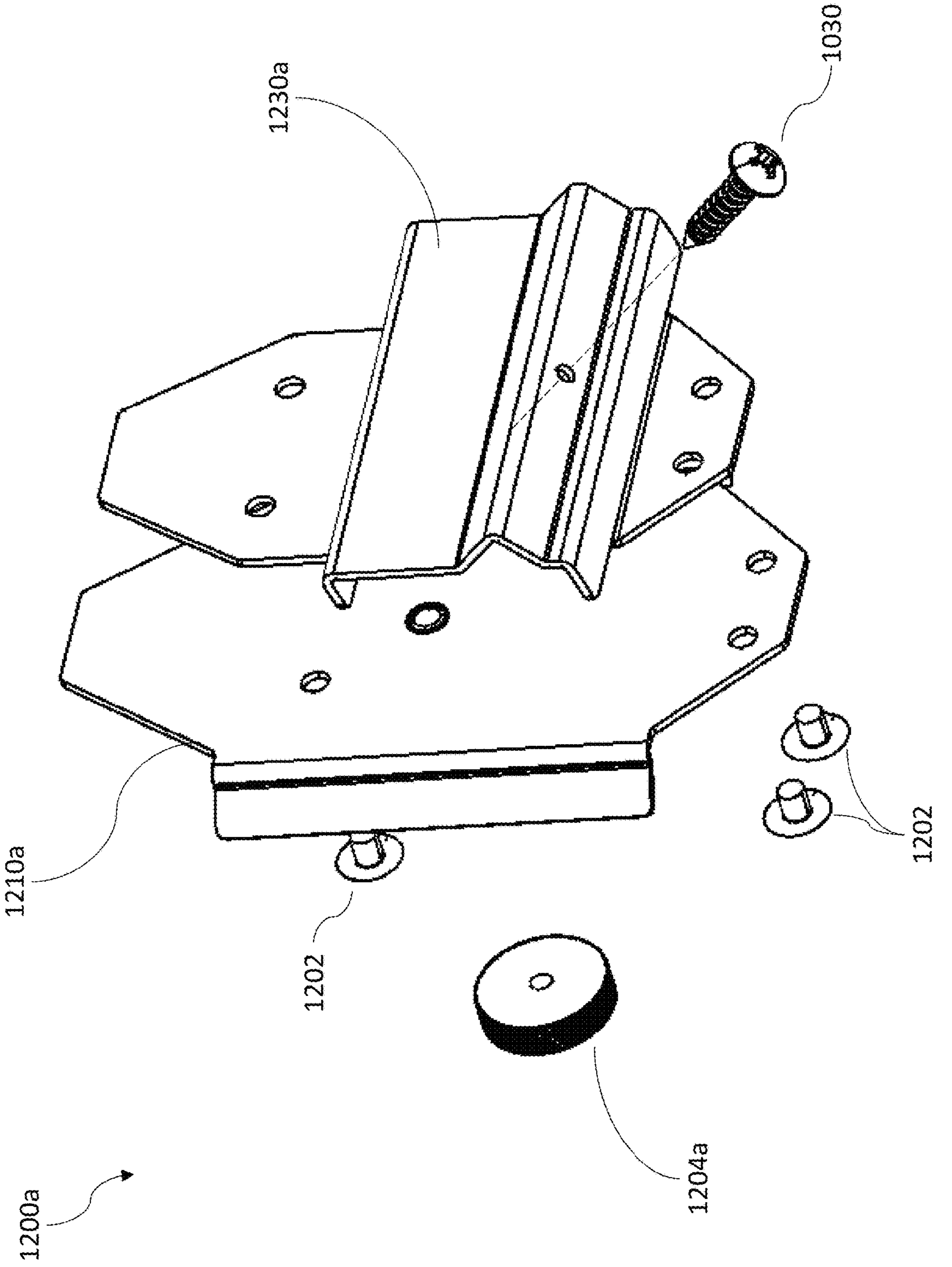
FIG. 4F shows an exploded bottom, front, left perspective view of the bar hanger holder of FIG. 4A.

FIG. 3 shows a perspective view of the bar hanger 1110. As shown, the bar hanger 1110 may define a longitudinal axis 1111 corresponding to the direction along which the bar hanger 1110 is slidably adjustable with respect to another bar hanger 1110 and/or the bar hanger holder 1200*a*. The bar hanger 1110 may include openings 1112 located at opposing ends of the bar hanger 1110. As described above, a subset of the openings 1112 may align with the openings 1144 of the crossmember 1120*a* to facilitate attachment with the crossmember 1120*a* via rivets 1010. The bar hanger 1110 may also include a tab 1116 and a slot 1118. The tab 1116 may be bent to engage the slot 1118 of another bar hanger 1110 in order to prevent the respective pair of bar hangers 1110 from disengaging one another when the bar hangers 1110 are fully extended.

The bar hanger 1110 may have a length ($l_{bh}$) that ranges between about 12 inches and about 24 inches. In some implementations, the bar hanger 1110 may also include one or more notches 1114, which may be used to fracture the bar hanger 1110 into shorter segments by bending the bar hanger 1110 back and forth about the notch 1114. For example, the housing assembly 1000*a* may be installed between two closely spaced support structures separated by a gap that is less than the length, $l_{bh}$, of the bar hanger 1110. In order to accommodate the smaller gap, the bar hanger 1110 may be fractured into a shorter segment so that the housing assembly 1000*a* fits between the respective support structures.

In some implementations, the bar hangers 1110-1-1110-4 may be substantially identical in shape and/or dimensions. The bar hanger 1110 may engage another bar hanger 1110 by being flipped upside down with respect to the other bar hanger 1110. For example, FIGS. 1G, 1H, and 1J show the bar hanger 1110-1 is rotated 180 degrees with respect to the bar hanger 1110-4. In this manner, one type of bar hanger 1110 is used, thus reducing the number of different parts in the housing assembly 1000*a* for manufacture. However, it should be appreciated that in some implementations, the bar hangers 1110-1-1110-4 may each have different shapes and/or dimensions.

In some implementations, the bar hanger 1110 may be shaped and/or dimensioned to reduce lateral play when telescopically coupled to another bar hanger 1110. For example, the respective pairs of bar hangers 1110 (e.g., the bar hangers 1110-1 and 1110-4 or the bar hangers 1110-2 and 1110-3) may physically contact one another such that the relative lateral movement between the bar hangers 1110 is reduced or, in some instances, mitigated. In some implementations, the pair of bar hangers 1110 may impart a compressive force onto each other that further reduces lateral play. The compressive force may also produce a corresponding frictional force that holds one bar hanger 1110 at a desired position with respect to the other bar hanger 1110 unless a user applies a sufficiently large force to slidably adjust the respective positions of the bar hangers 1110. Examples of bar hangers that are substantially identical in shape and/or dimension, reduce lateral play, and/or provide a compressive holding force may be found in U.S. application Ser. No. 16/886,365, filed on May 28, 2020, entitled, "ADJUSTABLE HANGER BAR ASSEMBLY" (hereinafter the '365 application) and International Application No. PCT/US2019/054220, filed on Oct. 2, 2019, entitled, "A BAR HANGER ASSEMBLY WITH MATING TELESCOPING BARS" (hereinafter the '220 application). The contents of each of the aforementioned applications is incorporated by reference herein in its entirety.

Similar to the crossmember 1120*a*, the bar hanger 1110 is formed as a single part. In some implementations, the bar hanger 1110 may be formed from various metals including, but not limited to aluminum, aluminum alloys, and various steel alloys (e.g., galvanized steel, stainless steel). The bar hanger 1110 may be fabricated using various manufacturing methods including, but not limited to various sheet metal processes (e.g., bending, cutting, stamping), extrusion, molding, and casting.

FIGS. 4A-4E show several views of the bar hanger holder 1200*a* in implementations where a gasket assembly 1240 is not included. As shown, the bar hanger holder 1200*a* may include a housing bracket 1210*a* and a hanger bracket 1230*a* coupled to the housing bracket 1210*a* via one or more rivets 1202. The housing bracket 1210*a* may provide an interface to couple the bar hanger holder 1200*a* to the housing 1300*a*. For example, the housing bracket 1210*a* may include a rod 1218 that is inserted through the slot 1312 of the housing 1300*a*. The rod 1218 and, by extension, the bar hanger holder 1200*a* may be slidably adjustable along the slot 1312. The bar hanger holder 1200*a* may further include a locking nut 1204*a* that engages the rod 1218 from within the cavity 1302 of the housing 1300*a* to lock the position of the housing 1300*a* with respect to the bar hanger holder 1200*a* when sufficiently tightened.

The hanger bracket 1230*a* may provide an interface to couple the bar hanger holder 1200*a* to the bar hangers 1110. For example, the hanger bracket 1230*a* and the housing bracket 1210*a* may define a passageway 1206 for one or a pair of bar hangers 1110 (i.e., the bar hangers 1110-1 and 1110-4 or the bar hangers 1110-2 and 1110-3) to pass through. As described above, the bar hanger holder 1200*a* may include a fastener 1030 to lock the position of the bar hangers 1110 with respect to the bar hanger holder 1200*a* when sufficiently tightened. Specifically, the hanger bracket 1230*a* may include a fastener opening 1238 to receive the fastener 1030. The fastener opening 1238 may be positioned to allow the fastener 1030 to directly press the bar hangers 1110 disposed within the passageway 1206.

Figure 5A:
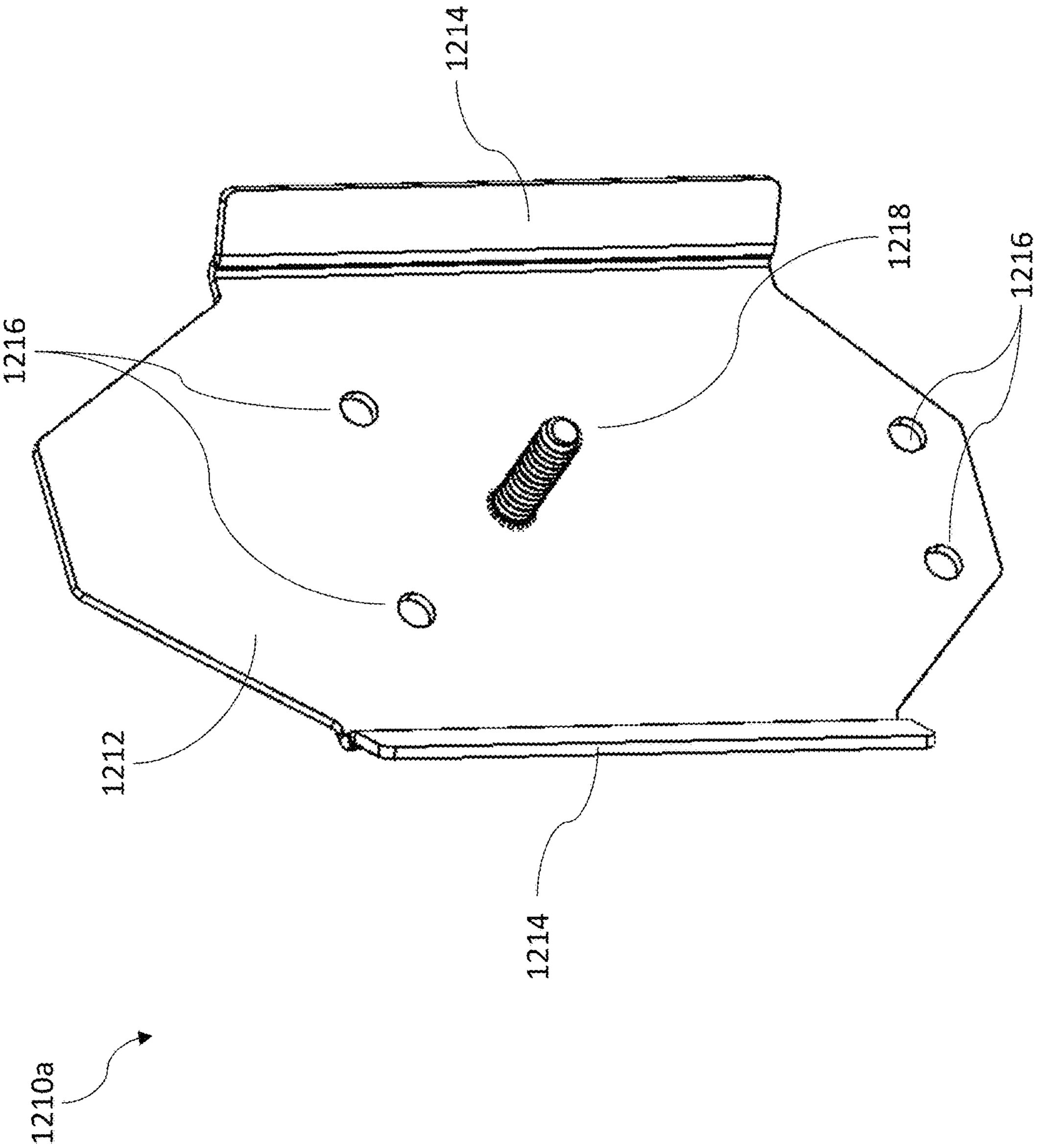
FIG. 5A shows a top, rear, right perspective view of the housing bracket in the bar hanger holder of FIG. 4A.
Figure 5B:
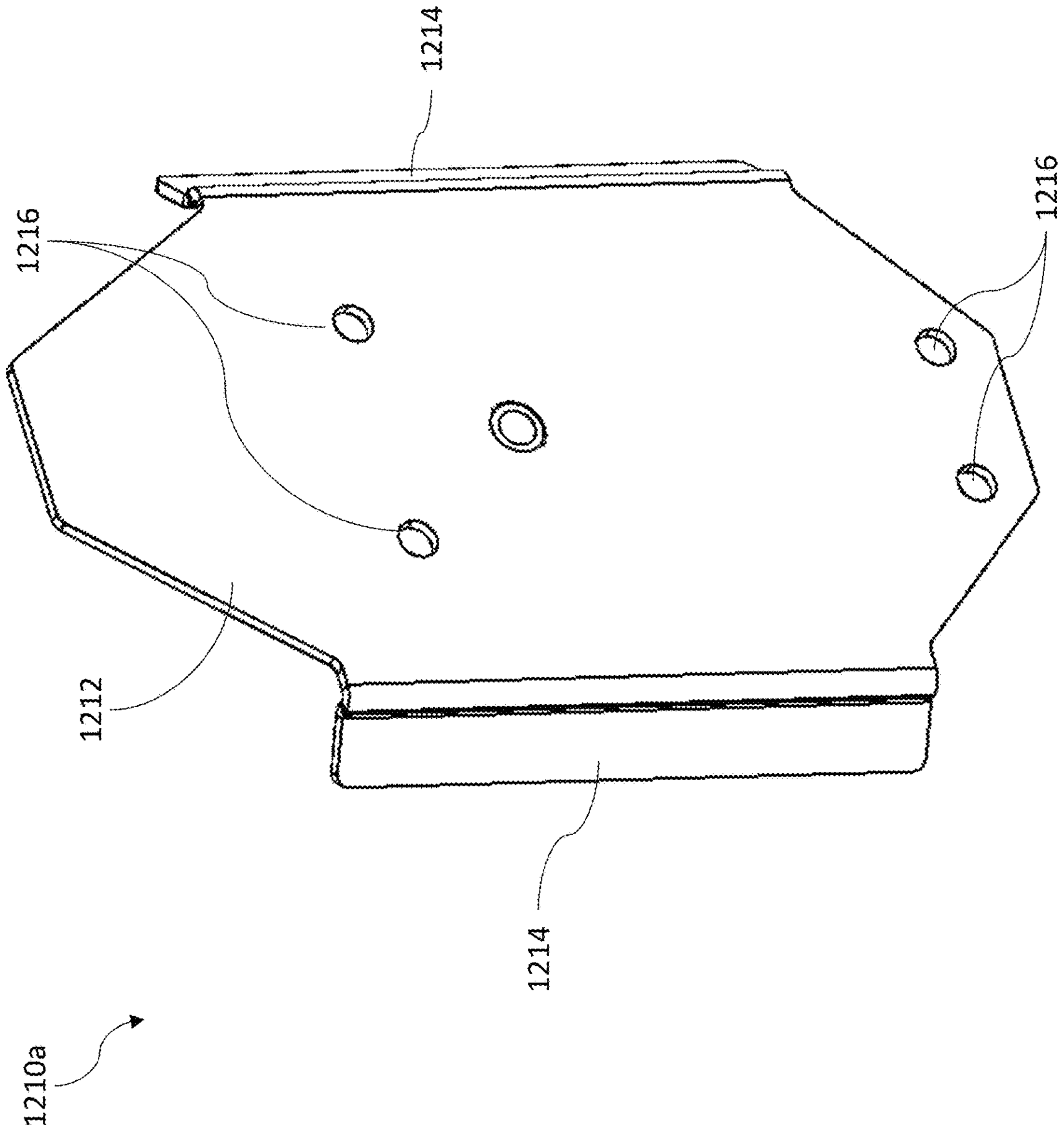
FIG. 5B shows a top, front, left perspective view of the housing bracket of FIG. 5A.

FIGS. 5A and 5B provide several views of the housing bracket 1210*a*. As shown, the housing bracket 1210*a* may include a base 1212 (also referred to herein as a "base portion 1212"). The base 1212 may be substantially flat in order to provide a surface that abuts bases 1231 and 1232 of the hanger bracket 1230*a*. The rod 1218 may protrude from the base 1212. In some implementations, the housing bracket 1210*a* may further include flanges 1214 that extend from opposing sides of the base 1212 to clasp the sidewall 1310 of the housing 1300*a*. The flanges 1214 may be oriented at an angle with respect to the base 1212 that corresponds to the cross-sectional profile of the housing 1300*a* (e.g., the octagonal shape of the housing 1300*a*). It should be appreciated, however, the flanges 1214 may be shaped and/or dimensioned to accommodate different-shaped housings. For example, the flanges 1214 may be oriented parallel with one another to abut the side of a square housing. In another example, the flanges 1214 may be curved in shape to contact a housing with a curved sidewall.

In some implementations, the flanges 1214 may be shaped such that the base 1212 is offset from the sidewall 1310 of the housing 1300*a* in order provide sufficient clearance for the rivets 1202. In some implementations, the offset may be tailored to accommodate smaller-sized housings supported by the bar hanger assembly 1100*a*. The housing bracket 1210*a* may further include openings 1216 that align with corresponding openings 1236 on the hanger bracket 1230*a* to facilitate attachment to the hanger bracket 1230*a* via the rivets 1202.

Figure 6A:
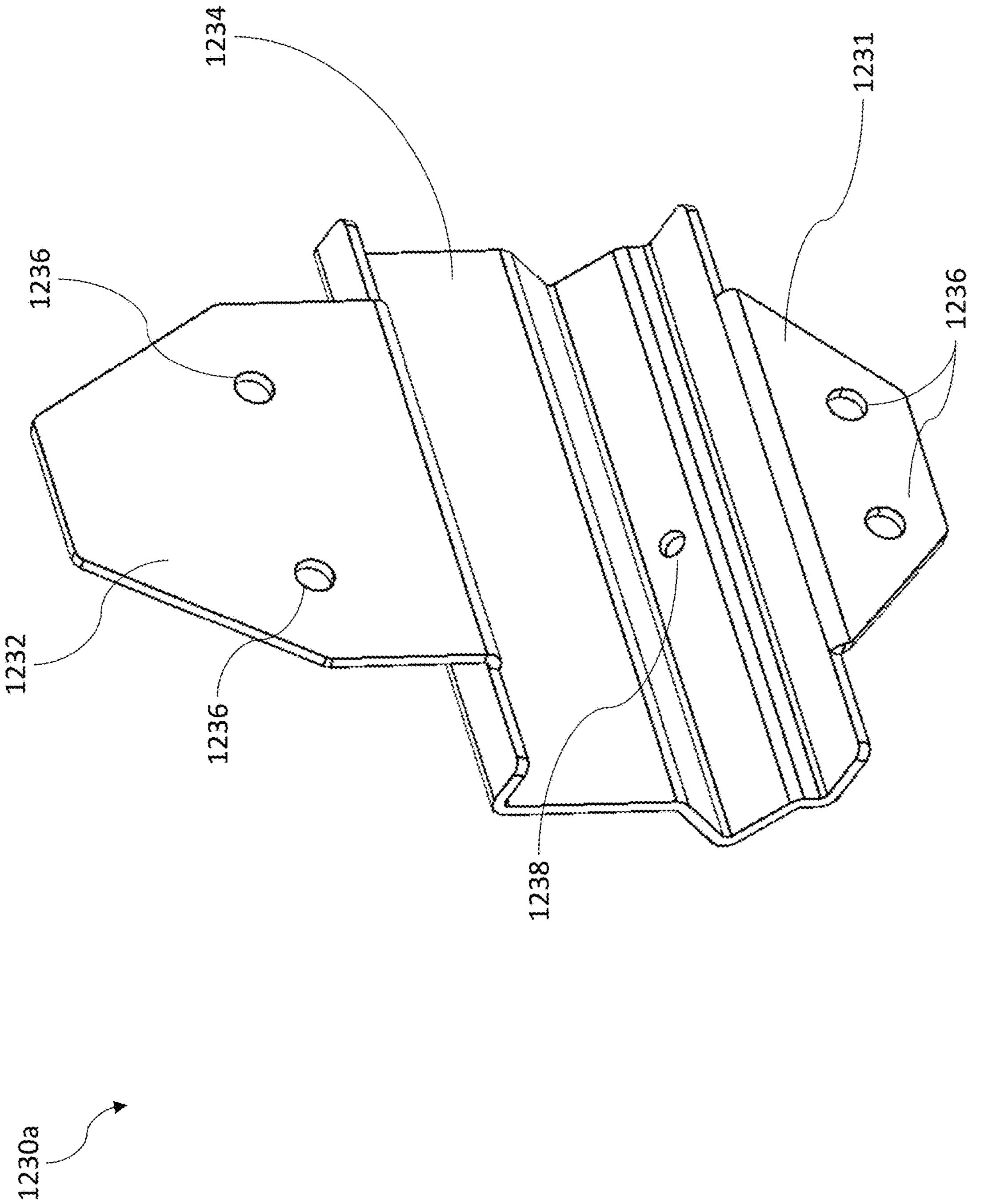
FIG. 6A shows a top, rear, right perspective view of the hanger bracket in the bar hanger holder of FIG. 4A.
Figure 6B:
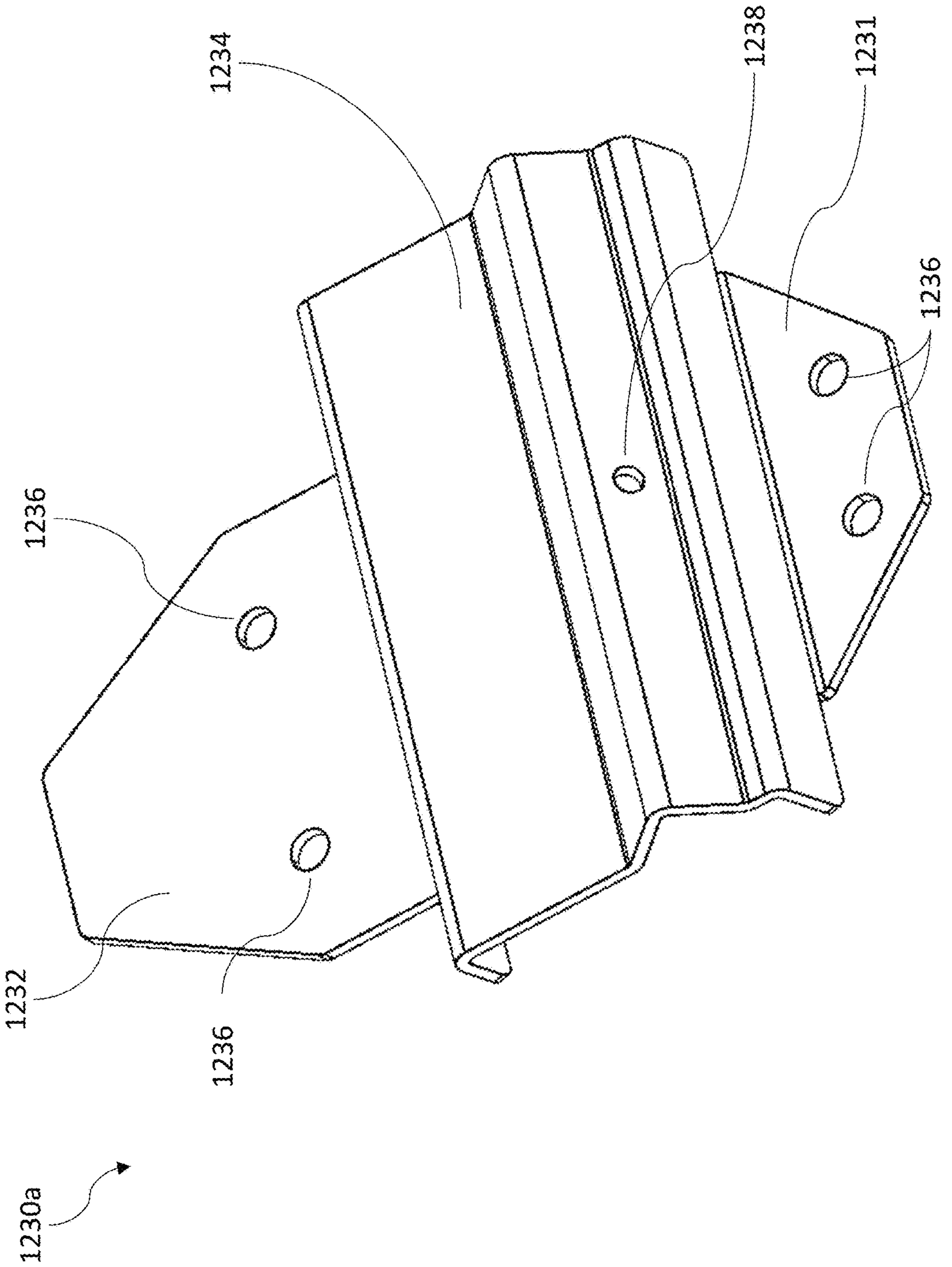
FIG. 6B shows a bottom, front, left perspective view of the hanger bracket of FIG. 6A.

FIGS. 6A and 6B provide several views of the hanger bracket 1230*a*. As shown, the hanger bracket 1230*a* may include bases 1231 and 1232 (also referred to herein as a "base portion 1231" and a "base portion 1232"). The bases 1231 and 1232 may each be substantially flat and coplanar in order to provide respective surfaces that abut the base 1212 of the housing bracket 1210*a*. The bases 1231 and 1232 may each include openings 1236 that align with the openings 1216 of the housing bracket 1210*a*. The hanger bracket 1230*a* may further include a rail section 1234 (also referred to herein as a "rail portion 1234") formed between the bases 1231 and 1232. The hanger bracket 1230*a* may also include the opening 1238 disposed on the rail 1234 to receive and guide the fastener 1030 as described above.

The shape and/or dimensions of the rail section 1234 may be tailored based on the shape and/or dimensions of the bar hanger 1110. For example, FIG. 1J shows the cross-sectional shape of the rail section 1234 may abut the top, the bottom, and the sides of the bar hangers 1110-1 and 1110-4. In this manner, the hanger bracket 1230*a* may reduce or, in some instances, mitigate lateral play between the bar hangers 1110-1 and 1110-4 and the bar hanger holder 1200*a*. In some implementations, the hanger bracket 1230*a* may be dimensioned to impart a compressive force onto the bar hangers 1110 in order to further reduce lateral play and/or to provide a holding force (e.g., a frictional force) that holds the bar hanger holder 1200*a* at a desired position with respect to the bar hangers 1110. In some implementations, the bar hanger holder 1200*a* may also support each bar hanger 1110 in each pair of bar hangers 1110 independently. For example, if the housing 1300*a* is positioned near the crossmember 1120*a* in the crossmember assembly 1102*a*-1 and the bar hangers 1110-1 and 1110-4 are fully extended, the bar hanger 1110-1 may pass through the passageway 1206 while the bar hanger 1110-4 may only be supported by the bar hanger 1110-1. Examples of bar hanger holders that reduce lateral play, impart a holding force with the bar hangers, and/or independently support each bar hanger 1110 in a pair of bar hangers 1110 may also be found in the '365 application and the '220 application.

Similar to the crossmember 1120*a*, the various components of the bar hanger holder 1200*a* may be formed from various metals including, but not limited to aluminum, aluminum alloys, and various steel alloys (e.g., galvanized steel, stainless steel). The components of the bar hanger holder 1200*a* may be fabricated using various manufacturing methods including, but not limited to various sheet metal processes (e.g., bending, cutting, stamping), extrusion, molding, and casting.

As described above, the housing 1300*a* may include a sidewall 1310 and a cover 1320 that defines a cavity 1302 to contain one or more components (not shown) of a lighting system and/or an electrical system including, but not limited to a light source, a driver, a heat sink, a trim, a cover plate and one or more electrical wires/cables. In some implementations, the housing 1300*a* may include one or more knockouts 1330, which may be removed to provide an opening for a wire or a cable to be routed into or out of the cavity 1302. Additionally, the housing 1300*a* may include one or more Romex feedthrough tabs 1332, which may be removed or bent without removal to similarly form an opening for the wire or cable to pass into the cavity 1302. For example, electrical wires/cables from an electrical power supply in a building, another lighting/electrical system, or a junction box may be fed into the housing 1300*a* to supply electrical power for the various components disposed therein. In some implementations, the cavity 1302 may be sufficiently large to contain one or more wires and one or more wire splices. The sidewall 1310 may further define an opening 1314 that provides access into the cavity 1302 (e.g., a user may access the wire splice via the opening 1314). In implementations where the housing 1300*a* contains a light source, the light emitted by the light source may pass through the opening 1314 to illuminate an environment.

The housing may have various cross-sectional shapes including, but not limited to a square, an octagon (see FIGS. 1A-1H), a polygon, a circle, an ellipse, or any combinations of the foregoing. The housing may have a width ($w_h$) that ranges between about 3 inches to about 10 inches. The housing may also have a depth ($d_h$) that ranges between about 2.5 inches to about 8 inches. In FIGS. 1A-1J, the housing 1300*a* depicted may have depth of about 4 inches corresponding to a deep housing. The housing 1300*a* may be formed from various metals and polymers including, but not limited to steel, aluminum, polyvinyl chloride (PVC), acrylonitrile butadiene styrene (ABS), polycarbonate (PC), polyurethane (PU), polyethylene, polyethylene terephthalate, polypropylene, and polystyrene.

The housing 1300*a* may also be configured to satisfy one or more safety standards including, but not limited to fire resistance, sound attenuation, air tightness, concrete tightness, structural rigidity, and water resistance. For example, the housing 1300*a* may be qualified as a luminaire fixture and/or a junction box based on the specifications set forth by the NEC and/or the Underwriter's Laboratory (UL). For instance, the housing 1300*a* may be qualified as a junction box if the housing 1300*a* satisfies UL514A or UL514C, which is the UL standard for metallic and nonmetallic outlet boxes, flush-device boxes, and covers, respectively. The housing 1300*a* may be qualified as a luminaire fixture if the housing 1300*a* satisfies UL1598, which is the UL standard for luminaires.

The housing 1300*a* may generally be fire-rated or non-fire-rated depending on the material used to form the housing 1300*a* and the gage or thickness of the housing 1300*a*. In terms of safety standards, the housing 1300*a* may be fire-rated if the housing 1300*a* satisfies UL263, which is the UL standard for fire tests of building construction and materials, or the standards set forth by the American Society for Testing and Materials (ASTM) and/or the National Fire Protection Association (NFPA). For instance, the housing 1300*a* may have an hourly rating (e.g., 1 hour, 2 hour) and a location rating (e.g., floor, wall, ceiling) based on where the housing assembly 1000*a* is installed in the environment.

As described above, the housing 1300*a* may also incorporate structural features to improve the structural rigidity of the housing 1300*a* (e.g., the thickness of the sidewall 1310 or cover 1320, the placement of a yoke in close proximity to the sidewall 1310 and the bar hanger holders 1200*a*1 and 1200*a*-2). The design of such features may be based, in part, on structural rigidity specifications set forth by the NEC and/or the UL (e.g., UL 1598, UL 514A, UL 514C) for a junction box and a luminaire fixture. The housing 1300*a* may also be insulation contact (IC) rated, which allows insulation in a wall or a ceiling to physically contact the housing 1100*a*. An IC rated housing 1300*a* may enable the housing assembly 1000*a* to be installed without use of a separate enclosure unlike non-IC rated recessed lighting systems. The housing 1300*a* may also meet air tightness standards (e.g., ASTM E283 certification) to increase the energy efficiency of a building by reducing air leaks between an interior environment and an exterior environment that may otherwise compromise the thermal insulation of the building. The housing 1300*a* may also meet sound ratings according to the specifications set forth by the Sound Transmission Class (STC) and/or the Impact Insulation Class (IIC).

It should be appreciated the safety standards cited herein are exemplary. The housing 1300*a* may generally satisfy similar and/or equivalent safety standards from other organizations and/or associations, which may vary by municipality, county, state, province, or country. Furthermore, the housing 1300*a* may satisfy the specifications set forth by safety standards as they are modified and/or updated over time.

In some implementations, the housing assembly 1000*a* may further provide an air-tight seal with the ceiling, wall, and/or floor. An airtight seal may be beneficial in terms of reducing air leakage through gaps formed between an opening in the ceiling, wall, or floor and the housing 1300*a*. In conventional housing assemblies, air leakage issues are common and often give rise to higher energy consumption and/or costs associated with cooling and/or heating the environment. Air leakage may also leave the ceiling, wall, or floor space susceptible to moisture accumulation and mold growth.

The air-tight seal may be formed in several ways. For example, a liquid sealant may be applied to the gaps between the housing 1300*a* and the ceiling, wall, or floor. Once sufficiently cured, the liquid sealant may substantially seal the gaps. Additionally, the housing 1300*a* itself may be a sufficiently sealed structure due, in part, to its construction. Thus, the combination of the housing 1300*a* and the application of the liquid sealant may form a barrier that substantially blocks or, in some instances, mitigates air leakage.

In another example, the housing assembly 1000*a* may include a mechanical component such as a gasket, an O-ring, or a flexible tape to substantially fill the gap. For example, FIGS. 1A-1G show the housing 1000*a* includes a gasket assembly 1240 coupled to the bar hanger holders 1200*a* and surrounding the housing 1300*a*. In some implementations, the gasket assembly 1240 may be positioned along the housing 1300*a* to ensure the ceiling, wall, or floor panel is disposed at a desired distance from the support structure. For example, FIG. 1E shows the gasket assembly 1240 may be substantially aligned to the flanges 1126-1-1126-3 of the crossmember 1120*a*. Thus, the ceiling, wall, or floor panel may abut the crossmember 1120*a* and/or the support structures to which the crossmember 1120*a* is mounted to when installed.

FIGS. 7A-7G show several views of the gasket assembly 1240. As shown, the gasket assembly 1240 may include a gasket plate 1250 and gaskets 1242-1 and 1242-2 mounted to a surface of the gasket plate 1250. The gasket plate 1250 may define an opening 1241 through which the housing 1300*a* is inserted. In some implementations, the gasket assembly 1240 may not be directly coupled to the housing 1300*a*, thus the housing 1300*a* may remain slidably adjustable with respect to the gasket plate 1240 via the bar hanger holders 1200*a*.

The gasket plate 1250 may include a frame 1252 that defines the opening 1241. The opening 1241 may be shaped to substantially conform with the cross-sectional shape of the housing 1300*a*. For example, the gasket plate 1250 shown in FIGS. 7A-7G may have an octagonal-shaped opening 1241 corresponding to the octagonal-shaped housing 1300*a*. The exterior shape of the gasket plate 1250 may be the same as the shape of the opening 1241 or may be different. In general, the gasket plate 1250 may have various shapes including, but not limited to a circle, an ellipse, a polygon (e.g., a square, an octagon), and any combination of the foregoing.

Figure 7A:
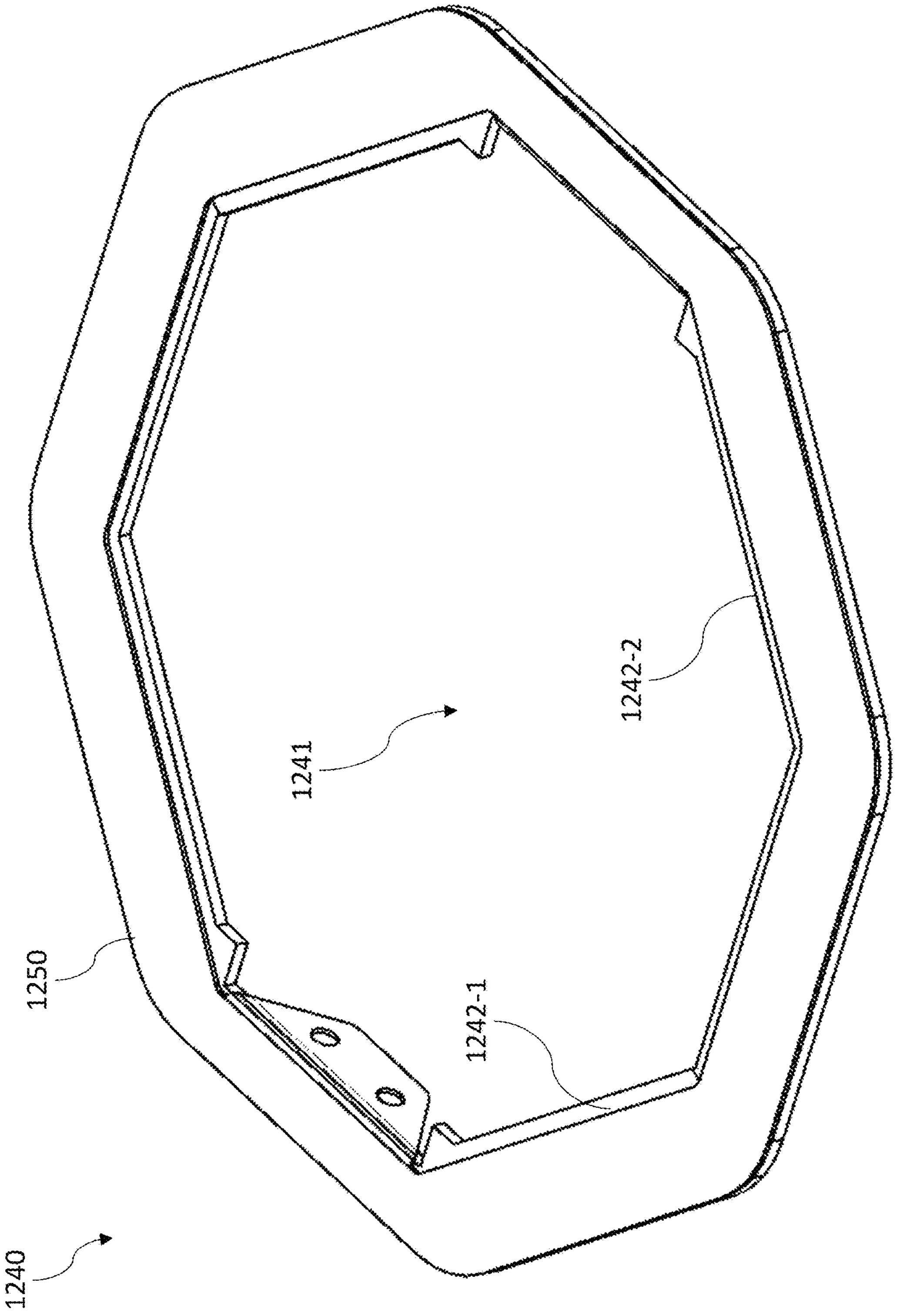
FIG. 7A shows a top perspective view of the gasket assembly in the housing assembly of FIG. 1A.
Figure 7B:
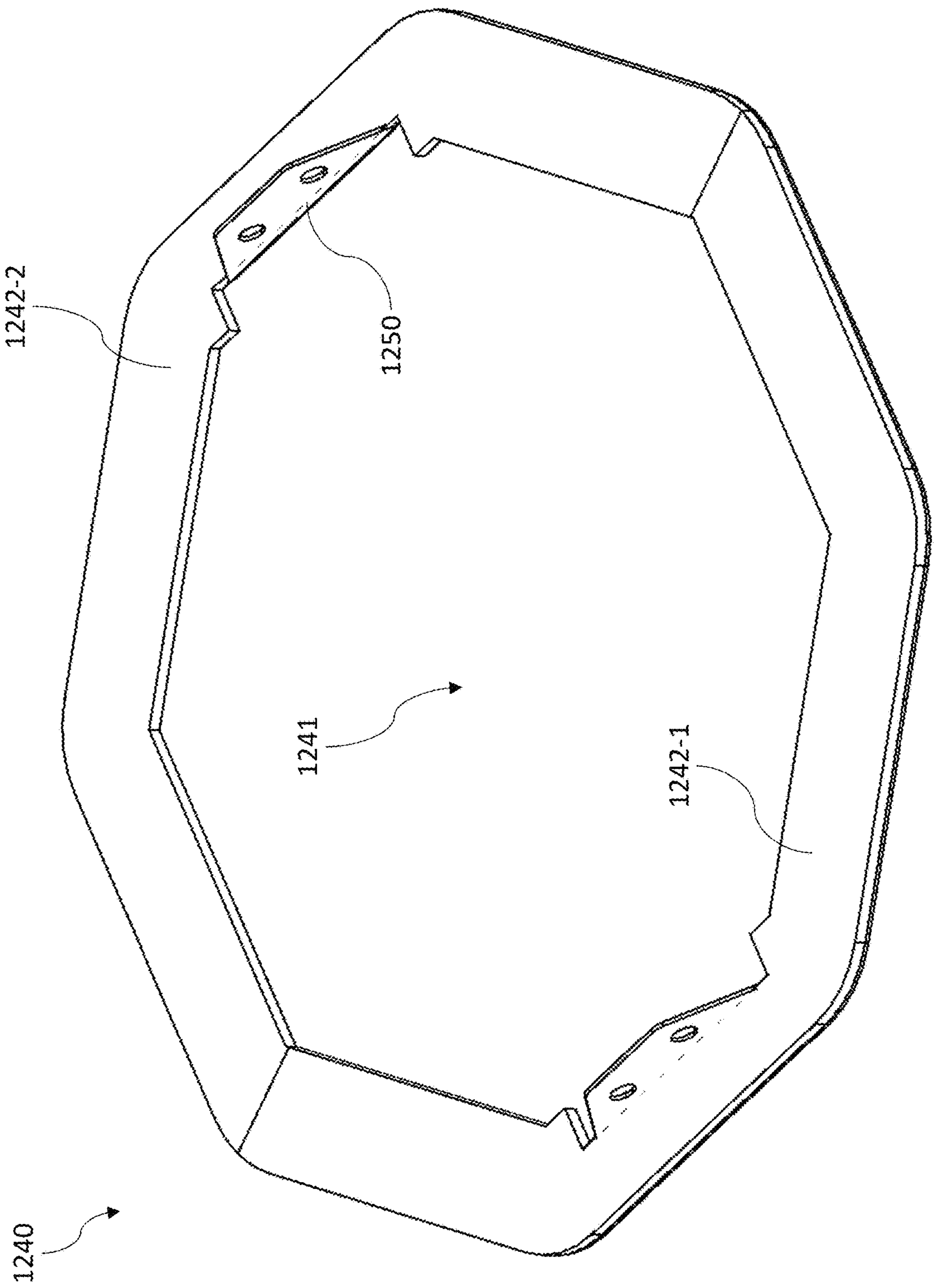
FIG. 7B shows a bottom perspective view of the gasket assembly of FIG. 7A.
Figure 7C:
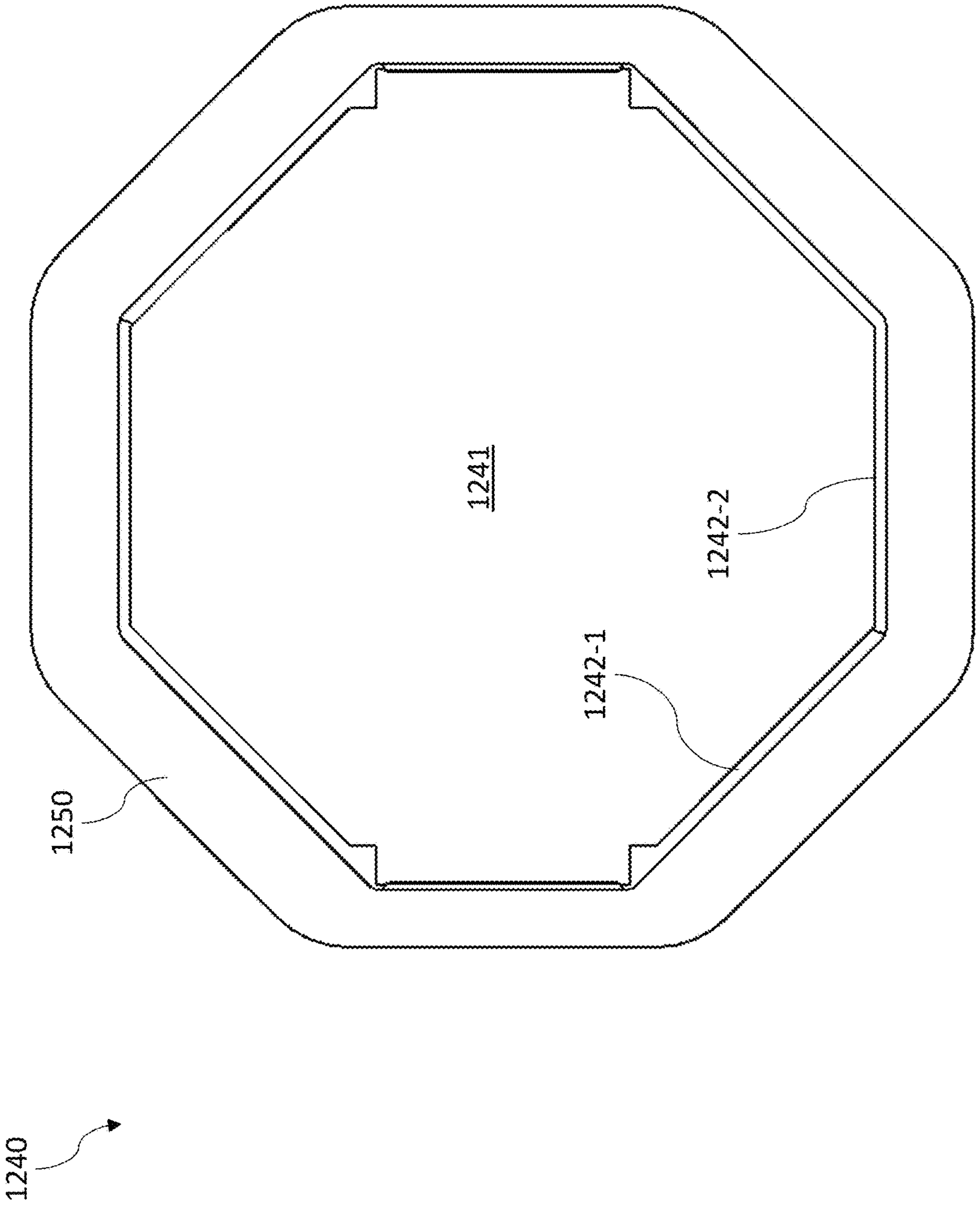
FIG. 7C shows a top view of the gasket assembly of FIG. 7A.
Figure 7D:
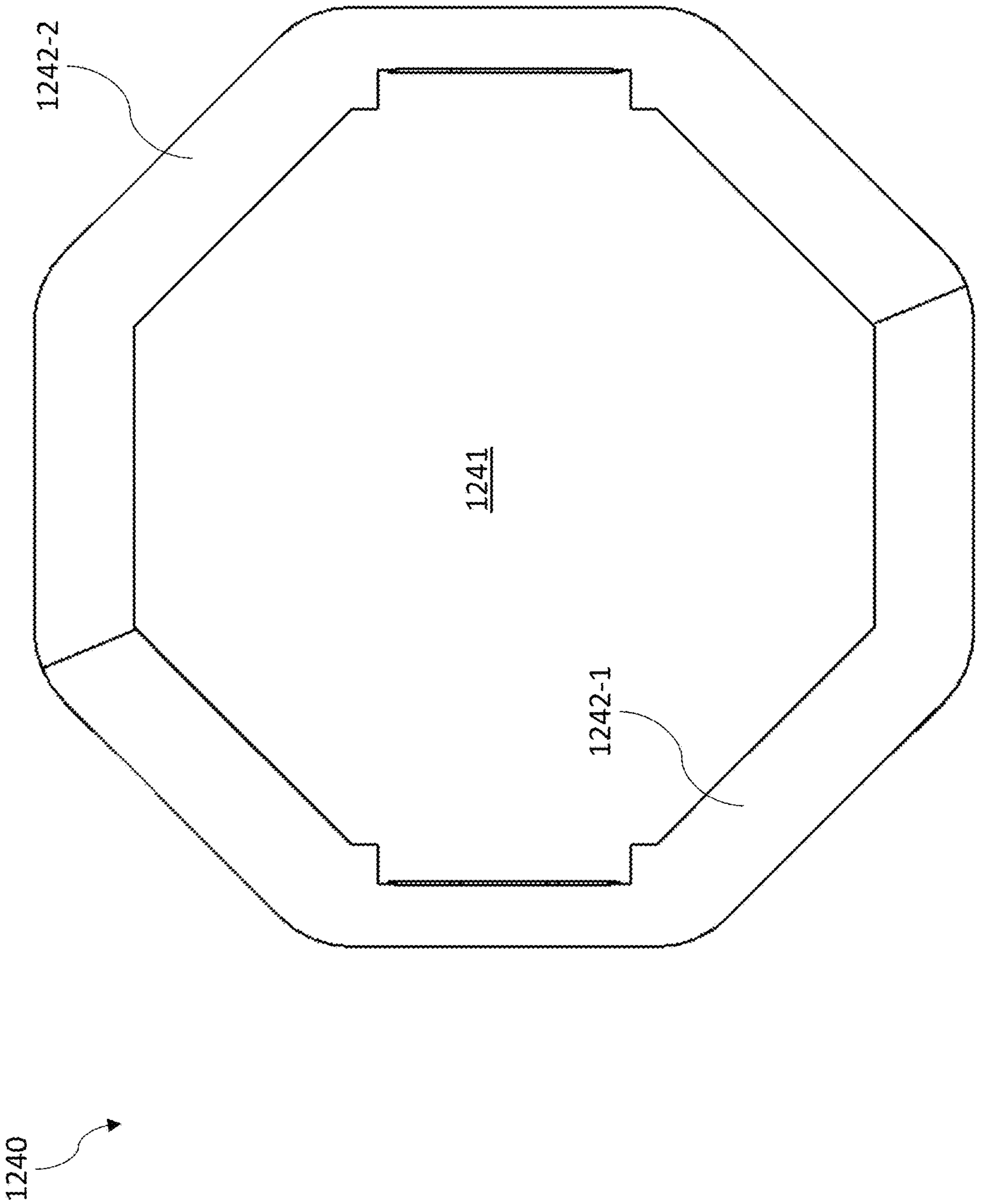
FIG. 7D shows a bottom view of the gasket assembly of FIG. 7A.
Figure 7E:
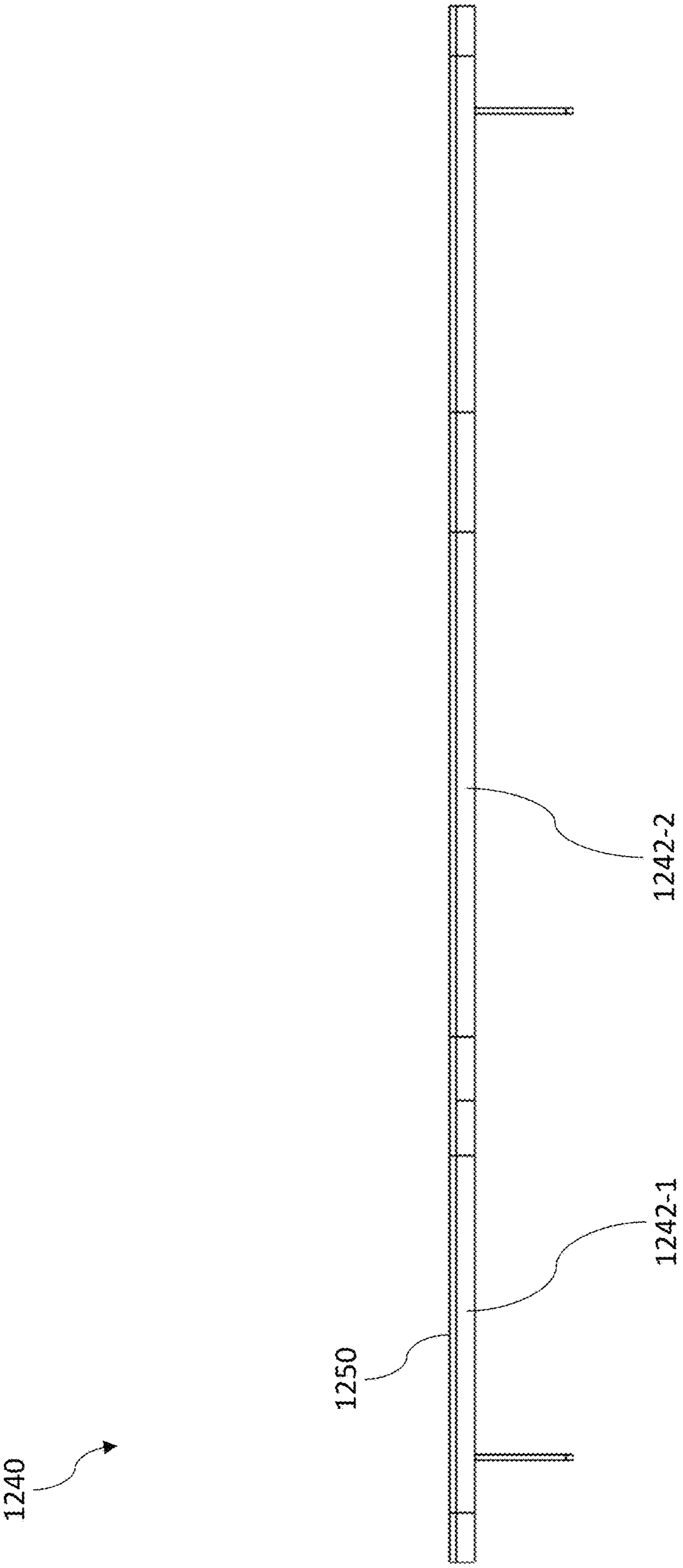
FIG. 7E shows a front view of the gasket assembly of FIG. 7A.
Figure 7F:
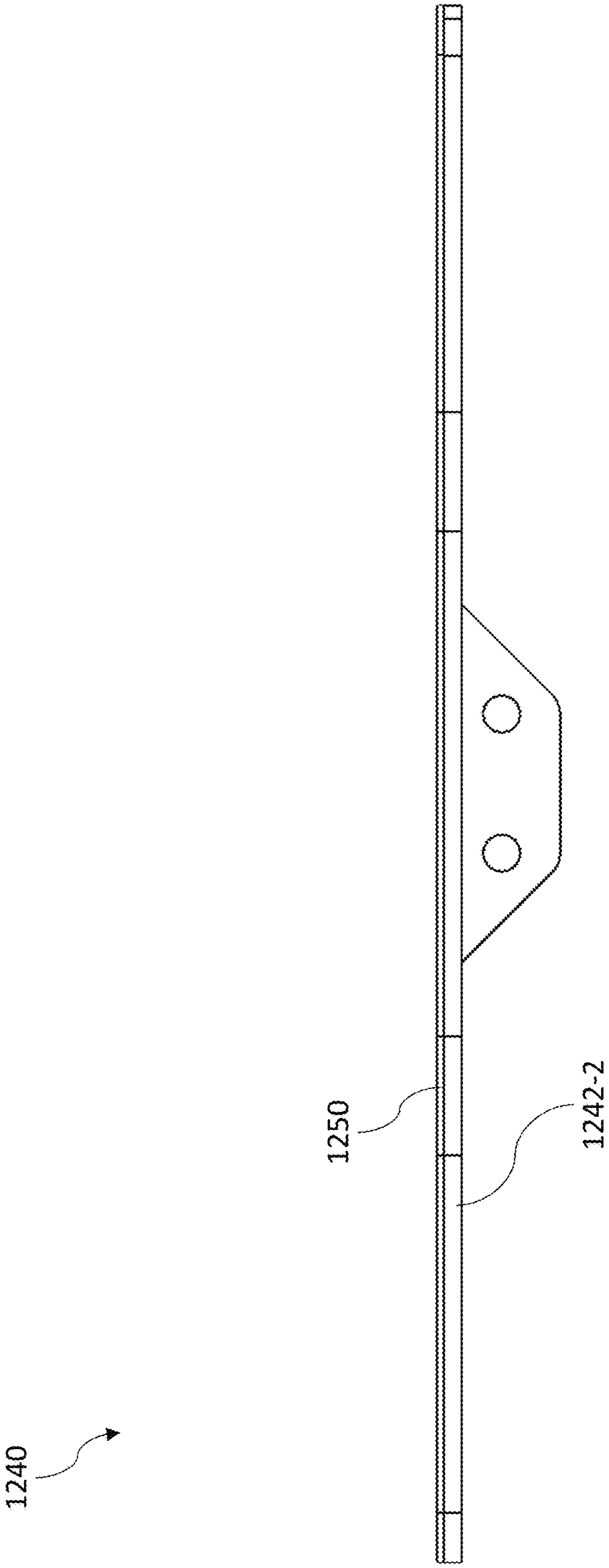
FIG. 7F shows a right-side view of the gasket assembly of FIG. 7A.
Figure 7G:
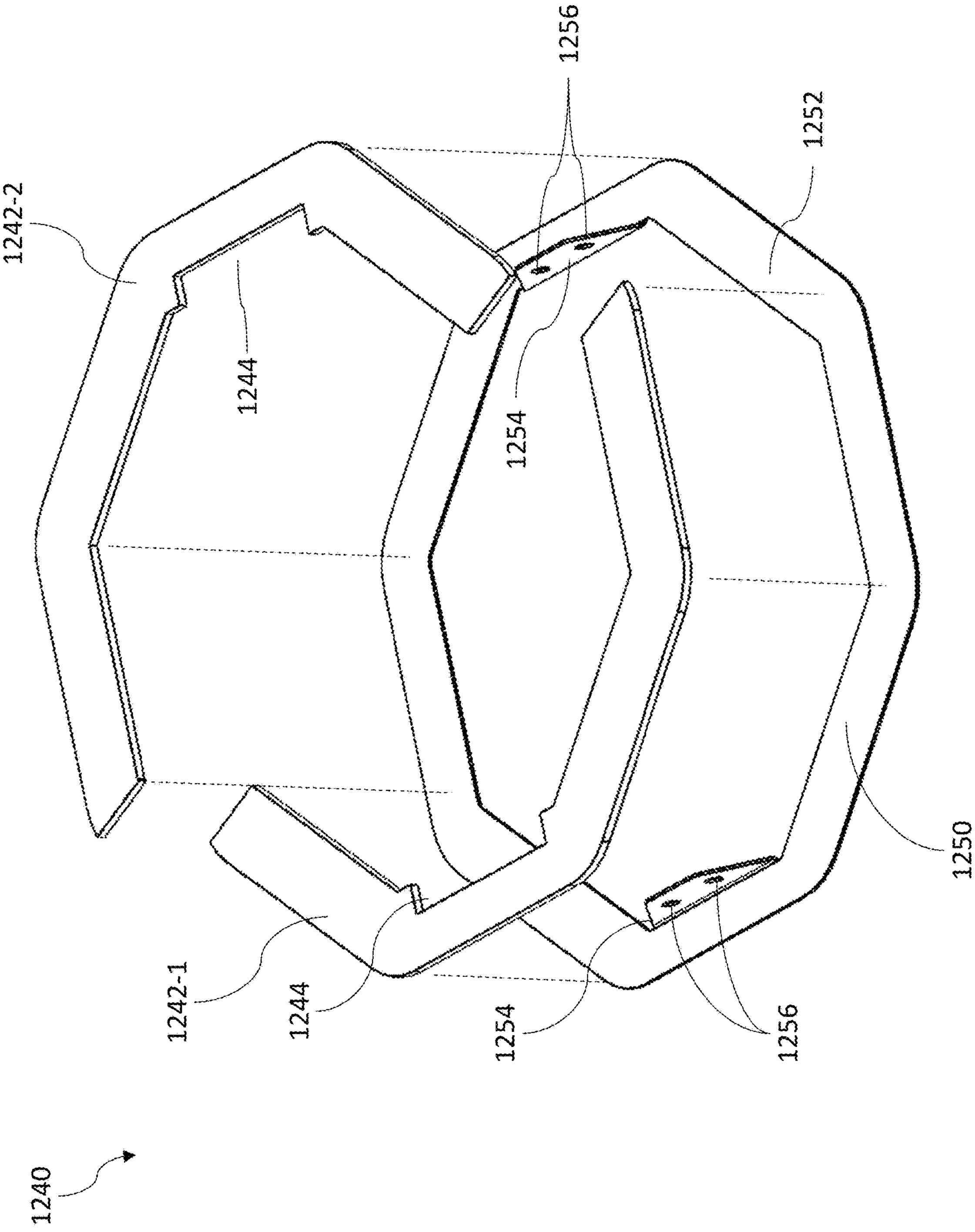
FIG. 7G shows an exploded view of the gasket assembly of FIG. 7A.

In some implementations, the gasket plate 1250 may further include one or more flanges 1254 to mount the gasket plate 1250 to respective bar hanger holders 1200*a*. For example, the frame 1252 may include a pair of flanges 1254 disposed diametrically opposite to align with the pair of bar hanger holders 1200*a* in the housing assembly 1000*a*. Each flange 1254 may further include one or more mounting features to couple the gasket assembly 1240 to the bar hanger holders 1200 or the housing 1300*a*. Various mounting mechanisms may be included to couple the gasket assembly 1240 to the bar hanger holder 1200*a* including, but not limited to a screw fastener, a rivet, an adhesive, and a snap-fit connection. For example, FIG. 7G shows the flange 1254 may include opening(s) 1256 that align with the opening(s) 1216 and 1236 of the housing bracket 1210*a* and the hanger bracket 1230*a*, respectively, such that the rivet(s) 1202 may couple the bar hanger holder 1200*a* to the gasket assembly 1240.

The gasket assembly 1240 may further include one or more gaskets. For example, a single gasket may be coupled to the gasket plate 1250 to form a seal along the periphery of the sidewall 1310 of the housing 1300*a*. In another example, FIG. 7G shows the gasket assembly 1240 may include a pair of gaskets 1242-1 and 1242-2, which together substantially cover a bottom surface of the gasket plate 1250. The gaskets 1242-1 and 1242-2 may be separately coupled to the gasket plate 1250 using, for example, a pressure-sensitive adhesive. The pair of gaskets 1242-1 and 1242-2 may be used instead of a single gasket in order to improve ease of assembly by providing a smaller gasket that is easier to align to the gasket plate 1250 during assembly and/or installation. As shown, the gaskets 1242-1 and 1242-2 may be shaped to substantially conform with the gasket plate 1250. For example, the gaskets 1242-1 and 1242-2 may each include a notch 1244 to provide clearance for the flanges 1254.

In some implementations, a force may be imparted to press the gaskets 1242-1 and 1242-2 against the interior surface of the ceiling, wall, or floor. For example, the vertical location of the housing assembly 1000*a* may be adjusted such that the gaskets 1242-1 and 1242-2 are positioned slighting below a plane where a ceiling panel is located. Thus, the ceiling panel should be pressed against the gaskets 1242-1 and 1242-2 when installing the ceiling panel onto the ceiling. The resultant compression force applied to the gaskets 1242-1 and 1242-2 may thus form a higher quality seal.

In some implementations, the quality of the seal formed by the housing assembly 1000*a* may be evaluated according to well-established standards. In some implementations, the housing assembly 1000*a* may be certified as air-tight even without the gasket assembly 1240. For example, the housing assembly 1000*a* may form an air-tight seal using a liquid sealant as described above. In some implementations, the housing assembly 1000*a* may include the gasket assembly 1240 to form a seal that satisfies the Title 24 requirement corresponding to the building energy efficiency standards established by the California Energy Commission.

The gasket plate 1250 may be formed from various materials including, but not limited to sheet metal. In some implementations, the gasket plate 1250 may be formed from the same material as the housing 1300*a*. The gaskets 1242-1 and 1242-2 may be formed from various types of polymers including, but not limited to polyethylene foam, silicone rubber, and neoprene rubber.

Figure 8C:
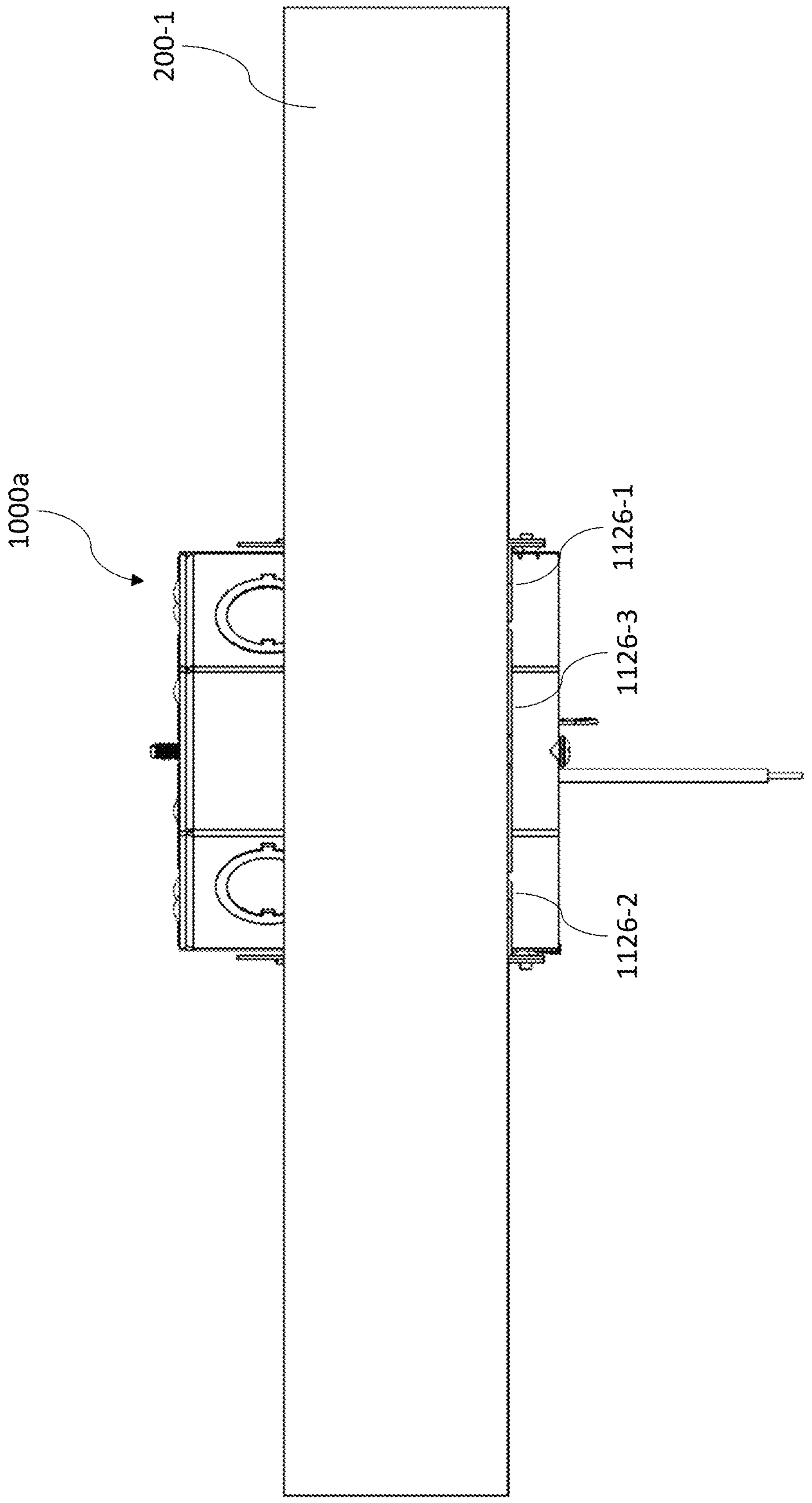
FIG. 8C shows a right-side view of the housing assembly of FIG. 8A.

As described above, the housing assembly 1000*a* and, in particular, the crossmember 1120*a* may provide several mounting features for various types of support structures. In the following, several examples of the housing assembly 1000*a* mounted to various support structures are shown. FIGS. 8A-8C show several views of the housing assembly 1000*a* installed onto wood joists 200-1 and 200-2. In some implementations, the wood joists 200-1 and 200-2 may be metal joists or wood/metal studs. As shown, the wall sections 1162 of the flanges 1128-1 and 1128-2, the wall section 1168 of the guide 1124, and the flanges 1126-1, 1126-2, and 1126-3 may abut respective sides of the wood joists 200-1 and 200-2. The crossmembers 1120*a* may be coupled to the wood joists 200-1 and 200-2 using one or more fasteners (e.g., the fastener 1020) inserted through one or more of the openings 1146 and 1138 of the crossmember 1120*a*. In some implementations, the use of the openings 1138 is optional. Furthermore, in some implementations, the flanges 1126-1, 1126-2, and 1126-3 may be removed prior to mounting the crossmember 1120*a* to the wood joists 200-1 and 200-2. In some implementations, the wood joist 200-1 and 200-2 may have pre-drilled openings (e.g., pilot holes) or may have no openings (e.g., the fastener 1020 forms an opening in the wood joists 200-1 and 200-2).

Figure 9A:
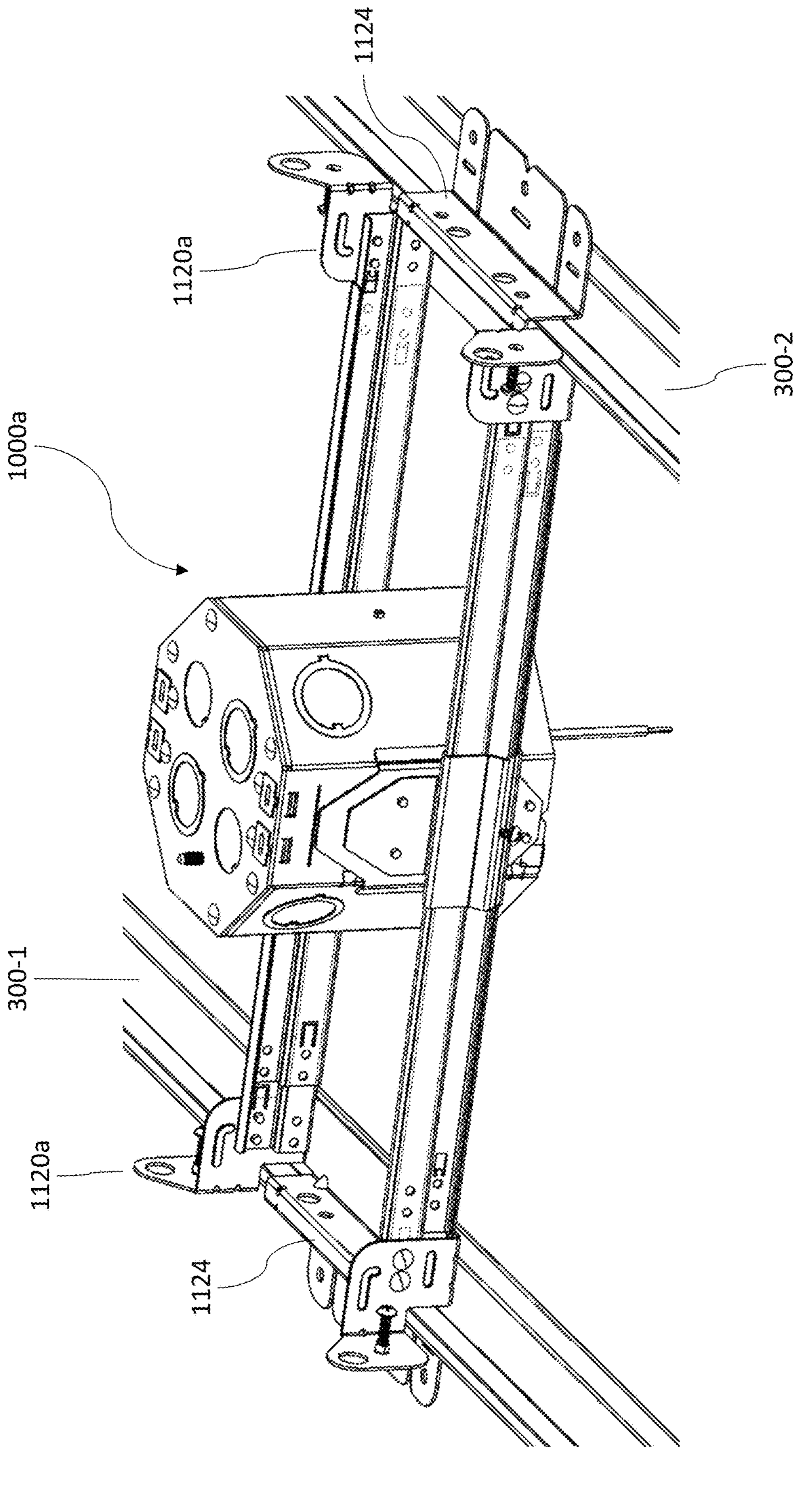
FIG. 9A shows a top, front, right perspective view of the housing assembly of FIG. 1A coupled to a pair of T-bars.
Figure 9B:
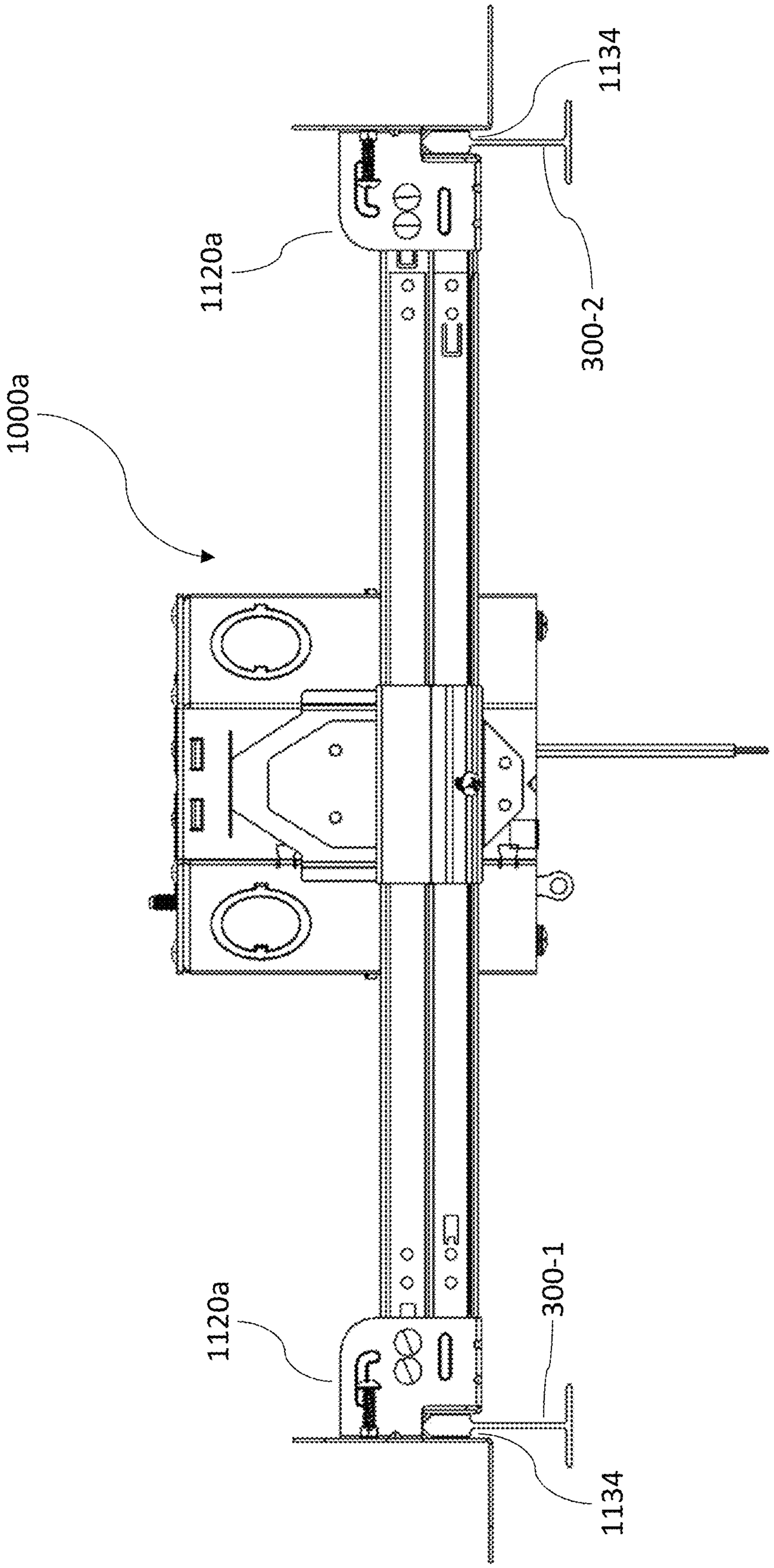
FIG. 9B shows a front view of the housing assembly of FIG. 9A.
Figure 9C:
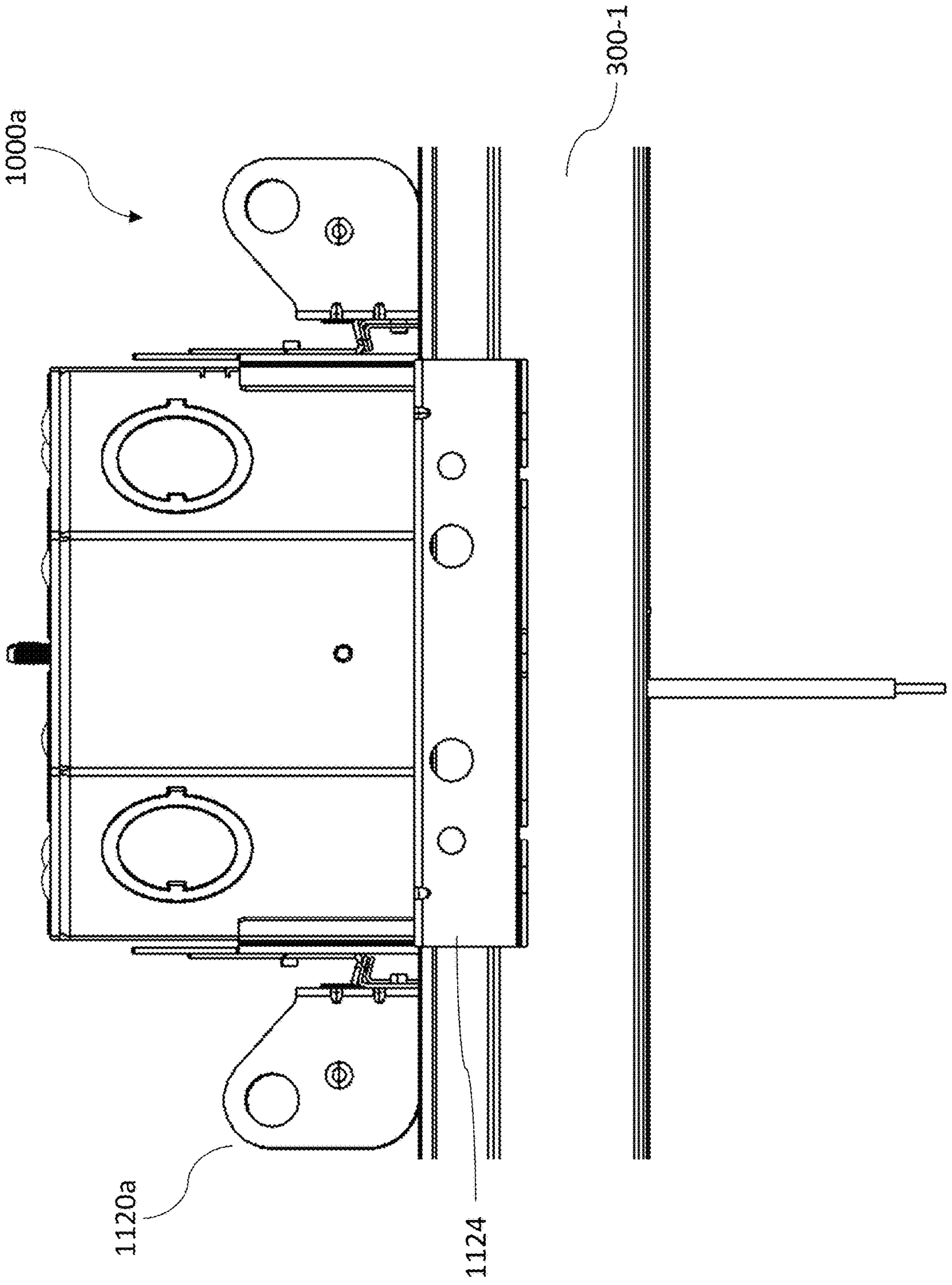
FIG. 9C shows a right-side view of the housing assembly of FIG. 9A.

FIGS. 9A-9C show several views of the housing assembly 1000*a* installed onto T-bars 300-1 and 300-2. As shown, the T-bars 300-1 and 300-2 may be inserted into the channels 1134 defined by the guides 1124. Specifically, the wall section 1166 may rest on top of the T-bars 300-1 and 300-2 while the wall sections 1164 and 1168 abut opposing sides of the T-bars 300-1 and 300-2. The crossmembers 1120*a* may be coupled to the T-bars 300-1 and 300-2 using one or more fasteners inserted through one or more of the openings 1130-1, 1130-2, 1132-1, and 1132-2. Similarly, the T-bars 300-1 and 300-2 may have pre-drilled openings or may have no openings (e.g., the fastener(s) form respective openings in the T-bars 300-1 and 300-2).

Figure 10A:
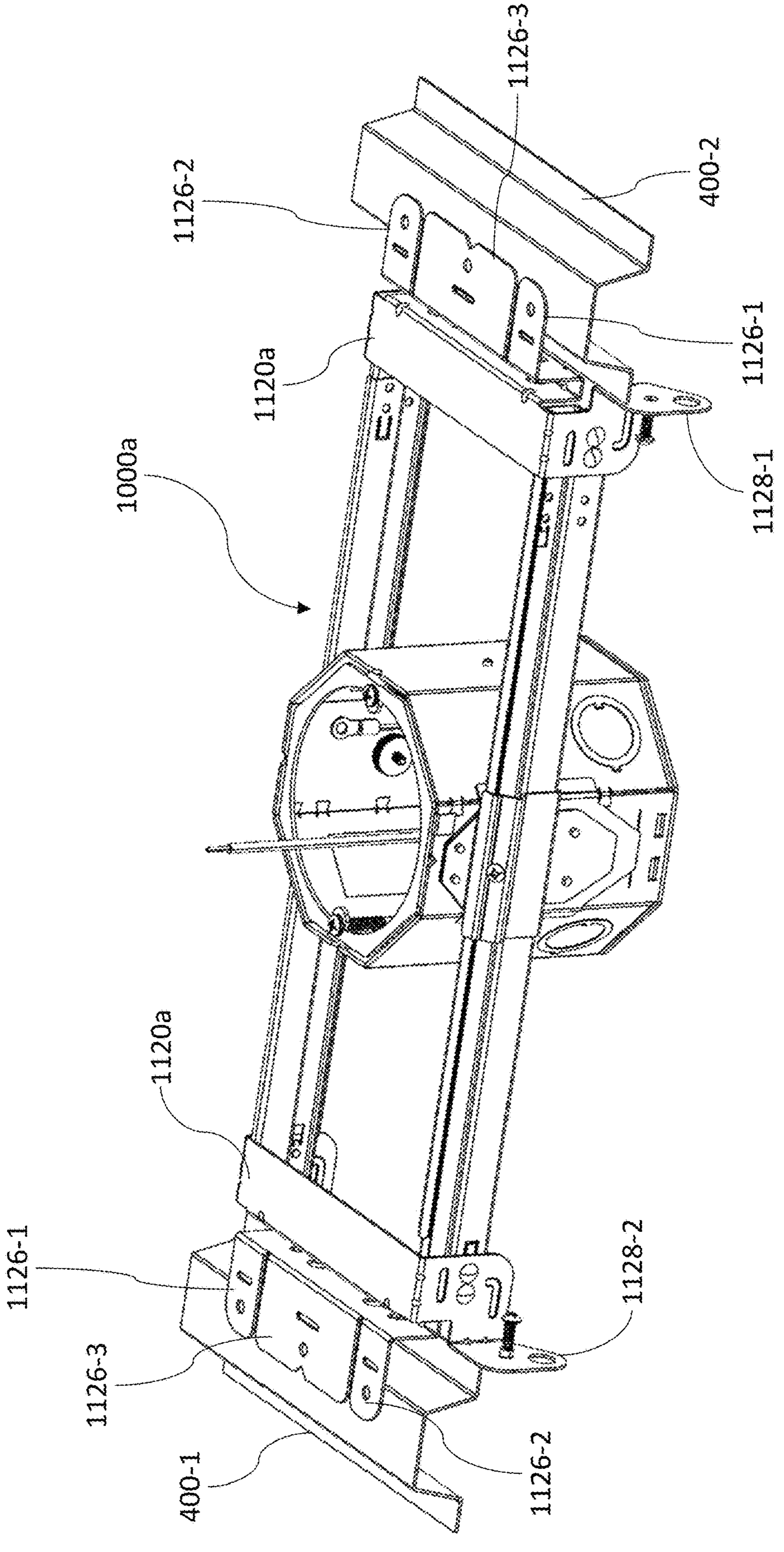
FIG. 10A shows a bottom, front, left perspective view of the housing assembly of FIG. 1A coupled to a pair of hat channels.
Figure 10B:
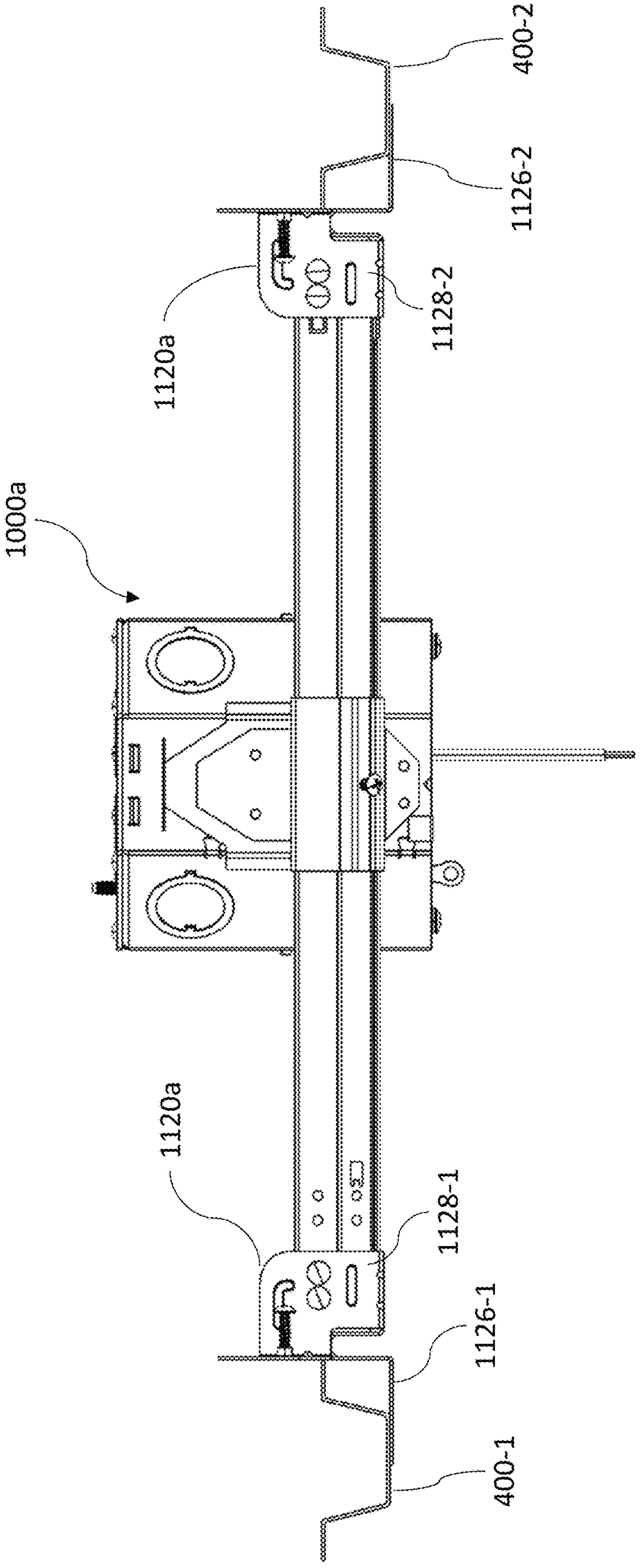
FIG. 10B shows a front view of the housing assembly of FIG. 10A.
Figure 10C:
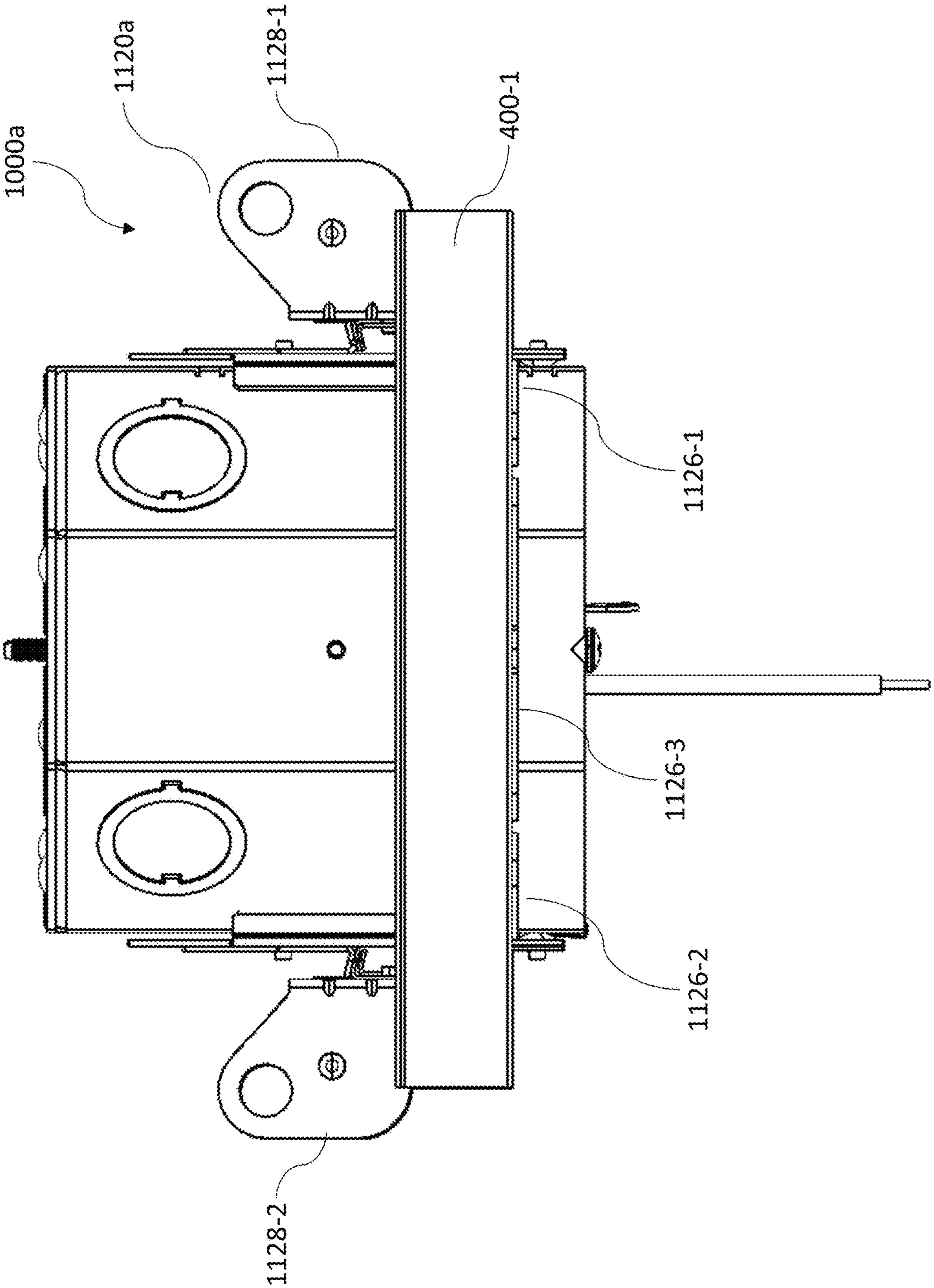
FIG. 10C shows a right-side view of the housing assembly of FIG. 10A.

FIGS. 10A-10C show several views of the housing assembly 1000*a* installed onto hat channels 400-1 and 400-2. As shown, the wall sections 1162 of the flanges 1128-1 and 1128-2, the wall section 1168 of the guide 1124, and the flanges 1126-1, 1126-2, and 1126-3 may abut the hat channels 400-1 and 400-2. In this case, one or more fasteners may be inserted through one or more of the openings 1138 in the flanges 1126-1, 1126-2, and 1126-3 to couple the crossmembers 1120*a* to the hat channel 400-1 and 400-2. Similarly, the hat channels 400-1 and 400-2 may have pre-drilled openings or may have no openings (e.g., the fastener(s) form respective openings in the hat channels 400-1 and 400-2).

As shown, the manner in which the crossmember 1120*a* attaches to a support structure may vary depending on the type of the support structure used. However, the overall approach for installing the housing assembly 1000*a* may remain substantially the same. For example, the housing assembly 1000*a* may be installed into an environment using the following steps: (1) adjusting the position and alignment of the crossmember assembly 1102*a*-1 until the desired mounting feature in the crossmember 1120*a* is in alignment and in physical contact with a first support structure, (2) coupling the crossmember 1120*a* to the first support structure using one or more fasteners (e.g., fastener 1020 for a wood joist), (3) adjusting the position and alignment of the crossmember assembly 1102*a*-2 until the desired mounting feature in the crossmember 1120*a* is in alignment and in physical contact with a second support structure, (4) coupling the crossmember 1120*a* to the second support structure using one or more fasteners (e.g., fastener 1020 for a wood joist), (5) adjusting the position of the housing 1300*a* (e.g. a horizontal position) with respect to the bar hanger assembly 1100*a* via one or more bar hanger holders 1200*a* (or a pan frame) until the housing 1300*a* is at a desired position, (6) locking the position of the housing 1300*a* to the bar hangers 1110 via the fastener 1030, (7) routing electrical wires and/or cables into the housing 1300*a*, (8) installing a panel for the ceiling, wall, or floor where the panel has an opening based on the cross-sectional shape of the housing 1300*a*, (9) adjusting the position of the housing 1300*a* relative to the panel (e.g., a vertical position) using the rod 1218 and the locking nut 1204*a* on the housing bracket 1210*a* and the slot 1312 on the housing 1300*a* until the edge 1313 (also referred to herein as the "end 1313") of the sidewall 1310 forming the opening 1314 is substantially flush or flush with the surface of the panel facing the environment (i.e., the surface that is opposite to the space in which the housing assembly 1000*a* is disposed), and (10) installing a light source module with a trim or a cover plate to cover the opening in the ceiling, wall, or floor panel. It should be appreciated one or more of the foregoing steps may be omitted or performed before or after another step provided safety regulations are met and the resultant installation is the same.

Figure 11:
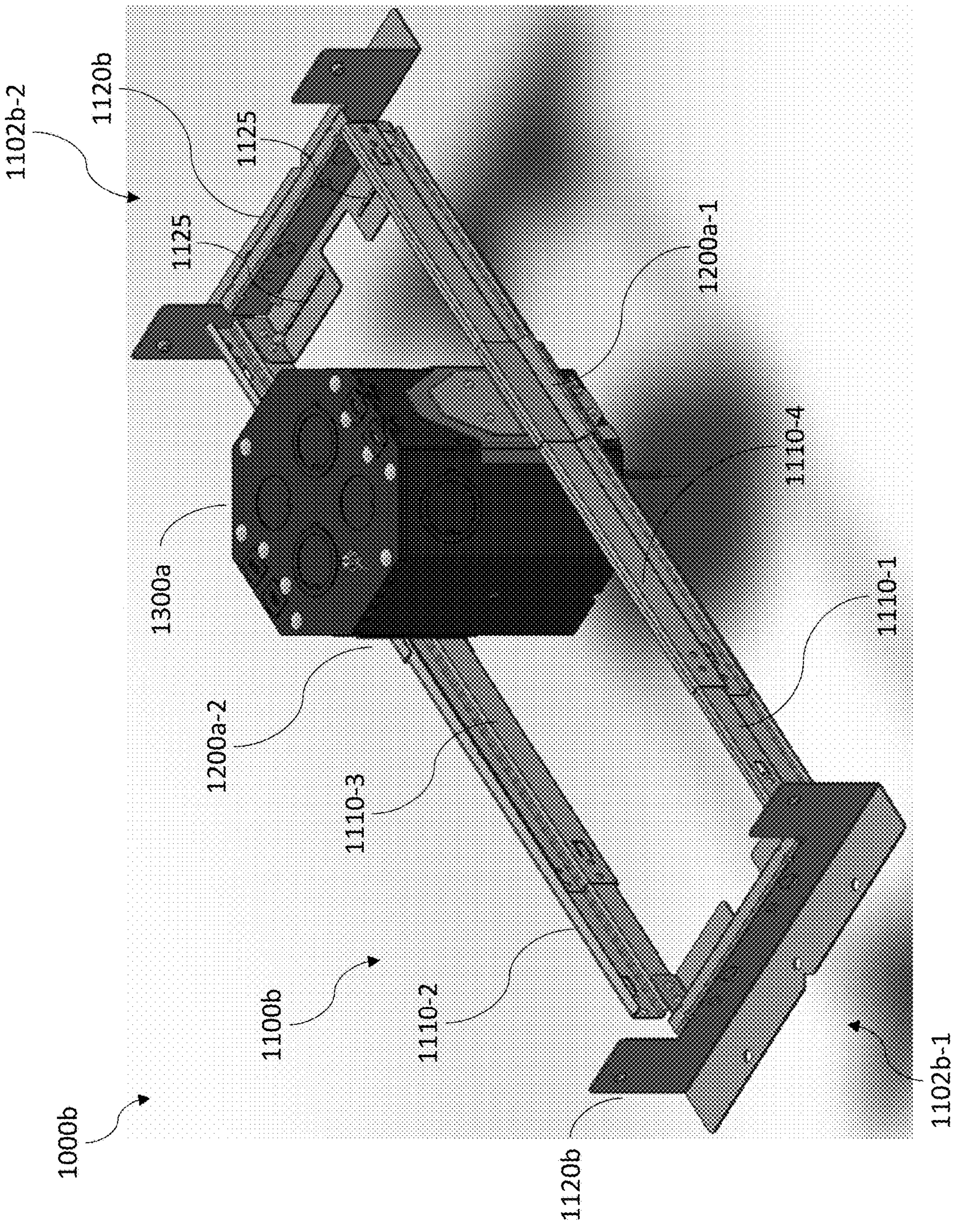
FIG. 11 shows a magnified view of the crossmember and the bar hangers in the housing assembly of FIG. 1G.

FIG. 11 shows another exemplary implementation of a housing assembly 1000*b* with a crossmember 1120*b*. The housing assembly 1000*b* may share several of the same components as the housing assembly 1000*a*. For example, the housing assembly 1000*b* may include the housing 1300*a* and the bar hanger holders 1200*a*. The bar hanger assembly 1100*b* and, in particular, the crossmember assemblies 1102*b*-1 and 1102*b*-2 may also include the bar hangers 1110-1-1110-4 used in the housing assembly 1000*a*. The primary difference between the housing assembly 1000*b* and the housing assembly 1000*a* is the crossmember 1120*b*.

Figure 12:
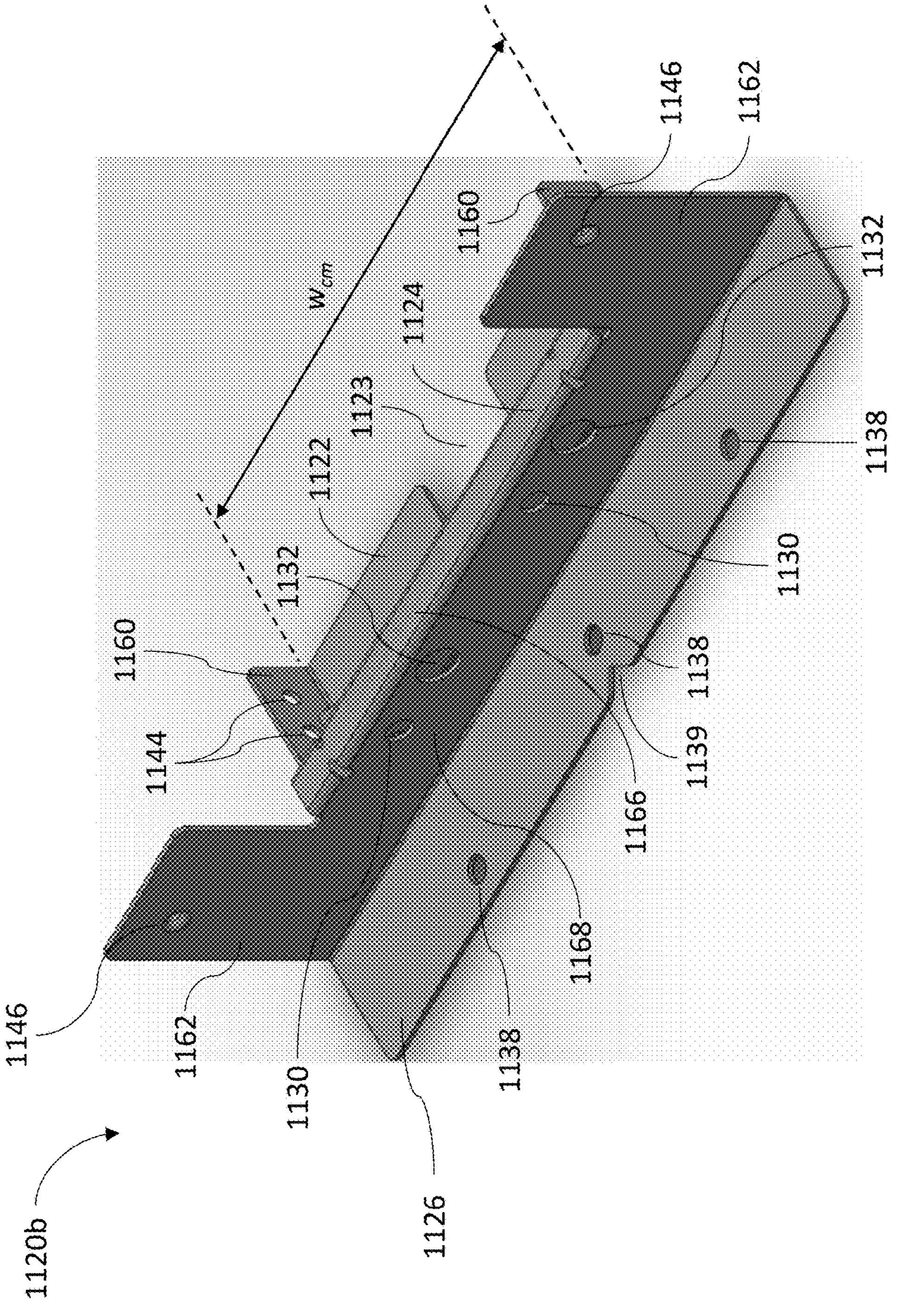
FIG. 12 shows a top, front, left perspective view of the crossmember in the housing assembly of FIG. 11.

FIG. 12 shows a perspective view of the crossmember 1120*b*. As shown, the crossmember 1120*b* may include a base 1122 with a notch 1123. In some implementations, the base 1122 may further include ribs 1125 to mechanically stiffen the base 1122. As before, the crossmember 1120*b* may include a guide 1124 that extends from the base 1122. The guide 1124 may include multiple wall sections (only wall sections 1166 and 1168 are observable in FIG. 12) forming a U-shaped structure that defines a channel to engage a T-bar. The crossmember 1120*b* may also include a single flange 1126 coupled to the wall section 1168 for attachment to a wood joist or a hat channel. In this implementation, the flange 1126 may not be readily removable from the crossmember 1120*b*. However, it should be appreciated that, in other embodiments, the flange 1126 may include one or more openings/slots to receive the end of a tool (e.g., a screwdriver) and a notch formed between the wall section 1168 and the flange 1126 to facilitate removal of the flange 1126.

Similar to the crossmember 1120*a*, the crossmember 1120*b* may also include a pair of wall sections 1160 and 1162 disposed on opposing sides of the base 1122. However, unlike the crossmember 1120*a*, the wall section 1160 may be physically separate from the wall section 1162. Specifically, the wall sections 1160 may extend from opposing sides of the base 1122 to provide a surface that supports the bar hangers 1110. Specifically, each wall section 1160 may include openings 1144 for attachment to the bar hangers 1110 via rivets 1010. FIG. 11 shows the bar hangers 1110 may be coupled to an exterior side of the wall sections 1160 such that the bar hangers 1110 are not disposed on or above the base 1122. The wall sections 1162 may be integrated together with the wall section 1168 of the guide 1124 and the flange 1126. As a result, the flange 1126 may extend along the width of the guide 1124 and the wall sections 1162. The wall sections 1162 may be an extension of the section 1168 to provide a surface that abuts a wood/metal joist or stud or a hat channel.

As before, the crossmember 1120*b* may provide several openings to receive and guide fasteners for attachment to various types of support structures. For instance, the guide 1124 may include openings 1130 and 1132 on at least the section 1168 to receive fasteners for attachment to a T-bar. The flange 1126 may include several openings 1138 to receive fasteners for attachment to a wood/metal joist or stud or a hat channel. The wall sections 1162 may include openings 1146 to receive fasteners for attachment to a wood/metal joist or stud. The flange 1126 may also include a notch 1139 as an alignment reference. The width, $w_{cm}$, of the crossmember 1120*b* may be similar to the crossmember 1120*a*.

Figure 13:
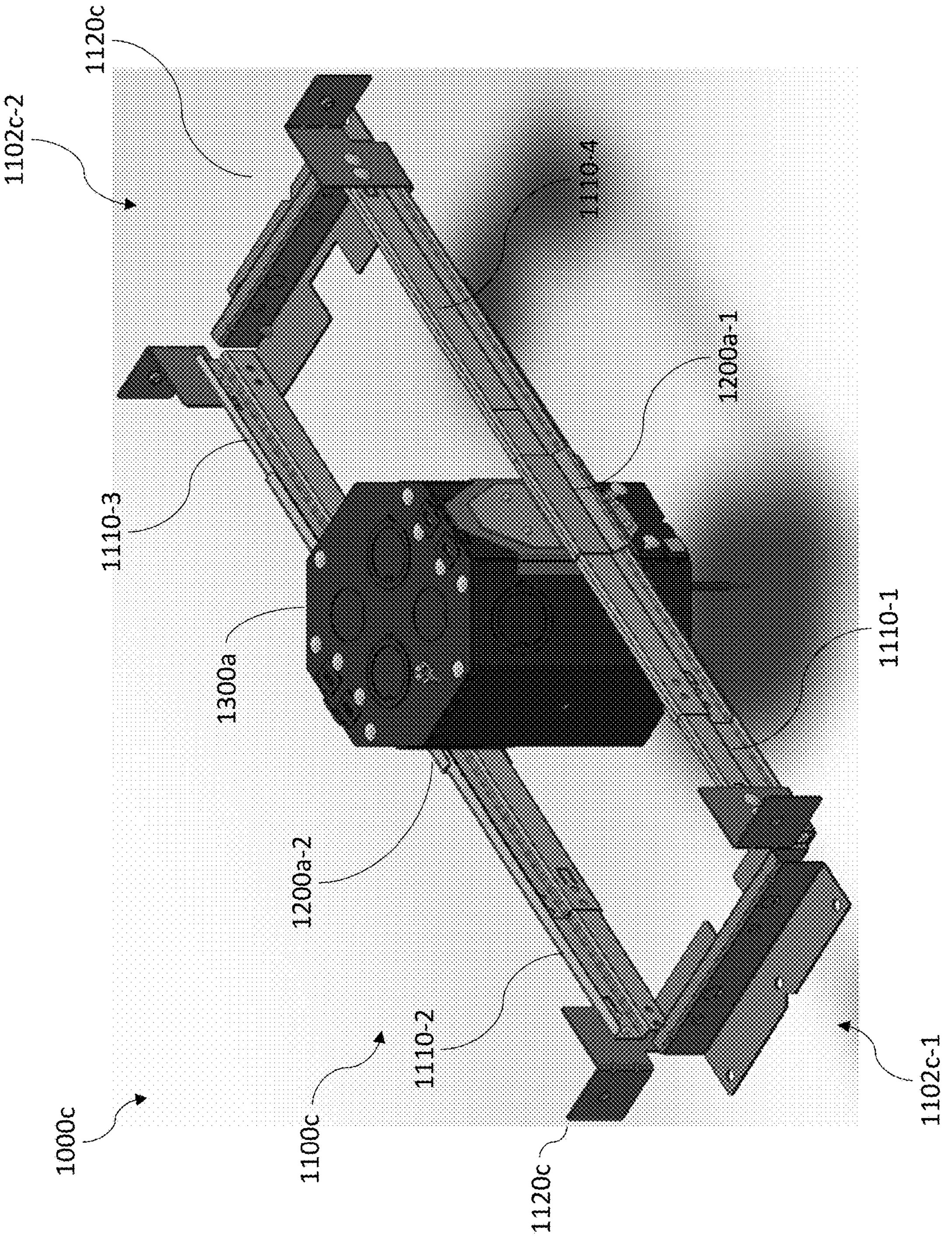
FIG. 13 shows a top, front, left perspective view of another exemplary housing assembly with a deep housing.

FIG. 13 shows another exemplary implementation of a housing assembly 1000*c* that shares several of the same components as the housing assemblies 1000*a* and 1000*b*. The primary difference between the housing assembly 1000*c* and the housing assemblies 1000*a* and 1000*b* is the bar hanger assembly 1100*c*, which includes crossmember assemblies 1102*c*-1 and 1102*c*-2 that each have and a crossmember 1120*c*.

Figure 14:
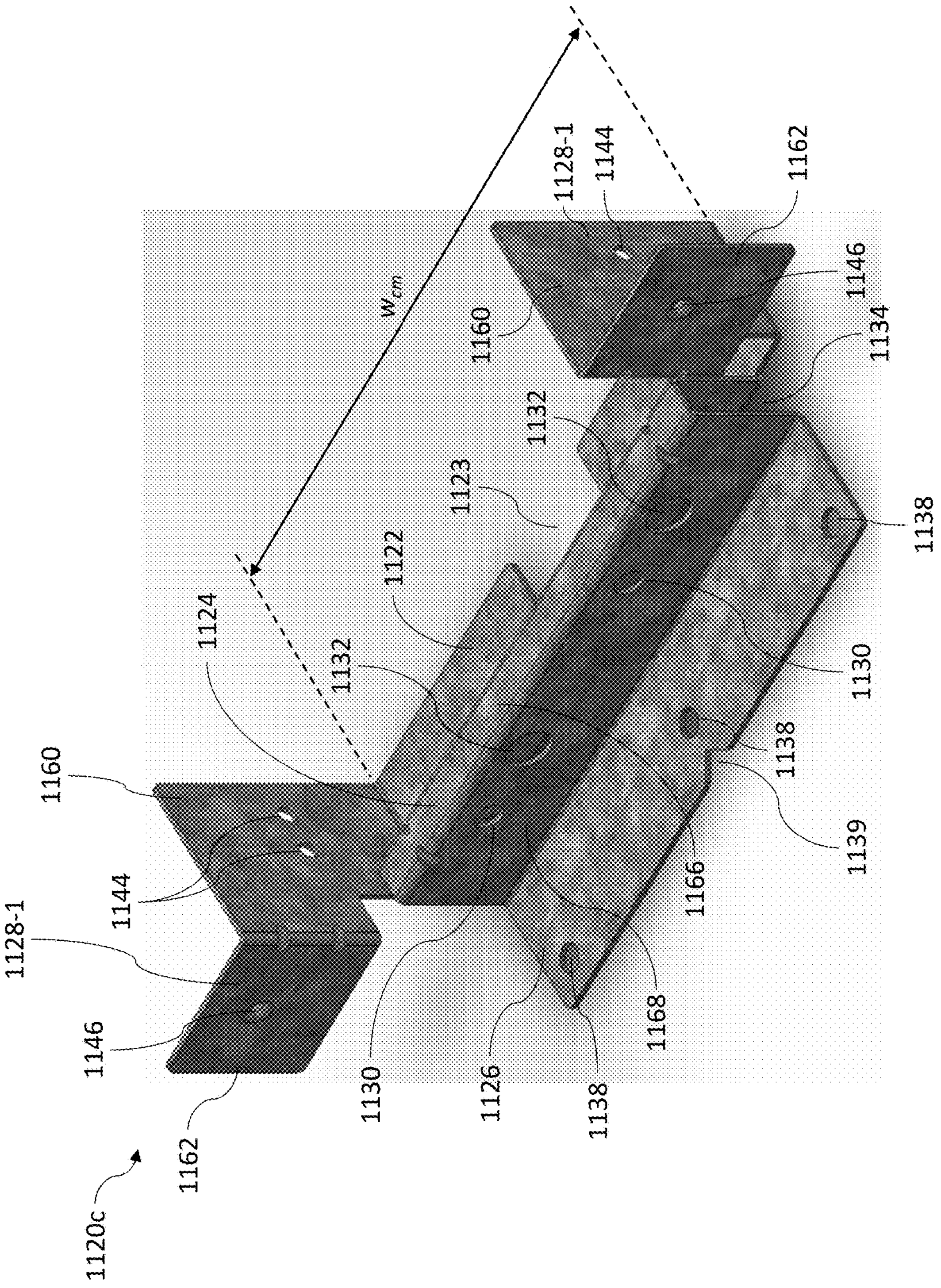
FIG. 14 shows a top, front, left perspective view of the crossmember in the housing assembly of FIG. 13.

FIG. 14 shows a perspective view of the crossmember 1120*c*. As shown, the crossmember 1120*c* may share several of the same structural features as the crossmembers 1120*a* and 1120*b*. In particular, the crossmember 1120*c* may have a base 1122 and a guide 1124 similar to the crossmember 1120*b*. However, the crossmember 1120*c* may include flanges 1128-1 and 1128-2 similar to the crossmember 1120*a*. Specifically, the wall sections 1160 may be joined to the base 1122 at a right angle and the wall sections 1162 may extend from the wall sections 1160 without physical contact with the guide 1124 or the flange 1126. The bar hangers 1110 may be coupled to an interior side of the wall sections 1162 such that the bar hangers 1110 are disposed above or on the base 1122 similar to the crossmember 1120*a*. As shown, the crossmember 1120*c* may further include a single flange 1126 that spans the width of the guide 1124.

A Housing Assembly With a Shallow Housing

Figure 15:
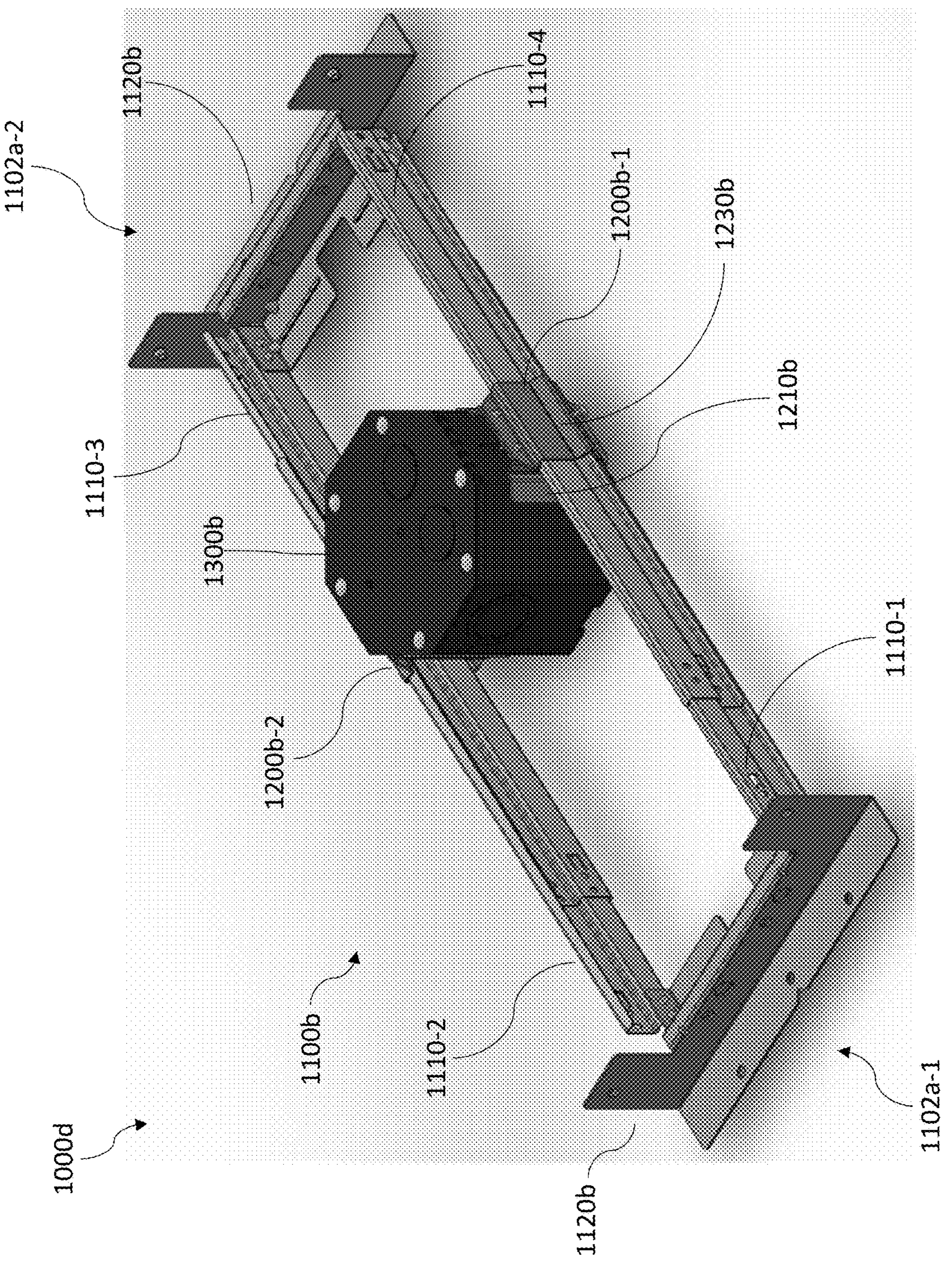
FIG. 15 shows a top, front, left perspective view of another exemplary housing assembly with a shallow housing.

The housing assemblies 1000*a*-1000*c* include the housing 1300*a*, which is representative of a deep housing. However, the bar hanger assemblies described herein may be adapted and reconfigured to accommodate different housings. To illustrate the reconfigurability of the housing assembly, the following provides several examples of housing assemblies that include a shallow housing (i.e., a housing with a smaller depth). For example, FIG. 15 shows an exemplary housing assembly 1000*d* with a housing 1300*b* having a depth, $d_h$, of about 2.5 inches. As shown, the housing assembly 1000*d* may include the bar hanger assembly 1100*b* of the housing assembly 1000*b*. The housing assembly 1000*d* may, however, include different bar hanger holders 1200*b*-1 and 1200*b*-2 (collectively referred to herein as "bar hanger holders 1200*b*") to support the housing 1300*b*.

The housing 1300*b* may include several features similar to the housing 1300*a*. For example, the housing 1300*b* may include a sidewall and a cover defining a cavity. The sidewall may also define an opening to provide access to the cavity. The housing 1300*b* may also include one or more knockouts disposed on the sidewall or the cover, which may be removed to provide an opening for a wire or a cable to be fed into the cavity. In some implementations, the housing 1300*b* may also include one or more slots disposed on the sidewall to enable slidable adjustment of the housing 1300*b* with respect to the bar hanger holders 1200*b*.

The bar hanger holder 1200*b* may also include several features and components similar to the bar hanger holder 1200*a*. For instance, the bar hanger holder 1200*b* may include a housing bracket 1210*c* and a hanger bracket 1230*c* coupled together via one or more rivets. The bar hanger holder 1200*b* may also include a fastener to lock the relative position between the bar hanger holder 1200*b* and the bar hangers 1110.

Figure 16:
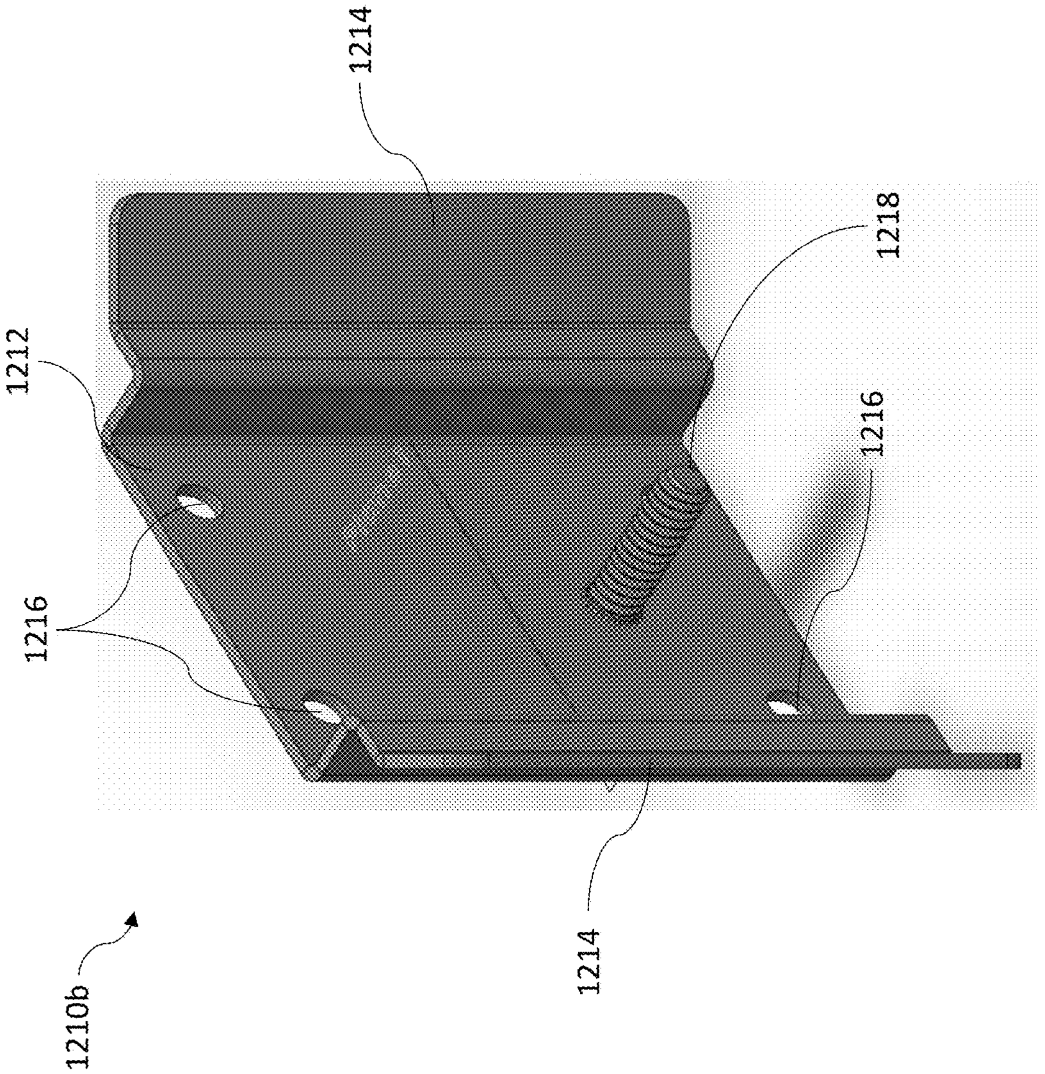
FIG. 16 shows a top, rear, right perspective view of the housing bracket in the housing assembly of FIG. 15.

FIG. 16 shows a perspective view of the housing bracket 1210*b*. As before, the housing bracket 1210*b* may include a base 1212 and a pair of flanges 1214 disposed on opposing sides of the base 1212. The flanges 1214 may be shaped to conform with the sidewall of the housing 1300*b* and to offset the base 1212 from the sidewall of the housing 1300*b* to provide sufficient clearance for one or more rivets. Compared to the housing bracket 1210*a*, the dimensions (e.g., the height) of the housing bracket 1210*b* may be reduced to correspond with the depth of the housing 1300*b*. The housing bracket 1210*b* may further include openings 1216 to facilitate attachment to the hanger bracket 1230*b* and a rod 1218 to slidably couple the housing bracket 1210*b* to the housing 1300*b*. A locking nut (not shown) may securely couple the bar hanger holder 1200*b* to the housing 1300*b*.

Figure 17:
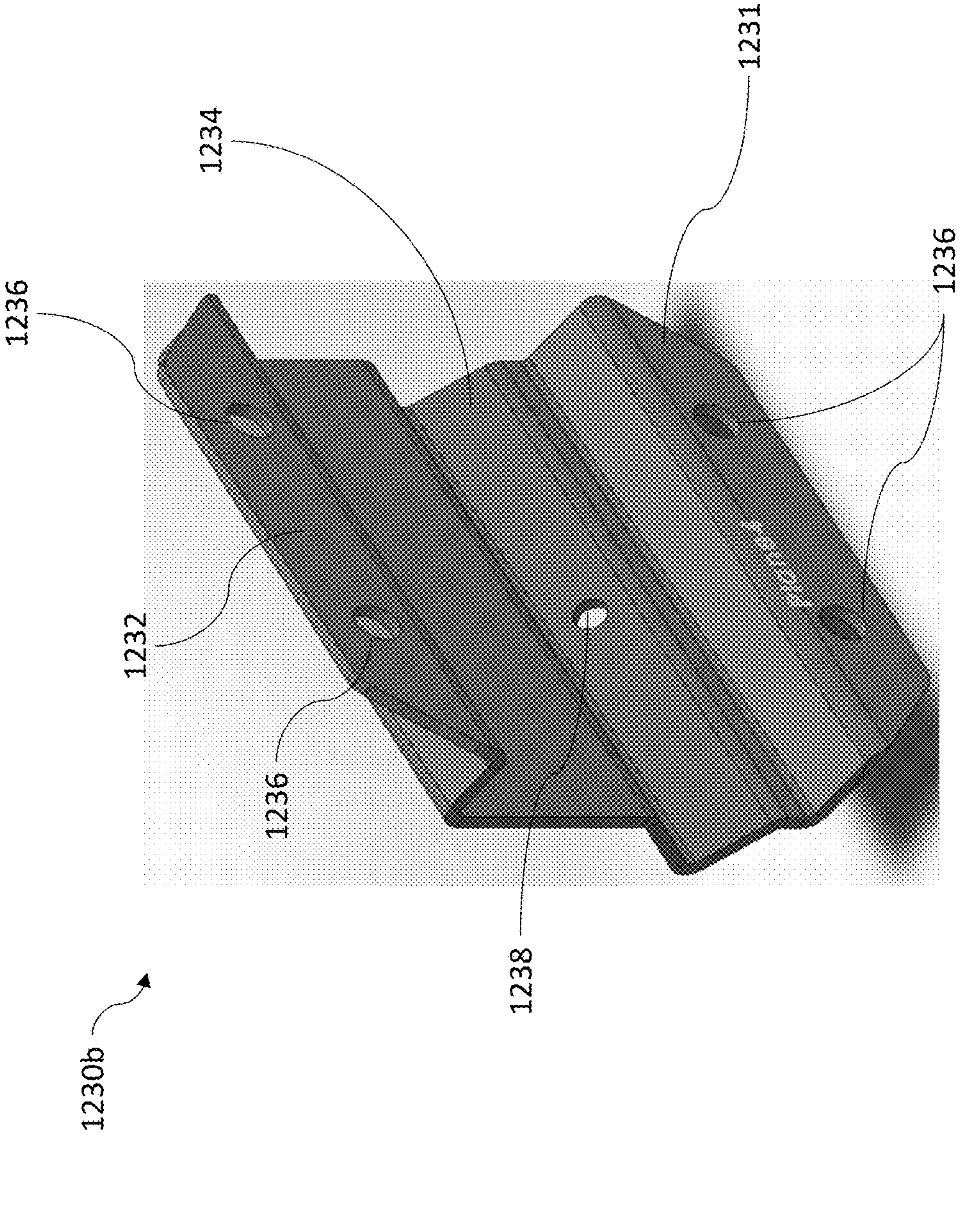
FIG. 17 shows a top, rear, right perspective view of the hanger bracket in the housing assembly of FIG. 15.

FIG. 17 shows a perspective view of the hanger bracket 1230*b*. As before, the hanger bracket 1230*b* may include bases 1231 and 1232 with openings 1236 to facilitate attachment to the housing bracket 1210*b*. Similarly, the dimensions (e.g., the height) of the hanger bracket 1230*b* may be reduced based on the depth of the housing 1300*b*. Once again, the hanger bracket 1230*b* may include a rail section 1234 disposed between the bases 1231 and 1232 to support and guide the bar hangers 1110. The rail section 1234 may further include an opening 1238 to receive a fastener that locks the position of the bar hanger holder 1200*b* with respect to the bar hangers 1110.

Figure 18:
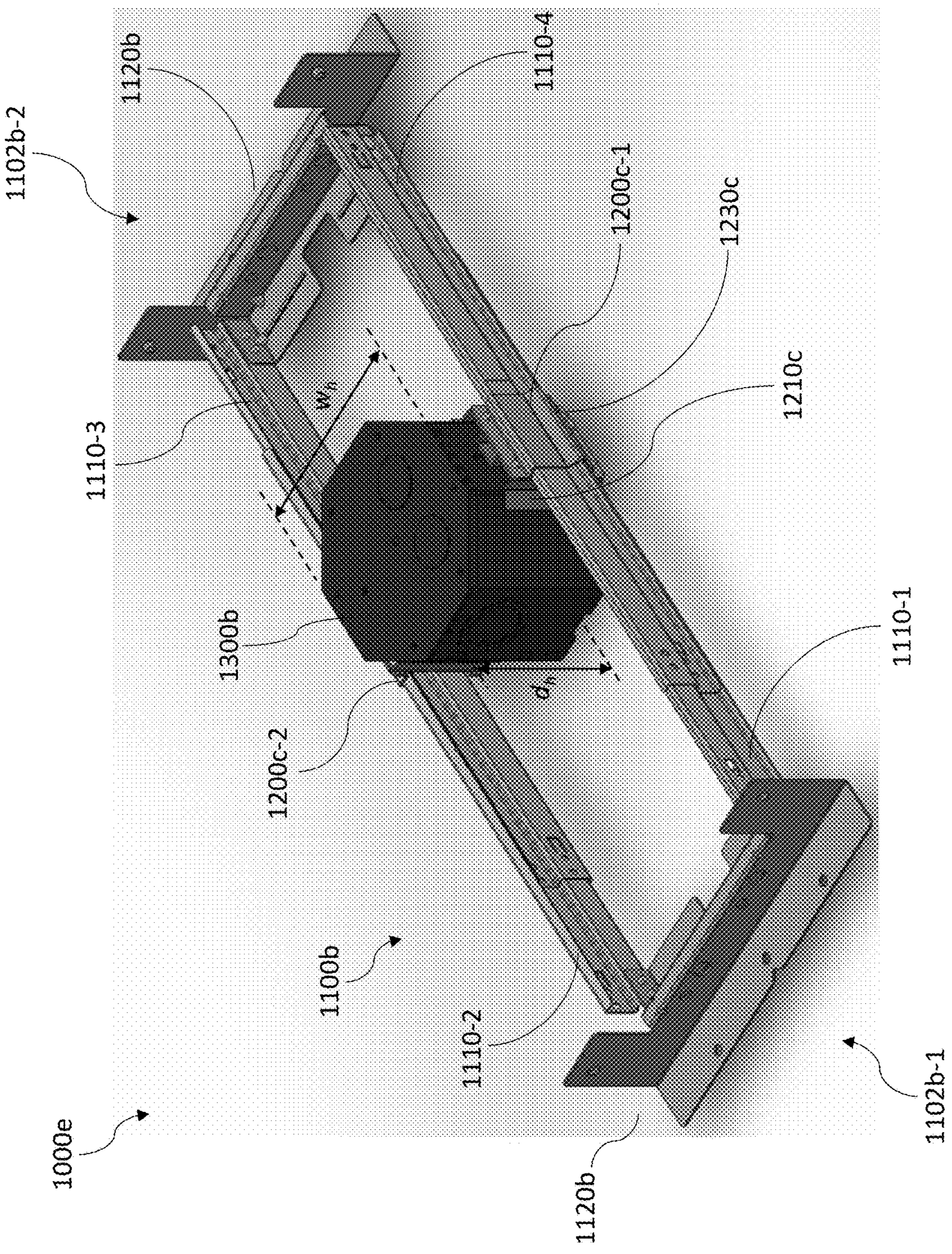
FIG. 18 shows a top, front, left perspective view of another exemplary housing assembly with a shallow housing.

FIG. 18 shows another exemplary housing assembly 1000*e* with bar hanger holders 1200*c*1 and 1200*c*-2 (collectively referred to herein as "bar hanger holders 1200*c*"), which have a different geometry compared to the bar hanger holders 1200*b*. As shown, the housing assembly 1000*e* may share the same bar hanger assembly 1100*b* and the housing 1300*b* as the housing assembly 1000*d*. the bar hanger holders 1200*c* may once again include a housing bracket 1210*c* and a hanger bracket 1230*c* coupled together via one or more rivets.

Figure 19:
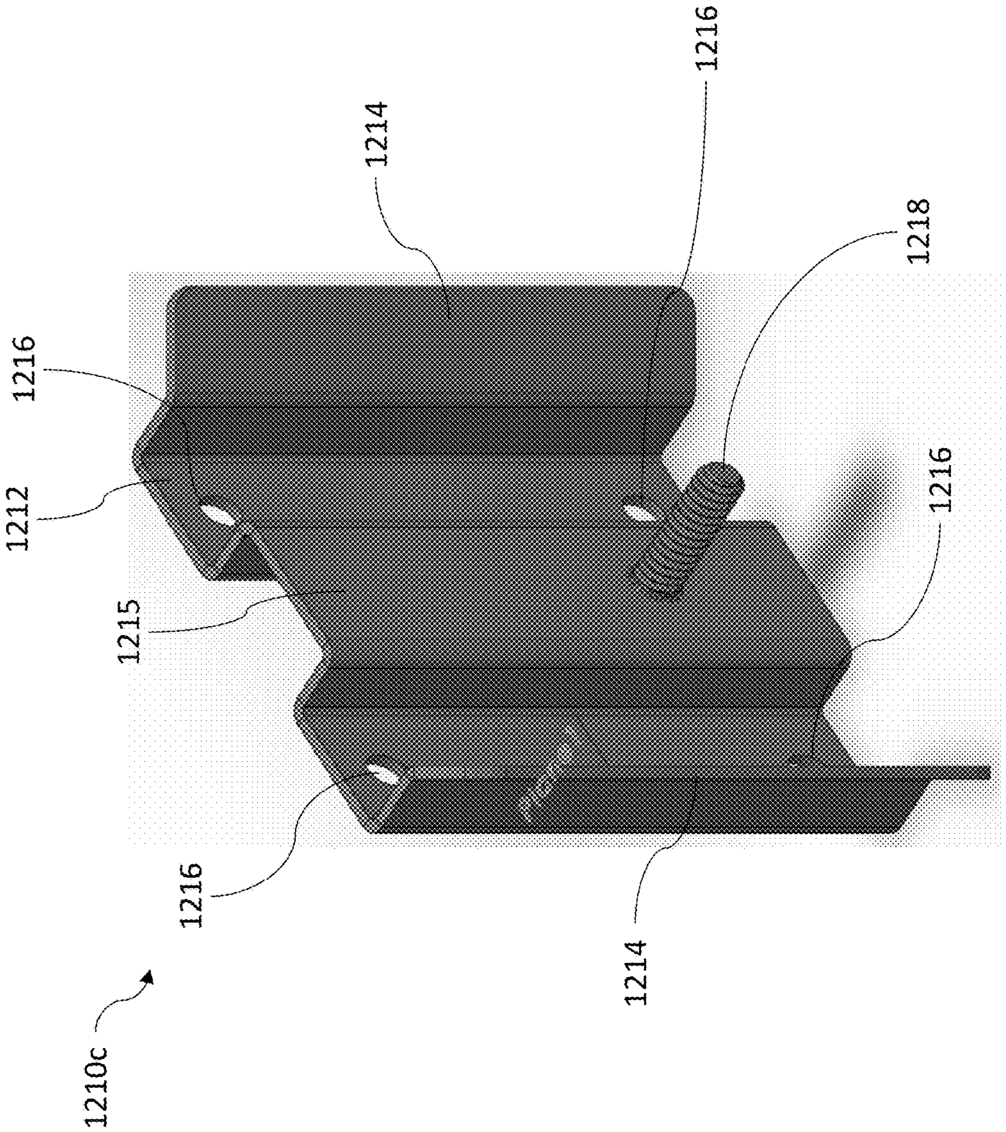
FIG. 19 shows a top, rear, right perspective view of the housing bracket in the housing assembly of FIG. 18.

FIG. 19 shows a perspective view of the housing bracket 1210*c*. As shown, the housing bracket 1210*c* may include a base 1212 and a protruding portion 1215 that extends from the base 1212 towards the housing 1300*b*, thus forming a corresponding recess on an exterior side of the housing bracket 1210*c*. The protruding portion 1215 may be shaped and/or dimensioned to physically contact the sidewall of the housing 1300*b* together with the pair of flanges 1214 thus providing an additional surface to align and support the housing bracket 1210*c* against the housing 1300*b*. Once again, the housing bracket 1210*c* may include openings 1216 that align with openings 1236 on the hanger bracket 1230*c* for attachment. The housing bracket 1210*c* may also include a rod 1218 disposed on the rib 1215 to couple to the housing 1300*b*.

Figure 20:
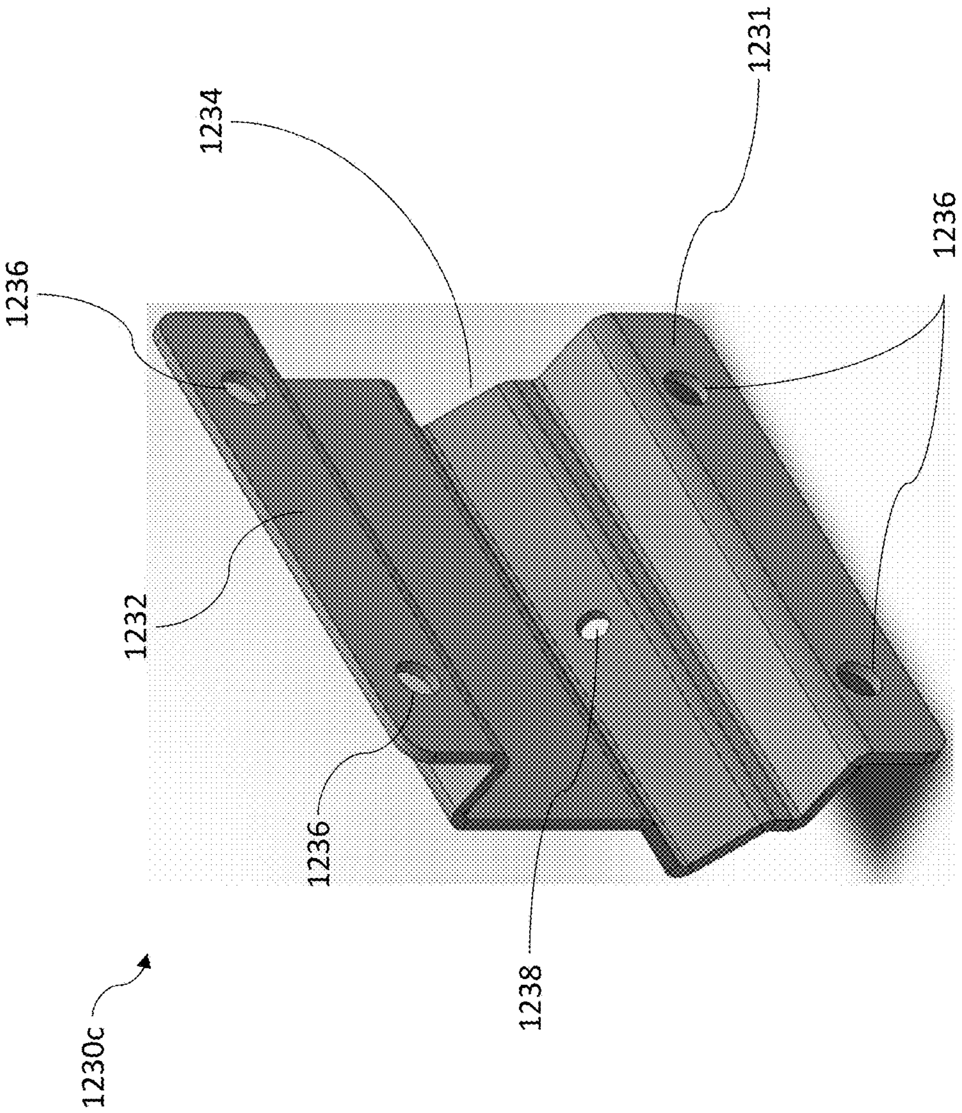
FIG. 20 shows a top, rear, right perspective view of the hanger bracket in the housing assembly of FIG. 18.

FIG. 20 shows a perspective view of the hanger bracket 1230*c*. The hanger bracket 1230*c* may be substantially similar to the hanger bracket 1230*b* with the difference being the shape and dimensions of the bases 1231 and 1232. The location of the openings 1236 are also tailored to align with the openings 1216 on the base 1212 of the housing bracket 1210*c*.

A Housing Assembly With a Deep Housing and a Pan Frame

In some implementations, the housing assembly may include a pan frame instead of a bar hanger holder to support a housing. The pan frame may generally provide a platform with an opening for the housing to pass through and integrated rail sections to slidably couple the pan frame to one or more bar hangers. In some implementations, the pan frame may also support other components, such as a junction box or an emergency battery pack (also referred to as an "emergency ballast"). In general, the pan frame may support the same types and/or sizes of housings (e.g., the housings 1300*a* and 1300*b*) as the bar hanger holders described above.

Figure 21A:
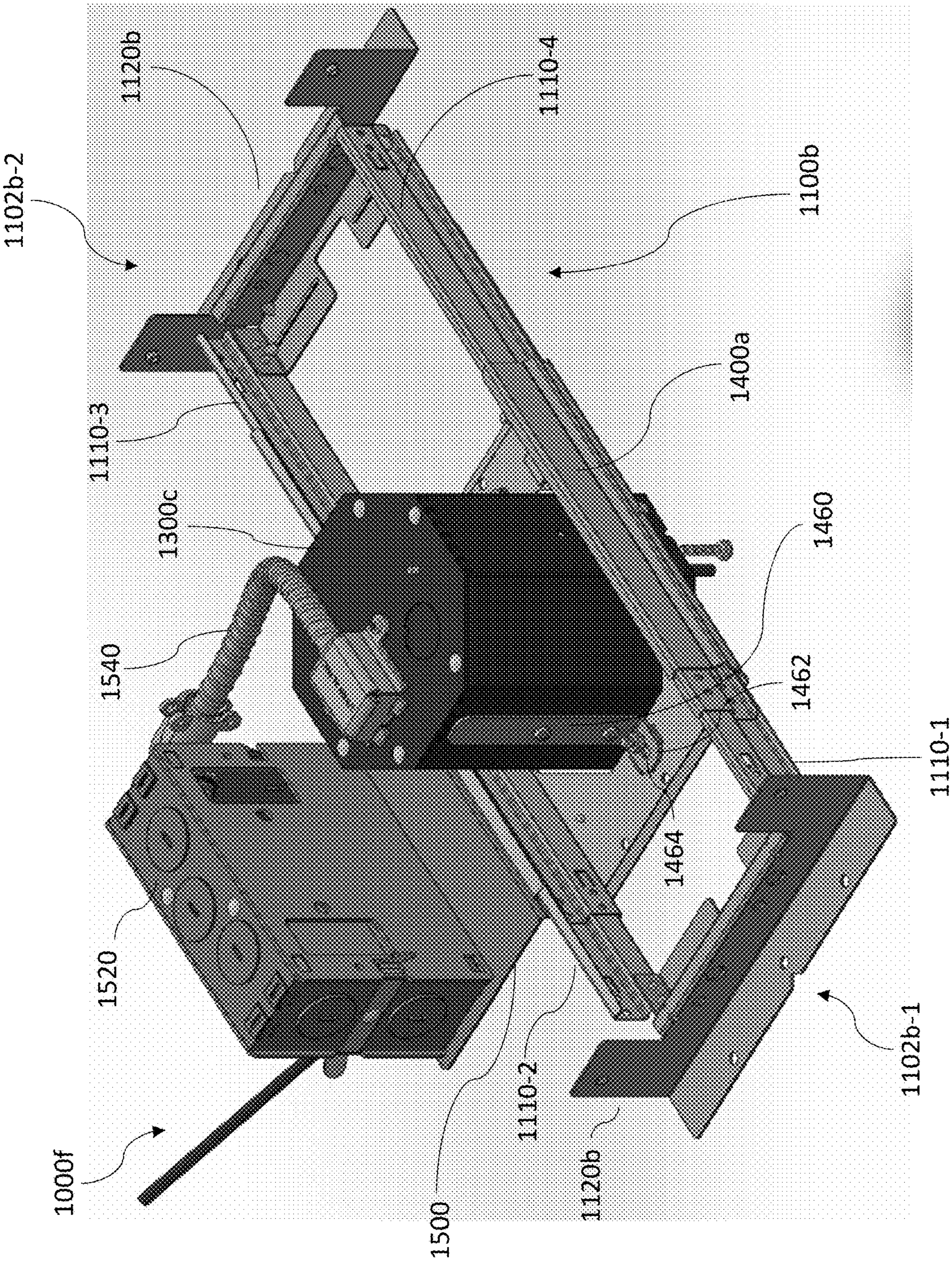
FIG. 21A shows a top, front, left perspective view of another exemplary housing assembly with a pan frame, a deep housing, and a junction box.

For example, FIG. 21A shows an exemplary housing assembly 1000*f* with a pan frame 1400*a*. The pan frame 1400*a* may support a housing 1300*c*, which is another exemplary deep housing similar to the housing 1300*a*. Specifically, the housing 1300*c* may include a different arrangement of knockouts 1330 and may not include any Romex feedthrough tabs 1332. The overall shape and dimensions of the housing 1300*c*, however, may be similar to the housing 1300*a*.

As shown, the housing assembly 1000*f* may include the bar hanger assembly 1100*b* from the housing assembly 1000*b*. The pan frame 1400*a* may be slidably coupled to the bar hangers 1110-1-1110-4 via rail sections 1414 integrally formed onto a base 1410 of the pan frame 1400*a*. The housing 1300*c* may be partially inserted through an opening 1412 on the base 1410 and mounted to the pan frame 1400*a* via a pair of mounting brackets 1460 disposed on opposing sides of the housing 1300*c*. Specifically, the mounting brackets 1460 may couple the base 1410 of the pan frame 1400*a* to the sidewall of the housing 1300*c*. In some implementations, the housing 1300*c* may include a slot (not shown) similar to the slot 1312 on the housing 1300*a* and the mounting bracket 1460 may include a rod (not shown) similar to the rod 1218 on the housing bracket 1210*a* to enable slidable adjustment of the housing 1300*c* with respect to the mounting bracket 1460. As before, a locking nut (not shown) may lock the position of the housing 1300*c* relative to the mounting bracket 1460. In this manner, the position of the housing 1300*c* may be adjusted along an axis orthogonal to the longitudinal axis of the bar hangers 1110. Similar to the slidable adjustment of the housing 1300*a* via the slots 1312 described above, the housing 1300*c* may be positioned to be substantially flush or flush with the ceiling during installation.

In some implementations, the housing assembly 1000*f* may also include a junction box 1520 mounted to the pan frame 1400*a* via a side plate 1500 coupled to the base 1410 of the pan frame 1400*a*. Thus, the junction box 1520, the side plate 1500, and the pan frame 1400*a* may move together relative to the bar hangers 1110. For example, the housing 1300*c* may contain a lighting module and the junction box 1520 may contain one or more wires and one or more wire splices to transmit electrical power from an external electrical power supply (e.g., the mains of a building, another lighting system, wiring from another junction box) to the lighting module. The housing assembly 1000*f* may include a cable 1540 to route electrical wires and/or cables between the junction box 1520 and the housing 1300*c*. As shown, the cable 1540 may be coupled to an opening formed by the removal of a knockout on the junction box 1520 and a corresponding opening formed by the removal of a knockout on the housing 1300*c*. In some implementations, the cable 1540 may be a metal-sheathed cable (e.g., a metal conduit cable) or a nonmetallic-sheathed cable (e.g., a Romex cable).

Figure 21B:
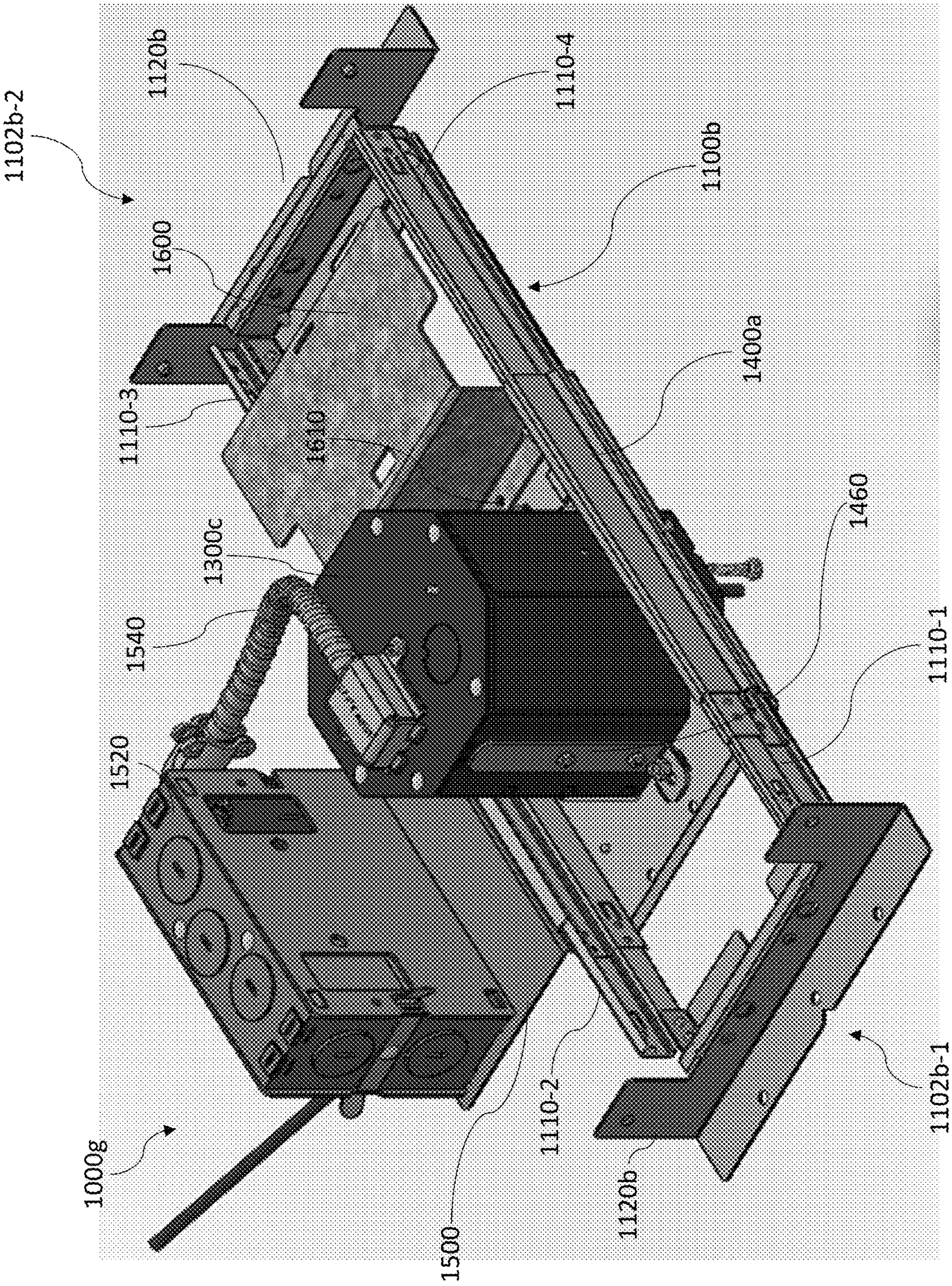
FIG. 21B shows a top, front, left perspective view of another exemplary housing assembly with a pan frame, a deep housing, a junction box, and a bracket.

In some implementations, the housing assembly may also include a bracket to support additional components/devices in the housing assembly, such as an emergency battery pack. For example, FIG. 21B shows an exemplary housing assembly 1000*g*, which is a variant of the housing assembly 1000*f* that includes a bracket 1600 coupled to the baes 1410 of the pan frame 1400*a*. As shown, the bracket 1600 may provide a platform to support the component/device mounted to the housing assembly 1000*g*. In some implementations, the bracket 1600 may include one or more mounting features (e.g., openings, rods, threaded bolts, slots) to couple the component/device to the bracket 1600.

In some implementations, the bracket 1600 may be mounted to a portion of the pan frame 1400*a* disposed between the bar hangers 1110-2/1110-3 and 1110-1/1110-4. That way, the bracket 1600 may provide a platform that does not obstruct movement of the pan frame 1400*a* along the bar hangers 1110. Additionally, the bracket 1600 may be positioned to avoid disrupting the placement of the side plate 1500, the junction box 1520, and/or the cable 1540. Said in another way, the bracket 1600 may be disposed proximate to the housing 1300*c* such that one or more knockouts on the housing 1300*c* may be readily accessible without affecting the routing and/or placement of the cable 1540 to the housing 1300*c*. The shape and/or dimensions of the bracket 1600 may vary, in part, based on the shape and/or dimensions of the components/devices being supported.

Figure 21C:
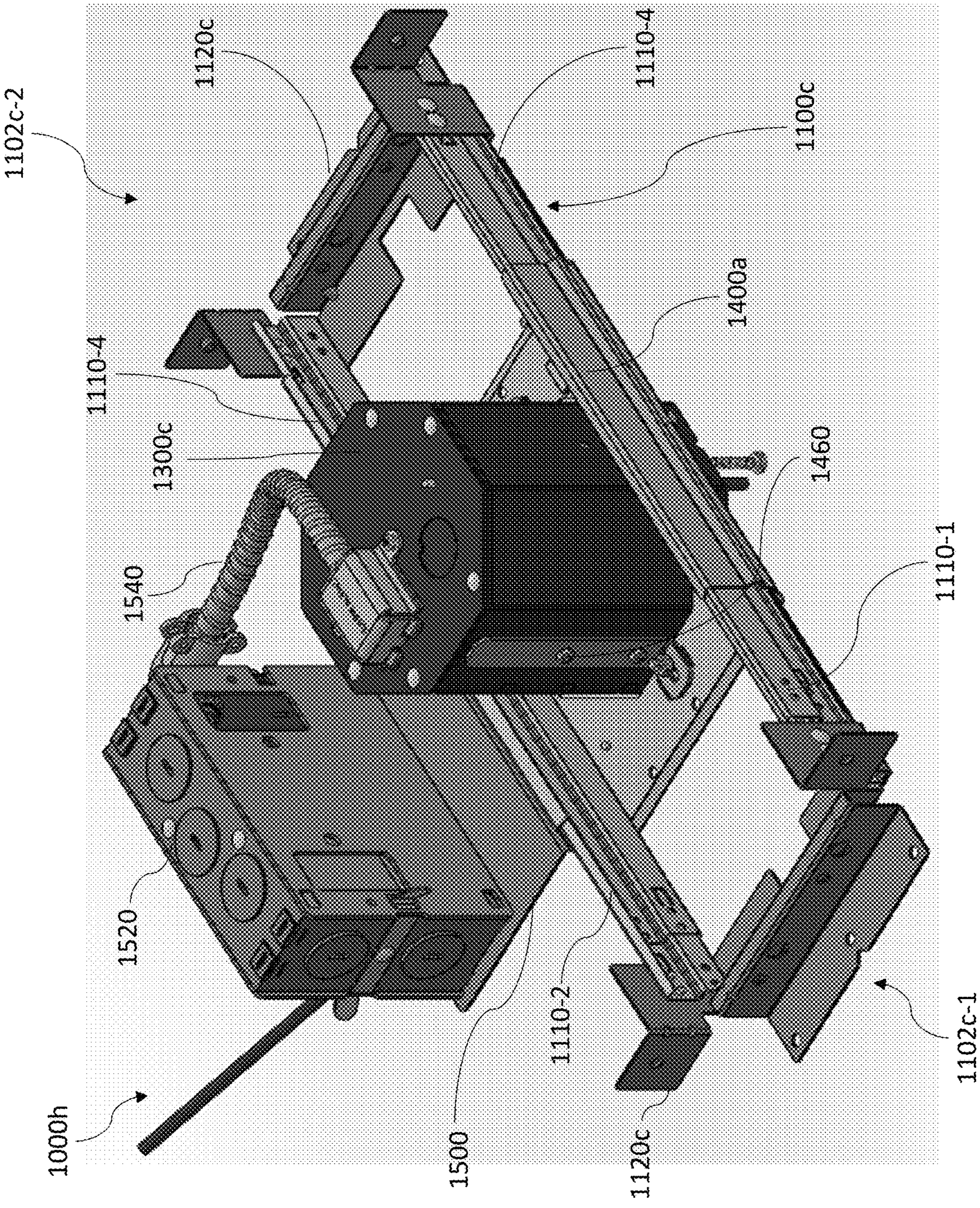
FIG. 21C shows a top, front, left perspective view of another exemplary housing assembly with a pan frame, a deep housing, and a junction box.

As described above, the housing assembly may be modular, thus enabling the housing assembly to have different configurations by substituting one or more components with other components based on, for example, the different features and/or properties provided (e.g., different materials, different sizes, different mounting features). Another example of the modular nature of the housing assembly is shown in FIG. 21C. Specifically, FIG. 21C shows a housing assembly 1000*h* that combines the bar hanger assembly 1100*c* from the housing assembly 1000*c* with the housing 1300*c*, the pan frame 1400*a*, the side plate 1500, the junction box 1520, and the cable 1540 from the housing assembly 1000*f*.

Figure 22:
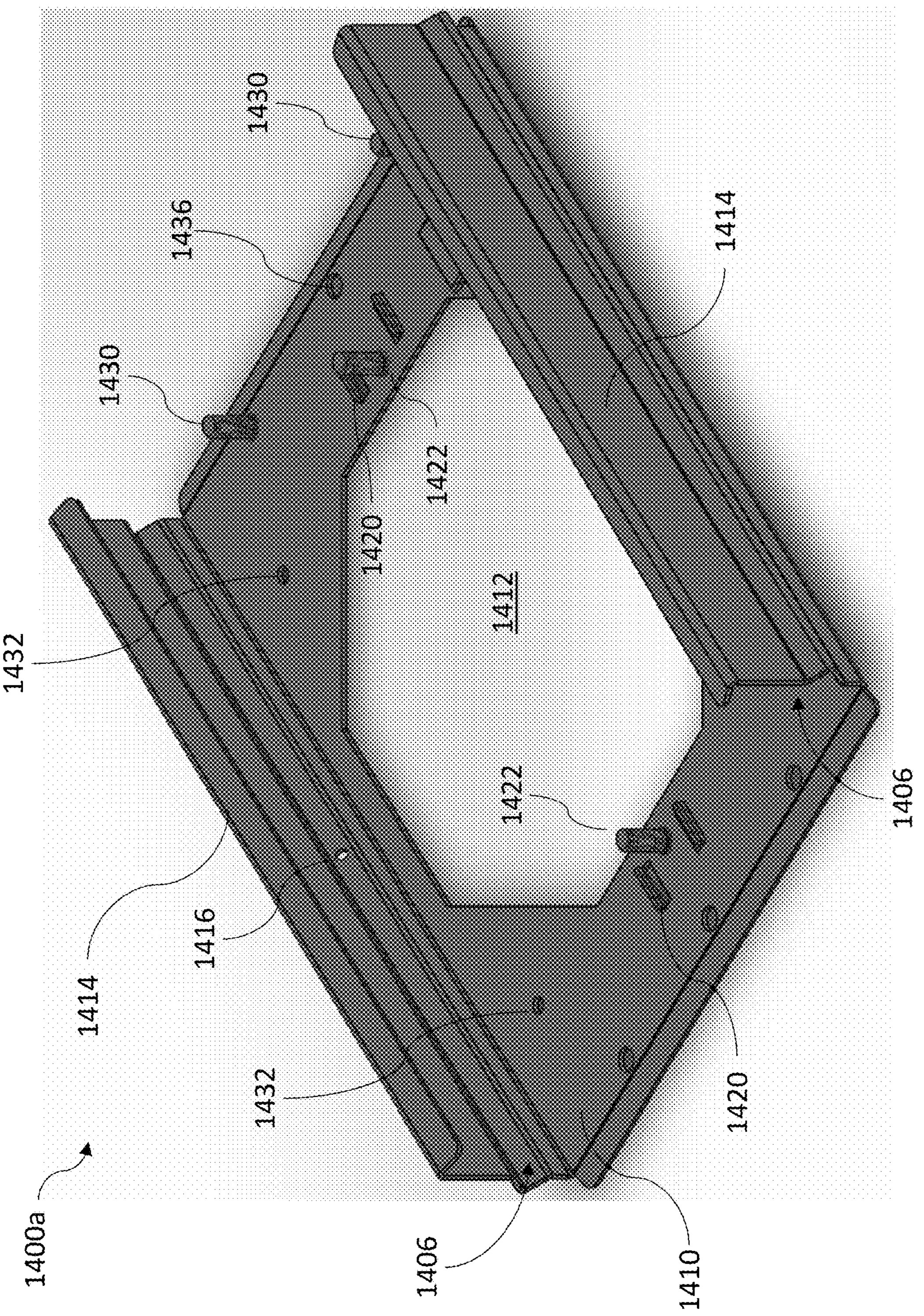
FIG. 22 shows a top, front, left perspective view of the pan frame in the housing assembly of FIGS. 21A-21C.

FIG. 22 shows a perspective view of the pan frame 1400*a* used in the housing assemblies 1000*f*, 1000*g*, and 1000*h*. As shown, the pan frame 1400*a* may include a base 1410, which provides a platform to support the housing 1300*c*. The base 1410 may include an opening 1412 that is shaped to conform with the cross-sectional shape of the housing 1300*c* and dimensioned such that the housing 1300*c* may be inserted through the opening 1412. In some implementations, the opening 1412 may be sufficiently larger than the housing 1300*c* such that a gap forms between the sidewall 1310 of the housing 1300*c* and the edge of the opening 1412.

To precisely align the housing 1300*c* to the pan frame 1400*a*, the base 1410 of the pan frame 1400*a* may include a guide 1420 and a rod 1422 to support the mounting bracket 1460. As shown in FIGS. 21A-21C, the housing bracket 1460 may be an L-shaped bracket that includes an arm 1466 and an arm 1462 supported and constrained by the guide 1420. Specifically, the guide 1420 may include a pair of rails that protrude from the base 1410, which are shaped to clasp opposing sides of the arm 1462 such that the arm 1462 is movable along the longitudinal axis of the rails and mechanically constrained along the other axes.

The arm 1466 may include one or more openings 1468 (see, for example, FIG. 32) to receive corresponding fasteners that couple the mounting bracket 1460 to the sidewall of the housing 1300*c*. The arm 1462 may include a slot 1464 to receive the rod 1422. The slot 1464 may thus allow the bracket 1460 to be slidably adjusted towards or away from the opening 1412 relative to the base 1410. In this manner, the pair of brackets 1460 may be repositioned to accommodate different-sized housings mounted to the pan frame 1400*a*. For example, the width of the housing may be substantially similar to the width of the opening 1412 (e.g., a deep housing such as the housing 1300*c*) or smaller (e.g., a shallow housing).

The pan frame 1400*a* may also include a pair of rail sections 1414 disposed on opposing sides of the base 1410. The rail sections 1414 may be shaped to define a passageway 1406 to support and guide the respective pairs of bar hangers 1110 (i.e., the bar hangers 1110-1 and 1110-4, the bar hangers 1110-2 and 1110-3). In general, the rail sections 1414 may be shaped and/or dimensioned to conform with the shape of the bar hangers 1110. In some implementations, the shape of the rails 1414 may be substantially similar or the same as the rail section 1234 of the hanger brackets 1230*a*, 1230*b*, and/or 1230*c*. Each rail section 1414 may further include an opening 1416 to receive a fastener that locks the pan frame 1400*a* to the bar hangers 1110.

The pan frame 1400*a* may also include several mounting features to mount other components of the housing assembly (e.g., the junction box 1520, the bracket 1600). For example, the base 1410 may include one or more openings 1432 that align with corresponding openings 1516 on the side plate 1500. Fasteners and/or rivets may be inserted through the openings 1432 and 1516 to couple the side plate 1500 to the pan frame 1400*a*. As shown in FIGS. 21A-21C, the side plate 1500 may be disposed below the base 1410. The pan frame 1400*a* may also include one or more rods 1430 that are inserted through corresponding openings in the bracket 1600 to facilitate alignment and attachment of the bracket 1600 to the pan frame 1400*a*. Respective locking nuts (not shown) may be coupled to the rods 1430 to securely attach the bracket 1600 to the pan frame 1400*a*. The pan frame 1400*a* may also include an opening 1436 disposed between the rods 1430 that aligns with an opening 1610 on the bracket 1600 to receive a fastener that also couples the bracket 1600 to the pan frame 1400*a*.

Figure 23:
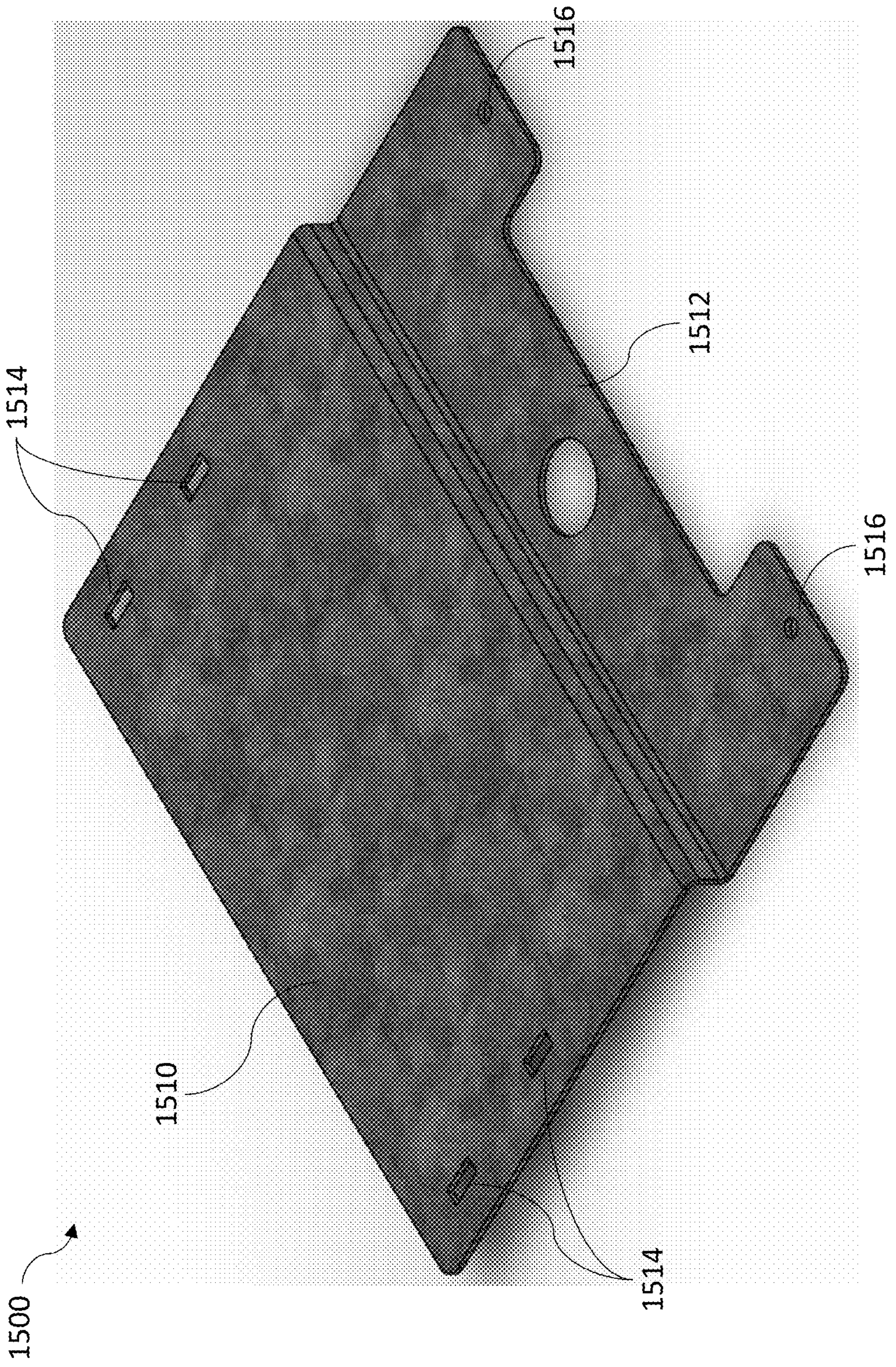
FIG. 23 shows a top, front, left perspective view of the side plate in the housing assembly of FIGS. 21B and 21C.

FIG. 23 shows a perspective view of the side plate 1500. As shown, the side plate 1500 may include a base 1510 to support the junction box 1520 and a flange 1512, which extends from the base 1510, to abut the base 1410 of the pan frame 1400*a*. The base 1510 may include one or more slots 1514 to mount the junction box 1520 to the side plate 1500. The flange 1512 may include the openings 1516 for attachment with the pan frame 1400*a*.

A Housing Assembly With a Shallow Housing and a Pan Frame

Figure 24A:
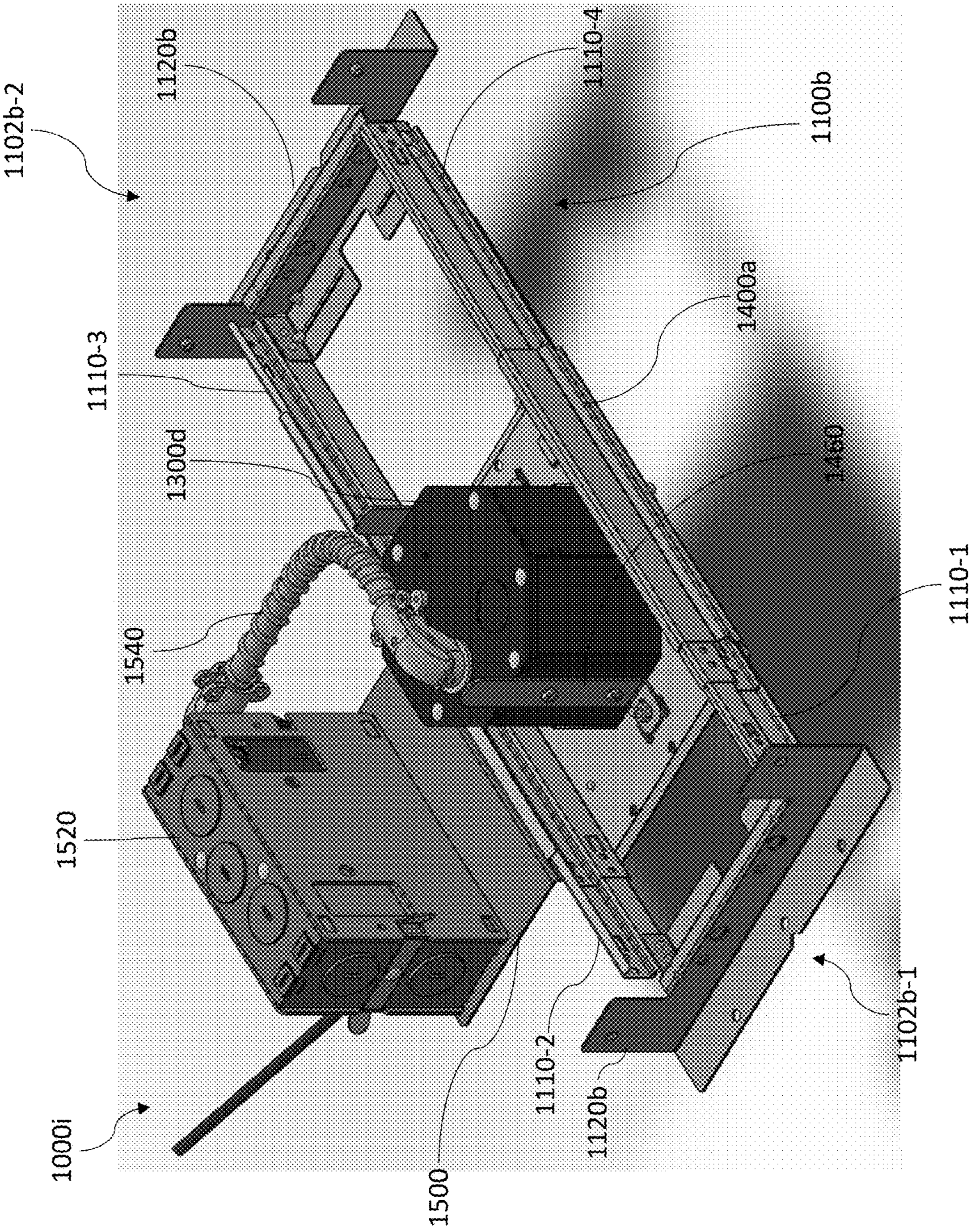
FIG. 24A shows a top, front, left perspective view of another exemplary housing assembly with a pan frame, a shallow housing, and a junction box.

In some implementations, the housing assembly may also include a pan frame that supports a different sized housing, such as a shallow housing (e.g., the housing 1300*b*). For example, FIG. 24A shows an exemplary housing assembly 1000*i* with a housing 1300*d*, which is another example of a shallow housing similar to the housing 1300*b*. Specifically, the housing 1300*d* includes a different arrangement of knockouts 1330 than the housing 1300*b*. As shown, the housing assembly 1000*i* may include the bar hanger assembly 1000*b*, the pan frame 1400*a*, the side plate 1500, the junction box 1520, and the cable 1540 from the housing assembly 1000*f*.

Figure 24B:
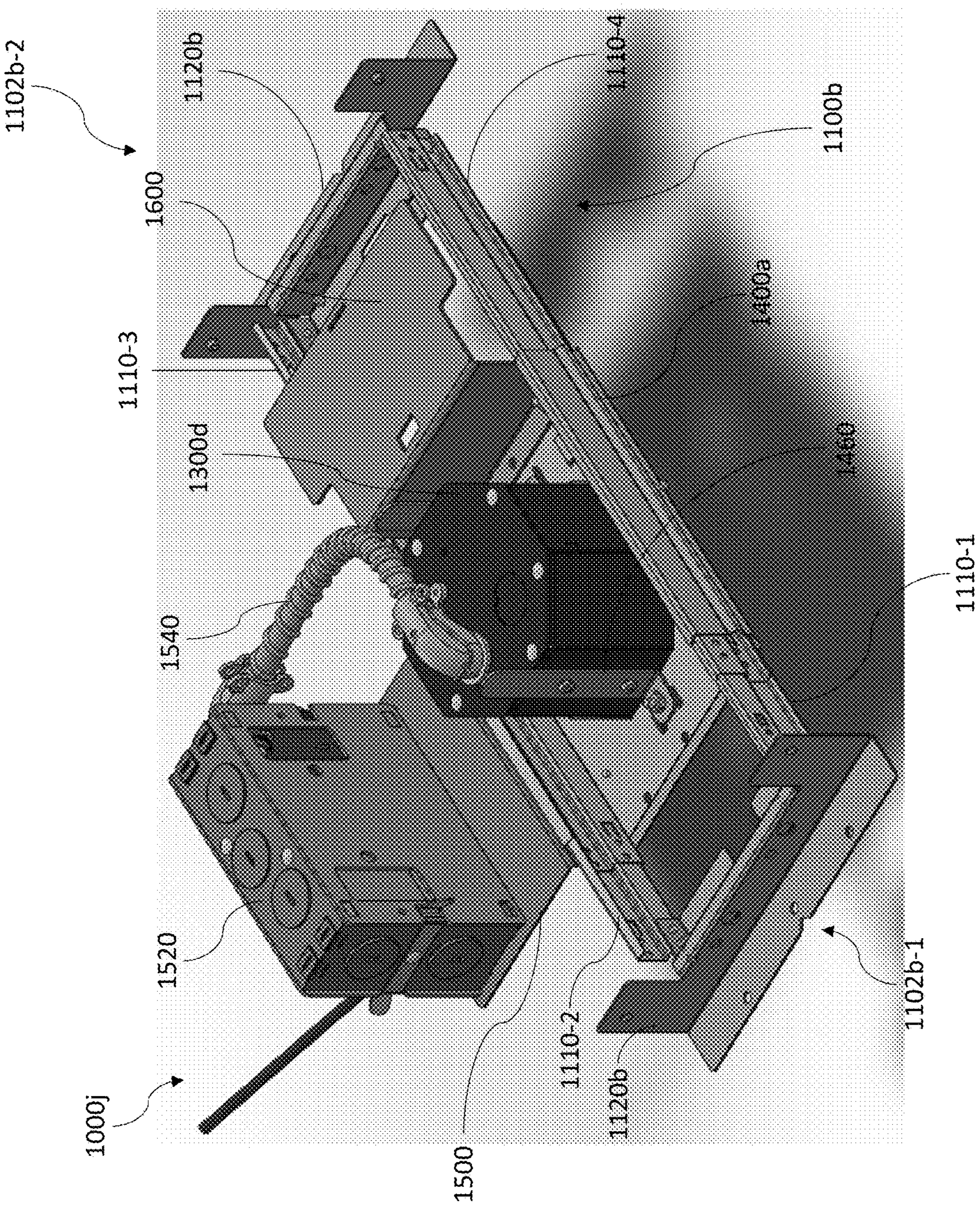
FIG. 24B shows a top, front, left perspective view of another exemplary housing assembly with a pan frame, a shallow housing, a junction box, and a bracket.

The housing 1300*d* may be mounted to the pan frame 1400*a* in the same manner as the housing 1300*c* using a pair of mounting brackets 1460 coupled to the sidewall of the housing 1300*d* and the base 1410 of the pan frame 1400*a*. The junction box 1520 may route electrical wires/cables to the housing 1300*d* via a cable 1540 through an opening formed by the removal of a knockout on the housing 1300*d*. In some implementations, the housing 1300*d* may include a slot (not shown) that enables the housing 1300*d* to be slidably adjustable with respect to the pan frame 1400*a* via the mounting brackets 1460. FIG. 24B shows a housing assembly 1000*j*, which is a variant of the housing assembly 1000*i* that includes the bracket 1600 coupled to the pan frame 1400*a*.

A Housing Assembly With a Rotatable Housing and a Pan Frame

Figure 25A:
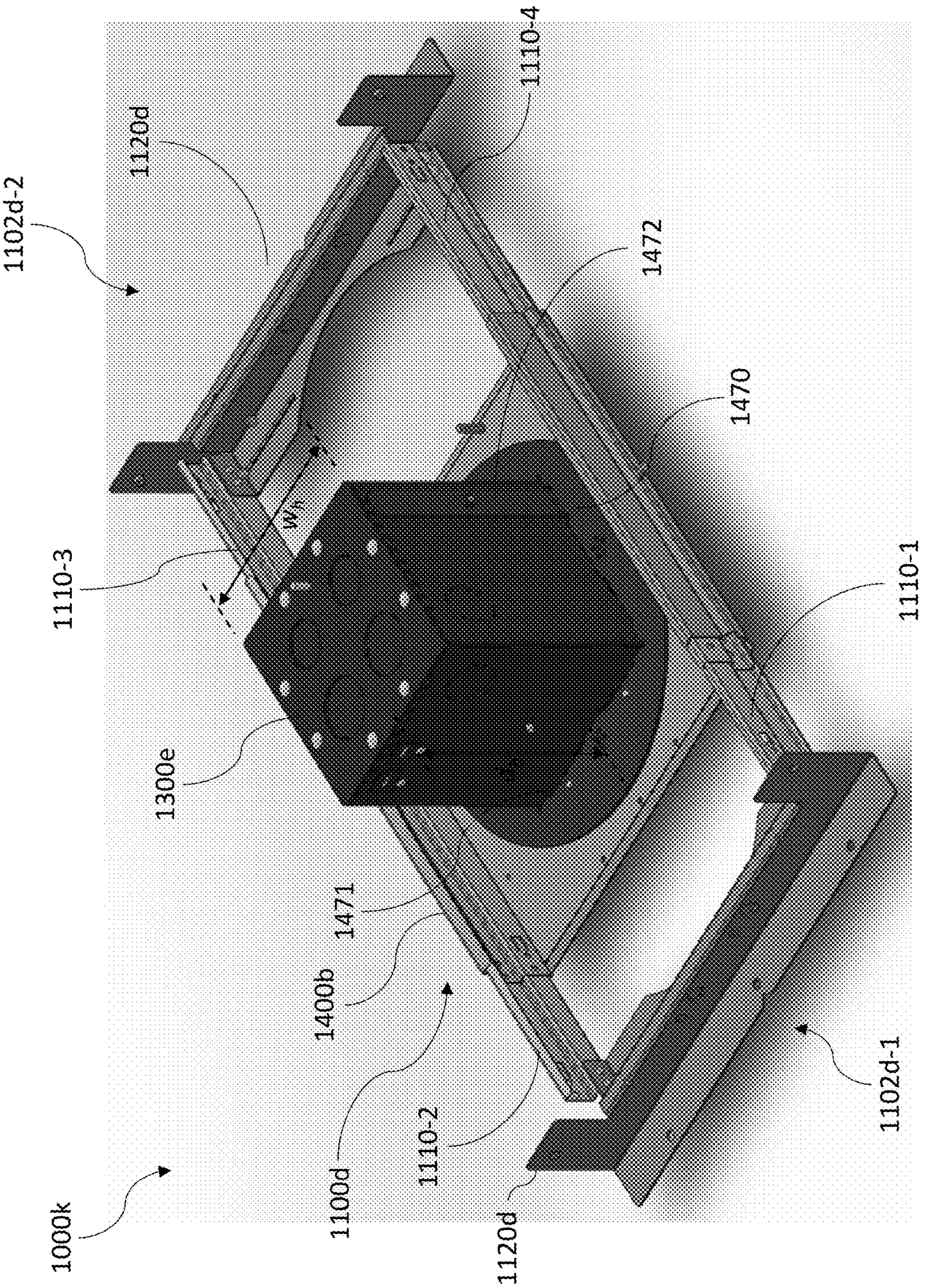
FIG. 25A shows a top, front, left perspective view of another exemplary housing assembly with a pan frame and a rotatable housing.

As shown, the position of the housing with respect to the pan frame may be adjusted using, for example, the slot 1464 on the mounting bracket 1460 and the rod 1422 on the pan frame 1400*a*. In some implementations, the pan frame may also allow the orientation of the housing to be adjusted as well. For example, FIG. 25A shows an exemplary housing 1000*k* with a pan frame 1400*b* and a mounting frame 1470 to support a housing 1300*e* with a square cross-sectional shape. The mounting frame 1470 may be rotatably coupled to the pan frame 1400*b* such that the angular orientation of the housing 1300*e* with respect to a plane of the base 1410 of the pan frame 1400*b* (e.g., the plane may be parallel to a corresponding plane of a panel in a ceiling, wall, or floor) may be changed. For example, the mounting frame 1470 may have one or more rods or pegs (not shown) that are inserted through respective slots 1424 on the pan frame 1400*b*, which guide the rotation of the mounting frame 1470 relative to the pan frame 1400*b*. Respective locking nuts (not shown) may be attached to the rods to lock the rotational position of the housing 1300*e* with respect to the pan frame 1400*b*.

In some implementations, multiple housing assemblies 1000*k* may be installed into an environment where the support structures may not be aligned and/or spaced evenly. If the housing 1300*e* is rigidly coupled to the pan frame

1400*b*, the respective housings 1300*e* may have different orientation due to constraints imposed by the layout of the support structures supporting the housing assemblies 1000*k*. In installations where the housing assemblies 1000*k* support lighting modules disposed in each housing 1300*e*, the different orientations of the housings 1300*e* may detrimentally affect the orientation and distribution of light emitted from each housing 1300*e*, which may result in unwanted glare or uneven lighting of the environment. Additionally, housings 1300*e* with different orientations may also result in openings formed in a ceiling with correspondingly different orientations, which may be aesthetically undesirable. By allowing the housing 1300*e* to be rotatable with respect to the pan frame 1400*b*, the user has more flexibility in orienting the housings 1300*e* in the housing assemblies 1000*k* as desired regardless of the layout of the various support structures in the environment. For example, each housing 1300*e* may be oriented to form an array where the respective sides of the housing 1300*e* are in parallel alignment with at least one side of another housing 1300*e*. In some implementations, the housings 1300*e* may be arranged to form a one-dimensional or two-dimensional array with at least one plane of symmetry.

The housing 1300*e* may include several features similar to the housings 1300*a*-1300*d*. For example, the housing 1300*e* may include a sidewall and a cover defining a cavity. The sidewall may also define an opening to provide access to the cavity. The housing 1300*e* may also include one or more knockouts, which may be removed to provide an opening for a wire or a cable to be fed into the cavity. In some implementations, the housing 1300*e* may also include a slot to provide slidable adjustment with respect to the mounting bracket 1272. Compared to the housings 1300*a*-1300*d*, however, the housing 1300*e* may have a cross-sectional shape corresponding to a square instead of an octagon. In some implementations, the housing 1300*e* may have a width, $w_h$, of about 4 inches and a depth, $d_h$, of about 4.5 inches.

The housing 1300*e* may be partially inserted through an opening 1471 of the mounting frame 1470 and mounted to the mounting frame 1470 via one or more mounting brackets 1472 similar to the mounting bracket 1460. As shown, the mounting bracket 1472 may be integrally formed together with the mounting frame 1470. However, in some implementations, a separate mounting bracket (e.g., the mounting bracket 1462) may couple the housing 1300*e* to the mounting frame 1470.

Figure 25B:
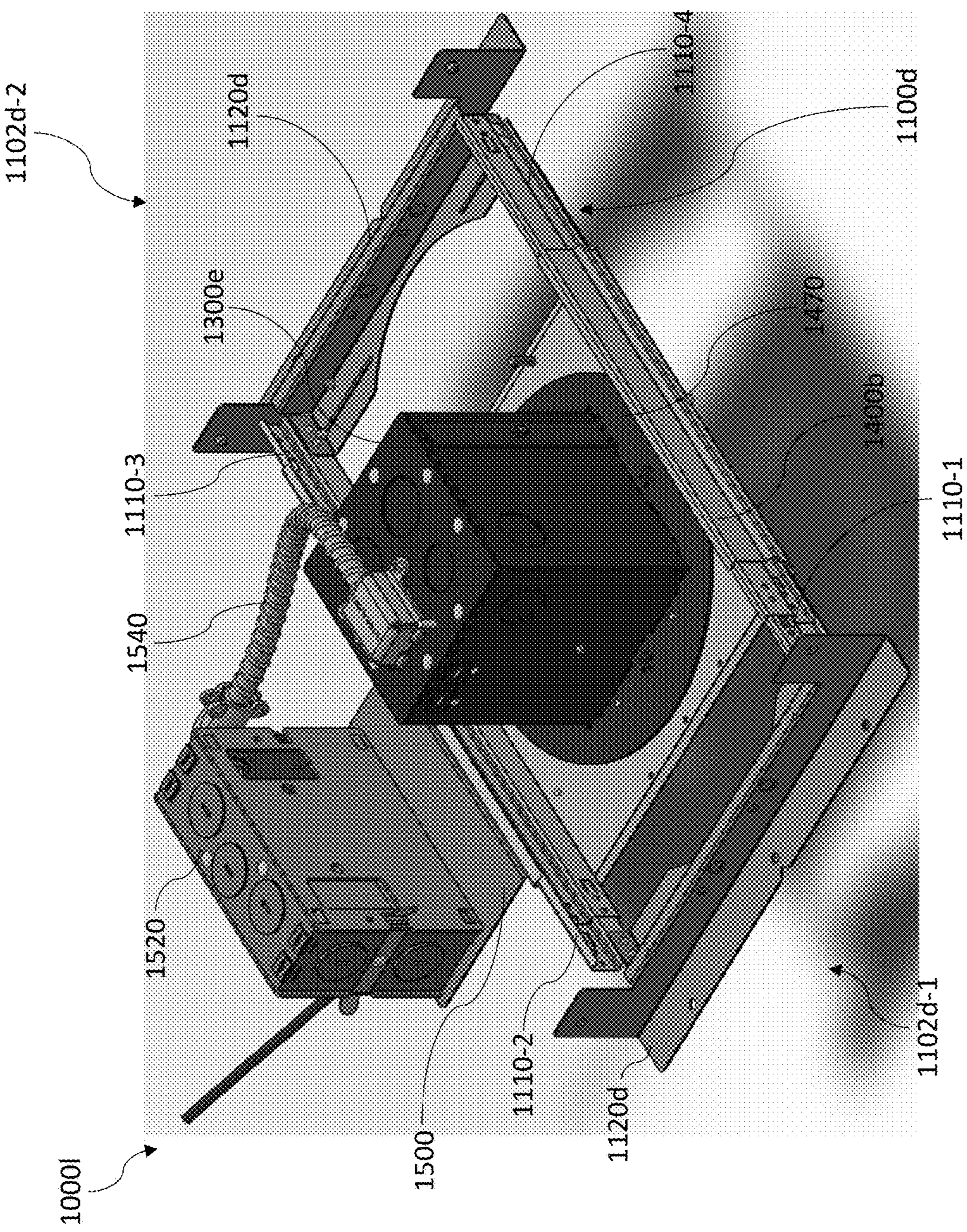
FIG. 25B shows a top, front, left perspective view of another exemplary housing assembly with a pan frame, a rotatable housing, and a junction box.
Figure 25C:
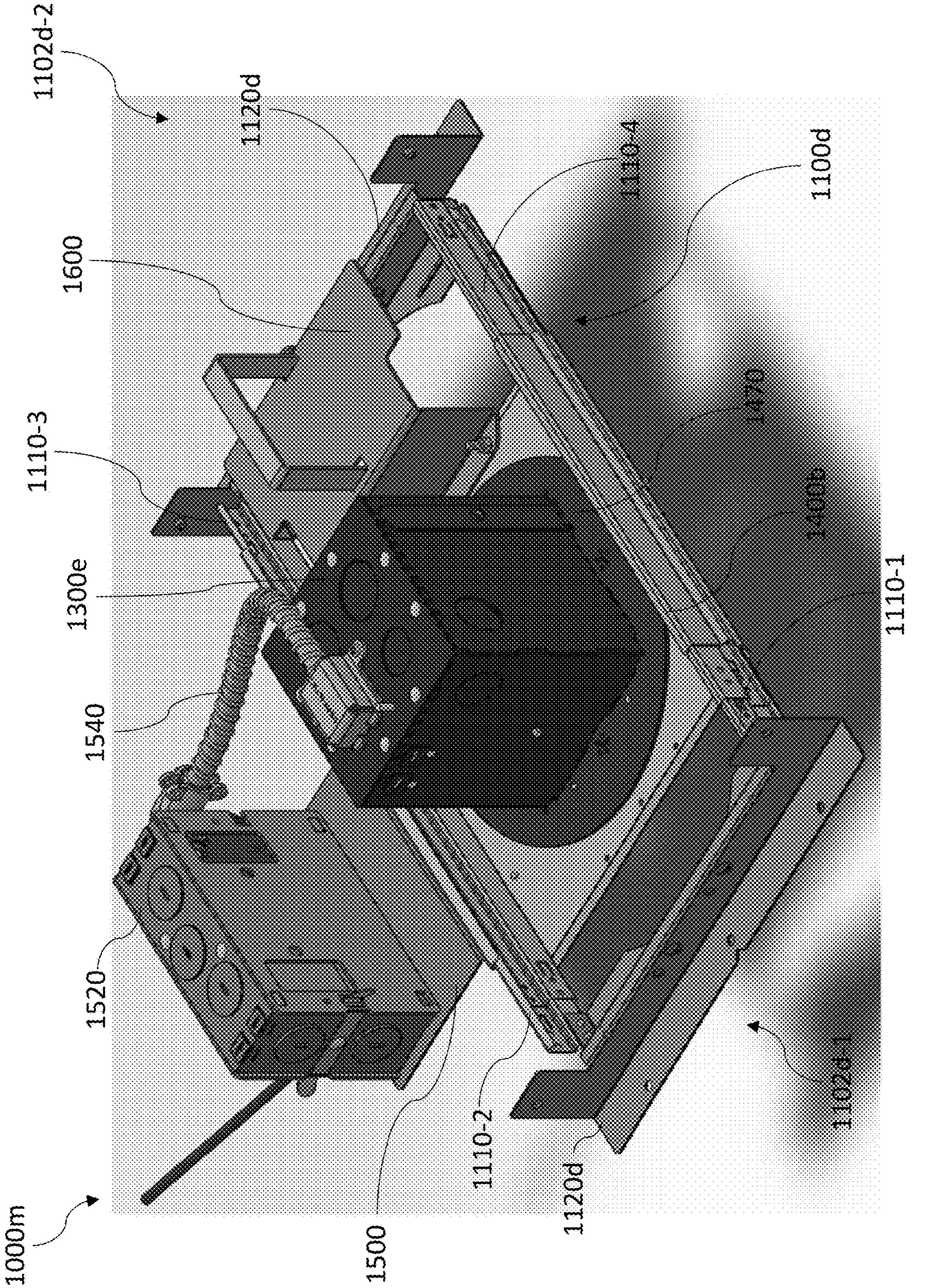
FIG. 25C shows a top, front, left perspective view of another exemplary housing assembly with a pan frame, a rotatable housing, a junction box, and a bracket.

As before, the pan frame 1400*b* may provide support for other components in the housing assembly. For example, FIG. 25B shows a housing assembly 10001, which is a variant of the housing assembly 1000*k* with a side plate 1500 coupled to the pan frame 1400*b*, a junction box 1520 mounted on the side plate 1500, and a cable 1540 to route electrical wires/cables from the junction box 1520 to the housing 1300*e* through an opening formed by the removal of a knockout on the housing 1300*e*. In another example, FIG. 25C shows a housing assembly 1000*m*, which is a variant of the housing assembly 10001 that further includes a bracket 1600 mounted to the pan frame 1400*b*.

Figure 26:
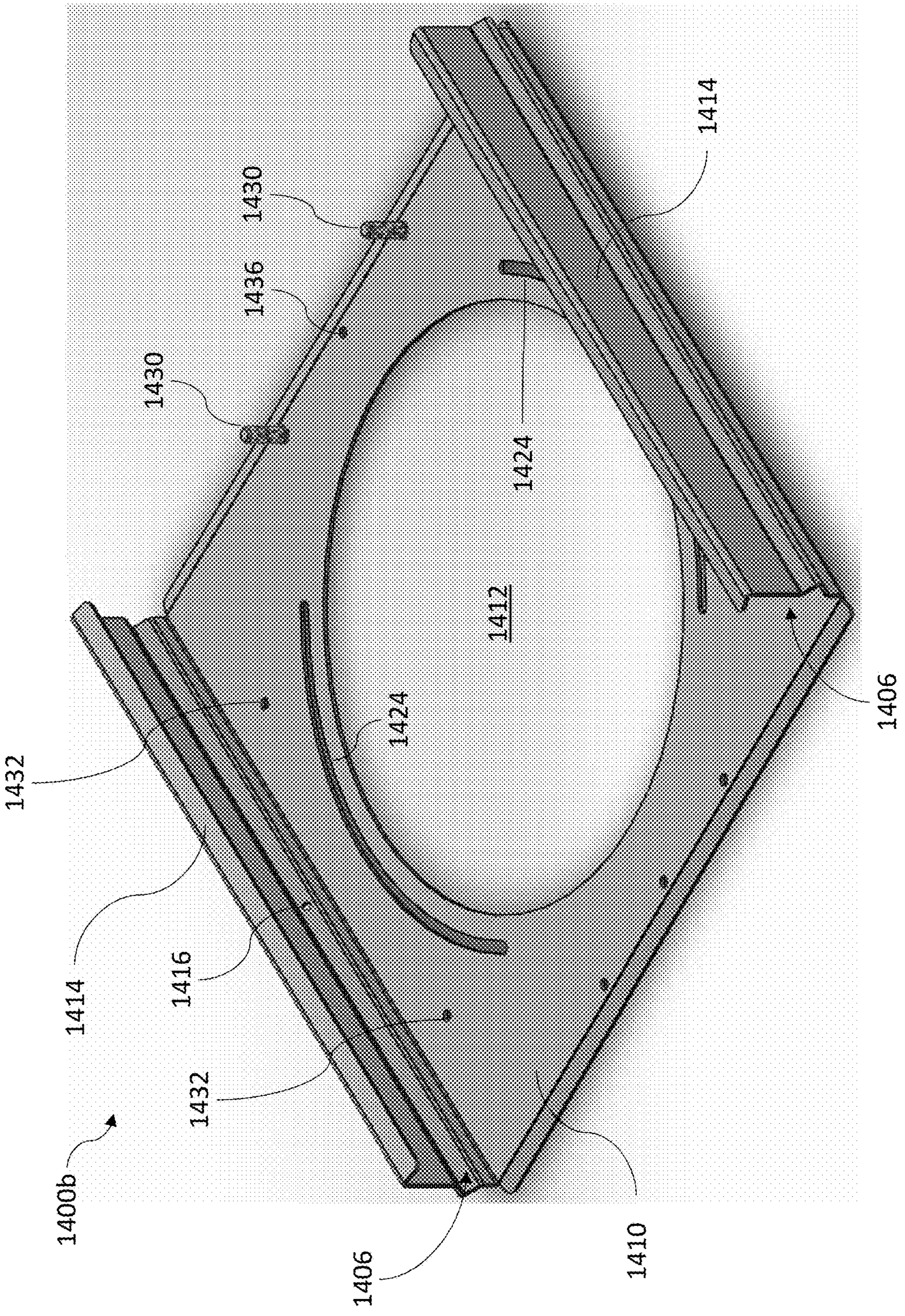
FIG. 26 shows a top, front, left perspective view of the pan frame in the housing assembly of FIGS. 25A-25C.

FIG. 26 shows a perspective view of the pan frame 1400*b*. Compared to the pan frame 1400*a*, the pan frame 1400*b* may be larger in size to accommodate the mounting frame 1470. However, the pan frame 1400*b* may still share several of the same features as the pan frame 1400*a*. For example, the pan frame 1400*b* may include a base 1410 with an opening 1412. In this case, the opening 1412 may be shaped to conform with the mounting frame 1470. The pan frame 1400*b* may further include rail sections 1414 disposed on opposing sides of the base 1410 and respective openings 1416 for a fastener to lock the pan frame 1400*b* to the bar hangers 1110. The pan frame 1400*b* may also include openings 1432 to couple the side plate 1500 to the pan frame 1400*b* and rods 1430 and an opening 1436 to couple the bracket 1600 to the pan frame 1400*b*. The pan frame 1400*b* may also include slots 1424 defining a semi-circular path with a center of rotation coinciding with the center of the opening 1412.

Figure 27:
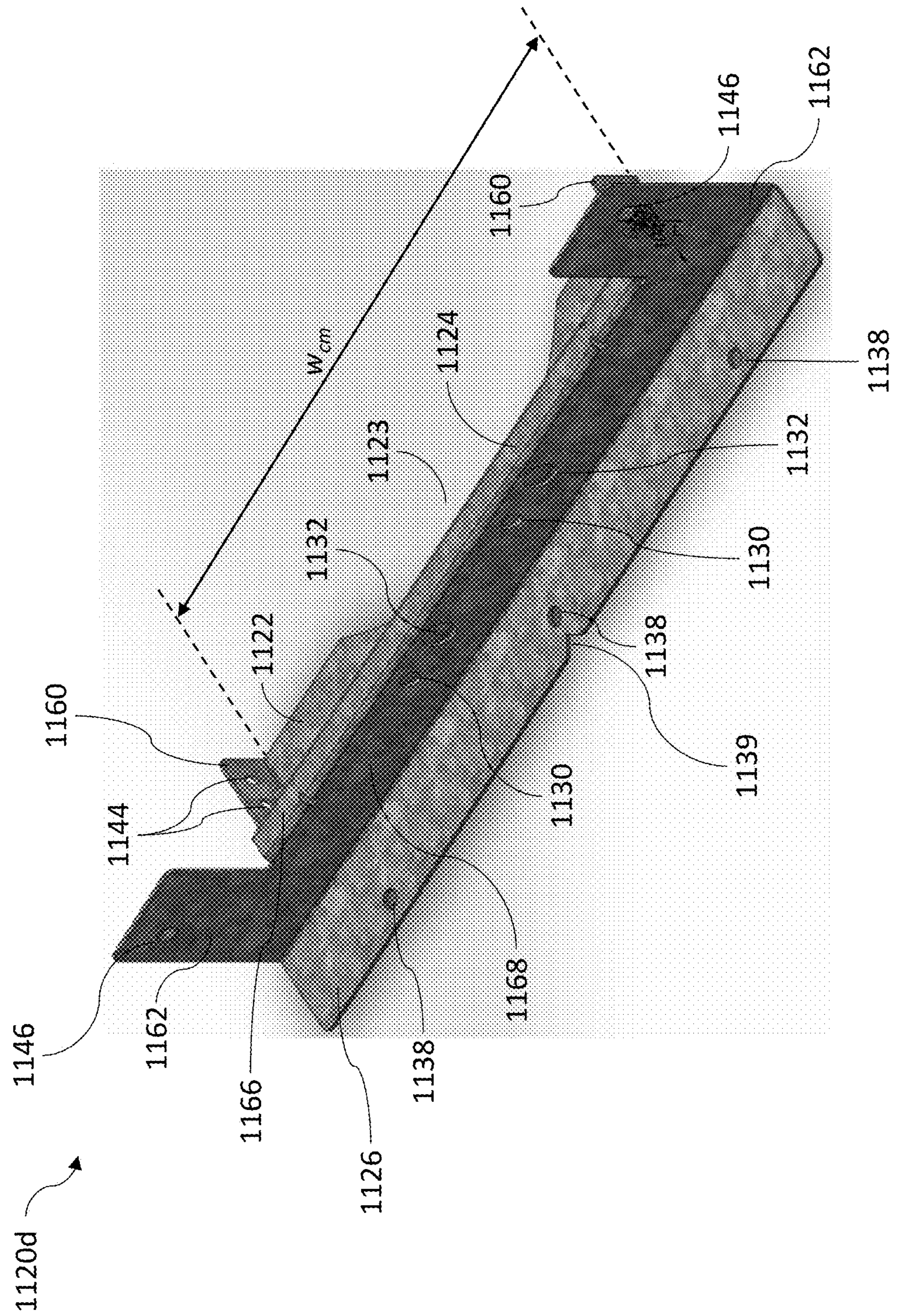
FIG. 27 shows a top, front, left perspective view of the crossmember in the housing assembly of FIGS. 25A-25C.

Since the pan frame 1400*b* is larger than the pan frame 1400*a*, the housing assembly 1000*k* includes a bar hanger assembly 1000*d* with a crossmember 1120*d* that is correspondingly larger in size to accommodate the larger pan frame 1400*b*. FIG. 27 shows a perspective view of the crossmember 1120*d*. As shown, the crossmember 1120*d* may be a wider variant of the crossmember 1120*b* with the same structural features. The width, $w_{cm}$, of the crossmember 1120*d* is about 9 inches.

Figure 28:
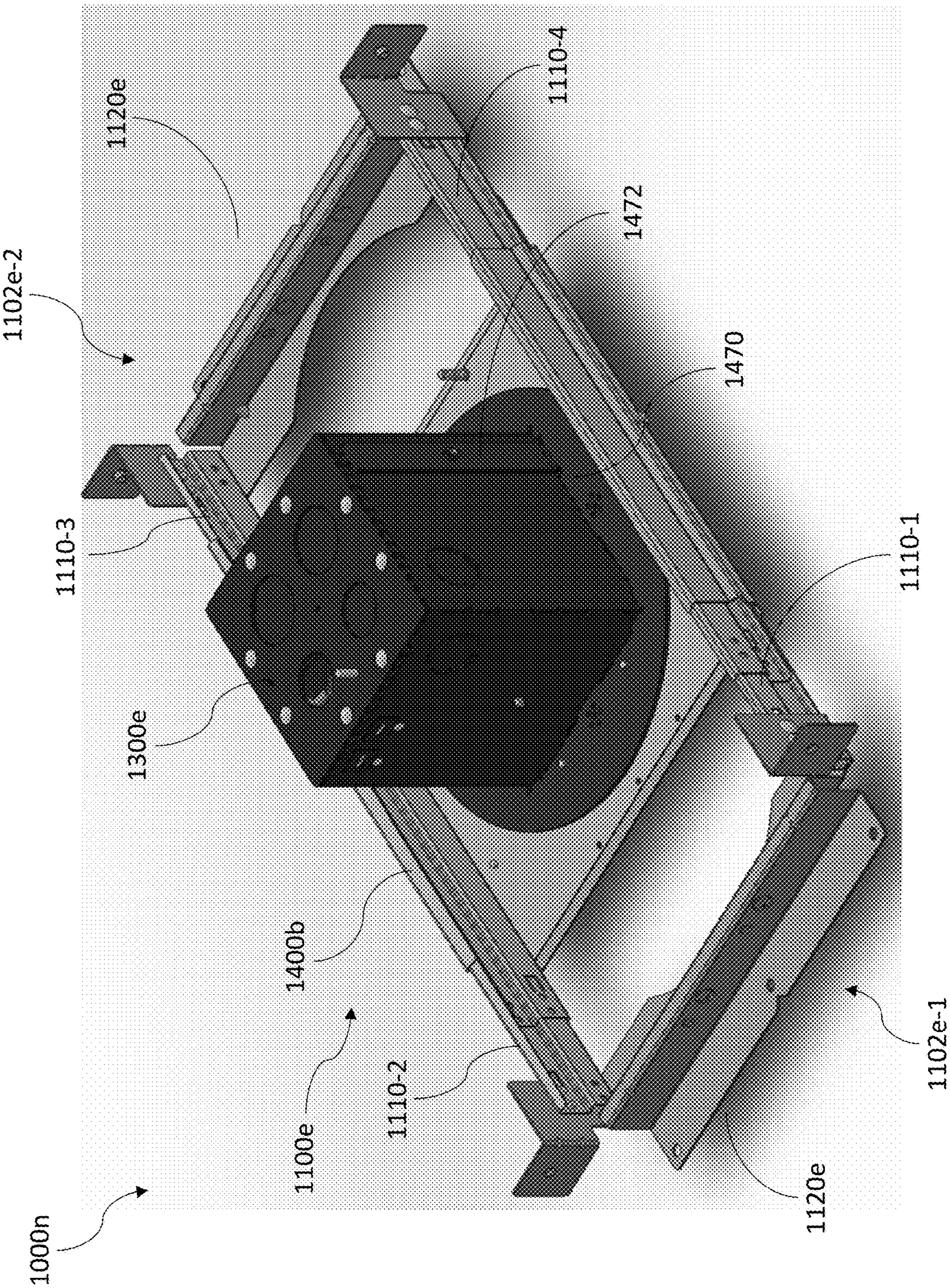
FIG. 28 shows a top, front, left perspective view of another exemplary housing assembly with a pan frame, a housing that is rotatable with respect to the pan frame, and a wide crossmember.
Figure 29:
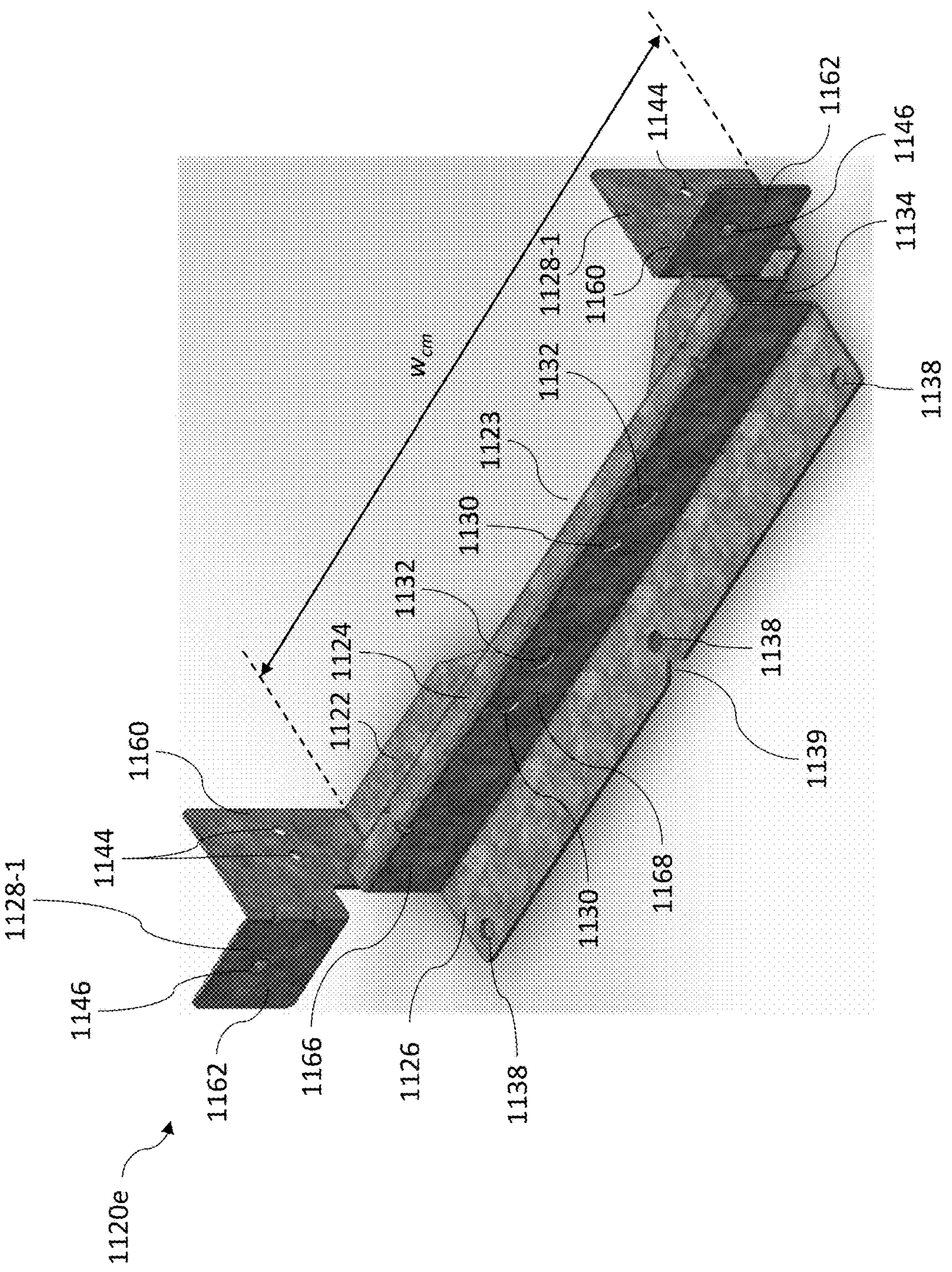
FIG. 29 shows a top, front, left perspective view of the crossmember in the housing assembly of FIG. 28.

Similar to the housing assemblies 1000*f* and 1000*h*, the housing assembly may use different crossmembers in conjunction with the pan frame 1400*b*. For example, FIG. 28 shows a housing assembly 1000*n* that includes a bar hanger assembly 1100*e* with a crossmember 1120*e*. The housing assembly 1000*n* may include the bar hangers 1110, the pan frame 1400*b*, the mounting frame 1450, and the housing 1300*e* of the housing assembly 1000*k*. FIG. 29 shows a perspective view of the crossmember 1120*e*. As shown, the crossmember 1120*e* may be a wider variant of the crossmember 1120*c* with a width, similar to the crossmember 1120*d*.

A Pan Frame With Folded Sidewall Flanges

In implementations where the housing assembly includes a pan frame, the pan frame may generally be tailored to be sufficiently rigid to reduce or, in some instances, mitigate unwanted deformation when mechanically loaded by the housing and the components contained therein. This may be accomplished in several ways. In one example, the pan frame may be formed from a sufficiently thick material (e.g., a higher gauge sheet metal) to increase the bending stiffness. In another example, the dimensions of the pan frame may be chosen to reduce the length of the moment arm corresponding to any bending moments applied to the pan frame (e.g., the load applied by the housing may impart a bending moment on the rail sections of the pan frame). In yet another example, the pan frame may include structural features (e.g., gussets, ribs) to increase its structural rigidity. For example, the pan frame may include one or more flanges that are bent with respect to the base in order to increase its bending stiffness about different bending axes without appreciably increasing the amount of material or used and/or changing the dimensions of the housing assembly.

Figure 30A:
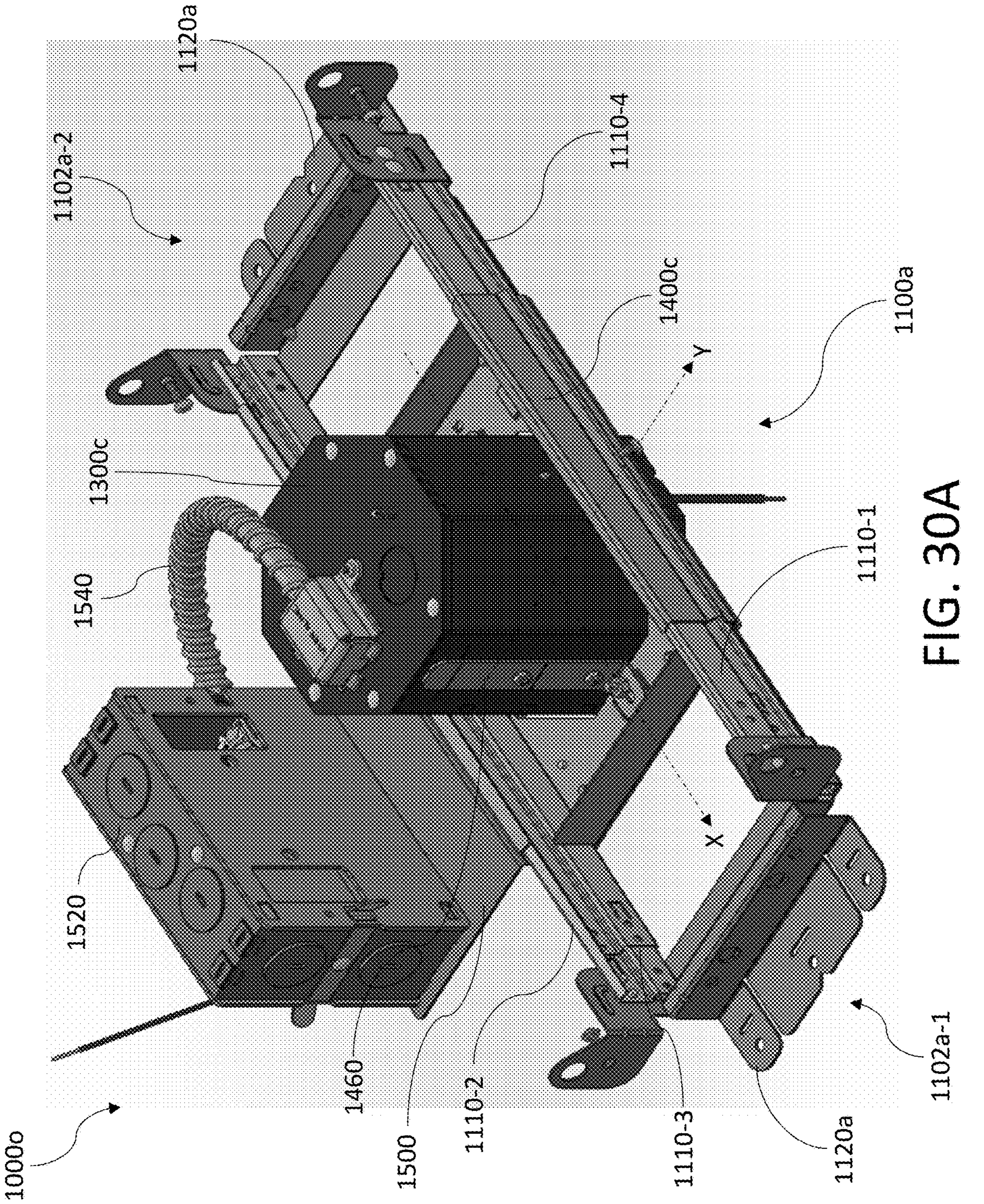
FIG. 30A shows a top, front, left perspective view of another exemplary housing assembly with a pan frame, a deep housing, and a junction box.

For example, FIG. 30A shows an exemplary housing assembly 1000*o* that includes a pan frame 1400*c* with a rectangular-shaped base 1410. As shown, the pan frame 1400*c* includes sidewall flanges 1434 disposed on the opposing short sides of the base 1410 to increase the bending stiffness of the pan frame 1400*c* about an X axis. The sidewall flanges 1434 may be flat and may be oriented at a right angle with respect to the base 1410. The pan frame 1400*c* may also include rail sections 1414 disposed on the opposing long sides of the base 1410 to increase the bending stiffness of the pan frame 1400*c* about a Y axis. It should be appreciated the rail sections 1414 in the pan frames 1400*a* and 1400*b* similarly increase the bending stiffness about the Y axis.

Figure 30B:
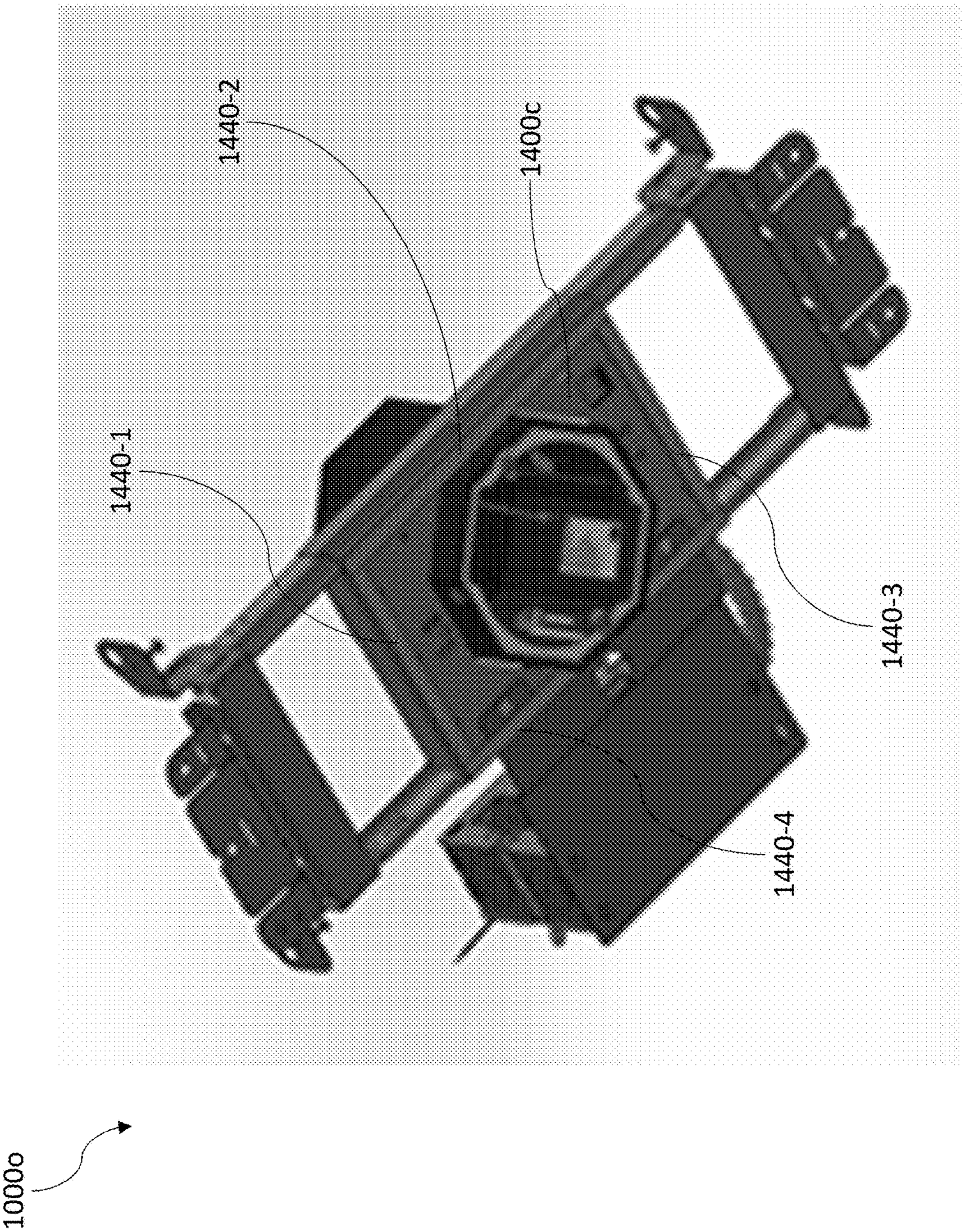
FIG. 30B shows a bottom perspective view of the housing assembly of FIG. 30A where gaskets are shown coupled to the pan frame.

As shown, the housing assembly 1000*o* may include several of the same components as some of the above housing assemblies, such as the bar hanger assembly 1100*a*, the side plate 1500, the junction box 1520, the cable 1540, the housing 1300*c*, and the brackets 1460. In some implementations, the housing assembly 1000*o* may further include one or more gaskets to form an air-tight seal. For example, FIG. 30B shows gaskets 1440-1-1440-4 may be coupled to the bottom of the pan frame 1400*c* using, for example, pressure sensitive adhesive. Thus, the gaskets 1440-1-1440-4 and, by extension, the housing assembly 1000*o* may be disposed on the ceiling panel after installation.

Figure 30C:
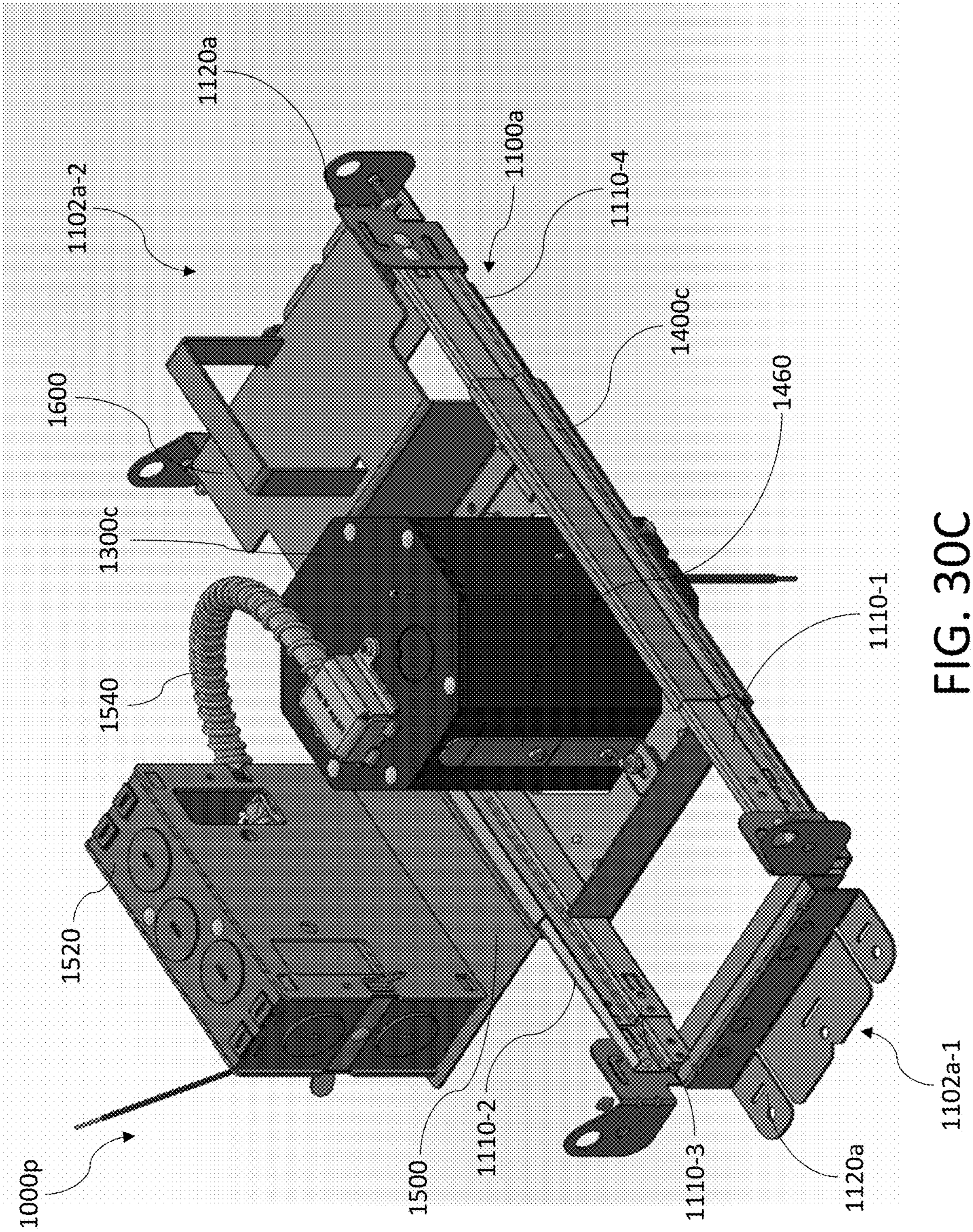
FIG. 30C shows a top, front, left perspective view of another exemplary housing assembly with a pan frame, a deep housing, a junction box, and a bracket.

The pan frame 1400*c* may also support different housing assembly variants. For example, FIG. 30C shows another housing assembly 1000*p*, which is a variant of the housing assembly 1000*o* that includes a bracket 1600. As shown, the bracket 1600 may be mounted in a similar manner to the above housing assemblies despite the presence of the sidewall flanges 1434. Specifically, the bracket 1600 may be partially disposed between the housing 1300*c* and the sidewall flange 1434.

Figure 31:
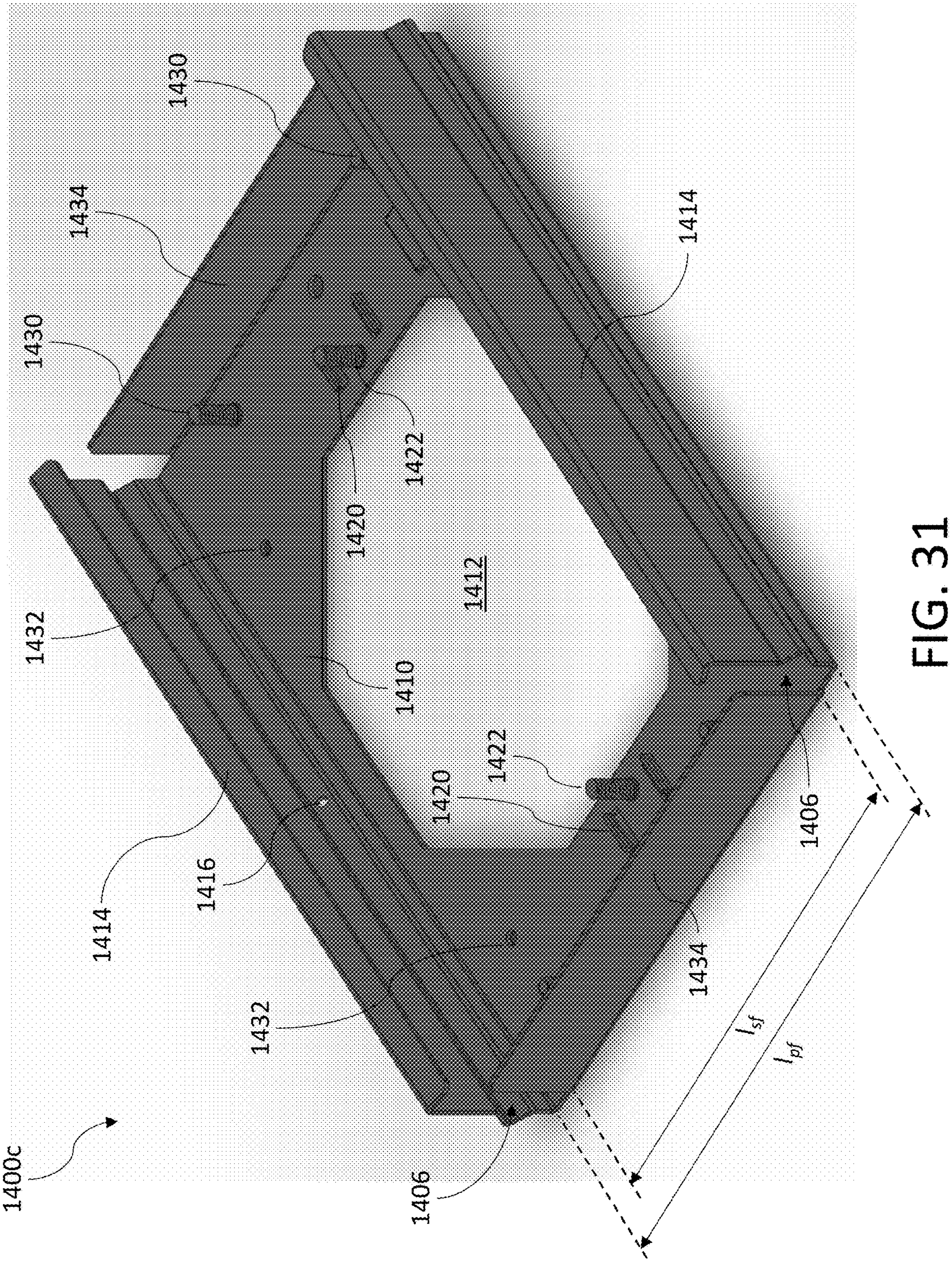
FIG. 31 shows a top, front, left perspective view of the pan frame in the housing assembly of FIGS. 30A-30C.

FIG. 31 shows a perspective view of the pan frame 1400*c*. As shown, the pan frame 1400*c* may include several of the same features as the pan frame 1400*a* to couple the pan frame 1400*c* to the housing 1300*c* and/or the bar hanger assembly 1200*a*. In some implementations, the pan frame 1400*c* may be substantially identical to the pan frame 1400*a* with the primary difference being the inclusion of the sidewall flanges 1434. As described above, the sidewall flanges 1434 may be disposed along the edges of the base 1410 between the rails 1414. In some implementations, each sidewall flange 1434 may have a length ($l_{sf}$) that spans most of the length of the respective short sides ($l_{pf}$) of the base 1410. Said in another way, the length, $l_{sf}$, may be chosen to be sufficiently smaller than the length, $l_{pf}$, to provide sufficient clearance for the passageways 1406 formed by the rail sections 1414 disposed on the opposing long sides of the base 1410 to receive the bar hangers 1110. It should be appreciated that, in other implementations, multiple sidewall flanges may be disposed on the short sides of the base 1410 with a shorter length than the sidewall flange 1434. The sidewall flanges 1434 may be formed by bending a portion of the pan frame during manufacture. The sidewall flanges 1434 may be oriented substantially orthogonal with respect to the base 1410 and the rail sections 1414.

Figure 32:
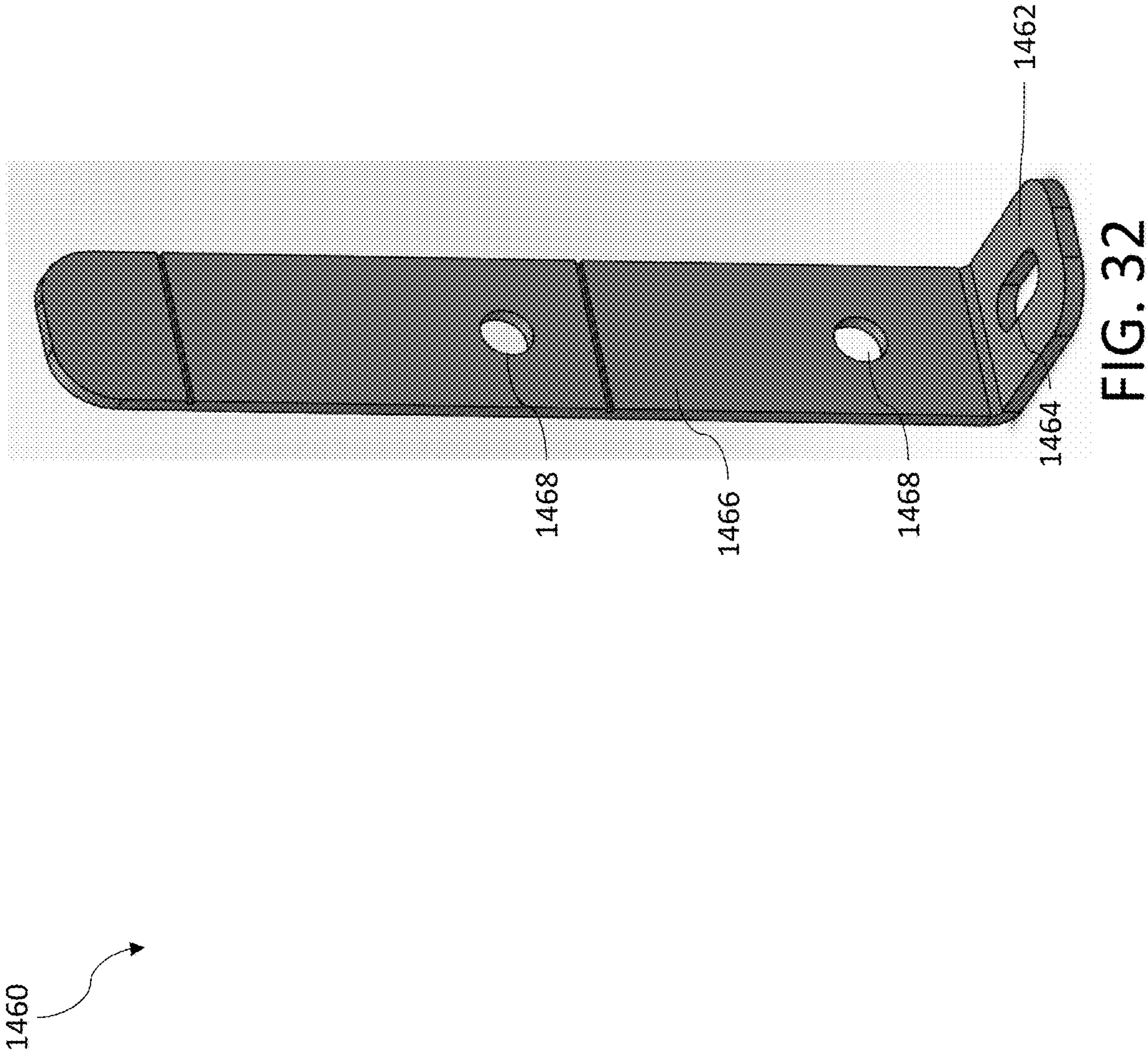
FIG. 32 shows a perspective view of the mounting bracket in the housing assembly of FIGS. 30A-30C.

FIG. 32 shows the mounting bracket 1460 to couple the housing 1300*c* to the pan frame 1400*c*. The mounting bracket 1460 may be similar to the mounting brackets described above. For example, the mounting bracket 1460 may include an L-shaped structure with an arm 1466 and an arm 1462. The arm 1466 may include one or more openings to receive corresponding fasteners that couple the bracket 1460 to the sidewall of the housing 1300*c*. The arm 1462 may include the slot 1464 to receive the rod 1422 on the pan frame 1400*c*. A locking nut (not shown) may securely couple the rod 1422 to the bracket 1460.

Figure 33A:
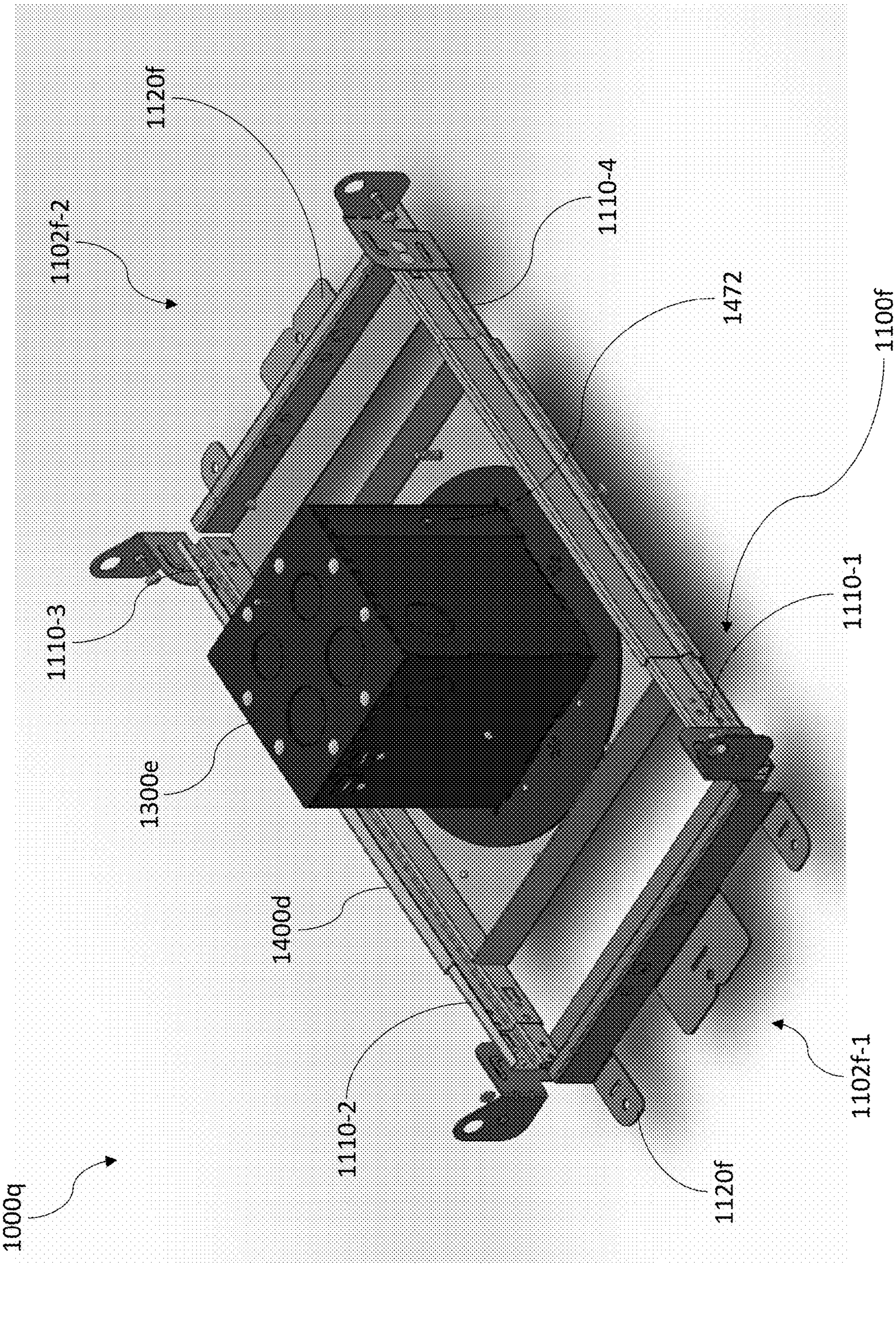
FIG. 33A shows a top, front, left perspective view of another exemplary housing assembly with a pan frame and a housing that is rotatable with respect to the pan frame.
Figure 33B:
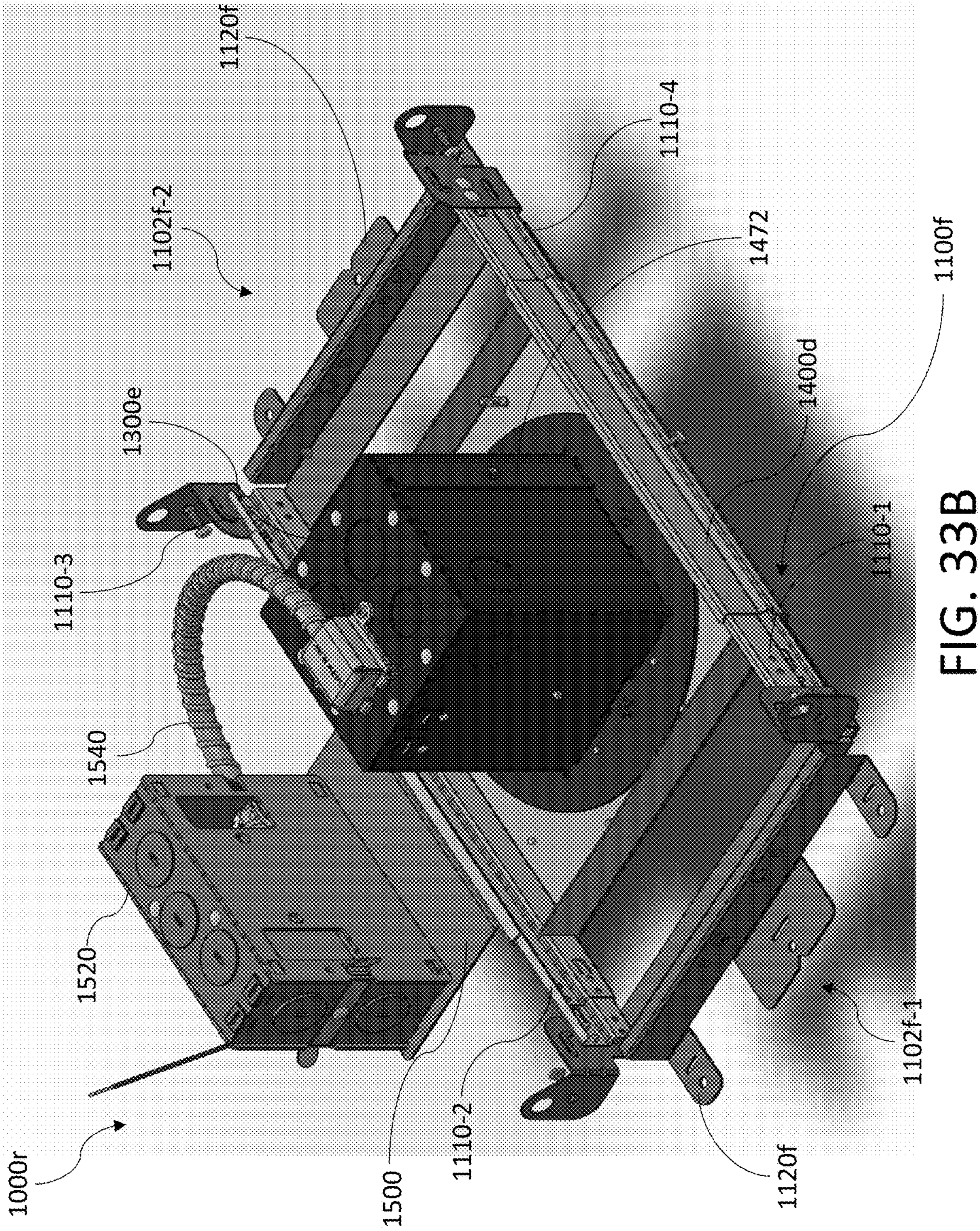
FIG. 33B shows a top, front, left perspective view of another exemplary housing assembly with a pan frame, a housing that is rotatable with respect to the pan frame, and a junction box.
Figure 33C:
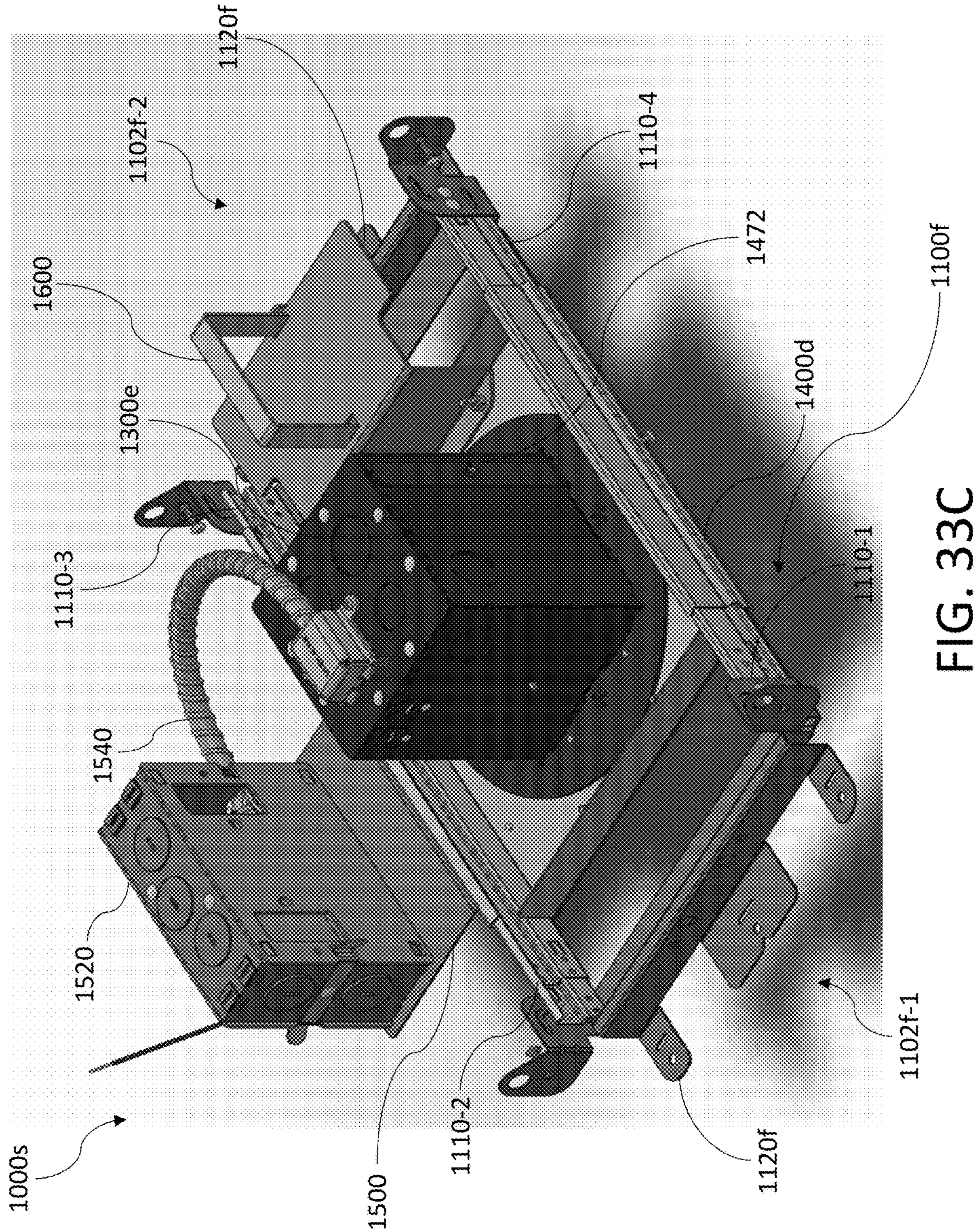
FIG. 33C shows a top, front, left perspective view of another exemplary housing assembly with a pan frame, a housing that is rotatable with respect to the pan frame, a junction box, and a bracket.

The pan frame supporting the rotatable housing 1300*e* may also include sidewall flanges to improve the mechanical rigidity of the pan frame in the same manner as the pan frame 1400*c*. For example, FIG. 33A shows a housing assembly 1000*q* that includes the rotatable housing 1300*e* and a pan frame 1400*d* with the sidewall flanges 1434. As before, the housing 1300*e* may be mounted to the pan frame 1400*d* via the mounting bracket 1472. FIG. 33B shows another housing assembly 1000*r*, which is a variant of the housing assembly 1000*q* that includes the side plate 1500, the junction box 1520, and the cable 1540. FIG. 33C shows another housing assembly 1000*s*, which is a variant of the housing assembly 1000*r* that includes the bracket 1600.

Figure 34:
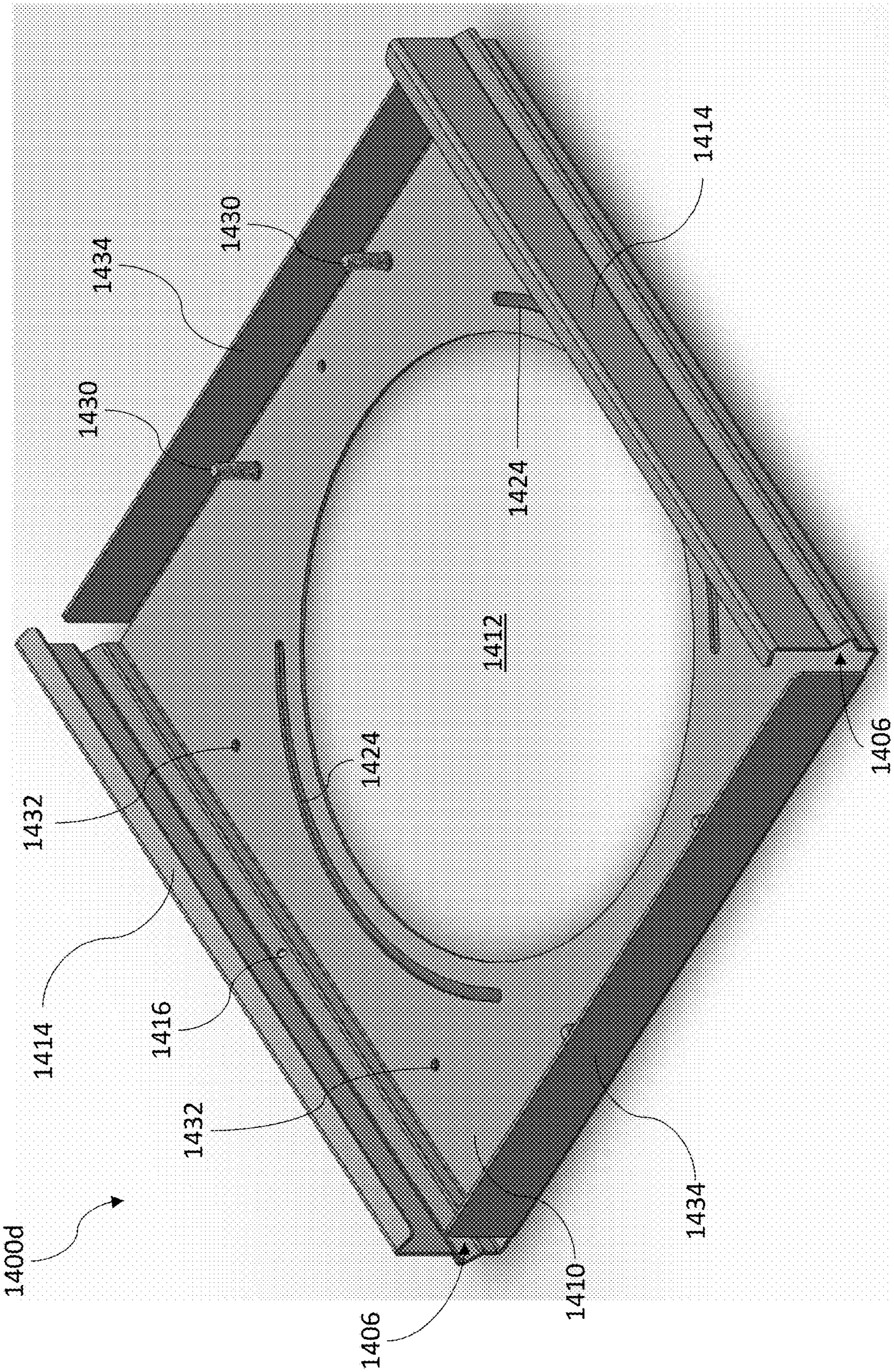
FIG. 34 shows a top, front, left perspective view of the pan frame in the housing assembly of FIGS. 33A-33C.

FIG. 34 shows a perspective view of the pan frame 1400*d*. As shown, the pan frame 1400*d* may be similar to the pan frame 1400*b* with the difference being the inclusion of the sidewall flanges 1434. Similar to the pan frame 1400*c*, the flanges 1434 in the pan frame 1400*d* may be disposed along the edges of the base 1410 and oriented orthogonal with respect to the base 1410 and the rails 1414 to increase the structural rigidity of the pan frame 1400*d*. The sidewall flanges 1434 may also span most of the length of the sides of the base 1410 between the rail sections 1414.

Figure 35:
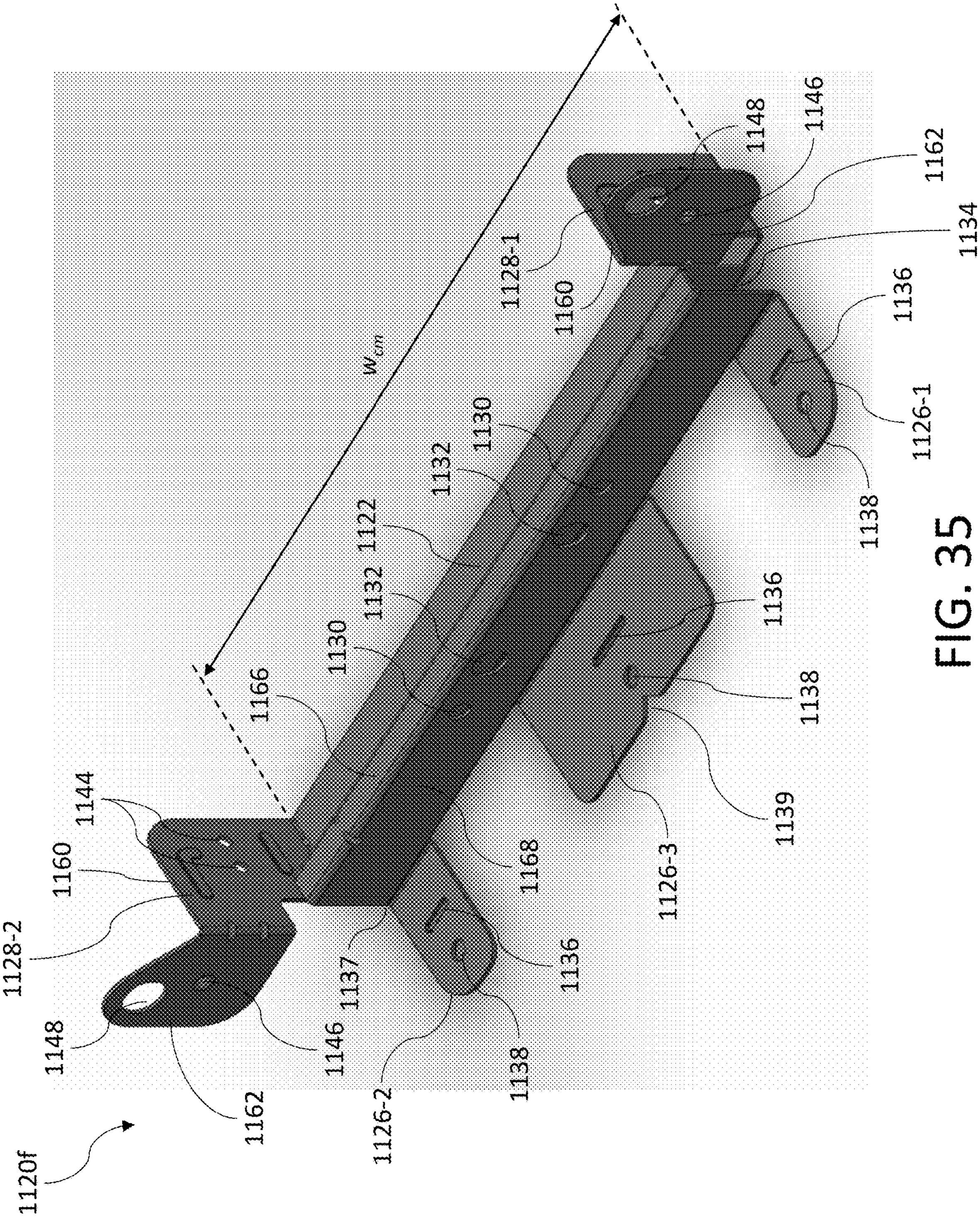
FIG. 35 shows a perspective view of the crossmember in the housing assembly of FIGS. 33A-33C.

Additionally, the housing assembly 1000*q* may include a bar hanger assembly 1100*f* with a crossmember 1120*f*. The crossmember 1120*f* may be a wider variant of the crossmember 1120*a*. FIG. 35 shows a perspective view of the crossmember 1120*f*. As shown, the crossmember 1120*f* may include the same structural features as the crossmember 1120*a*. For example, the crossmember 1120*f* may include a base 1122 joined to a guide 1124 with wall sections 1166 and 1168 (the wall section 1164 is not observable in FIG. 35) that define a channel 1134 and include openings 1130 and 1132 spaced apart in the same manner as the crossmember 1120*a*. The crossmember may further include flanges 1126-1, 1126-2, and 1126-3 joined to the wall section 1168 of the guide 1124. Compared to the crossmember 1120*a*, the flanges 1126-1, 1126-2, and 1126-3 of the crossmember 1120*f* may be spaced apart to span the width of the guide 1124 while having similar dimensions as the flanges 1126-1, 1126-2, and 1126-3 of the crossmember 1120*a*. As a result, the flange 1126-3 may be separated from the flanges 1126-1 and 1126-2 by a gap. The width, $w_{cm}$, of the crossmember 1120*f* may be similar to the width of the crossmembers 1120*d* and 1120*e*.

Figure 36A:
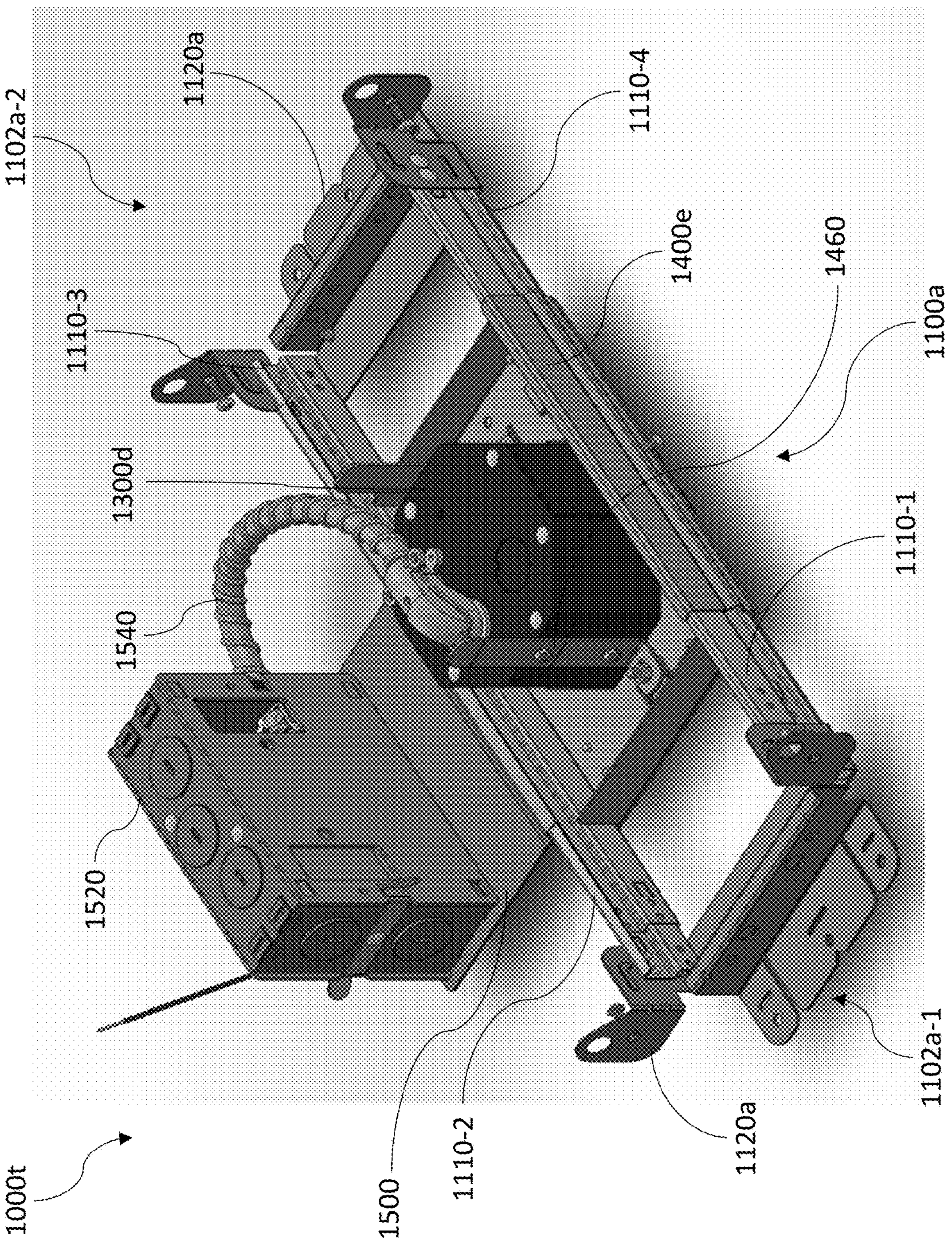
FIG. 36A shows a top, front, left perspective view of another exemplary housing assembly with a pan frame, a shallow housing, and a junction box.
Figure 36B:
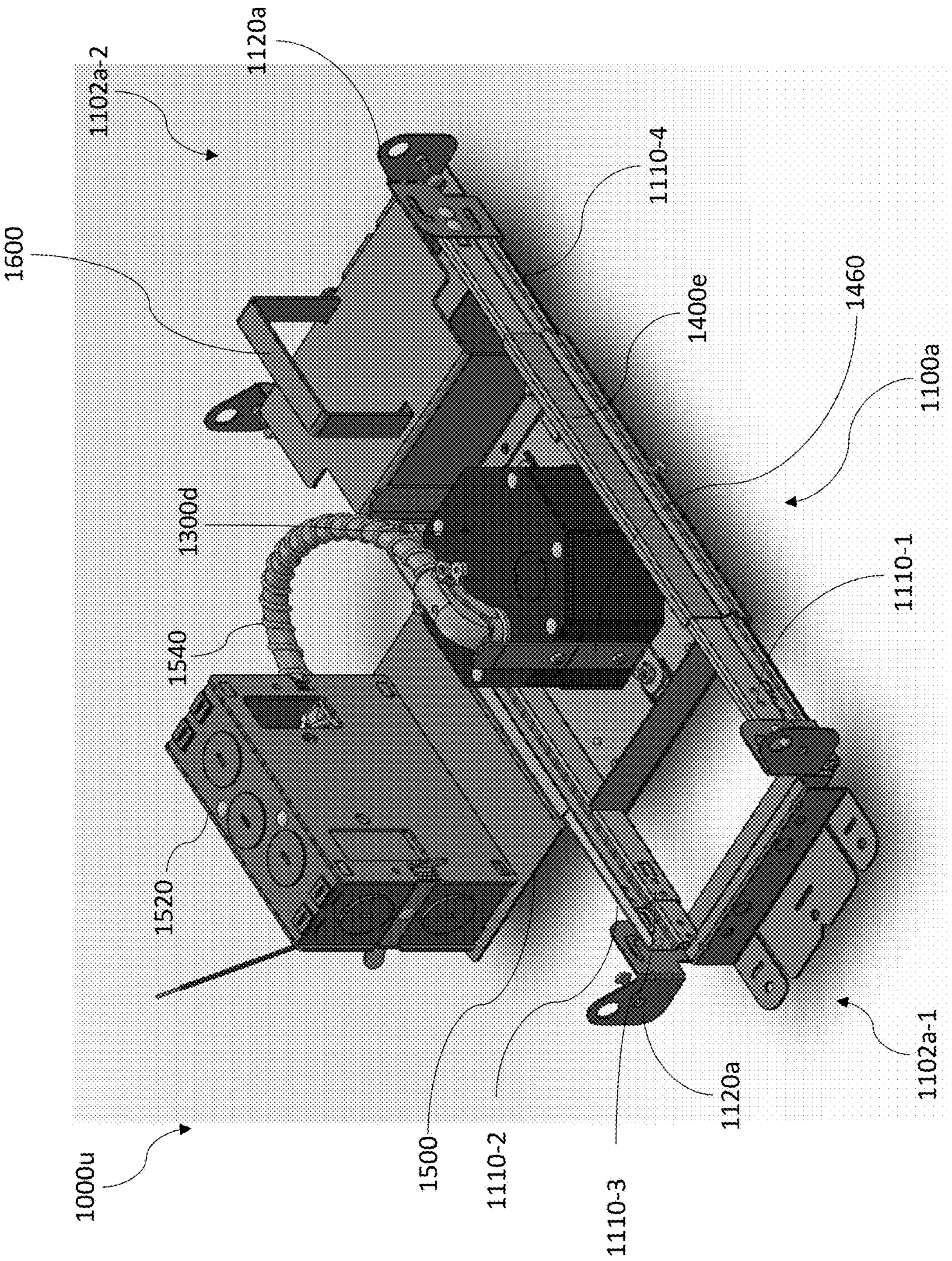
FIG. 36B shows a top, front, left perspective view of another exemplary housing assembly with a pan frame, a shallow housing, a junction box, and a bracket.

FIG. 36A shows yet another housing assembly 1000*t* with a pan frame 1400*e* tailored for the shallow housing 1300*d*. The pan frame 1400*e* may be similar to the pan frame 1400*c* with the main difference being the opening 1412 may be dimensioned to be smaller than the opening 1412 of the pan frame 1400*c* based on the smaller characteristic width of the housing 1400*e*. As shown, the housing assembly 1000*t* may include the bar hanger assembly 1100*a*, the side plate 1500, junction box 1520, and the cable 1540. The housing 1400*e* may once again be coupled to the pan frame 1400*e* via the mounting bracket 1462. FIG. 36B shows another housing assembly 1000*u*, which is a variant of the housing assembly 1000*t* that includes the bracket 1600.

Figure 37:
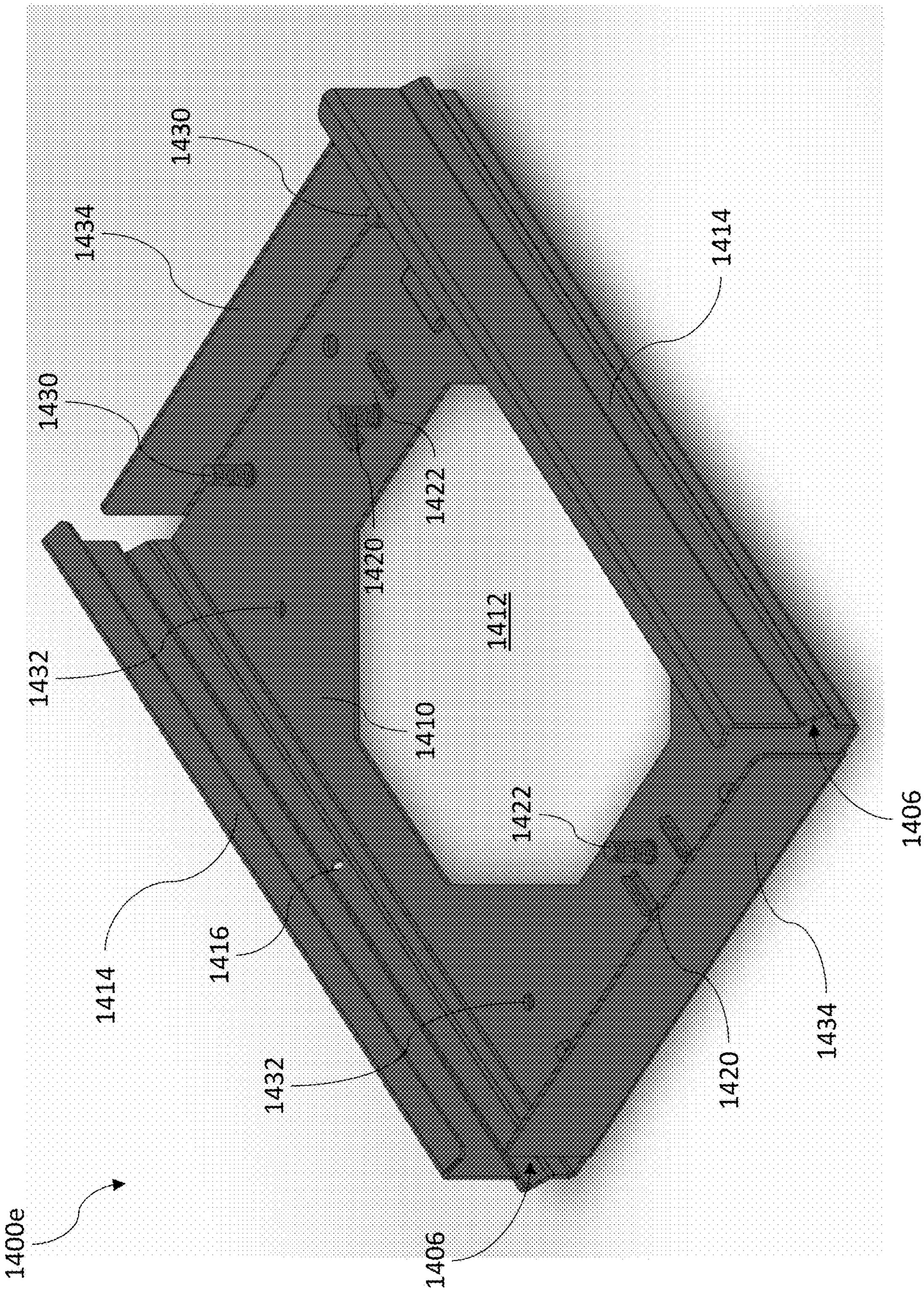
FIG. 37 shows a top, front, left perspective view of the pan frame in the housing assembly of FIGS. 36A and 36B.
Figure 38A:
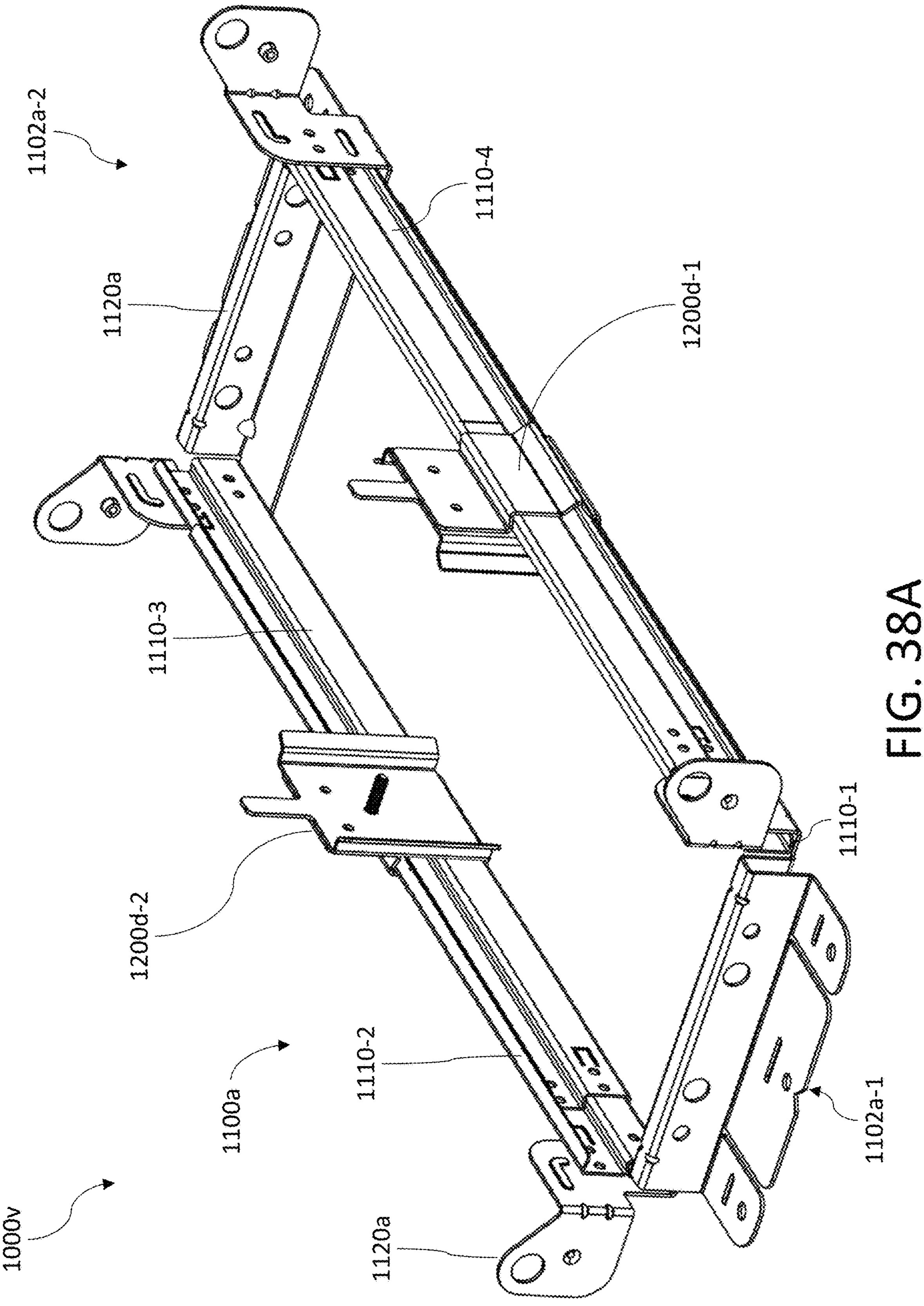
FIG. 38A shows a top, front, left perspective view of an exemplary housing assembly with a single-piece bar hanger holder. The housing is not shown for clarity.
Figure 38B:
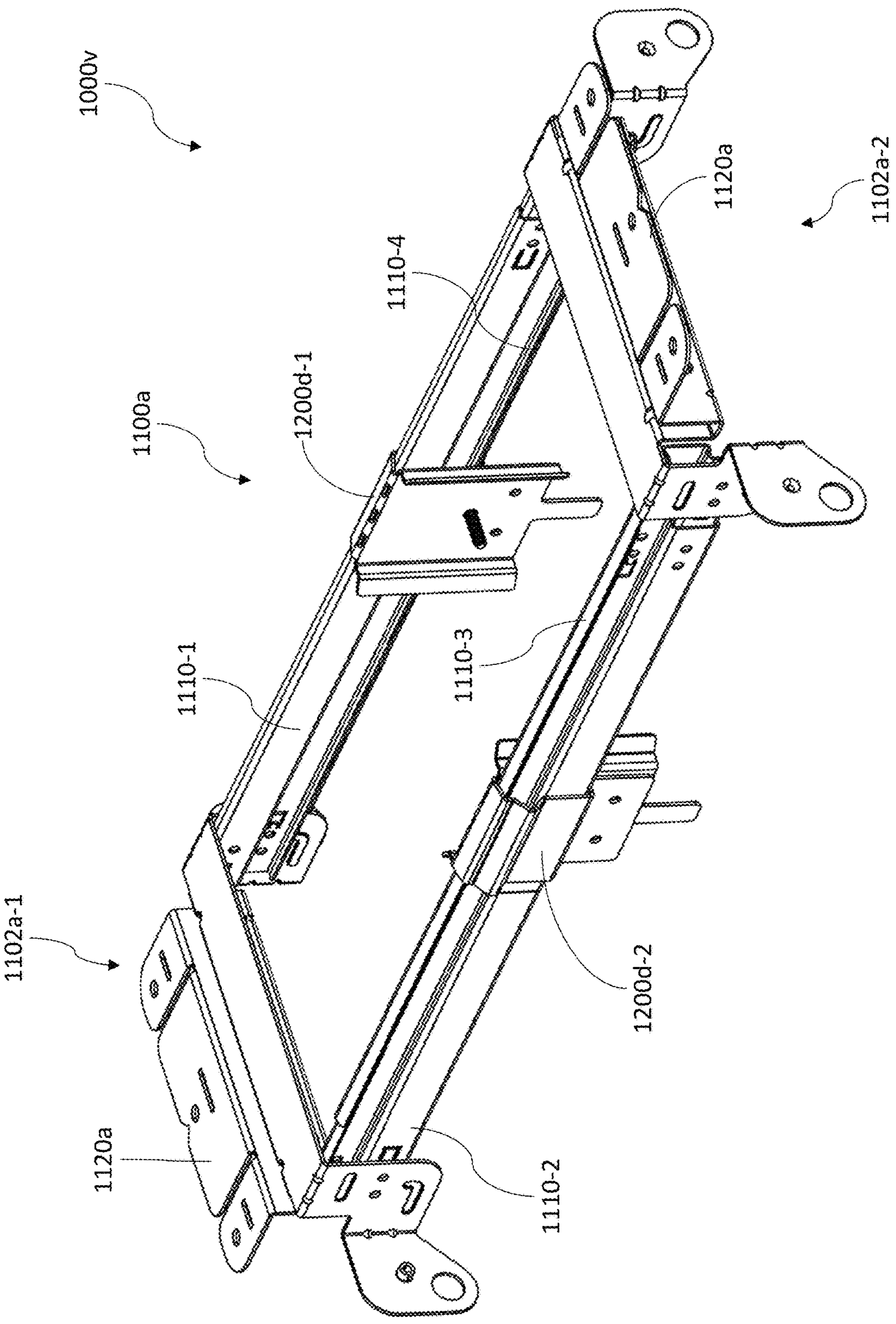
FIG. 38B shows a bottom, rear, right perspective view of the housing assembly of FIG. 38A.
Figure 38C:
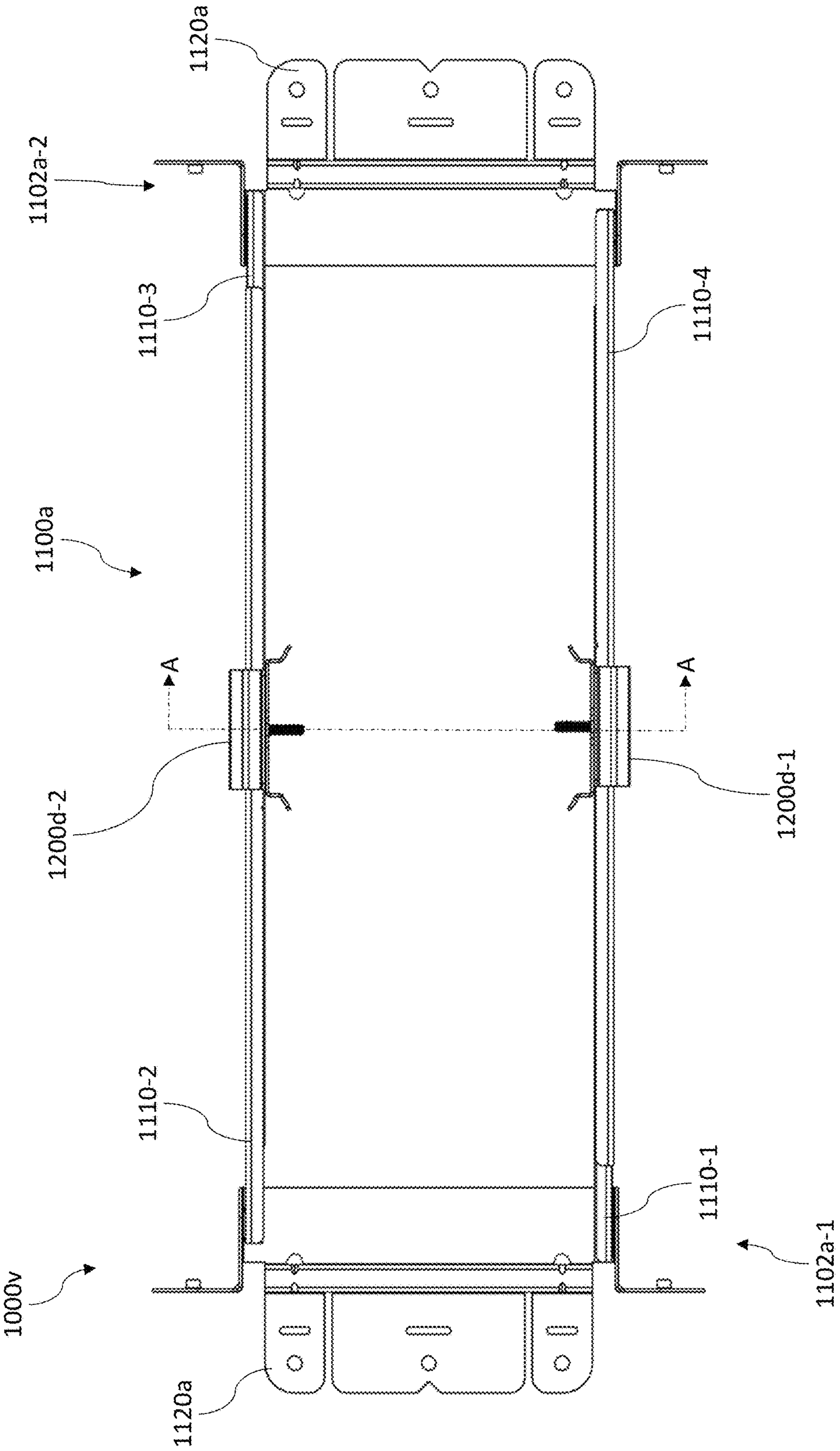
FIG. 38C shows a top view of the housing assembly of FIG. 38A.
Figure 38D:
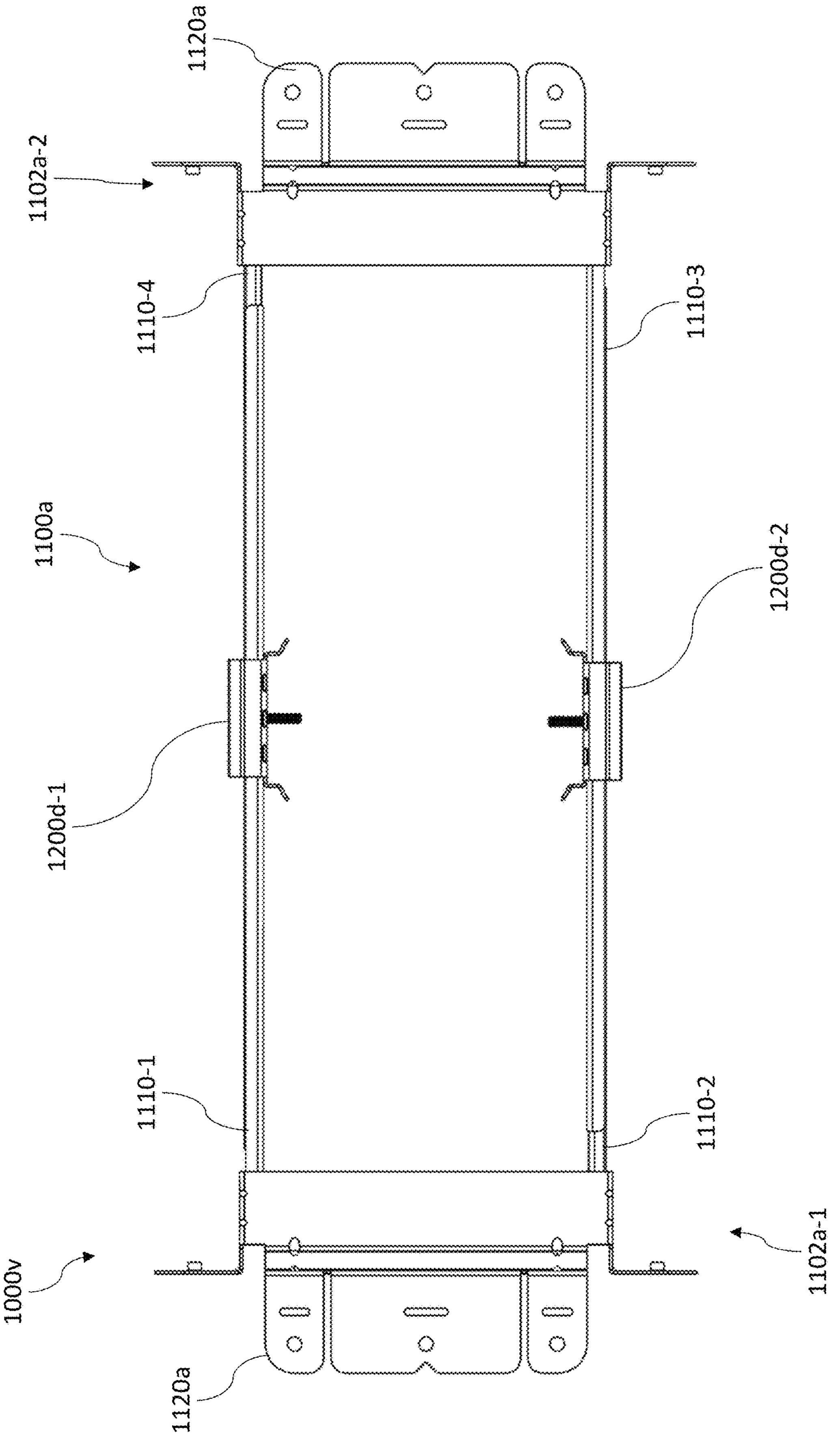
FIG. 38D shows a bottom view of the housing assembly of FIG. 38A.
Figure 38E:
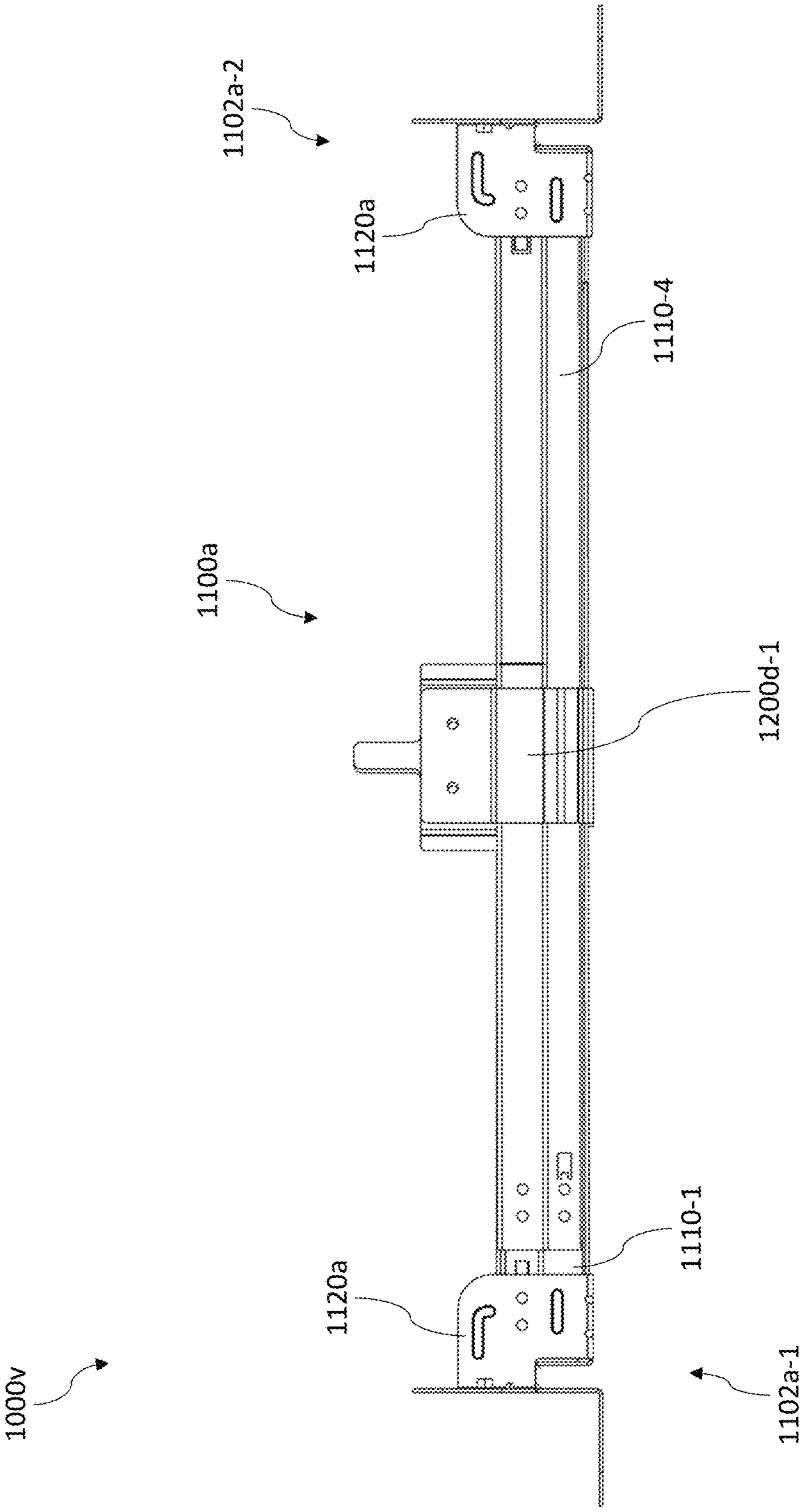
FIG. 38E shows a front view of the housing assembly of FIG. 38A.
Figure 38F:
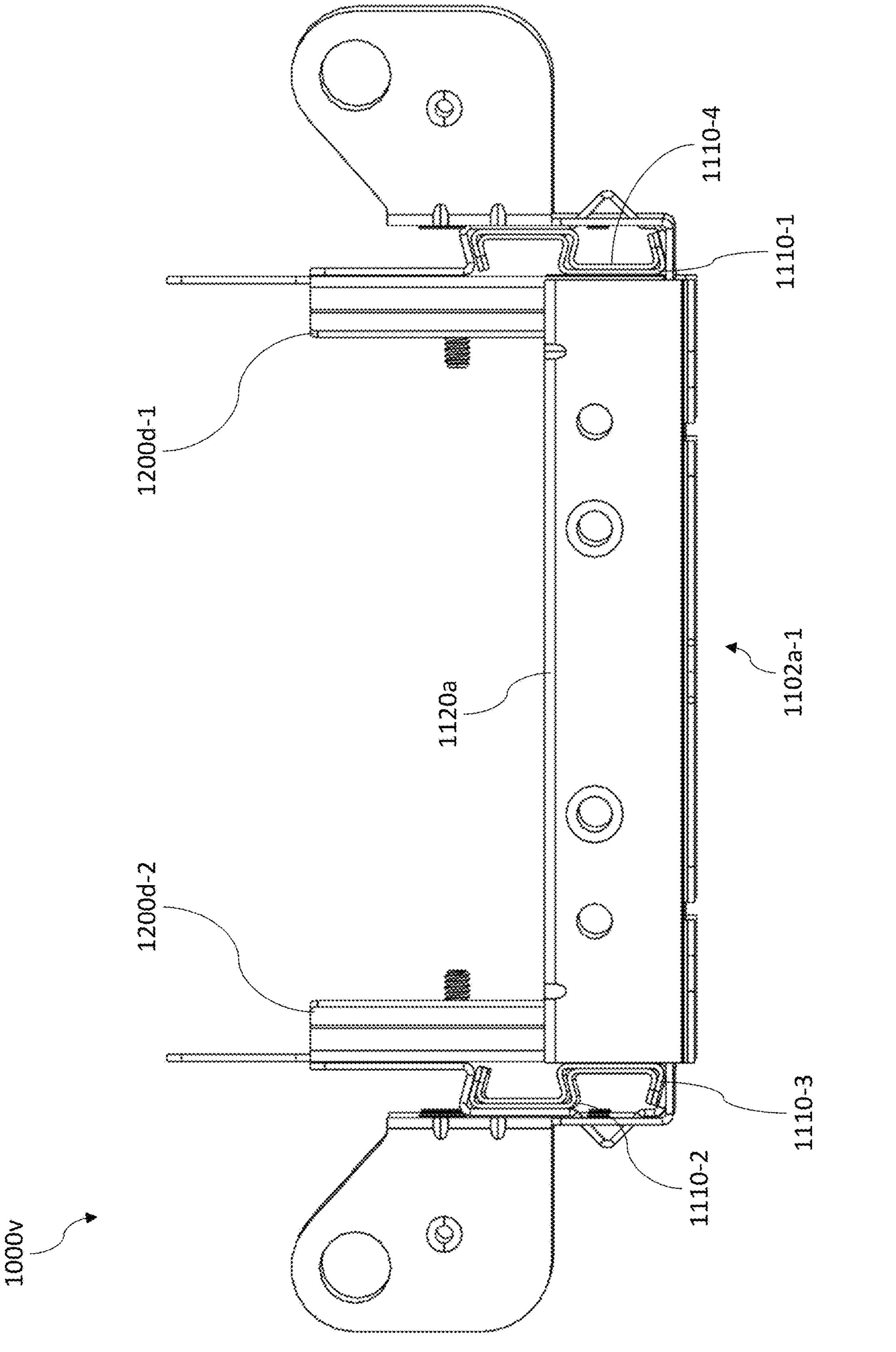
FIG. 38F shows a left-side view of the housing assembly of FIG. 38A.
Figure 38G:
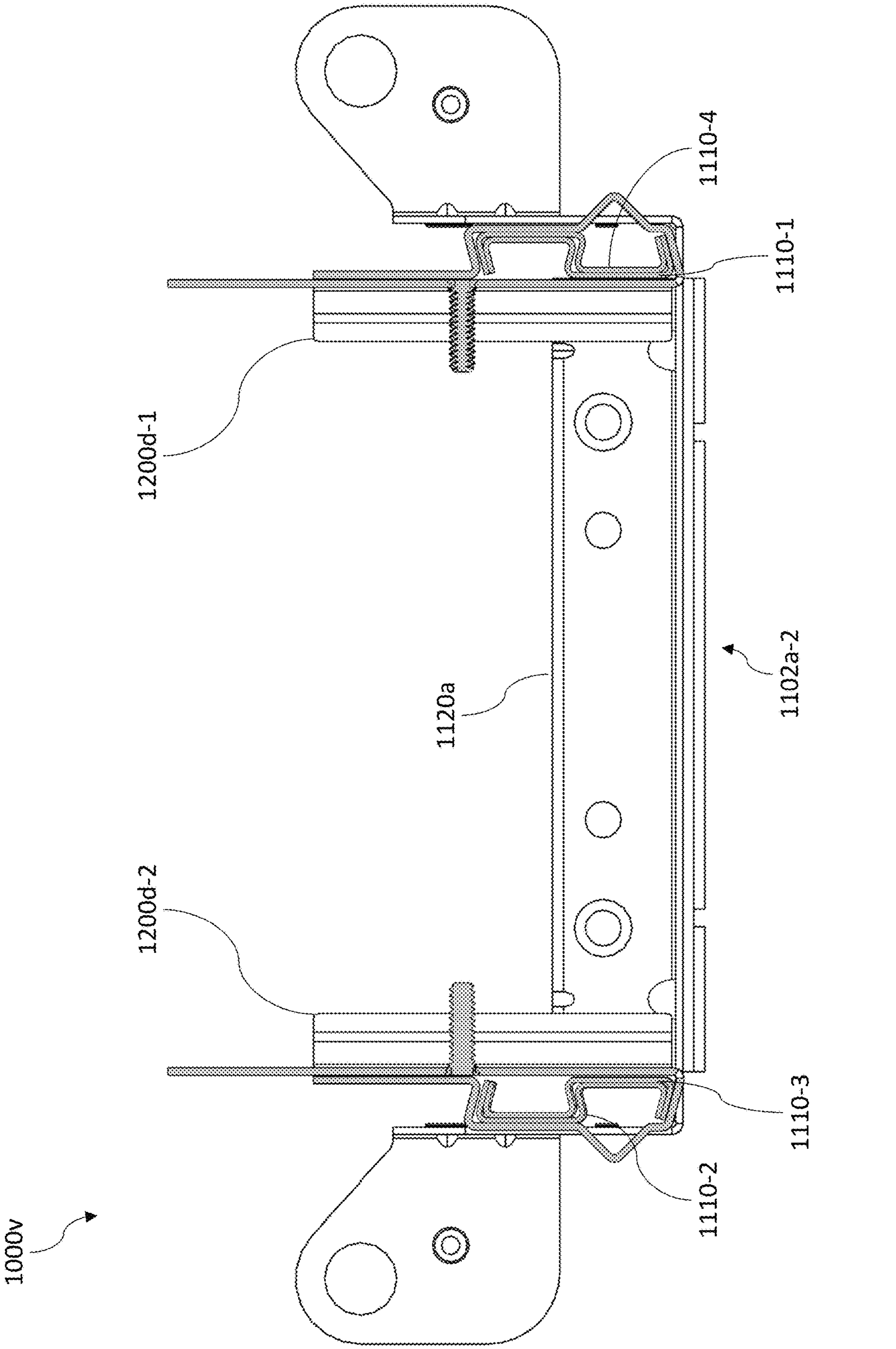
FIG. 38G shows a cross-sectional view of the housing assembly corresponding the plane A-A of FIG. 38C.
Figure 39A:
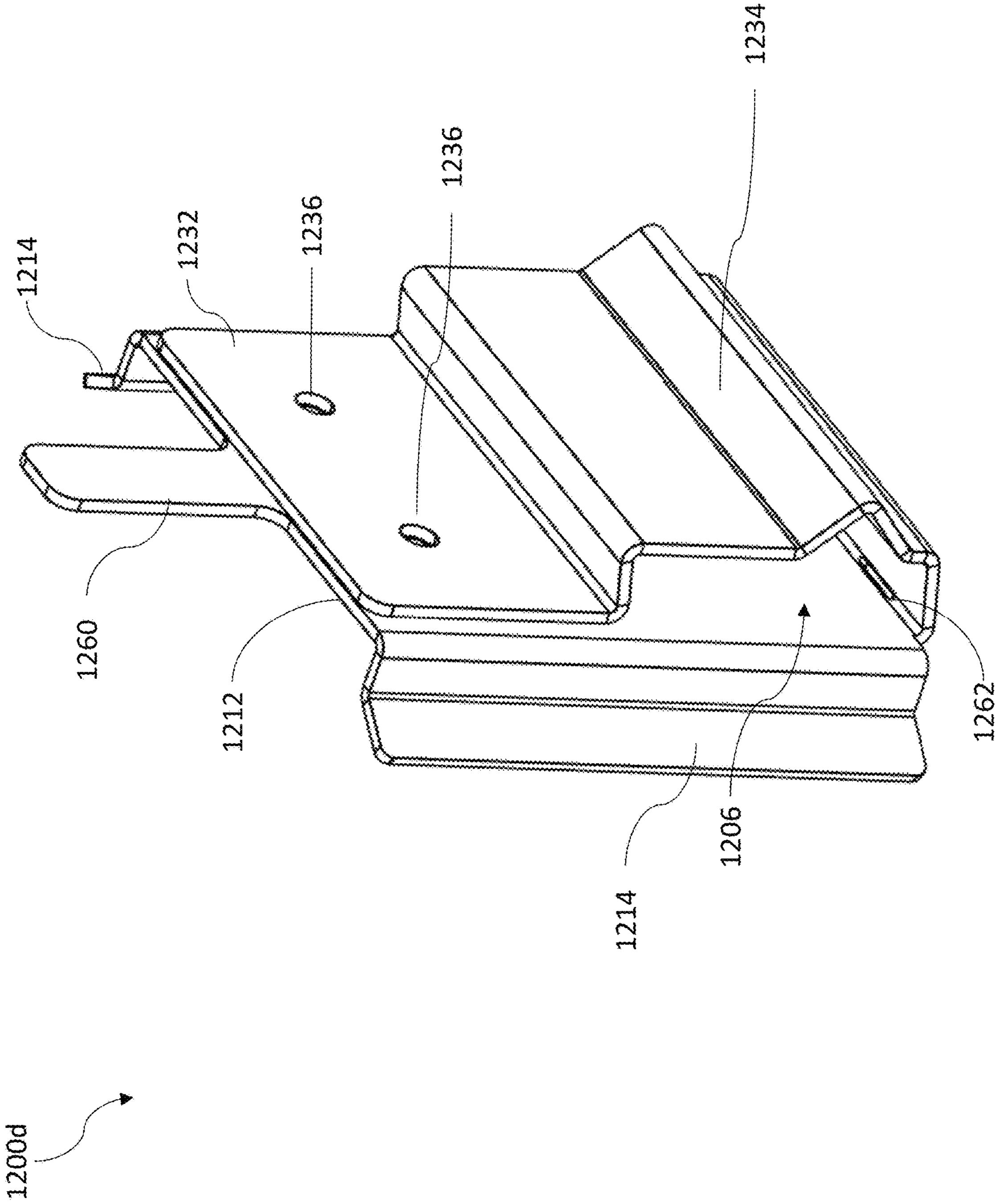
FIG. 39A shows a top, front, left perspective view of a bar hanger holder in the housing assembly of FIG. 38A.
Figure 39B:
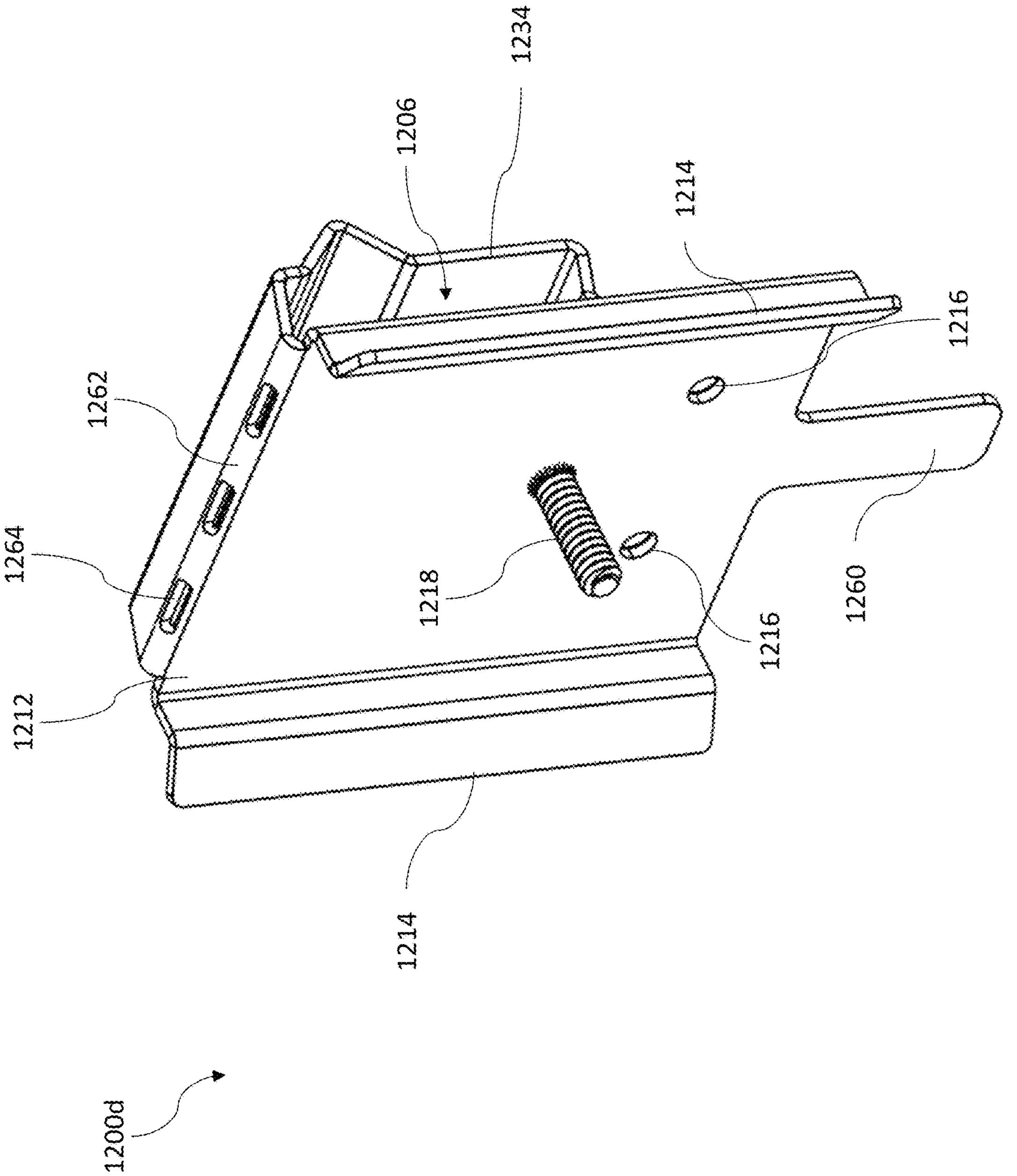
FIG. 39B shows a bottom, rear, right perspective view of the bar hanger holder of FIG. 39A.
Figure 39C:
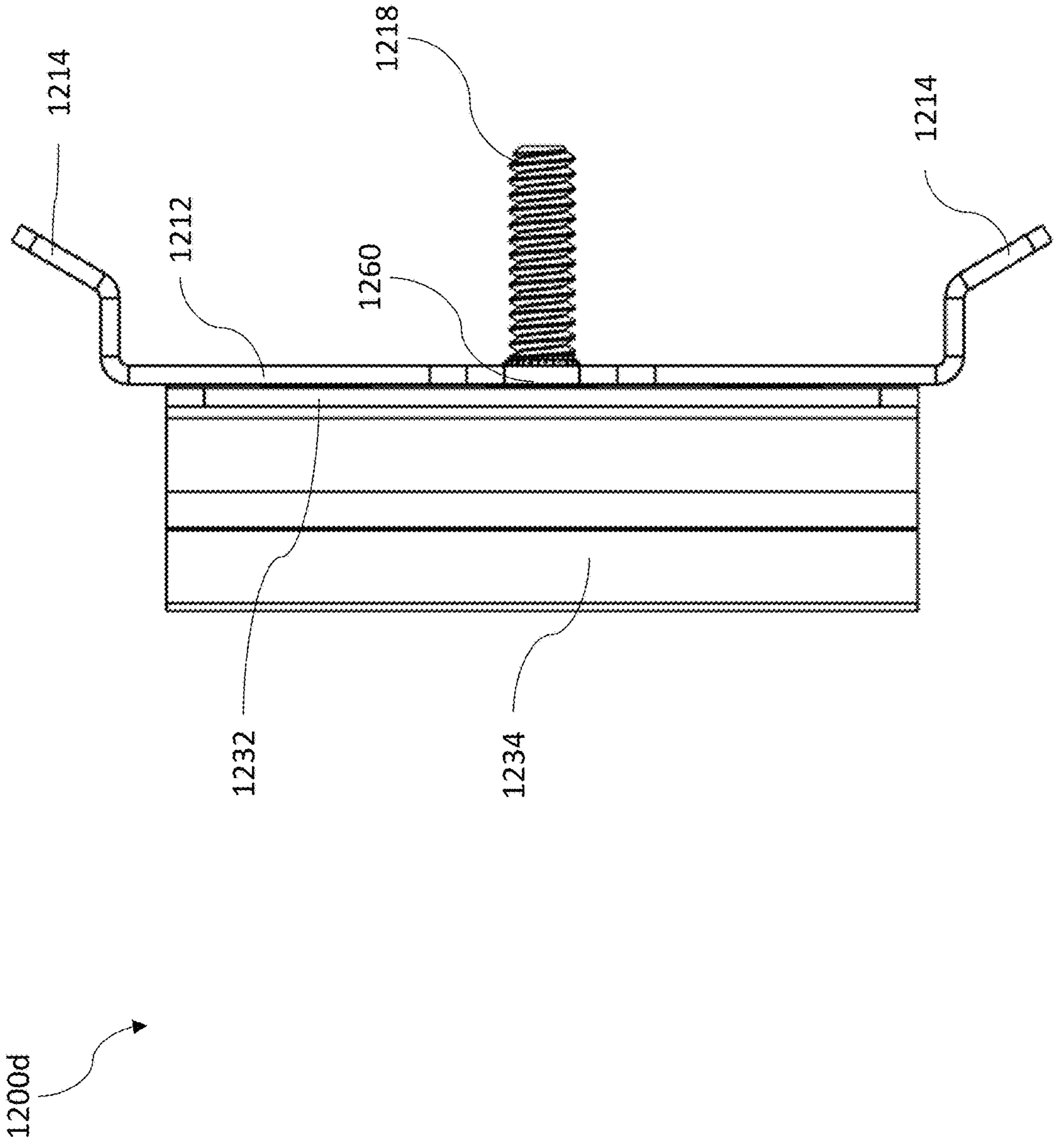
FIG. 39C shows a top view of the bar hanger holder of FIG. 39A.
Figure 39D:
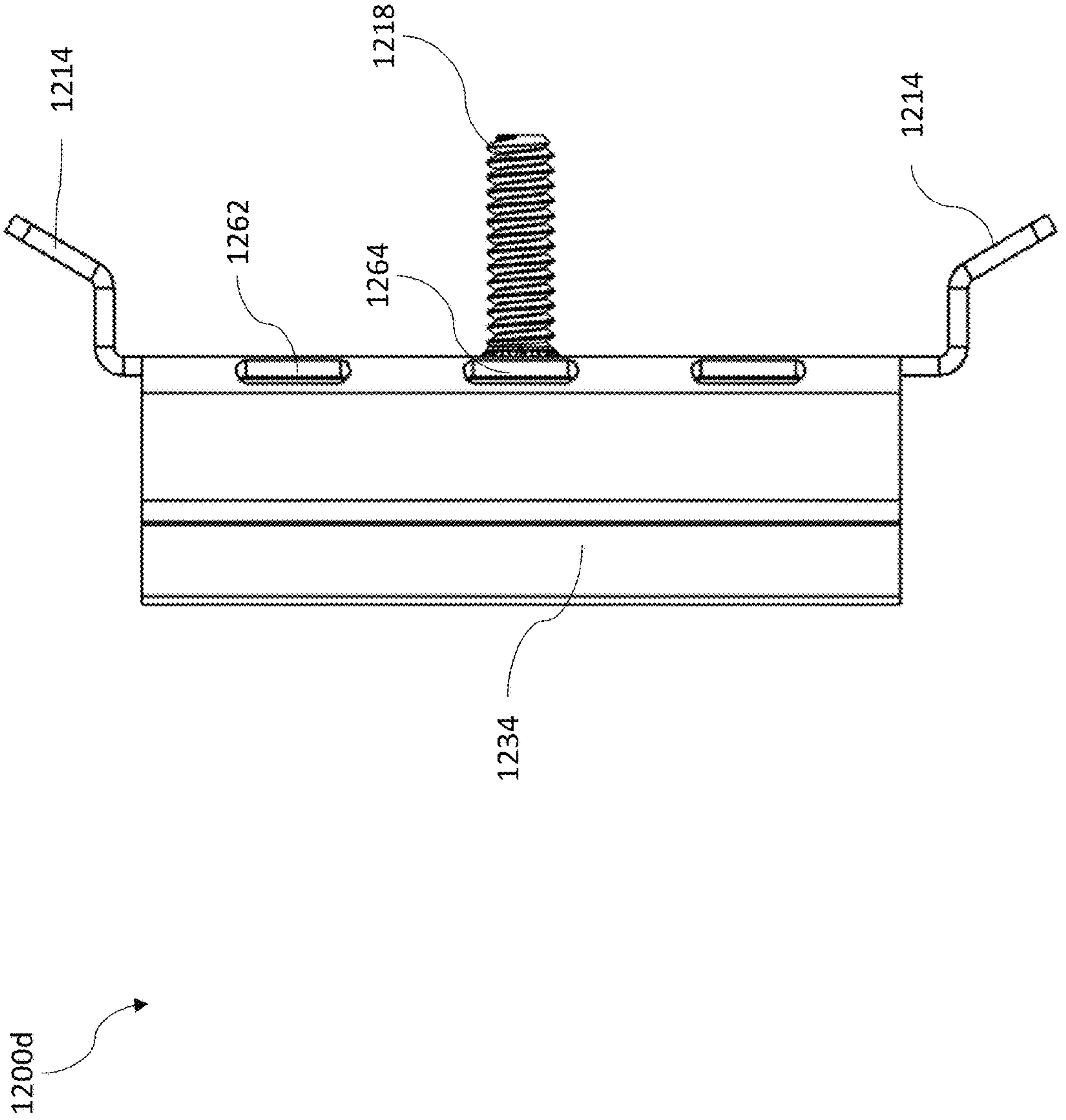
FIG. 39D shows a bottom view of the bar hanger holder of FIG. 39A.
Figure 39E:
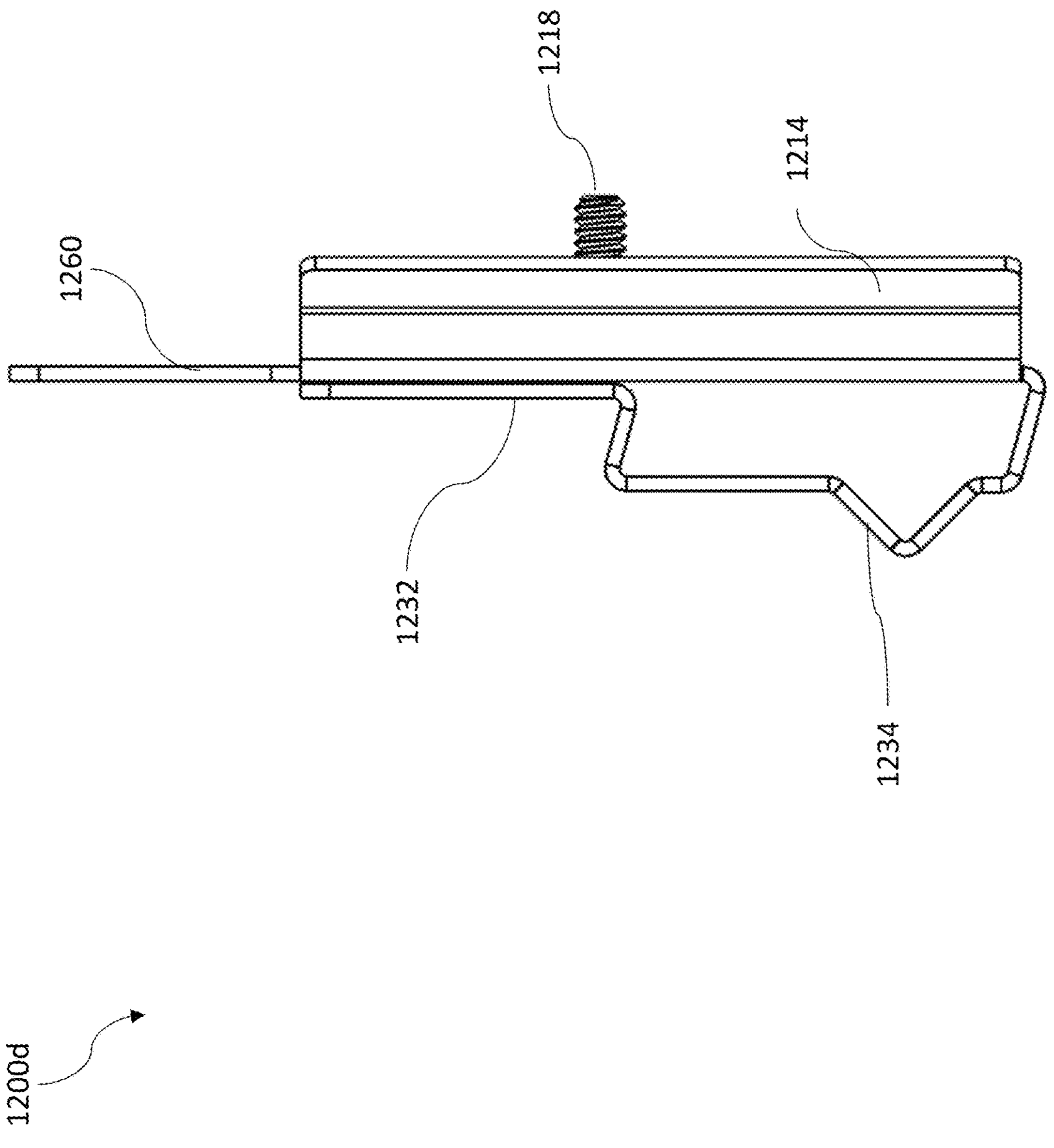
FIG. 39E shows a right-side view of the bar hanger holder of FIG. 39A.
Figure 39F:
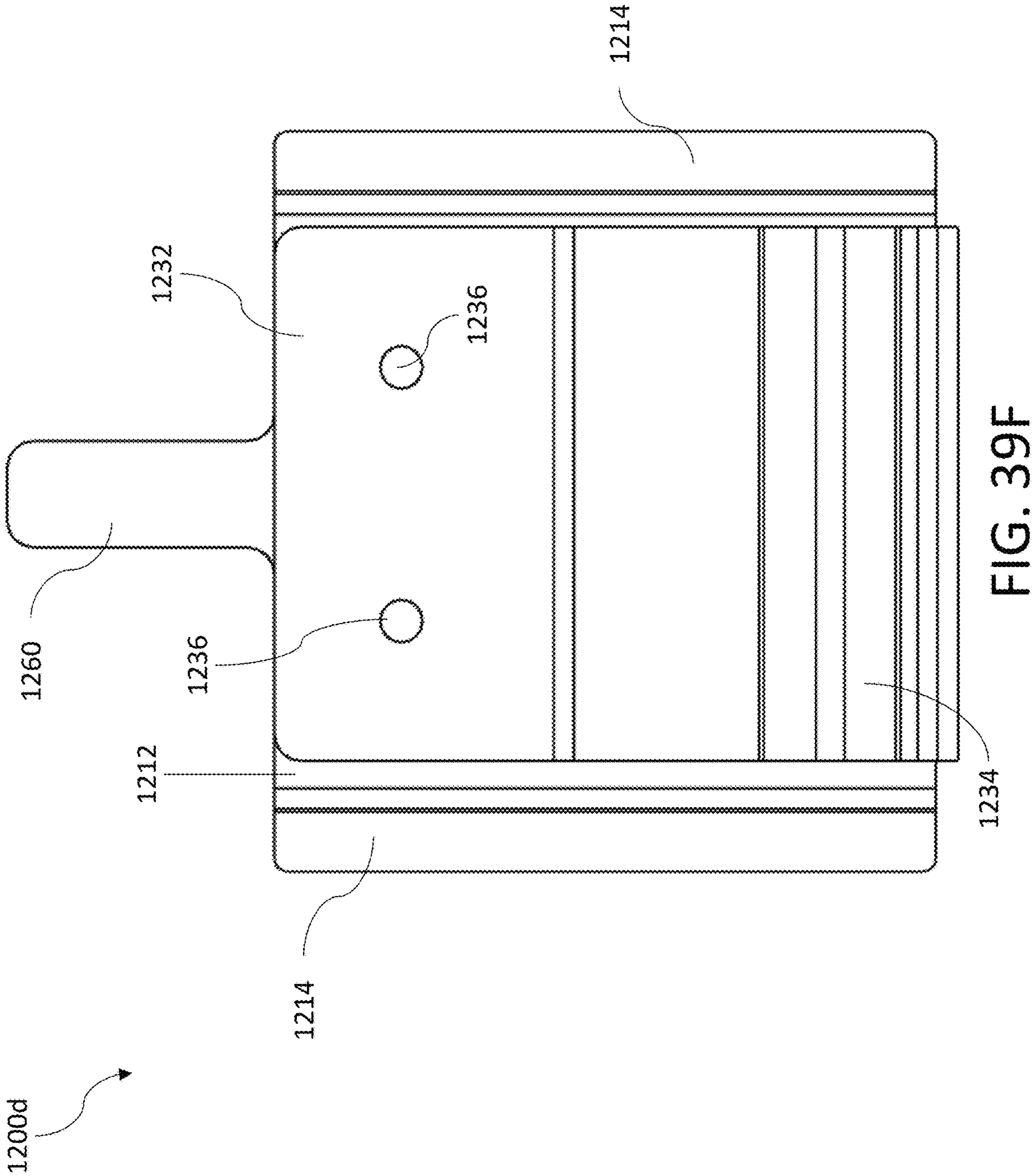
FIG. 39F shows a front view of the bar hanger holder of FIG. 39A.
Figure 39G:
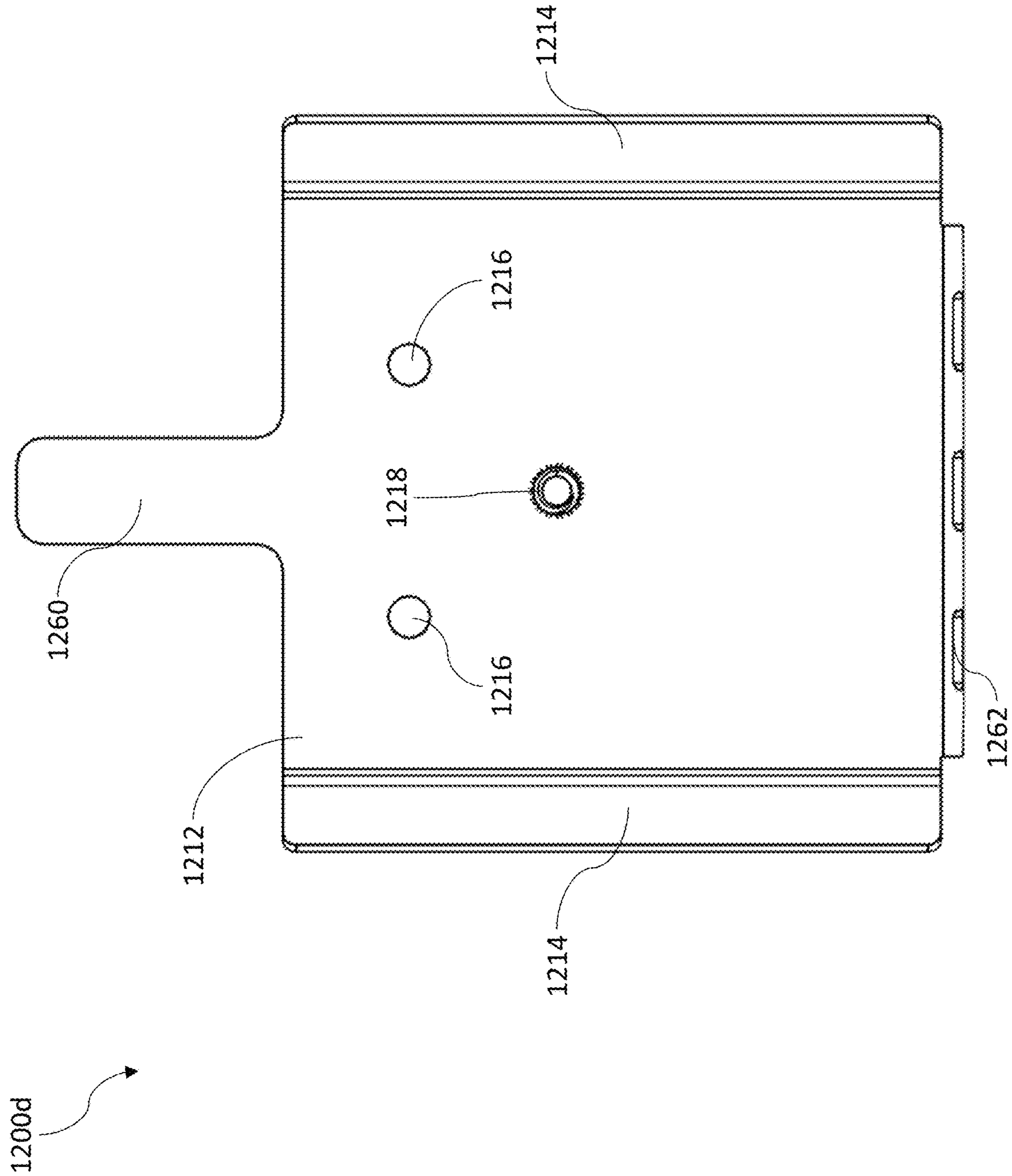
FIG. 39G shows a rear view of the bar hanger holder of FIG. 39A.

FIG. 37 shows a perspective view of the pan frame 1400*e*. As shown, the pan frame 1400*e* may be substantially similar to the pan frame 1400*c* with the primary difference being the smaller sized opening 1412.

A Housing Assembly With a Single-Piece Bar Hanger Holder

As described above, the bar hanger holder may include a housing bracket and a hanger bracket coupled together to provide a mounting interface to couple a bar hanger assembly to a housing. In some implementations, the housing bracket and the hanger bracket may be separate components coupled together using, for example, one or more rivets. However, it should be appreciated that in other implementations, the features of the housing bracket and the hanger bracket may be incorporated into a unitary or single-piece component.

For example, FIGS. 38A-38G show several views of an exemplary housing assembly 1000*v* with single-piece bar hanger holders 1200*d*-1 and 1200*d*-2 (collectively referred to herein as "the bar hanger holder 1200*d*"). For clarity, the housing is not shown; however, it should be appreciated the housing assembly 1000*v* may support various housings as described above including, but not limited to a deep housing, a shallow housing, a round housing, and a square housing. The housing assembly 1000*v* may include the bar hanger assembly 1100*a* with a pair of bar hanger holders 1200*d* (i.e., the bar hanger holders 1200*d*-1 and 1200*d*-2). As before, each bar hanger holder 1200*d* may be slidably coupled to one pair of bar hangers 1110 (e.g., bar hangers 1110-1 and 1110-4 or bar hangers 1110-2 and 1110-3). The bar hanger holders 1200*d* may further provide a mounting interface to support a housing. In some implementations, the pair of bar hanger holders 1200*d* may be disposed on opposing sides of the housing. In some implementations, the bar hanger holder 1200*d* may further provide additional axes of adjustment to position and/or orient the housing differently with respect to the bar hanger assembly 1100*a*.

FIGS. 39A-39G show several views of the bar hanger holder 1200*d*. As shown, the bar hanger holder 1200*d* may integrate several features from the hanger bracket and the housing bracket into a single component. For example, the bar hanger holder 1200*d* may include a base 1212 joined to a base 1232 (also referred to herein as an "end portion 1232") and a rail section 1234 via a perforated section 1262. The base 1212 may include one or more flanges 1214 to abut respective sides of the housing and/or to guide the adjustment of the housing relative to the bar hanger holder 1200*d* along one or more desired axes (e.g., a vertical axis). The base 1212 may further include a rod 1218 that is inserted through an opening on the housing to facilitate coupling of the bar hanger holder 1200*d* to the housing. In some implementations, a locking nut may be coupled (e.g., screwed) onto the rod 1218.

In some implementations, the rail 1234 and the base 1232 may be bent about the perforated section 1262 such that the base 1232 abuts the base 1212. Thus, the base 1212, the base 1232, and the rail 1234 may form a partially enclosed passageway 1206 to support and constrain the bar hangers 1110. In some implementations, the base 1212 may be coupled to the base 1232 via one or more rivets (not shown) to prevent the base 1232 from bending with respect to the base 1212 about the perforated section 1262 when the housing assembly 1000*v* is subjected to a load. Said in another way, the rivets may reduce or, in some instances, mitigate unwanted deformation of the bar hanger holder 1200*d* so that the bar hangers 1110 passing through the passageway 1206 are maintained in a desired orientation relative to the bar hanger holder 1200*d* and the housing.

For example, the base 1212 may include one or more openings 1216 and the base 1232 may include corresponding openings 1236 to receive corresponding rivets (not shown) to couple the bases 1212 and 1232 together such that the base 1212 is substantially flush with the base 1232. In some implementations, the rail section 1234 may further include an opening (not shown) to receive a locking fastener that locks the relative position of the bar hanger holder 1200*d* to the bar hangers 1110.

The bar hanger holder 1200*d* may also include a tab 1260 that extends from the base 1212 to cover an opening on the sidewall of the housing (e.g., a slot on the sidewall of the housing). In this manner, the opening on the housing may remain substantially covered even as the position and/or orientation of the housing is changed with respect to the bar hanger holder 1200*d*. In some implementations, the tab 1260 may be substantially coplanar with the base 1212. The placement of the tab 1260 on the base 1212 and the shape of the tab 1260 may be tailored such that the tab 1260 does not cover other features of the housing (e.g., a knockout, a Romex feedthrough). For example, FIGS. 39A-39G show the tab 1260 may (1) extend vertically from the base 1212, (2) be substantially centered with the rod 1218, and (3) have a sufficiently small width, which may enable the tab 1260 to move between respective knockouts and/or Romex feedthroughs located on one side of the housing.

Compared to the bar hanger holders 1200*a*-1200*c*, the bar hanger holder 1200*d* may be simpler to manufacture and assemble due, in part, to the lower number of parts used (e.g., the separate housing bracket and hanger bracket, the rivets along a bottom portion of the bar hanger holder). In some implementations, the bar hanger older 1200*d* may be fabricated from a flat sheet that is cut and/or bent to form the various structural features described above. For example, FIGS. 40A-40G show the bar hanger holder 1200*d* in a partially unbent state where the flanges 1214 and the rail section 1234 are formed using, for example, an automated bending process. At this stage of manufacture, the tab 1260 may already be formed and the rod 1218 may be coupled to the base 1212. To complete the manufacture and assembly of the bar hanger holder 1200*d*, the rail 1234 and the base 1232 may be bent about the perforated section 1262 until the base 1232 abuts the base 1212. Once the base 1232 is flush with the base 1212, rivets may be inserted through respective openings 1216 and 1236 to securely couple the base 1212 and the base 1232 together.

Figure 40A:
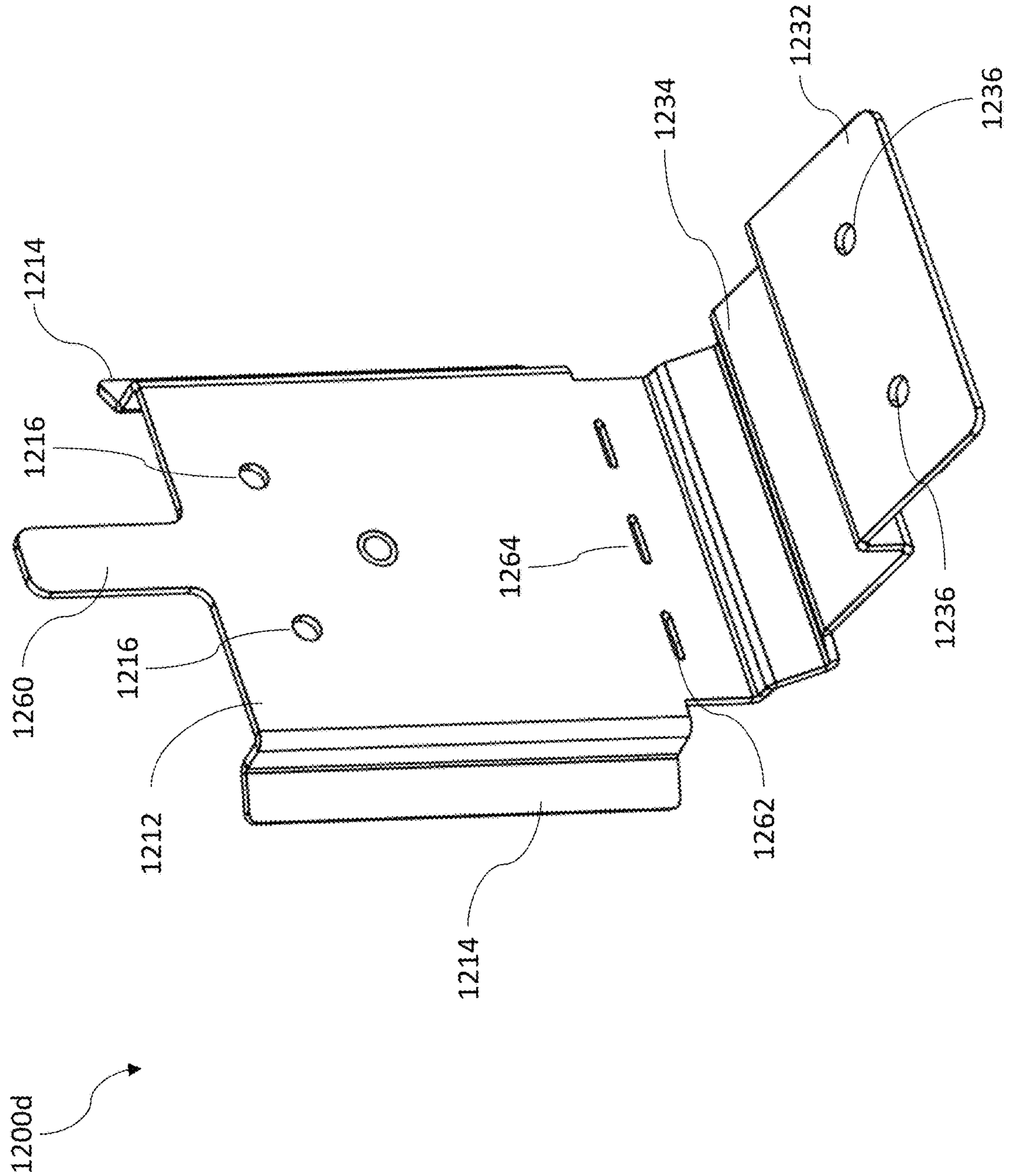
FIG. 40A shows a top, front, left perspective view of the bar hanger holder of FIG. 39A in a partially unbent state.
Figure 40B:
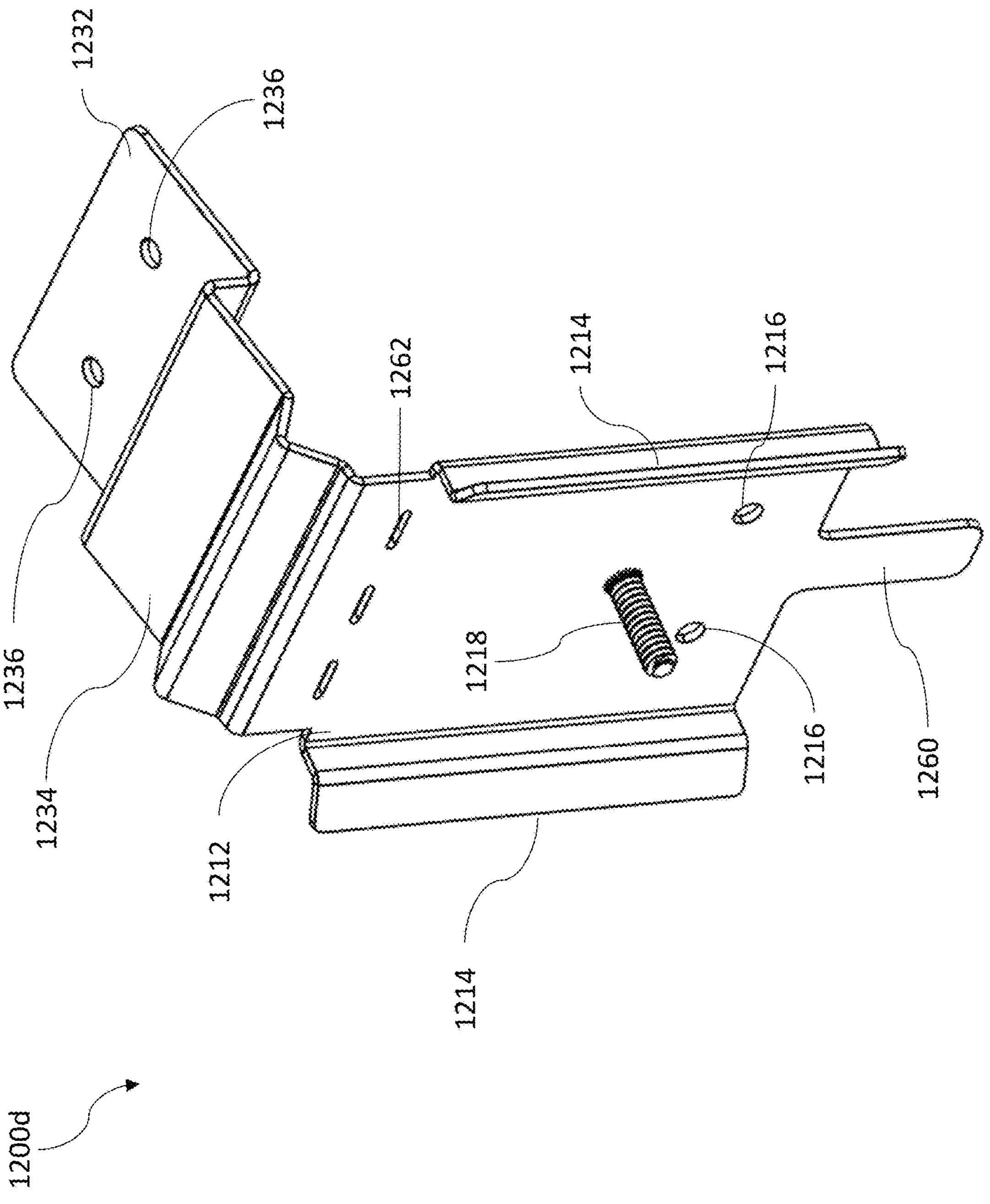
FIG. 40B shows a bottom, rear, right perspective view of the bar hanger holder of FIG. 40A.
Figure 40C:
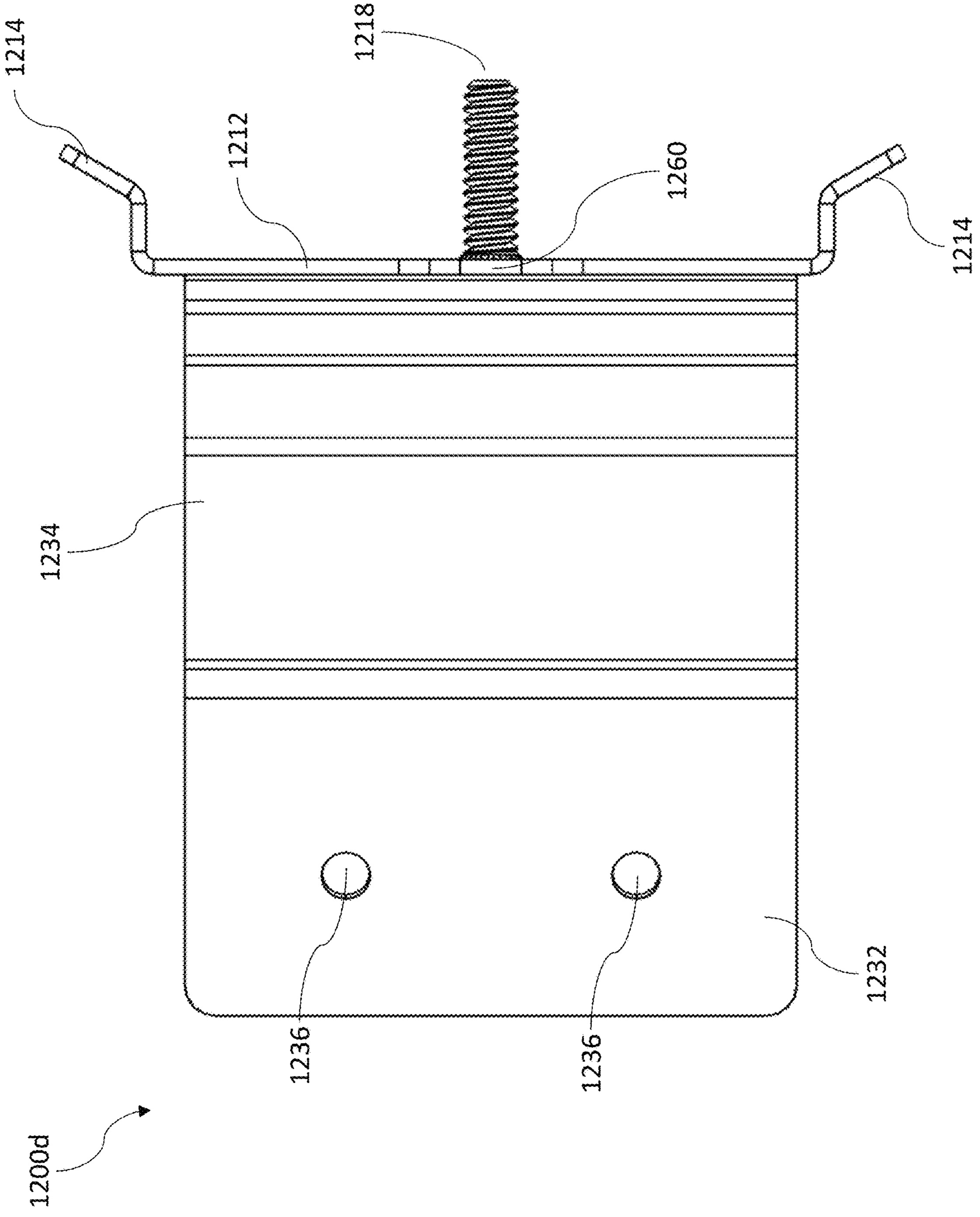
FIG. 40C shows a top view of the bar hanger holder of FIG. 40A.
Figure 40D:
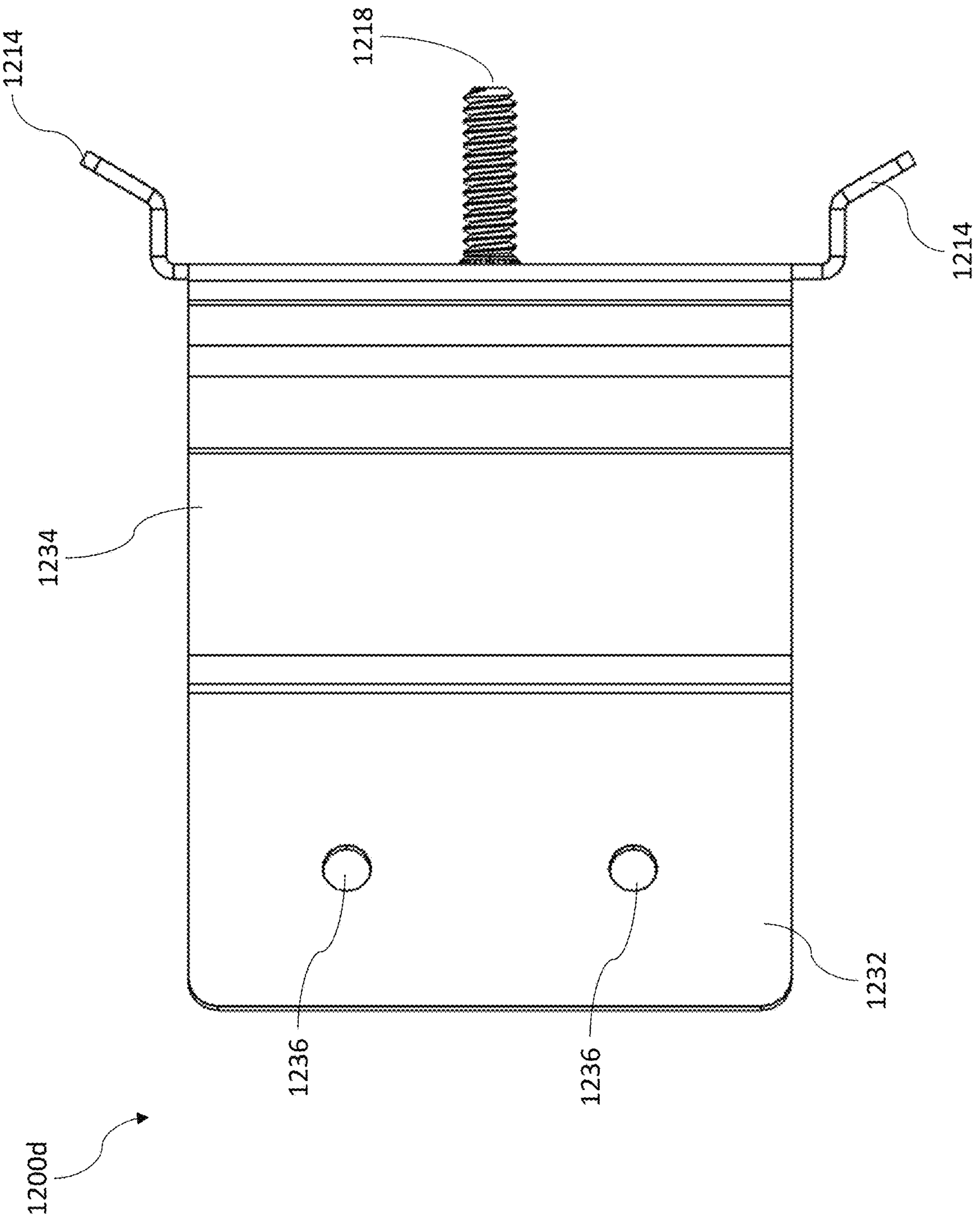
FIG. 40D shows a bottom view of the bar hanger holder of FIG. 40A.
Figure 40E:
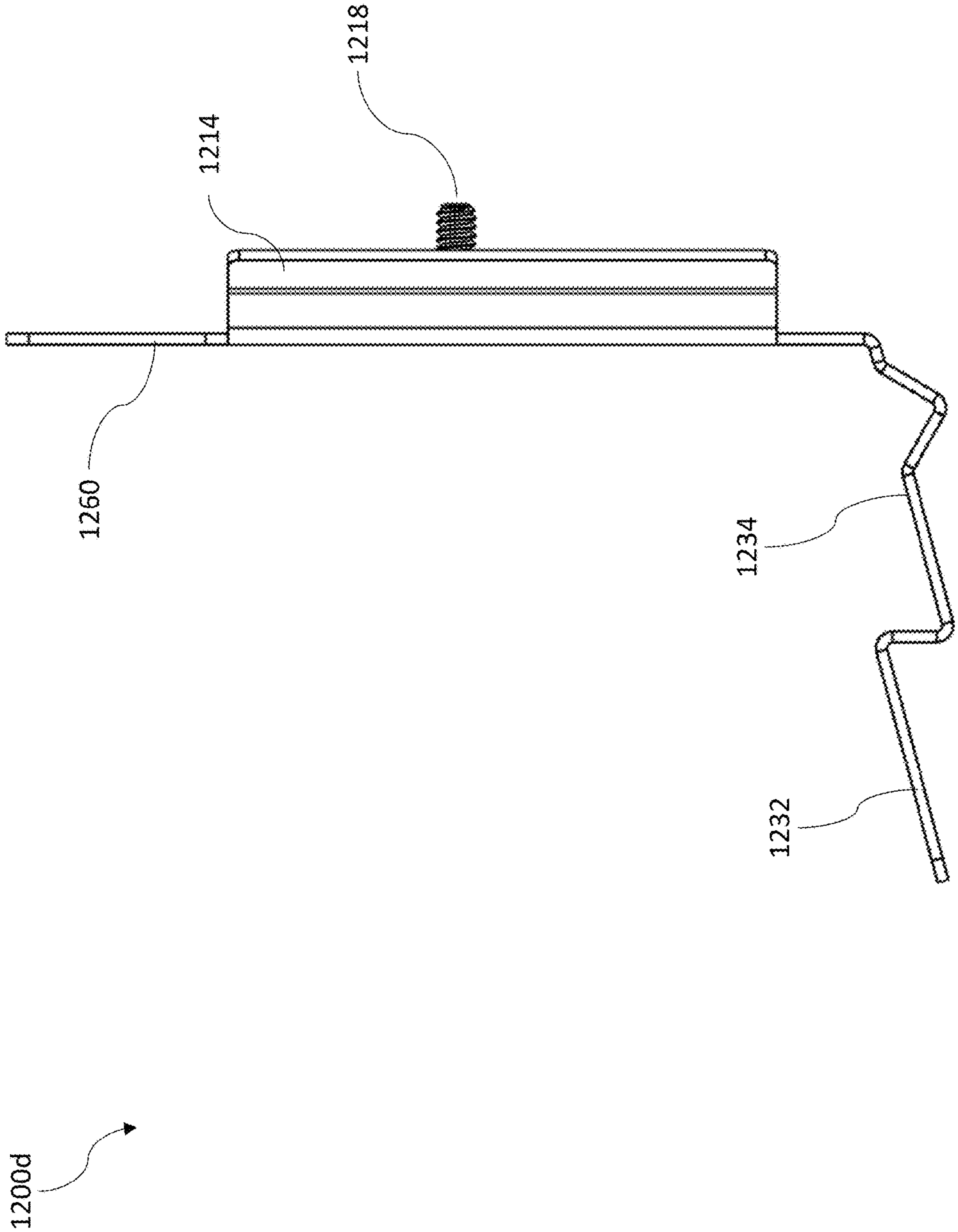
FIG. 40E shows a right-side view of the bar hanger holder of FIG. 40A.
Figure 40F:
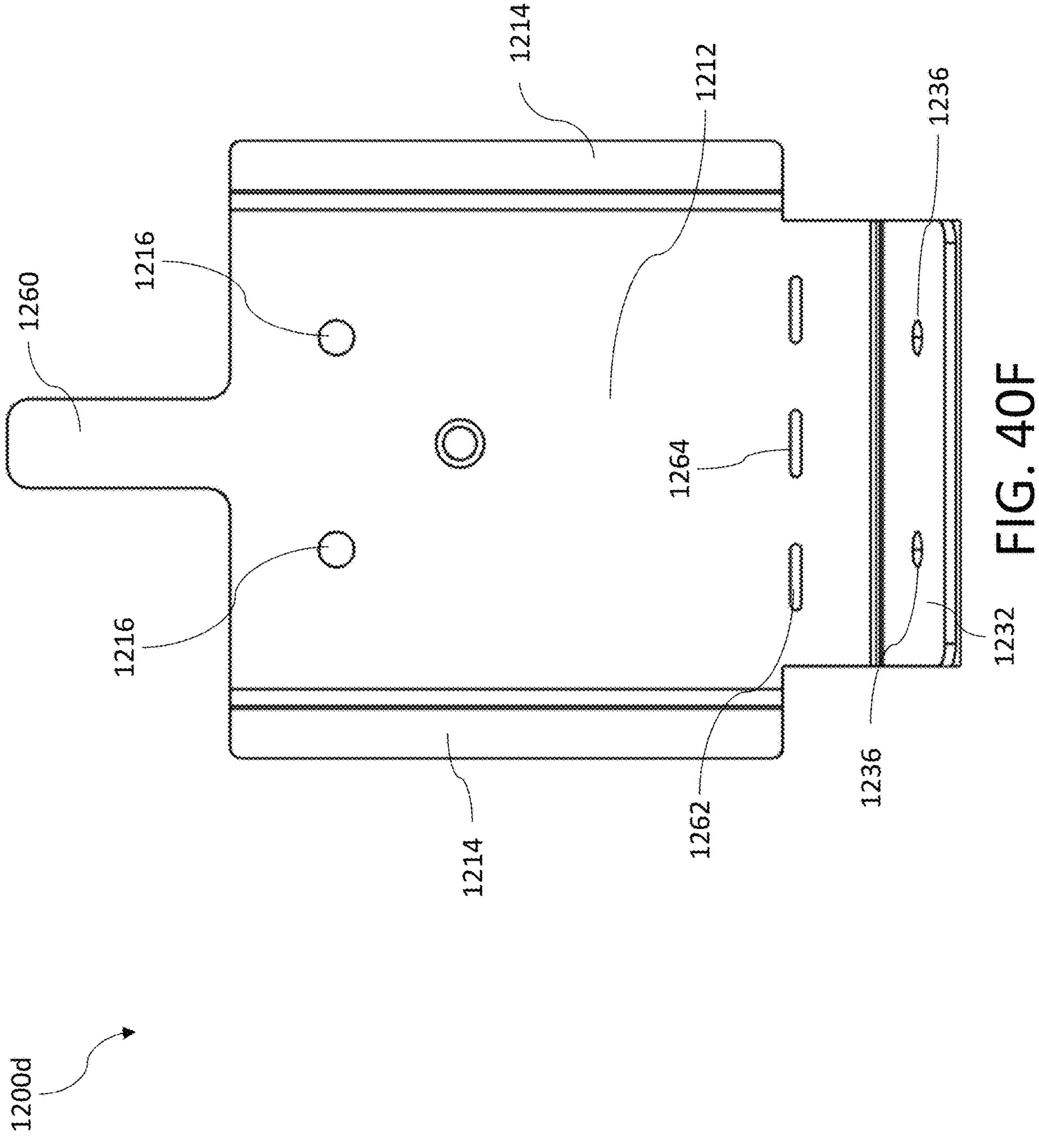
FIG. 40F shows a front view of the bar hanger holder of FIG. 40A.
Figure 40G:
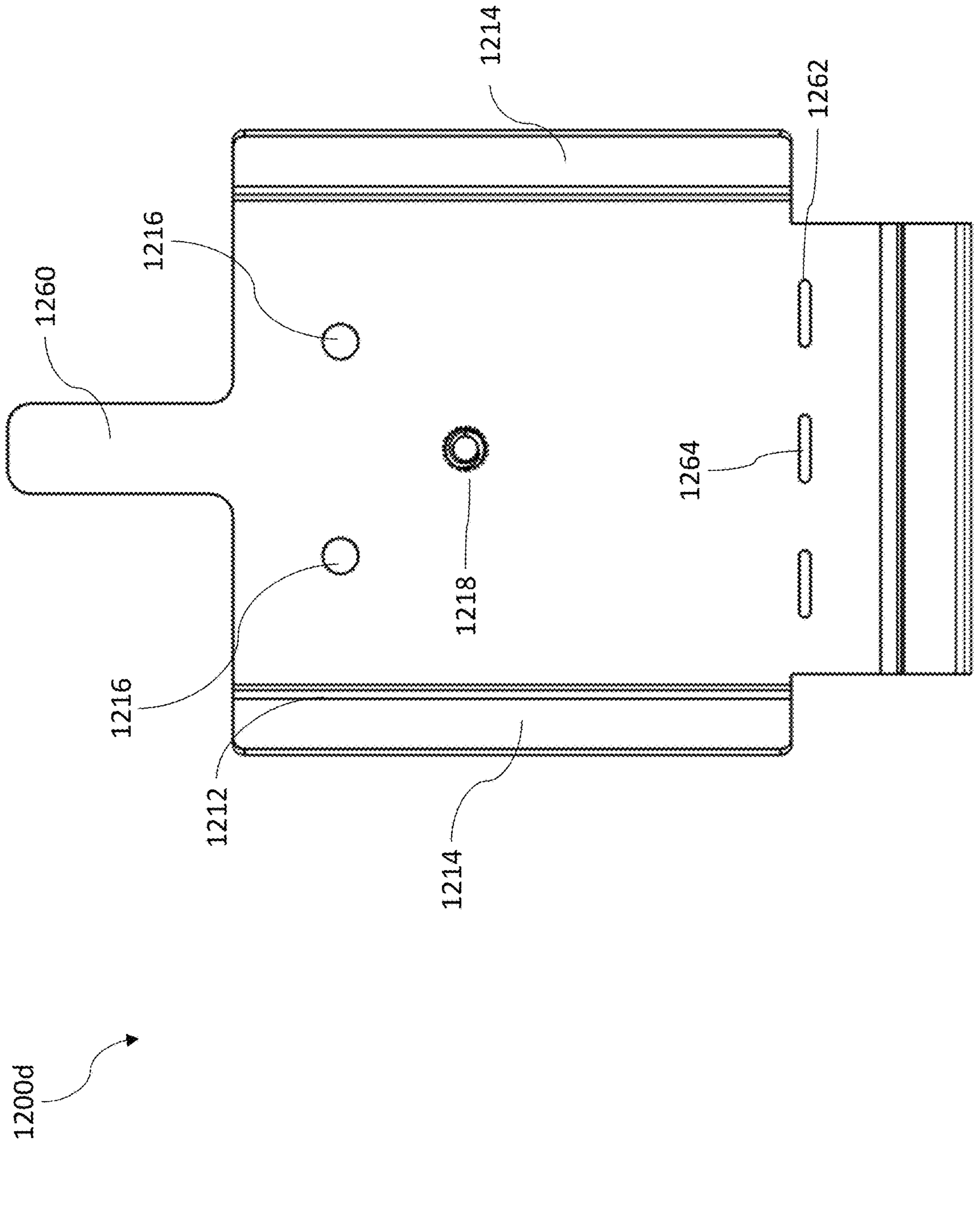
FIG. 40G shows a rear view of the bar hanger holder of FIG. 40A.

In some implementations, the perforated section 1262 may include one or more openings 1264 in order to make bending the rail 1234 and the base 1232 with respect to the base 1212 easier. For example, FIG. 40A shows the perforated section 1262 may include multiple openings 1264 shaped as elongated slots that are in a colinear arrangement along a desired bending axis. In some implementations, the number and/or dimensions of the openings 1264 may be chosen to reduce the bending resistance such that the rail section 1234 and the base 1232 may be bent manually (e.g., by hand or using a hand tool). The arrangement of the openings 1264 may ensure the rail section 1234 and the base 1232 are bent about the desired bending axis relative to the base 1212. However, it should be appreciated that, in other implementations, the single piece bar hanger holder may not include a perforated section. Instead, the machinery used to bend and form the bar hanger holder may provide sufficient precision and fidelity such that the perforated section is not needed.

Figure 41:
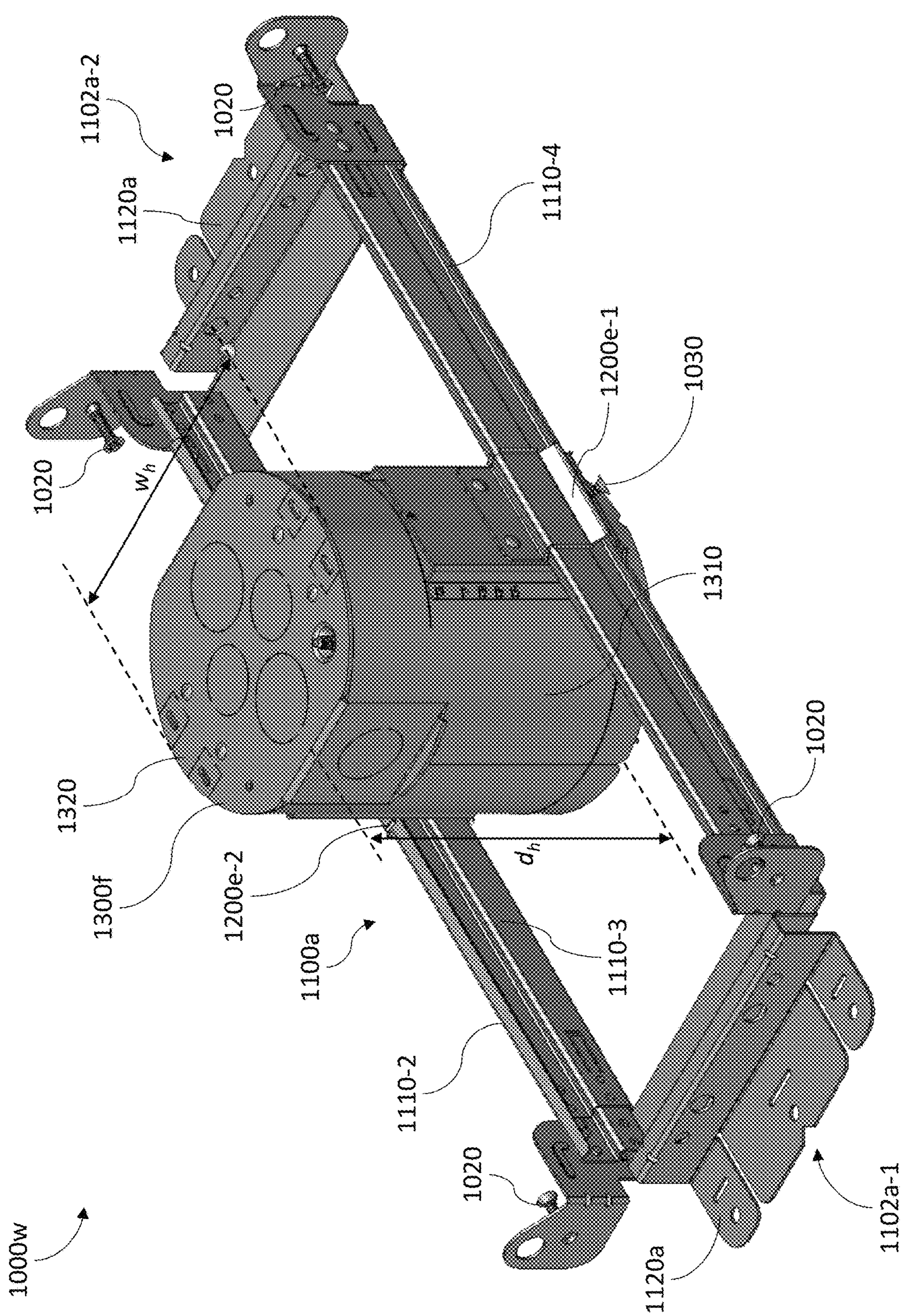
FIG. 41 shows a top, front, left perspective view of another exemplary housing assembly with a single-piece bar hanger holder and a round-shaped housing.

In another example, FIG. 41 shows another exemplary housing assembly 1000*w* with single-piece bar hanger holders 1200*e*-1 and 1200*d*-2 (collectively referred to herein as "the bar hanger holder 1200*d*"). Once again, the housing assembly 1000*v* may include the bar hanger assembly 1100*a*. Each bar hanger holder 1200*e* may be slidably coupled to one pair of bar hangers 1110 (e.g., bar hangers 1110-1 and 1110-4 or bar hangers 1110-2 and 1110-3). The housing assembly 1000*w* may further include a round-shaped housing 1300*f* coupled to the bar hanger assembly 1100*a* via the bar hanger holders 1200*e*. Specifically, the housing 1300*f* may have a curved sidewall 1310 and round cover 1320 conforming with the curved geometry of the sidewall 1310. In some implementations, at least a portion of the sidewall 1310 may have a circular cross-sectional shape.

The housing 1300*f*, however, may nevertheless include several of the same features as in the housings 1300*a*-1300*e*.

For example, the housing 1300*f* may include multiple knockouts and Romex feedthrough tabs disposed on the cover 1320 and/or the sidewall 1310. The housing 1300*f* may further include on or more slots (not shown) to facilitate adjustment of the housing 1300*f* relative to the bar hanger holders 1200*e*. In some implementations, the housing 1300*f* may have a width, $w_h$, of about 4.2 inches and a depth, $d_h$, of about 4.5 inches.

FIGS. 42A-42I show several views of the bar hanger holder 1200*e*. As shown, the bar hanger holder 1200*e* may include similar features as the bar hanger holder 1200*d*. For example, the bar hanger holder 1200*e* may include a base 1212 that is joined to a rail section 1234 and the rail section 1234 is joined to an end portion 1232. The end portion 1232 may abut the base 1212 and include multiple openings 1236 that align with corresponding openings 1216 on the base 1212 to receive rivets 1202, thus securely coupling the base 1212 to the end portion 1232. In this manner, the base 1212 and the rail section 1234 define a passageway 1206 to support and guide the bar hangers 1110. The rail section 1234 may further include a fastener opening 1238 to receive the fastener 1030 to lock the bar hangers 1110 to the bar hanger holder 1200*e*.

The base 1212 may further include flanges 1214 to physically contact the sidewall 1310 of the housing 1300*f* in order to align the bar hanger holder 1200*e* to the housing 1300*f*. The base 1212 may also include a rod 1218 protruding from the base 1212 for insertion into a slot on the housing 1300*f*. Once the rod 1218 is inserted through the slot of the housing 1300*f*, a wing nut 1204*b* may be placed onto the rod 1218 from within the cavity of the housing 1300*f* to lock the bar hanger holder 1200*e* to the housing 1300*f*.

Figure 42A:
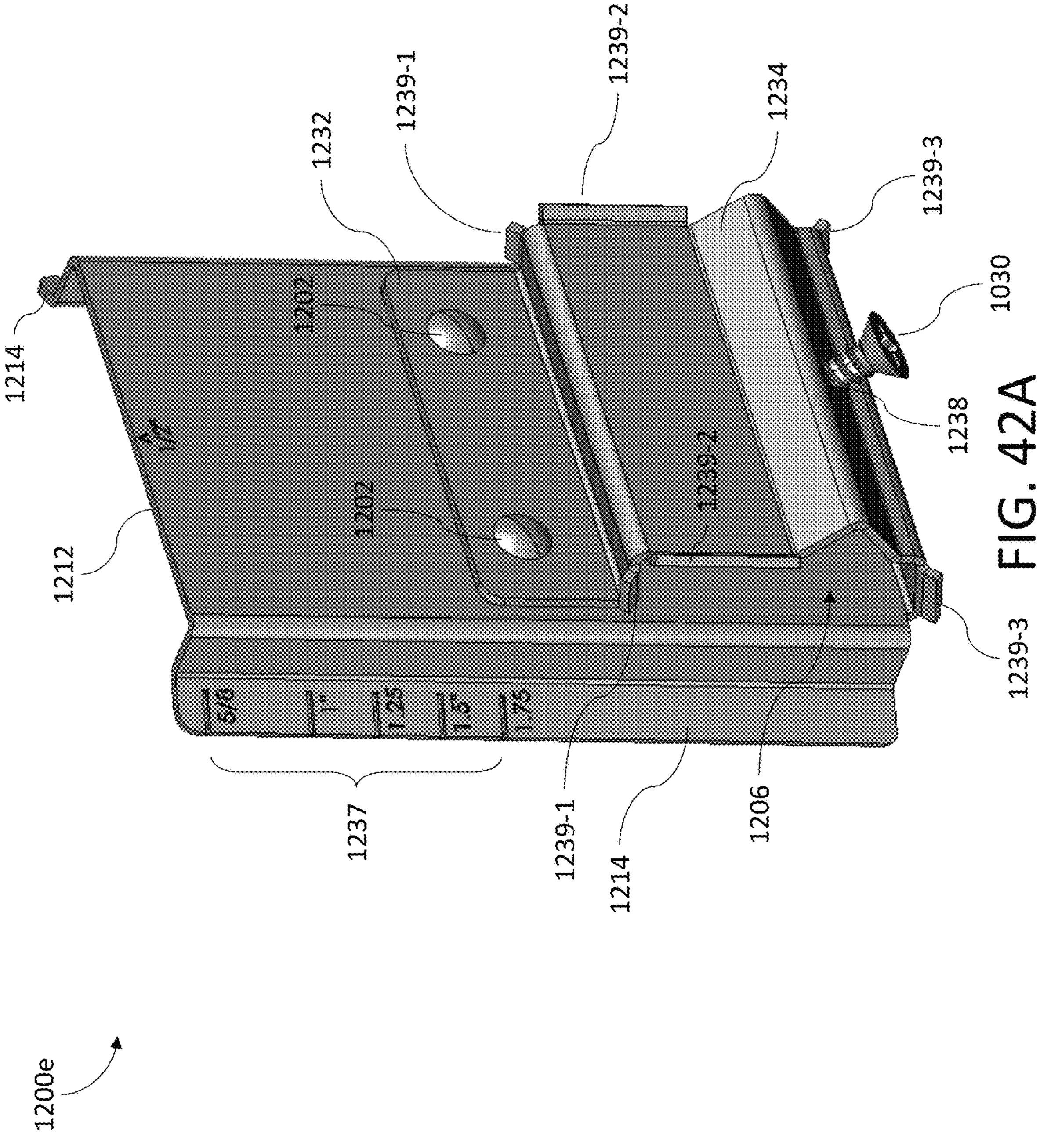
FIG. 42A shows a top, front, left perspective view of a bar hanger holder in the housing assembly of FIG. 42A.
Figure 42B:
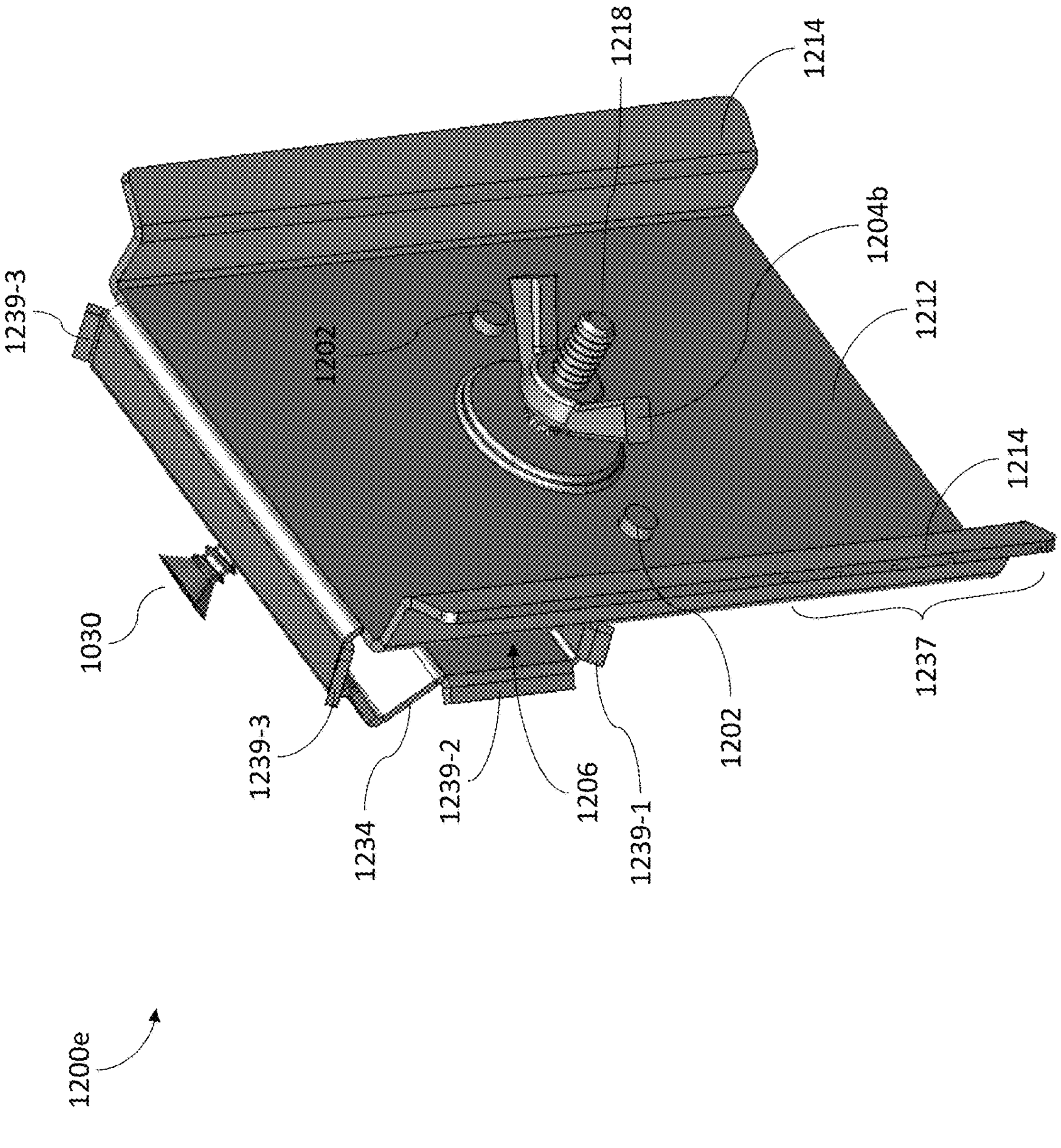
FIG. 42B shows a bottom, rear, left perspective view of the bar hanger holder of FIG. 42A.
Figure 42C:
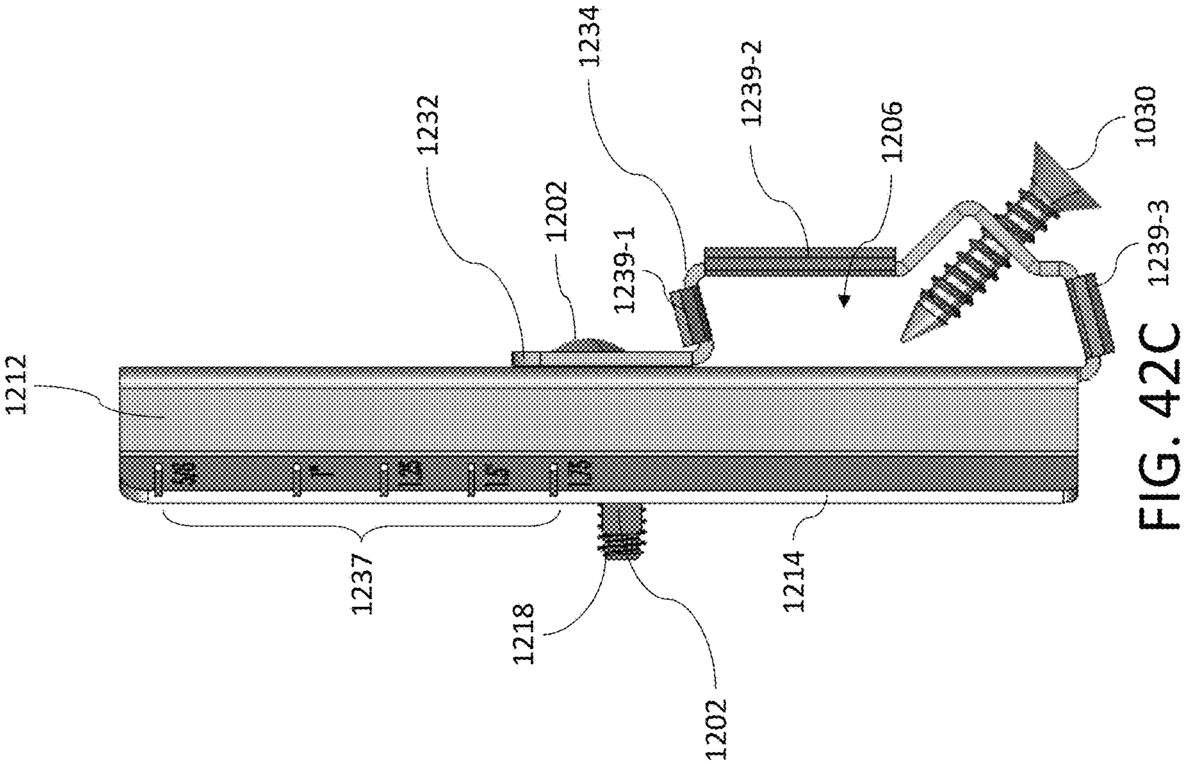
FIG. 42C shows a left-side view of the bar hanger holder of FIG. 42A.
Figure 42D:
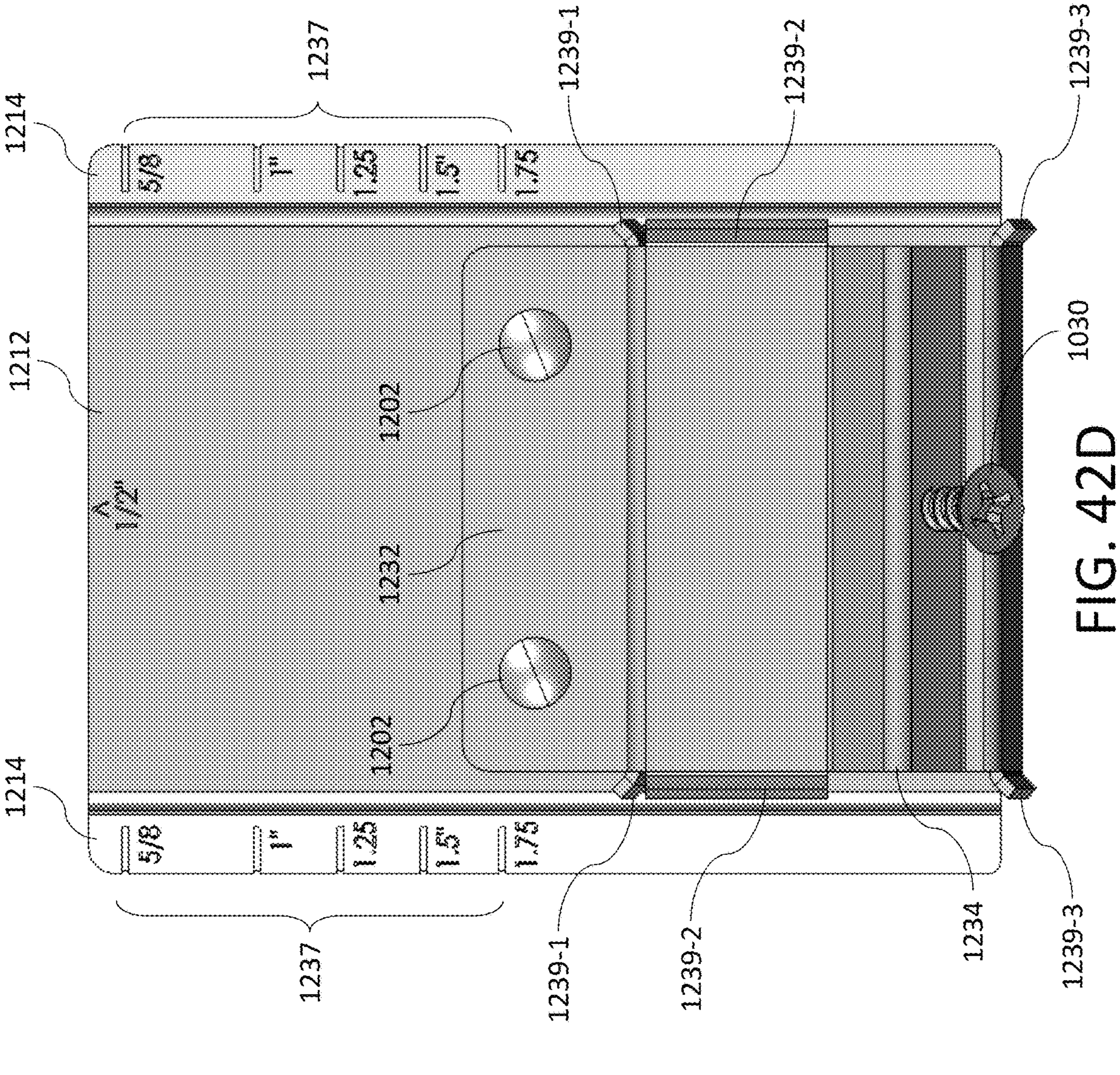
FIG. 42D shows a front view of the bar hanger holder of FIG. 42A.
Figure 42E:
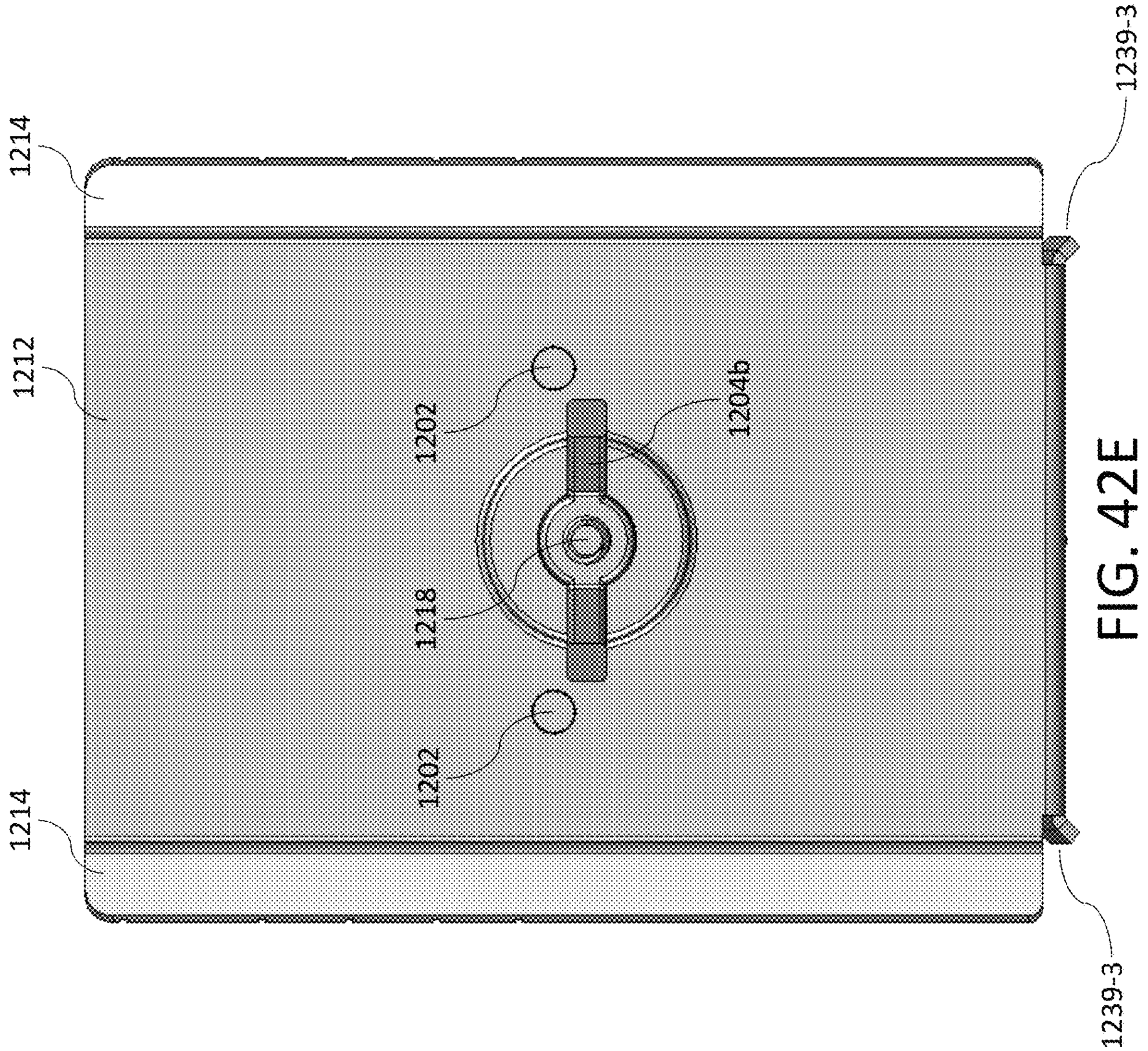
FIG. 42E shows a rear view of the bar hanger holder of FIG. 42A.
Figure 42G:
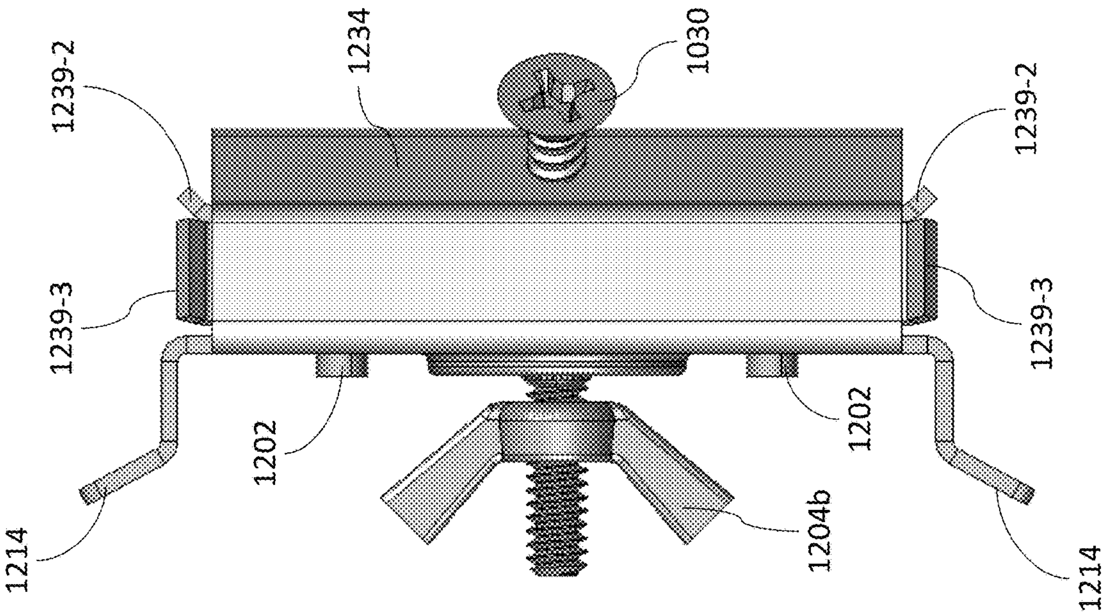
FIG. 42G shows a bottom view of the bar hanger holder of FIG. 42A.
Figure 42F:
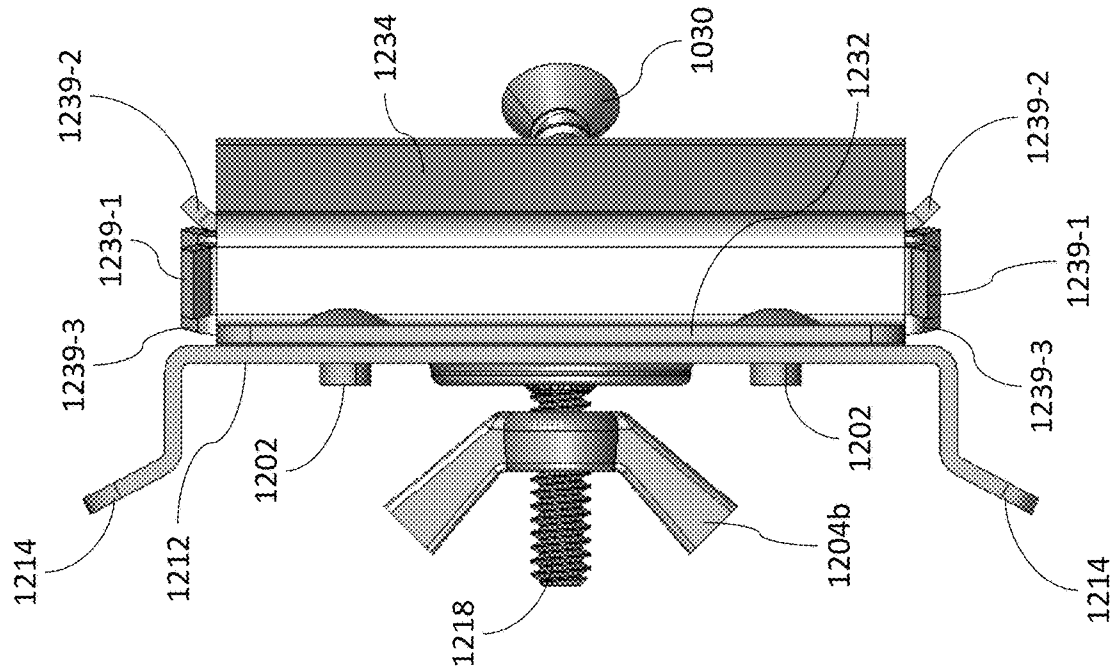
FIG. 42F shows a top view of the bar hanger holder of FIG. 42A.
Figure 42H:
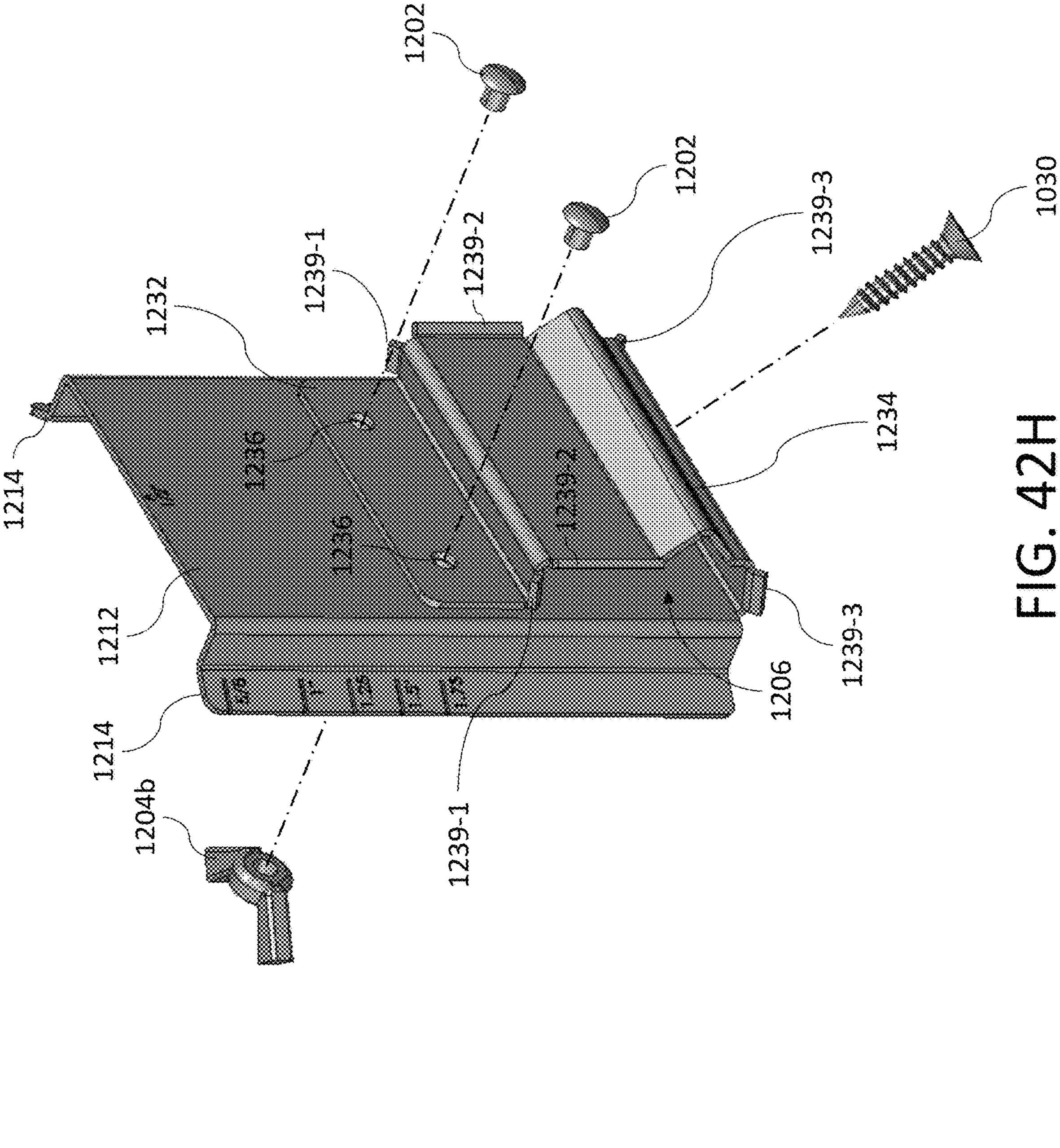
FIG. 42H shows an exploded top, front, left perspective view of the bar hanger holder of FIG. 42A.
Figure 42I:
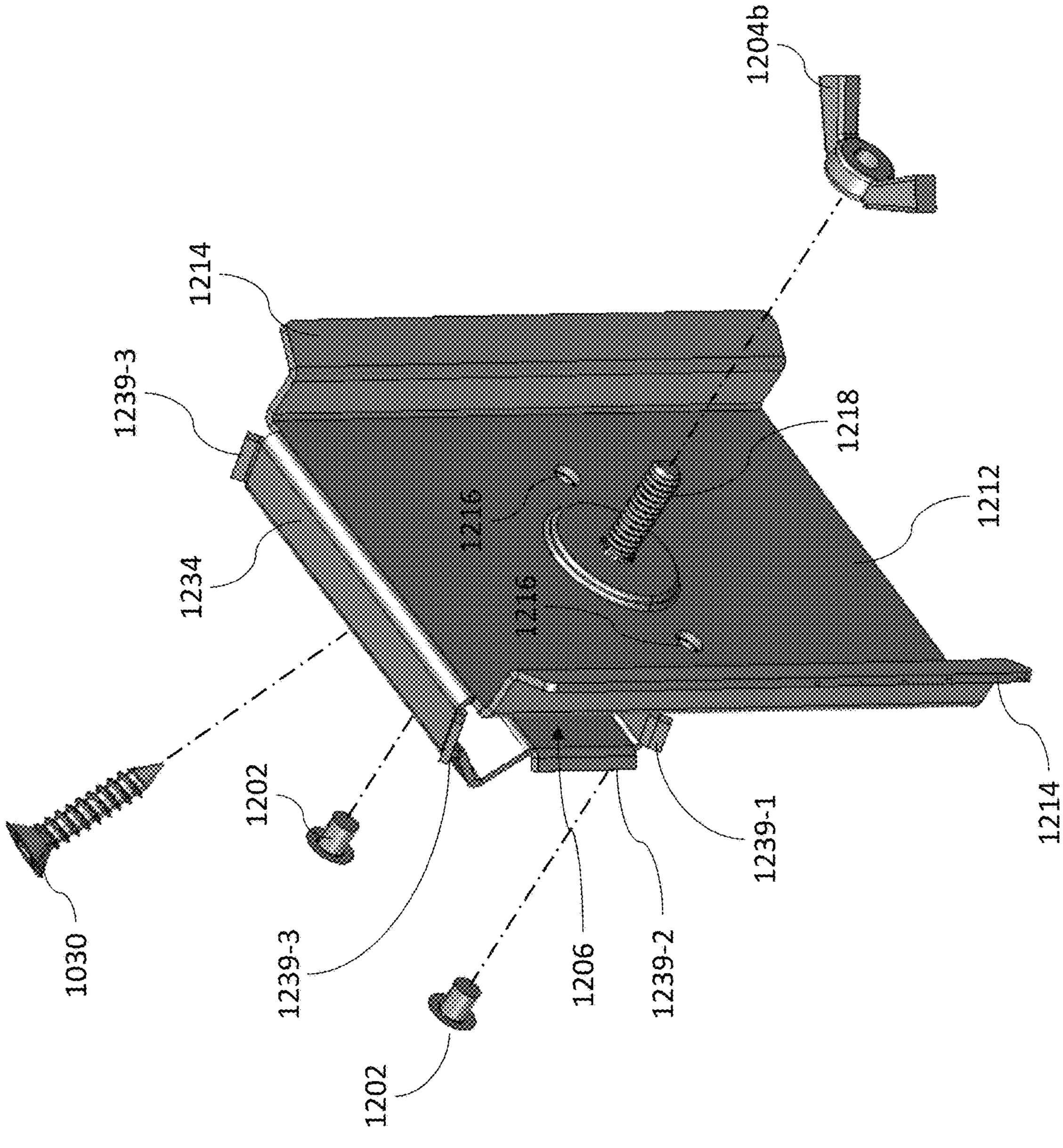
FIG. 42I shows an exploded bottom, rear, left perspective view of the bar hanger holder of FIG. 42A.

Compared to the bar hanger holder 1200*d*, the bar hanger holder 1200*e* may not include a perforated section to facilitate bending of the rail section 1234 with relative to the base 1212 during manufacture. The base 1212 may also extend upwards above the end portion 1232 to cover the openings on the sidewall 1310 of the housing 1300*f* in the same manner as the tab 1260 on the bar hanger holder 1200*d*. The bar hanger holder 1200*e* may further include flanges 1214 that similarly span the height of the base 1212. As shown in FIG. 42D, each flange 1214 may further include alignment markings 1237 to guide the user when adjusting the position of the housing 1300*f* relative to the bar hanger holder 1200*e* during installation. In some implementations, the alignment markings 1237 may provide numerical values that correspond to the distance between the bottom end 1313 of the housing (e.g., the housings 1300*a*-1300*f*) and a portion of the bar hanger assembly 1100*a* (e.g., the base 1122 of the crossmember 1120*a*). In some implementations, the alignment markings 1237 may provide numerical values corresponding to the thickness of a drywall panel installed, for example, at standard distance from the support structures. In some implementations, the alignment markings 1237 may be aligned to one or more reference lines on the housing 1300*f* to facilitate positional adjustment of the housing 1300*f* relative to the bar hanger holders 1200*d*.

The bar hanger holder 1200*e* may also include tabs 1239-1, 1239-2, and 1239-3 that flare outwards from the rail section 1234 along both sides of the passageway 1206. The tabs 1239-1, 1239-2, and 1239-3 may function, in part, as lead-in features to facilitate insertion of the bar hangers 1110 into the passageway 1206 when installing the housing assembly 1000*w* and/or adjusting the position of the housing 1300*f* along the bar hangers 1110.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles “a” and “an,” as used herein in the specification and in the claims, unless clearly indicated to the contrary, should be understood to mean “at least one.”

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A bar hanger assembly, comprising:
a first bar hanger;
a second bar hanger; and
a first crossmember directly coupled to the first bar hanger and the second bar hanger, the first crossmember comprising:
a first mounting feature to securely couple the first crossmember to a joist with only a fastener when the bar hanger assembly is installed onto the joist, the first mounting feature comprising a first flange, the first flange comprising:
a first wall directly coupled to the first bar hanger; and
a second wall, joined to the first wall, having a first fastener opening,
wherein when the bar hanger assembly is installed onto the joist, the second wall abuts the joist and a first fastener is inserted through the first fastener opening so as to securely attach the first flange directly to the joist;
a second mounting feature to securely couple the first crossmember to a T-bar with only a fastener when the bar hanger assembly is installed onto the T-bar; and
a third mounting feature to securely couple the first crossmember to a hat channel with only a fastener when the bar hanger assembly is installed onto the hat channel,
wherein the first crossmember is formed as a single component.

2. The bar hanger assembly of claim 1, wherein:
the first crossmember further comprises a base;
the first flange is directly joined to the base; and
the third mounting feature comprises:
a second flange having a second fastener opening, the second flange abutting the hat channel and a second fastener being inserted through the second fastener opening so as to securely attach the second flange directly to the hat channel when the bar hanger assembly is installed onto the hat channel.

3. The bar hanger assembly of claim 1, wherein:
the first wall is directly coupled to the first bar hanger via one or more rivets.

4. The bar hanger assembly of claim 2, wherein the first crossmember further comprises:
a notch, formed on the second flange, to facilitate removal of the second flange.

5. The bar hanger assembly of claim 1, wherein at least the first flange includes one or more gussets.

6. The bar hanger assembly of claim 1, wherein:
the first crossmember includes a safety cable opening; and
the bar hanger assembly further comprises:
a safety cable, passing through the safety cable opening of the first crossmember, to couple the bar hanger assembly to a ceiling space when the bar hanger assembly is installed onto one of the joist, the T-bar, or the hat channel disposed in the ceiling space.

7. The bar hanger assembly of claim 1, further comprising:
a third bar hanger telescopically coupled to the first bar hanger;
a fourth bar hanger telescopically coupled to the second bar hanger; and
a second crossmember rigidly coupled to the third bar hanger and the fourth bar hanger, the second crossmember being identical with the first crossmember.

8. A housing assembly, comprising:
the bar hanger assembly of claim 7; and
a housing, slidably coupled to the first, second, third, and fourth bar hangers, defining a cavity and having an edge defining an open end into the cavity, the open end being accessible through an opening of a ceiling when the housing assembly is installed into the ceiling.

9. The housing assembly of claim 8, wherein the housing assembly supports a mechanical load greater than or equal to 200 pounds applied to the housing when the first and second crossmembers are each installed onto one of a joist, a T-bar, or a hat channel.

10. The housing assembly of claim 8, further comprising:
a first bar hanger holder directly coupled to a first side of the housing and defining a first passageway for the first and third bar hangers to pass through thereby slidably coupling the first bar hanger holder to at least one of the first or third bar hangers, the first bar hanger holder comprising:
a base portion, abutting the first side of the housing, having a second fastener opening;
a rail section joined to the base portion, the rail section and the base portion together defining the first passageway;

an end portion, joined to the rail section and abutting the base portion, having a third fastener opening aligned to the second fastener opening; and a rivet, inserted through the second and third fastener openings, to couple the end portion to the base portion; and a second bar hanger holder, directly coupled to a second side of the housing opposite the first side, defining a second passageway for the second and fourth bar hangers to pass through thereby slidably coupling the second bar hanger holder to at least one of the second or fourth bar hangers, the second bar hanger holder being identical with the first bar hanger holder.

11. The housing assembly of claim 8, further comprising:

a pan frame, comprising:

a rectangular base defining an opening to accommodate at least a portion of the housing;

a first rail section, joined to a first side of the rectangular base, defining a first passageway for the first or third bar hangers to pass through thereby slidably coupling the pan frame to at least one of the first or third bar hangers;

a second rail section, joined to a second side of the rectangular base opposite the first side, defining a second passageway for the second or fourth bar hangers to pass through thereby slidably coupling the pan frame to at least one of the second or fourth bar hangers;

a first sidewall flange joined to a third side of the rectangular base and oriented substantially orthogonal with respect to the rectangular base; and a second sidewall flange joined to a fourth side of the rectangular base opposite the third side and oriented substantially orthogonal with respect to the rectangular base;

a first bracket coupled to the rectangular base of the pan frame and a first side of the housing; and a second bracket coupled to the rectangular base of the pan frame and a second side of the housing.

12. A bar hanger assembly, comprising:

a first bar hanger;

a second bar hanger; and a crossmember, comprising:

a base;

a first flange directly joined to the base, the first flange comprising:

a first wall coupled to the base and the first bar hanger, the first wall having a first notched portion to provide clearance for a T-bar to pass through when the bar hanger assembly is installed onto the T-bar; and a second wall, directly joined to the first wall, to abut a side of a joist when the bar hanger assembly is installed onto the joist, the second wall having a first fastener opening;

a second flange directly joined to the base, the second flange comprising:

a third wall coupled to the base and the second bar hanger, the third wall having a second notched portion to provide clearance for the T-bar to pass through when the bar hanger assembly is installed onto the T-bar; and a fourth wall, directly joined to the third wall, to abut the side of the joist when the bar hanger assembly is installed onto the joist, the second wall having a second fastener opening.

13. The bar hanger assembly of claim 12, wherein the crossmember further comprises:

a third flange, coupled to the base, to couple the crossmember to a hat channel when the bar hanger assembly is installed onto the hat channel, the third flange being substantially flat and having a third fastener opening, wherein, when the bar hanger assembly is installed onto the hat channel, the third flange is oriented substantially horizontal and abuts the hat channel and a fastener is inserted through the third fastener opening so as to securely attach the third flange directly to the hat channel.

14. A housing assembly, comprising:

the bar hanger assembly of claim 12; and a housing, slidably coupled to at least the first and second bar hangers, defining a cavity and having an edge defining an open end into the cavity, the open end being accessible through an opening of a ceiling when the housing assembly is installed into the ceiling.

15. The housing assembly of claim 14, further comprising:

a first bar hanger holder directly coupled to the housing and defining a first passageway for the first bar hanger to pass through thereby slidably coupling the first bar hanger holder to the first bar hanger, the first bar hanger holder comprising:

a base portion abutting the housing;

a rail section joined to the base portion, the rail section and the base portion together defining the first passageway; and an end portion joined to the rail section and directly coupled to the base portion; and a second bar hanger holder, directly coupled to the housing, defining a second passageway for the second bar hanger to pass through thereby slidably coupling the second bar hanger holder to the second bar hanger, the second bar hanger holder being identical with the first bar hanger holder.

16. The housing assembly of claim 14, further comprising:

a pan frame, comprising:

a base, coupled to the housing, defining an opening to accommodate at least a portion of the housing;

a first rail section, joined to the base, defining a first passageway for the first bar hanger to pass through thereby slidably coupling the pan frame to the first bar hanger;

a second rail section, joined to the base, defining a second passageway for the second bar hanger to pass through thereby slidably coupling the pan frame to the second bar hanger; and at least one sidewall flange joined to the base and disposed between the first and second rail sections, the at least one sidewall flange being oriented substantially vertical when the bar hanger assembly is installed onto the joist.

17. A bar hanger assembly, comprising:

a first bar hanger;

a second bar hanger; and a crossmember configured to couple to a support structure when the bar hanger assembly is installed onto the support structure, the crossmember comprising:

a first mounting feature configured to couple the crossmember to a joist as the support structure;

a second mounting feature configured to couple the crossmember to a T-bar as the support structure; and a third mounting feature configured to couple the crossmember to a hat channel as the support structure, the third mounting feature comprising:

a flange having a fastener opening, wherein when the bar hanger assembly is installed onto the hat channel, the flange is oriented substantially horizontal and abuts a bottom side of the hat channel and a fastener is inserted through the fastener opening so as to securely attach the flange directly to the bottom side of the hat channel.

18. The bar hanger assembly of claim 17, wherein the flange includes a slot shaped to receive a head of a screwdriver so as to facilitate removal of the flange.

19. The bar hanger assembly of claim 1, wherein:

the first wall has a notched portion to provide clearance for the T-bar to pass through when the bar hanger assembly is installed onto the T-bar.

20. The bar hanger assembly of claim 19, wherein the notched portion of the first wall is configured to rest onto the T-bar.

21. The bar hanger assembly of claim 17, wherein:

the flange is a first flange; and the first mounting features comprises a second flange, the second flange comprising:

a first wall directly coupled to the first bar hanger, the first wall having a notched portion to provide clearance for the T-bar to pass through when the bar hanger assembly is installed onto the T-bar; and a second wall, joined to the first wall, to abut the joist when the bar hanger assembly is installed onto the joist, the second wall having the first fastener opening.

* * * * *